US011960237B2

United States Patent
(12)

Sato et al.

(10) Patent No.: US 11,960,237 B2

(45) **Date of Patent: *Apr. 16, 2024**

(54) CARTRIDGE, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Masaaki Sato, Yokohama (JP); Masatoshi Yamashita, Tokyo (JP); Satoshi Nishiya, Yokohama (JP); Kazuhiko Kanno, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,318

(22) Filed: Jul. 11, 2022

(65) Prior Publication Data

US 2022/0350292 A1 Nov. 3, 2022

Related U.S. Application Data

(60) Division of application No. 17/188,367, filed on Mar. 1, 2021, now Pat. No. 11,520,284, which is a division (Continued)

(30) Foreign Application Priority Data

Jun. 15, 2012 (JP) ................................ 2012-135835

(51) Int. Cl.

*G03G 21/18* (2006.01)

*G03G 15/08* (2006.01)

(52) U.S. Cl.

CPC ..... *G03G 21/1857* (2013.01); *G03G 15/0896* (2013.01); *G03G 21/18* (2013.01); *G03G 21/1825* (2013.01)

(58) Field of Classification Search

CPC .......... G03G 21/1857; G03G 15/0896; G03G 21/18; G03G 21/1825; G03G 21/1864

See application file for complete search history.

(56) References Cited

U.S. PATENT DOCUMENTS 4,717,139 A 1/1988 Sootome et al.

5,331,373 A 7/1994 Nomura et al.

(Continued)

FOREIGN PATENT DOCUMENTS

CA 2875930 A 12/2013

CN 1190200 A 8/1998

(Continued)

OTHER PUBLICATIONS

Jun. 30, 2022 Office Action in Chinese Patent Application No. 201910716614.2 (with English translation).

(Continued)

*Primary Examiner* — Sandra Brase

(74) *Attorney, Agent, or Firm* — Venable LLP

(57) ABSTRACT

A cartridge detachably mountable to a main assembly of an electrophotographic image forming apparatus, the cartridge includes (i) a rotatable developing roller for developing a latent image formed on a photosensitive member; (ii) a first drive transmission member capable of receiving a rotational force originated by the main assembly; (iii) a second drive transmission member capable of coupling with the first drive transmission member and capable of transmitting the rotational force received by the first drive transmission member to the developing roller; and (iv) a coupling disconnection member including a force receiving portion capable of receiving the force originated by the main assembly, and an urging portion capable of urging at least one of the first drive transmission member and the second drive transmission member by the force received by the force receiving portion to separate one of the first drive transmission member and (Continued)

the second drive transmission member from the other, thereby disconnecting the coupling.

20 Claims, 93 Drawing Sheets

Related U.S. Application Data of application No. 16/723,034, filed on Dec. 20, 2019, now Pat. No. 10,996,623, which is a division of application No. 16/245,427, filed on Jan. 11, 2019, now Pat. No. 10,712,708, which is a division of application No. 15/715,418, filed on Sep. 26, 2017, now Pat. No. 10,228,652, which is a division of application No. 15/181,792, filed on Jun. 14, 2016, now Pat. No. 9,804,560, which is a division of application No. 14/565,678, filed on Dec. 10, 2014, now Pat. No. 9,429,877, which is a continuation of application No. PCT/JP2013/067016, filed on Jun. 14, 2013.

(56) References Cited

U.S. PATENT DOCUMENTS 5,452,056 A 9/1995 Nomura et al.
5,528,341 A 6/1996 Shishido et al.
5,528,343 A 6/1996 Tada et al.
5,585,889 A 12/1996 Shishido et al.
5,729,796 A 3/1998 Miura et al.
5,768,658 A 6/1998 Watanabe et al.
5,815,644 A 9/1998 Nishiuwatoko et al.
5,825,472 A 10/1998 Araki et al.
5,870,654 A 2/1999 Sato et al.
5,870,655 A 2/1999 Nishiuwatoko et al.
5,878,309 A 3/1999 Nomura et al.
5,893,006 A 5/1999 Kanno et al.
5,911,096 A 6/1999 Batori et al.
5,920,753 A 7/1999 Sasaki et al.
5,926,666 A 7/1999 Miura et al.
5,937,240 A 8/1999 Kanno et al.
5,940,657 A 8/1999 Yokomori et al.
5,940,658 A 8/1999 Yokoi et al.
5,950,049 A 9/1999 Yokomori et al.
5,966,566 A 10/1999 Odagawa et al.
5,974,288 A 10/1999 Sato
6,035,159 A 3/2000 Azuma et al.
6,070,029 A 5/2000 Nishiuwatoko et al.
6,072,969 A 6/2000 Yokomori et al.
6,075,957 A 6/2000 Batori et al.
6,104,894 A 8/2000 Sato et al.
6,131,007 A 10/2000 Yamaguchi et al.
6,185,390 B1 2/2001 Higeta et al.
6,188,856 B1 2/2001 Sato
6,345,164 B1 2/2002 Yokomori et al.
6,381,420 B1 4/2002 Sato et al.
6,381,430 B1 4/2002 Yokomori et al.
6,496,667 B2 12/2002 Shiratori et al.
6,516,168 B2 2/2003 Shiratori et al.
6,560,422 B2 5/2003 Kanno et al.
6,640,066 B2 10/2003 Sato
6,681,088 B2 1/2004 Kanno et al.
6,714,749 B2 3/2004 Sato et al.
6,735,403 B2 5/2004 Kanno et al.
6,834,173 B2 12/2004 Yamaguchi et al.
6,895,199 B2 5/2005 Sato et al.
6,898,399 B2 5/2005 Morioka et al.
6,937,832 B2 8/2005 Sato et al.
6,937,834 B2 8/2005 Kanno et al.
6,947,687 B2 9/2005 Yamaguchi et al.
6,961,528 B2 11/2005 Yamaguchi et al.
6,980,759 B2 12/2005 Kanno et al.
7,027,756 B2 4/2006 Hoshi et al.
7,058,337 B2 6/2006 Hashimoto et al.
7,149,457 B2 12/2006 Miyabe et al.
7,155,140 B2 12/2006 Arimitsu et al.
7,155,141 B2 12/2006 Sato et al.
7,158,736 B2 1/2007 Sato et al.
7,184,686 B2 2/2007 Kanno et al.
7,200,349 B2 4/2007 Sato et al.
7,218,882 B2 5/2007 Toba et al.
7,224,925 B2 5/2007 Sato et al.
7,283,766 B2 10/2007 Arimitsu et al.
7,349,657 B2 3/2008 Sato et al.
7,412,193 B2 12/2008 Sato et al.
7,463,844 B2 12/2008 Hashimoto et al.
7,499,663 B2 3/2009 Sato et al.
7,660,550 B2 2/2010 Mori et al.
7,689,146 B2 3/2010 Sato et al.
7,720,408 B2 5/2010 Jeno et al.
7,756,441 B2 7/2010 Kanno et al.
7,813,668 B2 10/2010 Jeno et al.
7,929,881 B2 4/2011 Yoshino et al.
7,933,534 B2 4/2011 Hoshi et al.
7,983,589 B2 7/2011 Sato et al.
8,059,988 B2 11/2011 Kanno et al.
8,090,292 B2 1/2012 Kanno et al.
8,155,557 B2 4/2012 Kanno et al.
8,170,444 B2 5/2012 Kanno et al.
8,170,445 B2 5/2012 Kanno et al.
8,385,775 B2 2/2013 Kanno et al.
8,396,391 B2 3/2013 Yamashita
8,437,661 B2 5/2013 Kanno et al.
8,494,410 B2 7/2013 Kanno et al.
8,577,252 B2 11/2013 Anan et al.
8,682,211 B2 3/2014 Hoshi et al.
8,805,237 B2 8/2014 Kanno et al.
9,429,877 B2 8/2016 Sato et al.
9,804,560 B2 10/2017 Sato et al.
10,228,652 B2 3/2019 Sato et al.
10,712,708 B2 7/2020 Sato et al.
10,996,623 B2 5/2021 Sato et al.
2002/0025191 A1 2/2002 Kitayama
2002/0044794 A1 4/2002 Nishiuwatoko et al.
2002/0150404 A1 10/2002 Matsuzaka et al.
2003/0138270 A1 7/2003 Matsuoka
2005/0013632 A1 1/2005 Kishigami
2005/0047821 A1 3/2005 Murayama et al.
2005/0254858 A1 11/2005 Numagami et al.
2005/0265746 A1 12/2005 Jung et al.
2006/0013627 A1 1/2006 Choi
2006/0029418 A1 2/2006 Ishii
2006/0029435 A1 2/2006 Kasai et al.
2006/0110184 A1 5/2006 Yoshino et al.
2006/0216061 A1 9/2006 Yamaguchi
2006/0245785 A1 11/2006 Kawamura et al.
2007/0177899 A1 8/2007 Kawamura
2008/0107991 A1 5/2008 Hamano
2008/0138105 A1 6/2008 Kanno et al.
2008/0138115 A1 6/2008 Chadani et al.
2008/0181669 A1 7/2008 Kwon
2008/0190242 A1 8/2008 Kim et al.
2009/0003875 A1 1/2009 Toba et al.
2009/0003876 A1 1/2009 Maeshima et al.
2009/0123181 A1 5/2009 Ito
2009/0232546 A1 9/2009 Yamada et al.
2009/0297211 A1 12/2009 Kanno et al.
2010/0045724 A1 2/2010 Toki
2010/0054814 A1 3/2010 Sakurai et al.
2010/0054823 A1 3/2010 Takasaka et al.
2010/0111562 A1 5/2010 Okabe et al.
2010/0142993 A1 6/2010 Shiraki et al.
2010/0209138 A1 8/2010 Tani
2010/0272470 A1 10/2010 Tomatsu et al.
2011/0020031 A1 1/2011 Sato et al.
2011/0038649 A1 2/2011 Miyabe et al.
2011/0158695 A1 6/2011 Tamura
2011/0159422 A1 6/2011 Nakamura et al.
2011/0188889 A1 8/2011 Kamimura
2011/0236066 A1 9/2011 Takagi
2012/0014730 A1 1/2012 Yoshizawa
2013/0164028 A1 6/2013 Morioka et al.
2013/0164035 A1 6/2013 Jung et al.

(56) References Cited

U.S. PATENT DOCUMENTS

| | | | |
|---|---|---|---|
| 2013/0251402 | A1 | 9/2013 | Yamashita et al. |
| 2014/0072327 | A1 | 3/2014 | Hayashi et al. |
| 2014/0140723 | A1 | 5/2014 | Hoshi et al. |
| 2014/0314445 | A1 | 10/2014 | Kanno et al. |
| 2015/0055963 | A1 | 2/2015 | Kanno et al. |
| 2015/0253723 | A1 | 9/2015 | Morioka et al. |

FOREIGN PATENT DOCUMENTS

| | | | |
|---|---|---|---|
| CN | 1346077 | A | 4/2002 |
| CN | 1621971 | A | 6/2005 |
| CN | 1725128 | A | 1/2006 |
| CN | 1755541 | A | 4/2006 |
| CN | 2791703 | Y | 6/2006 |
| CN | 101025592 | A | 8/2007 |
| CN | 101174112 | A | 5/2008 |
| CN | 101231497 | A | 7/2008 |
| CN | 201096170 | A | 8/2008 |
| CN | 101430520 | A | 5/2009 |
| CN | 101479673 | A | 7/2009 |
| CN | 101592909 | A | 12/2009 |
| CN | 101655146 | A | 2/2010 |
| CN | 101661244 | A | 3/2010 |
| CN | 101689035 | A | 3/2010 |
| CN | 101715570 | A | 5/2010 |
| CN | 101750950 | A | 6/2010 |
| CN | 101833262 | A | 9/2010 |
| CN | 102037417 | A | 4/2011 |
| CN | 102057333 | A | 5/2011 |
| CN | 102109017 | A | 6/2011 |
| CN | 102109780 | A | 6/2011 |
| CN | 102132219 | A | 7/2011 |
| CN | 102141767 | A | 8/2011 |
| CN | 102221809 | A | 10/2011 |
| CN | 102262377 | A | 11/2011 |
| CN | 103123448 | A | 5/2013 |
| DE | 11 2009 001 827 | | 1/2019 |
| EP | 0 708 387 | A2 | 4/1996 |
| EP | 0 917 115 | B1 | 9/2003 |
| EP | 2081090 | A2 | 7/2009 |
| JP | S59-118530 | A | 7/1984 |
| JP | S61-226424 | A | 10/1986 |
| JP | H04-110870 | A | 4/1992 |
| JP | H05-061281 | A | 3/1993 |
| JP | H05-97301 | A | 4/1993 |
| JP | H06-095501 | A | 4/1994 |
| JP | H07-295461 | A | 11/1995 |
| JP | H10-104905 | A | 4/1998 |
| JP | H10-142899 | A | 5/1998 |
| JP | 2001-337511 | A | 12/2001 |
| JP | 2002-149037 | A | 5/2002 |
| JP | 2002-227272 | A | 8/2002 |
| JP | 2003-162137 | A | 6/2003 |
| JP | 2003-208204 | A | 7/2003 |
| JP | 2003-287050 | A | 10/2003 |
| JP | 2003-307993 | A | 10/2003 |
| JP | 2004-225734 | A | 8/2004 |
| JP | 2006-126709 | A | 5/2006 |
| JP | 2006-330694 | A | 12/2006 |
| JP | 2006-343358 | A | 12/2006 |
| JP | 2008-164151 | A | 7/2008 |
| JP | 2009-222737 | A | 10/2009 |
| JP | 2009-274826 | A | 11/2009 |
| JP | 2010-092078 | A | 4/2010 |
| JP | 2010-107008 | A | 5/2010 |
| JP | 2010-107889 | A | 5/2010 |
| JP | 2010-107890 | A | 5/2010 |
| JP | 2011-185293 | A | 9/2011 |
| JP | 2011-203363 | A | 10/2011 |
| JP | 2011-232656 | A | 11/2011 |
| JP | 2016-068685 | A | 4/2012 |
| JP | 2013-54183 | A | 3/2013 |
| JP | 2015-169876 | A | 9/2015 |
| KR | 2011-0015451 | A | 2/2011 |
| RU | 2289835 | C | 12/2006 |
| RU | 2 367 016 | C2 | 4/2009 |
| RU | 2376620 | C | 12/2009 |
| RU | 2009126563 | A | 1/2011 |
| WO | 2009/151132 | A | 12/2009 |
| WO | 2010/024457 | A1 | 3/2010 |

OTHER PUBLICATIONS

May 24, 2021 Office Action in Chinese Patent Application No. 201910716618.0 (with English translation).

Jun. 7, 2021 Office Action in Chinese Patent Application No. 201910716614.2 (with English translation).

Jun. 9, 2021 Office Action in Chinese Patent Application No. 201910716633.5 (with English translation).

Nov. 18, 2021 Office Action in Indian Patent Application No. 202048025638.

Mar. 4, 2022 Office Action in Indian Patent Application No. 201948016672.

Dec. 9, 2021 Notice of Acceptance in Australian Patent Application No. 2020202815.

International Search Report for International Patent Applicaiton No. PCT/JP2013/067016.

Examination Report in Canadian Patent Application No. 2,875,930, dated Mar. 23, 2016.

Search Report in European Patent Application No. 13803526.6, dated Jan. 25, 2016.

English translation of Office Action in Taiwanese Patent Application No. 1012121116, dated Nov. 5, 2015.

Office Action in Taiwanese Patent Application No. 102121116, dated Nov. 5, 2015.

Patent Examination Report in Australian Patent Application No. 2013275198, dated Jun. 30, 2015.

English translation of Japanese Patent Application Pub. No. 2001-337511 A.

Mar. 23, 2017 Office Action in Chilean Patent Application No. 201403365.

Mar. 17, 2017 Office Action in Indonesian Patent Application No. P00201500162.

Jul. 16, 2017 Search and Examination Report in United Arab Emirates Patent Application No. 1378/2014.

Extended European Search Report in European Patent Application No. 17170760.7, dated Sep. 8, 2017.

Office Action in Taiwanese Patent Application No. 105119953, dated Aug. 24, 2017.

Notice of Acceptance in Australian Patent Application No. 2013275198, dated Jun. 30, 2016.

Decision on Grant in Russian Patent Application No. 2015101095, dated Dec. 6, 2015 (with English translation).

Office Action in Indian Patent Application No. 176/CHEP/2015, dated Oct. 29, 2018.

Examination Report in Australian Patent Application No. 2016244218, dated Nov. 26, 2018.

Jul. 18, 2018 Office Action in Chilean Patent Application No. 201403365.

Aug. 14, 2018 Office Action in Chinese Patent Application No. 201380042394.0 (with English translation).

Decision on Grant in Russian Patent Application No. 2017113100, dated Mar. 22, 2018 (with English translation).

Office Action in Australian Patent Application No. 2016244218, dated Jun. 6, 2018.

Dec. 6, 2017 Office Action in Australian Patent Application No. 2016244218.

Oct. 13, 2017 Office Action in Chilean Patent Application No. 201403365.

Communication in European Patent Application No. 13 803 526.6, dated Nov. 14, 2017.

Jan. 16, 2019 Notice of Allowance in Chilean Patent Application No. 201800159.

Extended Search Report in European Patent Application No. 18 20 8240.4, dated Apr. 16, 2019.

Examination Report in United Kingdom Patent Application No. GB1500631.5, dated May 20, 2019.

(56) References Cited

OTHER PUBLICATIONS

Examination Report in Australian Patent Application No. 2018267647, dated Jul. 8, 2019.
Aug. 12, 2019 Office Action in Taiwanese Patent Application No. 107111957.
Office Action in Russian Patent Application No. 2018119487, dated Mar. 20, 2019 (with English translation).
Oct. 3, 2019 Office Action in Indian Patent Application No. 201648041084.
Nov. 27, 2019 Office Action in United Arab Emirates Patent Application No. UAE/P/1378/2014.
Dec. 17, 2019 Office Action in Brazilian Patent Application No. BR112014031215-0 (with English translation).
Jan. 24, 2020 Decision to Grant in Russian Patent Application No. 2018119487 (with English translation).
May 21, 2020 Notice of Acceptance in Austrailan Patent Application No. 2018267647.
Apr. 17, 2020 Office Action in German Patent Application No. 11 2013 002 931.6 (with English translation).
Sep. 1, 2020 Decision to Grant in Russian Patent Application No. 2020112310 (with English translation).
Nov. 4, 2020 extended search report in European Patent Application No. 20 17 8156.
Notice of Acceptance dated Dec. 18, 2020 in counterpart Australian Application No. 2020202815.
Mar. 11, 2021 Office Action in Russian Patent Application No. 2020135924.
Aug. 24, 2021 Office Action in Brazilian Patent Application No. 112014031215-0 (with English translation).
Apr. 6, 2021 Office Action in Japanese Patent Application No. 2020-076130 (with English translation).
Machine Translation of Japanese Patent Application Pub. No. 2002-149037 A.
Machine Translation of Japanese Patent Application Pub. No. H05-061281 A.
Aug. 3, 2021 Office Action in Chinese Patent Application No. 201910716613.8 (with English translation).
Jul. 23, 2021 Decision to Grant in Russian Patent Application No. 2020135924 (with English translation).
Jul. 29, 2021 Notice of Allowance in Taiwanese Patent Application No. 109113905.
Jan. 5, 2023 Office Action in Chinese Patent Application No. 201910716614.2.
Oct. 4, 2022 Examination Report in Australian Patent Application No. 2021273659.
Aug. 26, 2022 Office Action in Chinese Patent Application No. 201910716616.1.
Mar. 27, 2023 Examination Report in Philippines Patent Application No. 1/2018/500059.
Jul. 28, 2023 Subsequent Substantive Examination Report in Philippines Patent Application No. 1/2018/500059.
Nov. 13, 2023 Notice of Allowance in Philippines Patent Application No. 1/2018/500059.
Dec. 22, 2023 Examination Report in Australian Patent Application No. 202323312.
Feb. 16, 2024 Search Report in Argentine Patent Application No. 20200100428 (with partial English translation).

(a)

(b)

(a)

(b)

(a)

(b)

(a)

(b)

CARTRIDGE, PROCESS CARTRIDGE AND ELECTROPHOTOGRAPHIC IMAGE FORMING APPARATUS

FIELD OF THE INVENTION

The present invention relates to an electrophotographic image forming apparatus (image forming apparatus) and a cartridge detachably mountable to a main assembly of the image forming apparatus.

The image forming apparatus forms an image on a recording material using an electrophotographic image forming process. Examples of the image forming apparatus include an electrophotographic copying machine, an electrophotographic printer (laser beam printer, LED or printer, for example), a facsimile machine, a word processor and so on.

The cartridge comprises an electrophotographic photosensitive drum as an image bearing member, and at least one of process means actable on the drum (a developer carrying member (developing roller)), which are unified into a cartridge which is detachably mountable to the image forming apparatus. The cartridge may comprise the drum and the developing roller as a unit, or may comprises the drum, or may comprises the developing roller. A cartridge which comprises the drum is a drum cartridge, and the cartridge which comprises the developing roller is a developing cartridge.

The main assembly of the image forming apparatus is portions of the image forming apparatus other than the cartridge.

BACKGROUND ART

In a conventional image forming apparatus, a drum and process means actable on the drum are unified into a cartridge which is detachably mountable to a main assembly of the apparatus (process cartridge type).

With such a process cartridge type, maintenance operations for the image forming apparatus can be performed in effect by the user without relying on a service person, and therefore, the operationality can be remarkably improved.

Therefore, the process cartridge type is widely used in the field of the image forming apparatus.

A process cartridge (Japanese Laid-open Patent Application 2001-337511), for example) and an image forming apparatus (Japanese Laid-open Patent Application 2003-208024, for example) have been proposed, in which a clutch is provided to effect switching to drive the developing roller during an image forming operation and to shut off the drive of the developing roller during a non-image-formation.

SUMMARY OF THE INVENTION

Problem to be Solved by the Invention

In Japanese Laid-open Patent Application 2001-337511, a spring clutch is provided at an end portion of the developing roller to switch the drive.

In addition, in Japanese Laid-open Patent Application 2003-208024, a clutch is provided in the image forming apparatus to switch the drive for the developing roller.

Accordingly, it is a principal object of the present invention to improve the clutch for switching the drive for the developing roller.

Means for Solving the Problem

According to a first aspect of the present invention, there is provided a cartridge detachably mountable to a main assembly of an electrophotographic image forming apparatus, said cartridge comprising (i) a rotatable developing roller for developing a latent image formed on a photosensitive member; (ii) a first drive transmission member capable of receiving a rotational force originated by the main assembly; (iii) a second drive transmission member capable of coupling with said first drive transmission member and capable of transmitting the rotational force received by said first drive transmission member to said developing roller; and (iv) a coupling disconnection member including (iv-i) a force receiving portion capable of receiving the force originated by the main assembly, and (iv-ii) an urging portion capable of urging at least one of said first drive transmission member and said second drive transmission member by the force received by said force receiving portion to separate one of said first drive transmission member and said second drive transmission member from the other, thereby disconnecting the coupling.

According to a second aspect of the present invention, there is provided an electrophotographic image forming apparatus capable of image formation on a recording material, said electrophotographic image forming apparatus comprising: (i) a main assembly including a main assembly drive transmission member and a main assembly urging member; and (ii) a cartridge detachably mountable to said main assembly, said cartridge including, (ii-i) a rotatable developing roller for developing a latent image formed on a photosensitive member; (ii-ii) a first drive transmission member capable of receiving a rotational force originated by said main assembly; (ii-iii) a second drive transmission member capable of coupling with said first drive transmission member and capable of transmitting the rotational force received by said first drive transmission member to said developing roller; and (ii-iv) a coupling disconnection member including (ii-iv-i) a force receiving portion capable of receiving the force originated by the main assembly urging member, and (ii-iv-ii) an urging portion capable of urging at least one of said first drive transmission member and said second drive transmission member by the force received by said force receiving portion to separate one of said first drive transmission member and said second drive transmission member from the other, thereby disconnecting the coupling.

According to a third aspect of the present invention, there is provided an process cartridge detachably mountable to a main assembly of an electrophotographic image forming apparatus, said main assembly including a main assembly drive transmission member and a main assembly urging member, said process cartridge comprising (i) rotatable photosensitive member; (ii) a rotatable developing roller for developing a latent image formed on said photosensitive member, said developing roller being movable toward and away from said photosensitive member; (iii) an urging force receiving portion for receiving an urging force from the main assembly urging member to space said developing roller from said photosensitive member; (iv) a first drive transmission member for receiving a rotational force from the main assembly drive transmission member; (v) a second drive transmission member capable of coupling with said first drive transmission member and capable of transmitting the rotational force received by said first drive transmission member to said developing roller; and (vi) an urging portion capable of urging at least one of said first drive transmission member and said second drive transmission member by the force received by said urging force receiving portion to separate one of said first drive transmission member and said second drive transmission member from the other, thereby disconnecting the coupling According to a fourth aspect of the present invention, there is provided an electrophotographic image forming apparatus capable of image formation on a recording material, said electrophotographic image forming apparatus comprising (i) a main assembly including a spacing force urging member and a main assembly drive transmission member; and (ii) a process cartridge detachably mountable to said main assembly, said process cartridge including, (ii-i) a rotatable photosensitive member, (ii-ii) a developing roller rotatable to develop a latent image formed on said photosensitive member, said developing roller being movable toward and away from said photosensitive member, (ii-iii) a spacing force receiving portion for receiving a spacing force for spacing said developing roller from said photosensitive member, from said spacing force urging member, (ii-iv) a first drive transmission member for receiving a rotational force from the main assembly drive transmission member, (ii-v) a second drive transmission member capable of connecting with said first drive transmission member to transmit the rotational force received by said first drive transmission member to said developing roller, and (ii-vi) a coupling disconnection member capable of urging at least one of said first drive transmission member and said second drive transmission member to separate one of said first drive transmission member and said second drive transmission member from the other to disconnect the coupling by said spacing force received by said spacing force receiving portion.

According to a fifth aspect of the present invention, there is provided an process cartridge detachably mountable to a main assembly of an electrophotographic image forming apparatus, said process cartridge comprising a photosensitive member; a photosensitive member frame rotatably supporting said photosensitive member; a developing roller for developing a latent image formed on said photosensitive member; a developing device frame rotatably supporting said developing roller and connected with said photosensitive member frame so as to be rotatable between a contacting position in which said developing roller is contacted with said photosensitive member and a spacing position in which said developing roller is spaced from said photosensitive member; a first drive transmission member rotatable about a rotation axis about which said developing device frame is rotatable relative to said photosensitive member frame and capable of receiving a rotational force from the main assembly; a second drive transmission member rotatable about the rotation axis and capable of connecting with said first drive transmission member and transmitting the rotational force to said developing roller; and a disconnecting mechanism for disconnecting between said first drive transmission member and said second drive transmission member in accordance with rotation of the developing device frame from the contacting position to said spacing position.

According to a sixth aspect of the present invention, there is provided an electrophotographic image forming apparatus for forming an image on a recording material, said electrophotographic image forming apparatus comprising (i) a main assembly including a main assembly drive transmission member for transmitting a rotational force; and (ii) a process cartridge detachably mountable to said main assembly, said process cartridge including, (ii-i) a photosensitive member, (ii-ii) a photosensitive member frame for rotatably supporting said photosensitive member, (ii-iii) a developing roller, (ii-iv) a developing device frame rotatably supporting said developing roller and connected with said photosensitive member frame so as to be rotatable between a contacting position in which said developing roller is contacted with said photosensitive member and a spacing position in which said developing roller is spaced from said photosensitive member, (ii-v) a first drive transmission member rotatable about a rotation axis about which said developing device frame is rotatable relative to said photosensitive member frame and capable of receiving a rotational force from the main assembly drive transmission member, (ii-vi) a second drive transmission member rotatable about the rotation axis and capable of connecting with said first drive transmission member and transmitting the rotational force to said developing roller, and (ii-vii) a disconnecting mechanism for disconnecting between said first drive transmission member and said second drive transmission member in accordance with rotation of the developing device frame from the contacting position to said spacing position.

Effect of the Invention

According to the present invention, the switching of the drive for the developing roller can be effected in the cartridge.

These and other objects, features and advantages of the present invention will become more apparent upon a consideration of the following description of the preferred embodiments of the present invention taken in conjunction with the accompanying drawings.

DESCRIPTION OF THE EMBODIMENTS

Embodiment 1

[General Description of the Electrophotographic Image Forming Apparatus]

A first embodiment of the present invention will be described referring to the accompanying drawing.

The example of the image forming apparatuses of the following embodiments is a full-color image forming apparatus to which four process cartridges are detachably mountable.

The number of the process cartridges mountable to the image forming apparatus is not limited to this example. It is properly selected as desired.

For example, in the case of a monochromatic image forming apparatus, the number of the process cartridges mounted to the image forming apparatus is one. The examples of the image forming apparatuses of the following embodiments are printers.

[General Arrangement of the Image Forming Apparatus]

Figure 2:
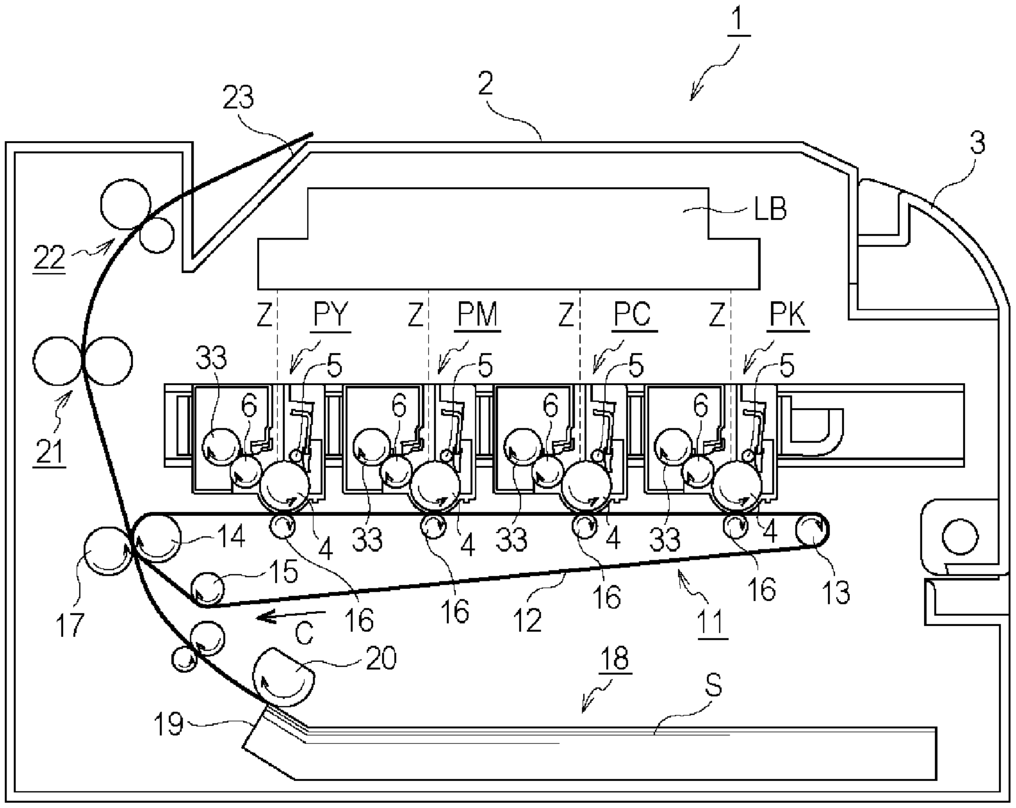
FIG. 2 is a sectional view of the image forming apparatus according to the first embodiment of the present invention.
Figure 3:
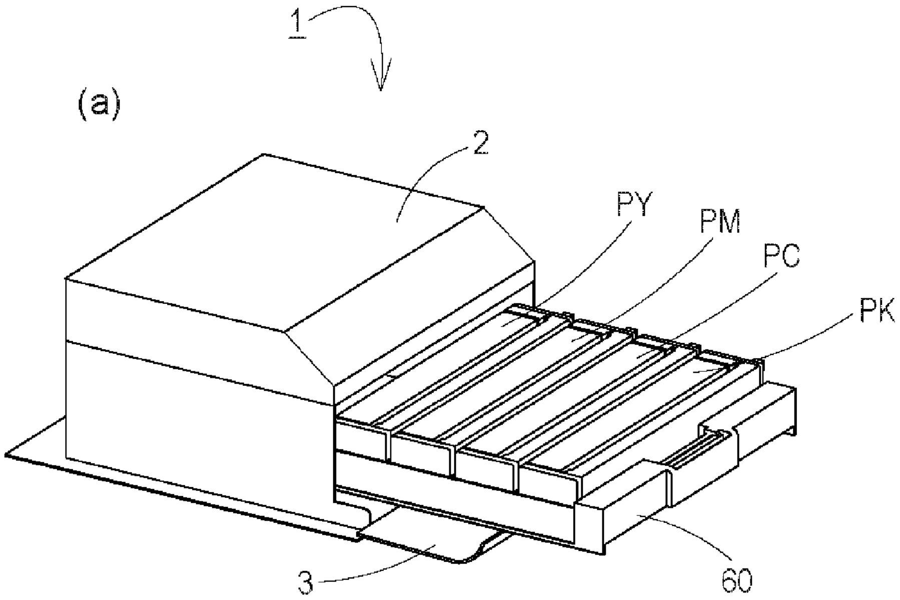
FIG. 3 is a perspective view of the image forming apparatus according to the first embodiment of the present invention.
Figure 3:
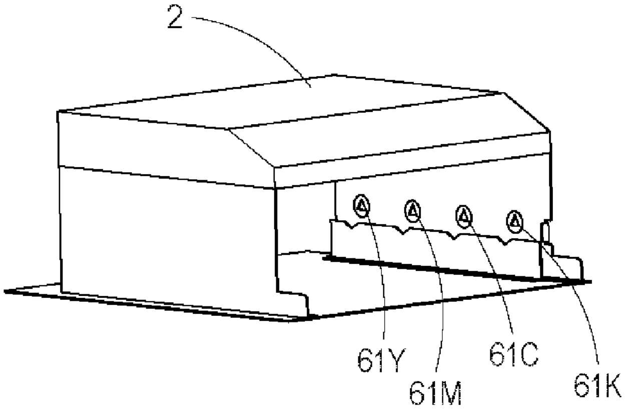
Figure 4:
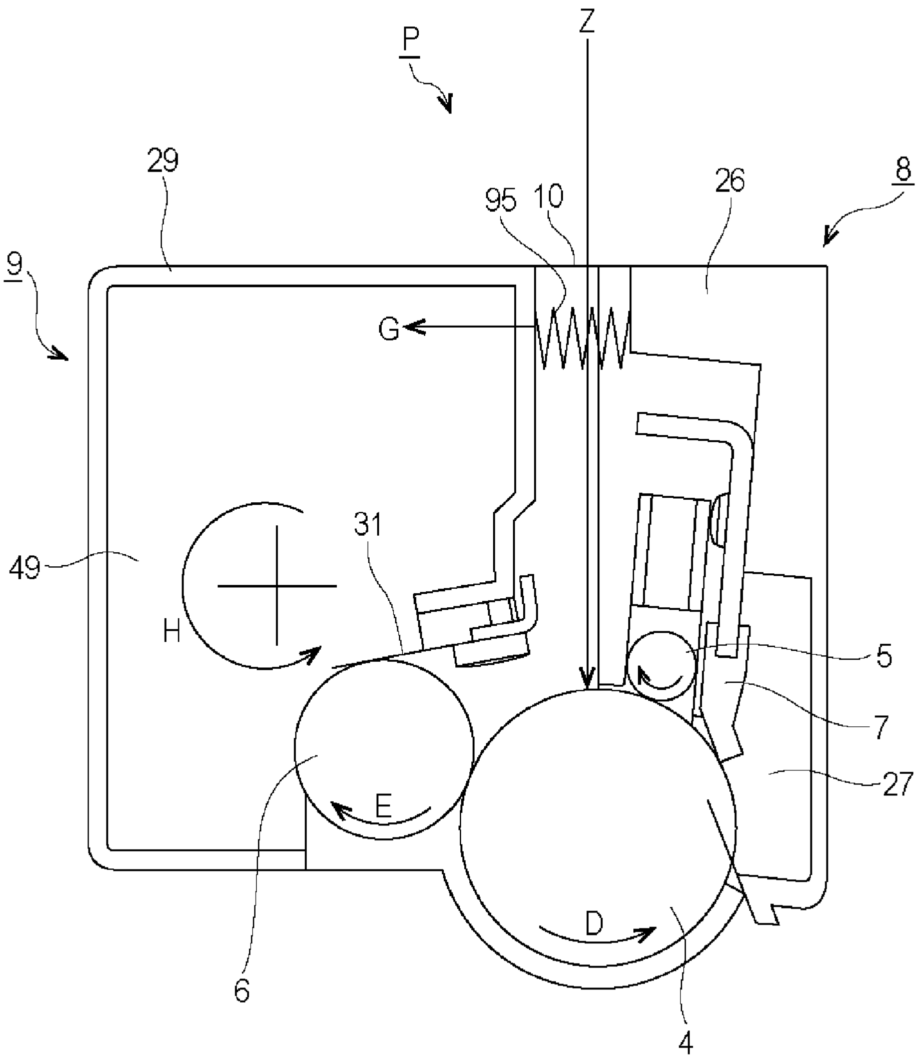
FIG. 4 is a sectional view of the process cartridge according to the first embodiment of the present invention.
Figure 5:
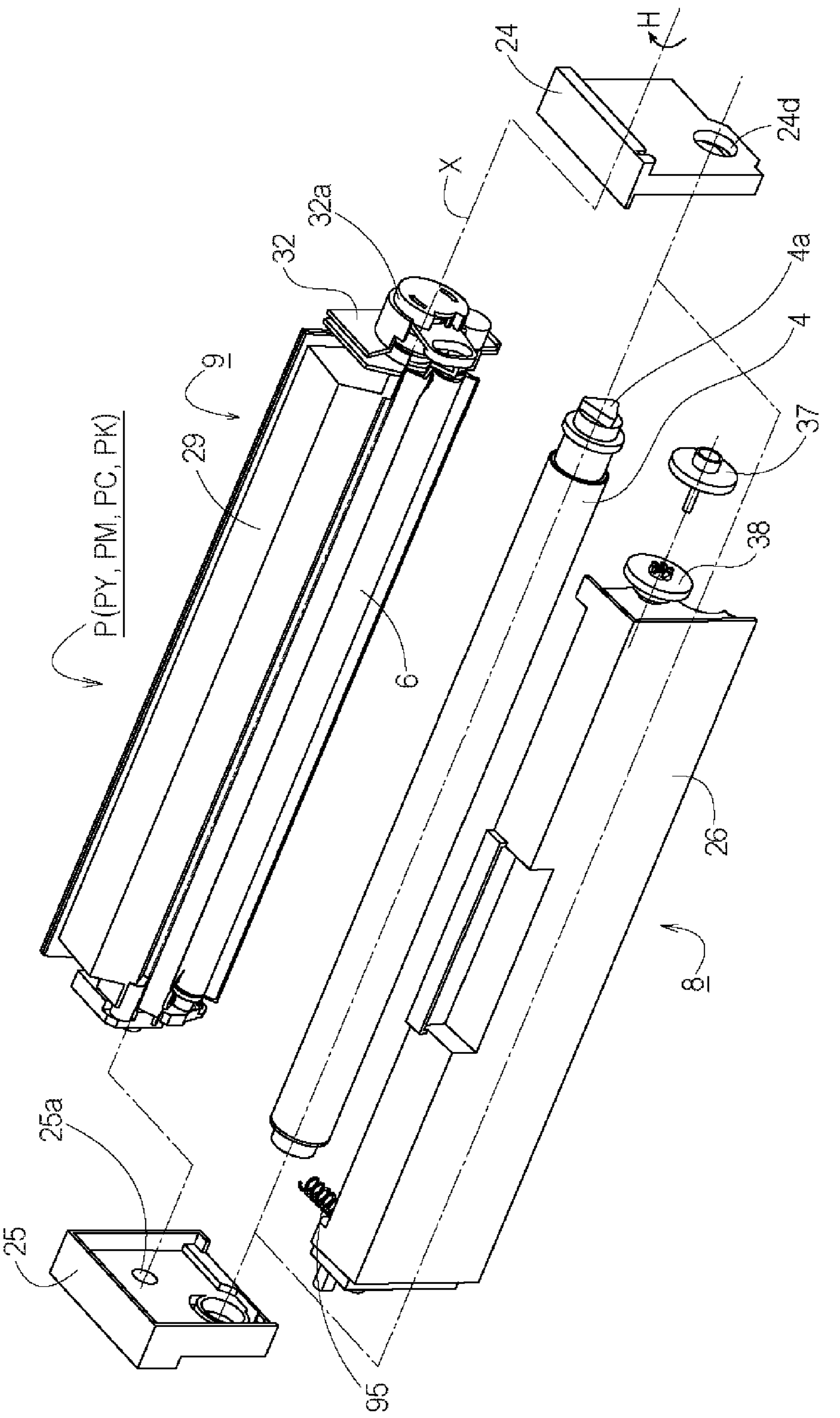
FIG. 5 is a perspective view of a process cartridge according to the first embodiment of the present invention.
Figure 6:
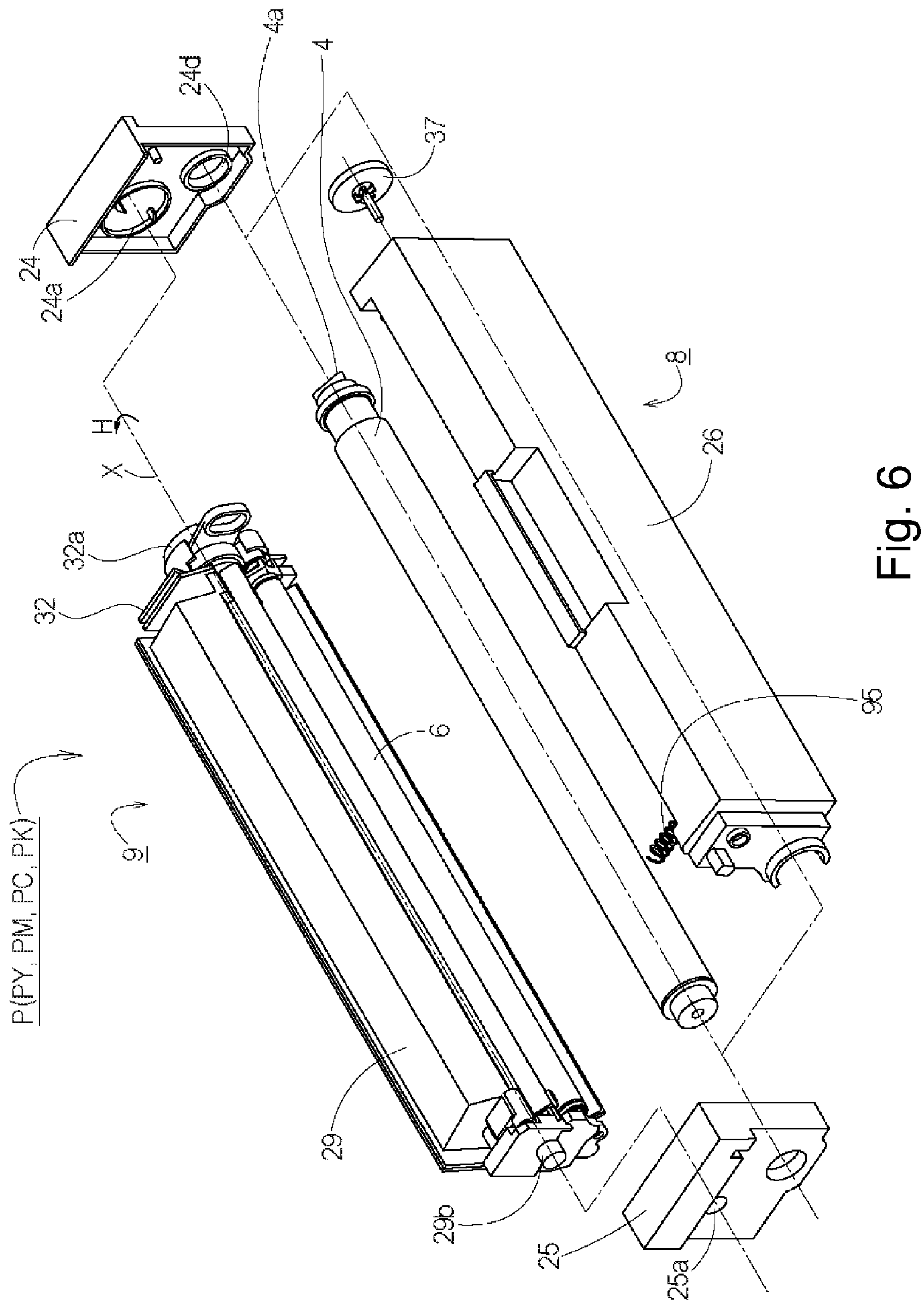
FIG. 6 is a perspective view of the process cartridge according to a first embodiment of the present invention.

FIG. 2 is a schematic section of the image forming apparatus of this embodiment. Part (a) of FIG. 3 is a perspective view of the image forming apparatus of this embodiment. FIG. 4 is a sectional view of a process cartridge P of this embodiment. FIG. 5 is a perspective view of the process cartridge P of this embodiment as seen from a driving side, and FIG. 6 is a perspective view of the process cartridge P of this embodiment as seen from a non-driving side.

As shown in FIG. 2, the image forming apparatus 1 is a four full-color laser beam printer using an electrophotographic image forming process for forming a color image on a recording material S. The image forming apparatus 1 is of a process cartridge type, in which the process cartridges are dismountably mounted to a main assembly 2 of the electrophotographic image forming apparatus to form the color image on the recording material S.

Here, a side of the image forming apparatus 1 that is provided with a front door 3 is a front side, and a side opposite from the front side is a rear side. In addition, a right side of the image forming apparatus 1 as seen from the front side is a driving side, and a left side is a non-driving side. FIG. 2 is a sectional view of the image forming apparatus 1 as seen from the non-driving side, in which a front side of the sheet of the drawing is the non-driving side of the image forming apparatus 1, the right side of the sheet of the drawing is the front side of the image forming apparatus 1, and the rear side of the sheet of the drawing is the driving side of the image forming apparatus 1.

In the main assembly 2 of the image forming apparatus, there are provided process cartridges P (PY, PM, PC, PK) including a first process cartridge PY (yellow), a second process cartridge PM (magenta), a third process cartridge PC (cyan), and a fourth process cartridge PK (black), which are arranged in the horizontal direction.

The first-fourth process cartridges P (PY, PM, PC, PK) include similar electrophotographic image forming process mechanisms, although the colors of the developers contained therein are different. To the first-fourth process cartridges P (PY, PM, PC, PK), rotational forces are transmitted from drive outputting portions of the main assembly 2 of the image forming apparatus. This will be described in detail hereinafter.

In addition, the first-fourth each process cartridges P (PY, PM, PC, PK) are supplied with bias voltages (charging bias voltages, developing bias voltages and so on) (unshown), from the main assembly 2 of the image forming apparatus.

As shown in FIG. 4, each of the first-fourth process cartridges P (PY, PM, PC, PK) includes a photosensitive drum unit 8 provided with a photosensitive drum 4, a charging means and a cleaning means as process means actable on the drum 4.

In addition, each of the first-fourth process cartridges P (PY, PM, PC, PK) includes a developing unit 9 provided with a developing means for developing an electrostatic latent image on the drum 4.

The first process cartridge PY accommodates a yellow (Y) developer in a developing device frame 29 thereof to form a yellow color developer image on the surface of the drum 4.

The second process cartridge PM accommodates a magenta (M) developer in the developing device frame 29 thereof to form a magenta color developer image on the surface of the drum 4.

The third process cartridge PC accommodates a cyan (C) developer in the developing device frame 29 thereof to form a cyan color developer image on the surface of the drum 4.

The fourth process cartridge PK accommodates a black (K) developer in the developing device frame 29 thereof to form a black color developer image on the surface of the drum 4.

Above the first-fourth process cartridges P (PY, PM, PC, PK), there is provided a laser scanner unit LB as an exposure means. The laser scanner unit LB outputs a laser beam in accordance with image information. The laser beam Z is scanningly projected onto the surface of the drum 4 through an exposure window 10 of the cartridge P.

Below the first-fourth cartridges P (PY, PM, PC, PK), there is provided an intermediary transfer belt unit 11 as a transfer member. The intermediary transfer belt unit 11 includes a driving roller 13, tension rollers 14 and 15, around which a transfer belt 12 having flexibility is extended.

The drum 4 of each of the first-fourth cartridges P (PY, PM, PC, PK) contacts, at the bottom surface portion, an upper surface of the transfer belt 12. The contact portion is a primary transfer portion. Inside the transfer belt 12, there is provided a primal), transfer roller 16 opposed to the drum 4.

In addition, there is provided a secondary transfer roller 17 at a position opposed the tension roller 14 with the transfer belt 12 interposed therebetween. The contact portion between the transfer belt 12 and the secondary transfer roller 17 is a secondary transfer portion.

Below the intermediary transfer belt unit 11, a feeding unit 18 is provided. The feeding unit 18 includes a sheet feeding tray 19 accommodating a stack of recording materials S, and a sheet feeding roller 20.

Below an upper left portion in the main assembly 2 of the apparatus in FIG. 2, a fixing unit 21 and a discharging unit 22 are provided. An upper surface of the main assembly 2 of the apparatus functions as a discharging tray 23.

The recording material S having a developer image transferred thereto is subjected to a fixing operation by a fixing means provided in the fixing unit 21, and thereafter, it is discharged to the discharging tray 23.

The cartridge P is detachably mountable to the main assembly 2 of the apparatus through a drawable cartridge tray 60. Part (a) of FIG. 3 shows a state in which the cartridge tray 60 and the cartridges P are drawn out of the main assembly 2 of the apparatus.

[Image Forming Operation]

Operations for forming a full-color image will be described.

The drums 4 of the first-fourth cartridges P (PY, PM, PC, PK) are rotated at a predetermined speed (counterclockwise direction in FIG. 2, a direction indicated by arrow D in FIG. 4).

The transfer belt 12 is also rotated at the speed corresponding to the speed of the drum 4 codirectionally with the rotation of the drums (the direction indicated by an arrow C in FIG. 2).

Also, the laser scanner unit LB is driven. In synchronism with the drive of the scanner unit LB, the surface of the drums 4 are charged by the charging rollers 5 to a predetermined polarity and potential uniformly. The laser scanner unit LB scans and exposes the surfaces of the drums 4 with the laser beams Z in accordance with the image signal off the respective colors.

By this, the electrostatic latent images are formed on the surfaces of the drums 4 in accordance with the corresponding color image signal, respectively. The electrostatic latent images are developed by the respective developing rollers 6 rotated at a predetermined speed (clockwisely in FIG. 2, the direction indicated by an arrow E in FIG. 4).

Through such an electrophotographic image forming process operation, a yellow color developer image corresponding to the yellow component of the full-color image is formed on the drum 4 of the first cartridge PY. Then, the developer image is transferred (primary transfer) onto the transfer belt 12.

Similarly, a magenta developer image corresponding to the magenta component of the full-color image is formed on the drum 4 of the second cartridge PM. The developer image is transferred (primary transfer) superimposedly onto the yellow color developer image already transferred onto the transfer belt 12.

Similarly, a cyan developer image corresponding to the cyan component of the full-color image is formed on the drum 4 of the third cartridge PC. Then, the developer image is transferred (primary transfer) superimposedly onto the yellow color and magenta color developer images already transferred onto the transfer belt 12.

Similarly, a black developer image corresponding to the black component of the full-color image is formed on the drum 4 of the fourth cartridge PK. Then, the developer image is transferred (primary, transfer) superimposedly on the yellow color, magenta color and cyan color developer images already transferred onto the transfer belt 12.

In this manner, a four full-color comprising yellow color, magenta color, cyan color and black color is formed on the transfer belt 12 (unfixed developer image).

On the other hand, a recording material S is singled out and fed at predetermined control timing. The recording material S is introduced at predetermined control timing to the secondary transfer portion which is the contact portion between the secondary transfer roller 17 and the transfer belt 12.

By this, the four color superimposed developer image is all together transferred sequentially onto the surface of the recording material S from the transfer belt 12 while the recording material S is being fed to the secondary transfer portion.

[General Arrangement of the Process Cartridge]

In this embodiment, the first-fourth cartridges P (PY, PM, PC, PK) have similar electrophotographic image forming process mechanisms, although the colors and/or the filled amounts of the developers accommodated therein are different.

The cartridge P is provided with the drum 4 as the photosensitive member, and the process means actable on the drum 4. The process means includes the charging roller 5 as the charging means for charging the drum 4, a developing roller 6 as the developing means for developing the latent image formed on the drum 4, a cleaning blade 7 as the cleaning means for removing a residual developer remaining on the surface of the drum 4, and so on. The cartridge P is divided into the drum unit 8 and the developing unit 9.

[Structure of the Drum Unit]

As shown in FIGS. 4, 5 and 6, the drum unit 8 comprises the drum 4 as the photosensitive member, the charging roller 5, the cleaning blade 7, a cleaner container 26 as a photosensitive member frame, a residual developer accommodating portion 27, cartridge cover members (a cartridge cover member 24 in the driving side, and a cartridge cover member 25 in the non-driving side in FIGS. 5 and 6). The photosensitive member frame in a broad sense comprises the cleaner container 26 which is the photosensitive member frame in a narrow sense, and the residual developer accommodating portion 27, the driving side cartridge cover member 24, the non-driving side cartridge cover member 25 as well (this applies to the embodiments described hereinafter). When the cartridge P is mounted to the main assembly 2 of the apparatus, the photosensitive member frame is fixed to the main assembly 2 of the apparatus.

The drum 4 is rotatably supported by the cartridge cover members 24 and 25 provided at the longitudinal opposite end portions of the cartridge P. Here, an axial direction of the drum 4 is the longitudinal direction.

The cartridge cover members 24 and 25 are fixed to the cleaner container 26 at the opposite longitudinal end portions of the cleaner container 26.

As shown in FIG. 5, a coupling member 4*a* for transmitting a driving force to the drum 4 is provided at one longitudinal end portion of the drum 4. Part (b) of FIG. 3 is a perspective view of the main assembly 2 of the apparatus, in which the cartridge tray 60 and the cartridge P are not shown. The coupling members 4*a* of the cartridges P (PY, PM, PC, PK) are engaged with drum-driving-force-outputting members 61 (61Y, 61M, 61C, 61K) as main assembly side drive transmission members of the main assembly of the apparatus 2 shown in part (b) of FIG. 3 so that the driving force of a driving motor (unshown) of the main assembly of the apparatus is transmitted to the drums 4.

The charging roller 5 is supported by the cleaner container 26 and is contacted to the drum 4 so as to be driven thereby.

The cleaning blade 7 is supported by the cleaner container 26 so as to be contacted to the circumferential surface of the drum 4 at a predetermined pressure.

An untransferred residual developer removed from the peripheral surface of the drum 4 by the cleaning means 7 is accommodated in the residual developer accommodating portion 27 in the cleaner container 26.

In addition, the driving side cartridge cover member 24 and the non-driving side cartridge cover member 25 are provided with supporting portions 24*a*, 25*a* for rotatably supporting the developing unit 9 (FIG. 6).

[Structure of the Developing Unit]

Figure 1:
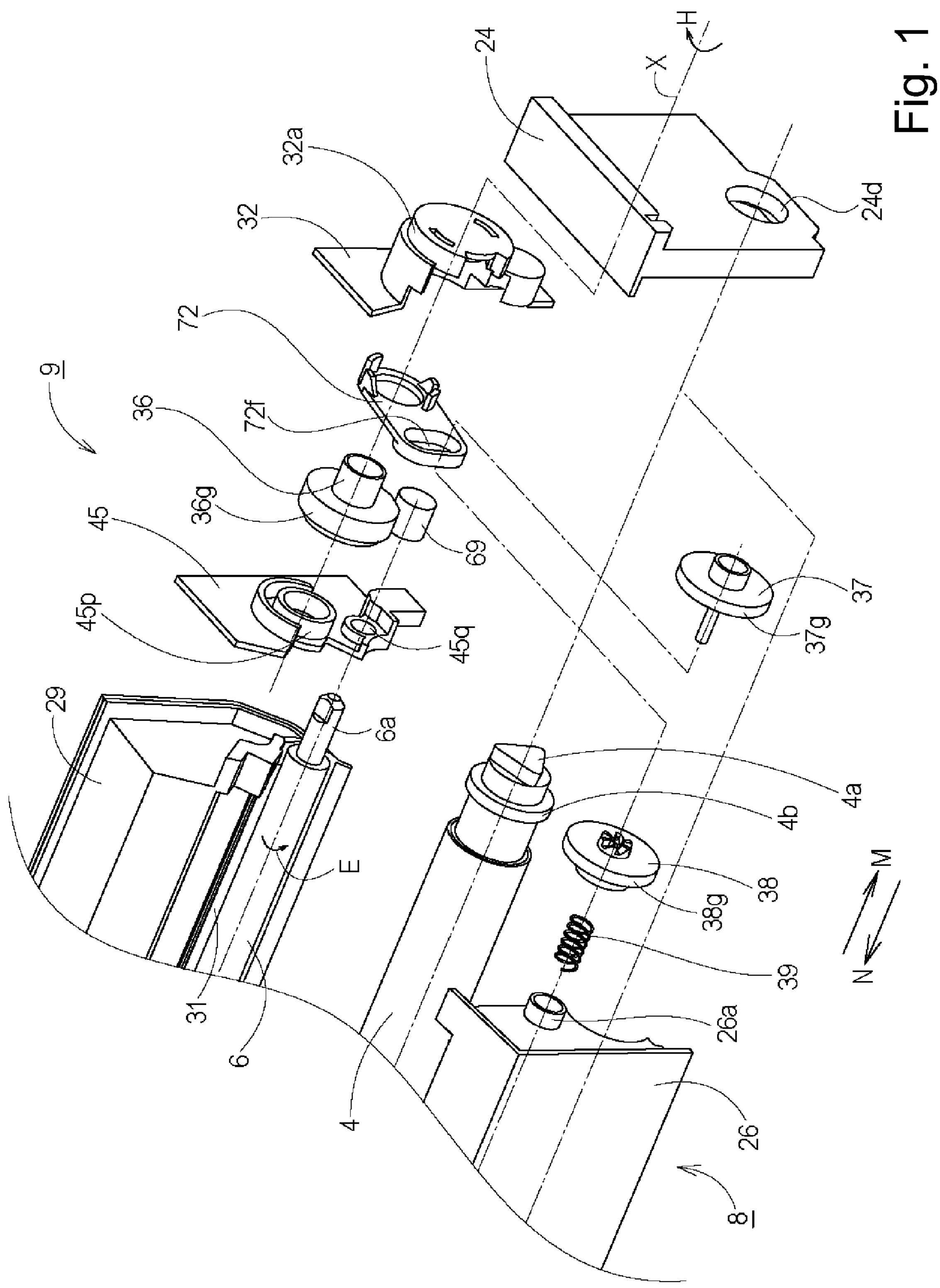
FIG. 1 is a perspective view of a process cartridge according to a first embodiment of the present invention.
Figure 8:
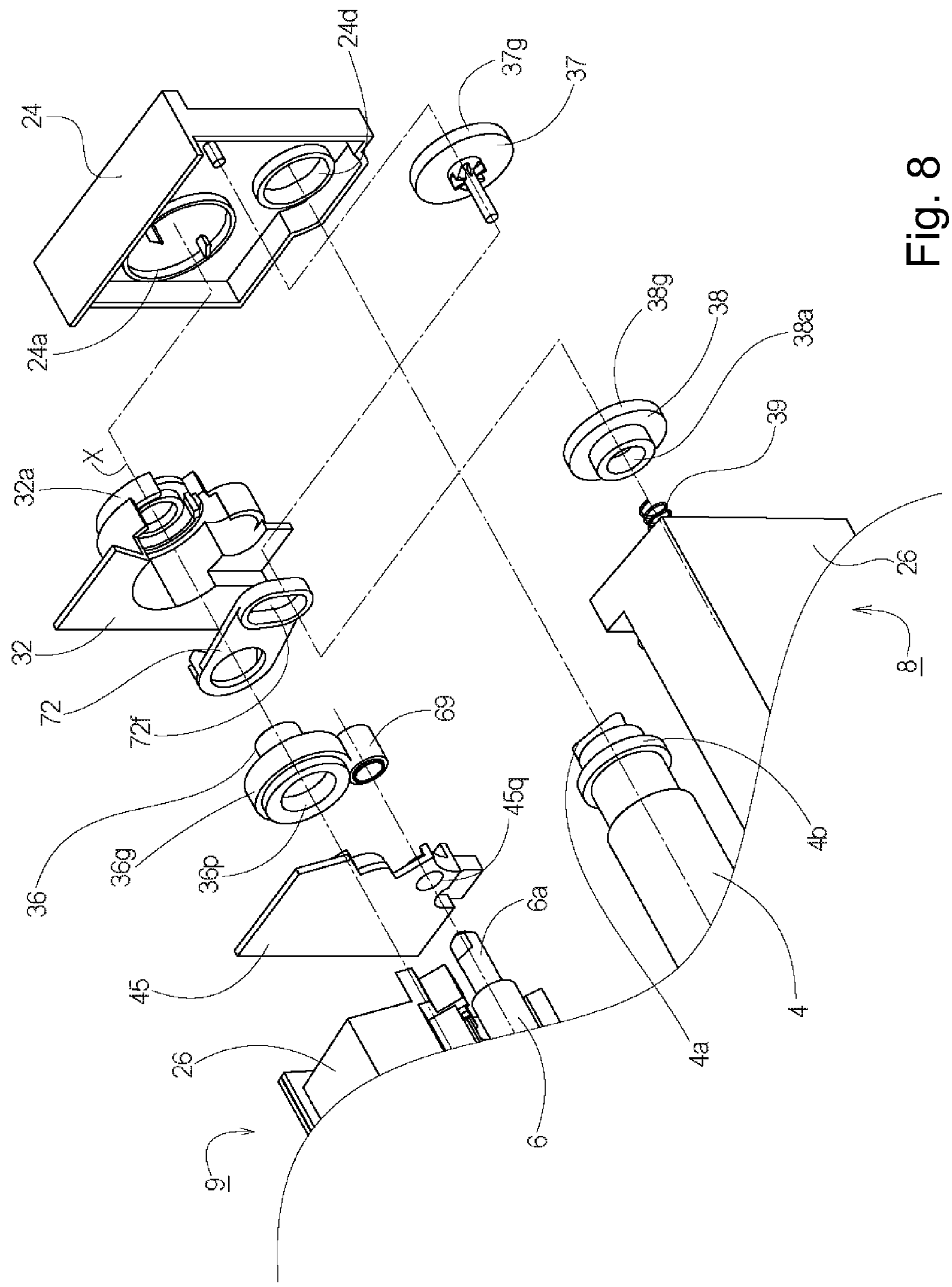
FIG. 8 is a perspective view of the process cartridge according to the first embodiment of the present invention.

As shown in FIGS. 1 and 8, the developing unit 9 comprises the developing roller 6, a developing blade 31, the developing device frame 29, a bearing member 45, a developing device covering member 32 and so on. The developing device frame in a broad sense comprises the bearing member 45 and the developing device covering member 32 and so on as well as the developing device frame 29 (this applies to the embodiments which will be described hereinafter). When the cartridge P is mounted to the main assembly 2 of the apparatus, the developing device frame 29 is movable relative to the main assembly 2 of the apparatus.

The cartridge frame in a broad sense comprises the photosensitive member frame in the above-described broad sense and the developing device frame in the above-described broad sense (the same applies to the embodiments which will be described hereinafter).

The developing device frame 29 includes the developer accommodating portion 49 accommodating the developer to be supplied to the developing roller 6, and the developing blade 31 for regulating a layer thickness of the developer on the peripheral surface of the developing roller 6.

In addition, as shown in FIG. 1, the bearing member 45 is fixed to one longitudinal end portion of the developing device frame 29. The bearing member 45 rotatably supports the developing roller 6. The developing roller 6 is provided with a developing roller gear 69 at a longitudinal end portion. The bearing member 45 also supports rotatably a development idler gear 36 for transmitting the driving force to the developing roller gear 69. This will be described in detail hereinafter.

The developing device covering member 32 is fixed to an outside of the bearing member 45 with respect to the longitudinal direction of the cartridge P. The developing device covering member 32 covers the developing roller gear 69 and the development idler gear 36 and so on.

[Assembling of the Drum Unit and the Developing Unit]

FIGS. 5 and 6 show connection between the developing unit 9 and the drum unit 8. At one longitudinal end portion side of the cartridge P, an outside circumference 32*a* of a cylindrical portion 32*b* of the developing device covering member 32 is fitted in the supporting portion 24*a* of the driving side cartridge cover member 24. In addition, at the other longitudinal end portion side of the cartridge P, a projected portion 29*b* projected from the developing device frame 29 is fitted in a supporting hole portion 25*a* of the non-driving side cartridge cover member 25. By this, the developing unit 9 is supported rotatably relative to the drum unit 8. Here, a rotational center (rotation axis) of the developing unit 9 relative to the drum unit is called "rotational center (rotation axis) X". The rotational center X is an axis resulting the center of the supporting hole portion 24*a* and the center of the supporting hole portion 25*a*.

[Contact Between the Developing Roller and the Drum]

As shown in FIGS. 4, 5 and 6, developing unit 9 is urged by an urging spring 95 which is an elastic member as an urging member so that the developing roller 6 is contacted to the drum 4 about the rotational center X. That is, the developing unit 9 is pressed in the direction indicated by an arrow G in FIG. 4 by an urging force of the urging spring 95 which produces a moment in the direction indicated by an arrow H about the rotational center X.

By this, the developing roller 6 is contacted to the drum 4 at a predetermined pressure. The position of the developing unit 9 relative to the drum unit 8 at this time is a contacting position. When the developing unit 9 is moved in the direction opposite the direction of the arrow G against the urging force of the urging spring 95, the developing roller 6 is spaced from the drum 4. In this manner, the developing roller 6 is movable toward and away from the drum 4.

[Spacing Between the Developing Roller and the Drum]

Figure 7:
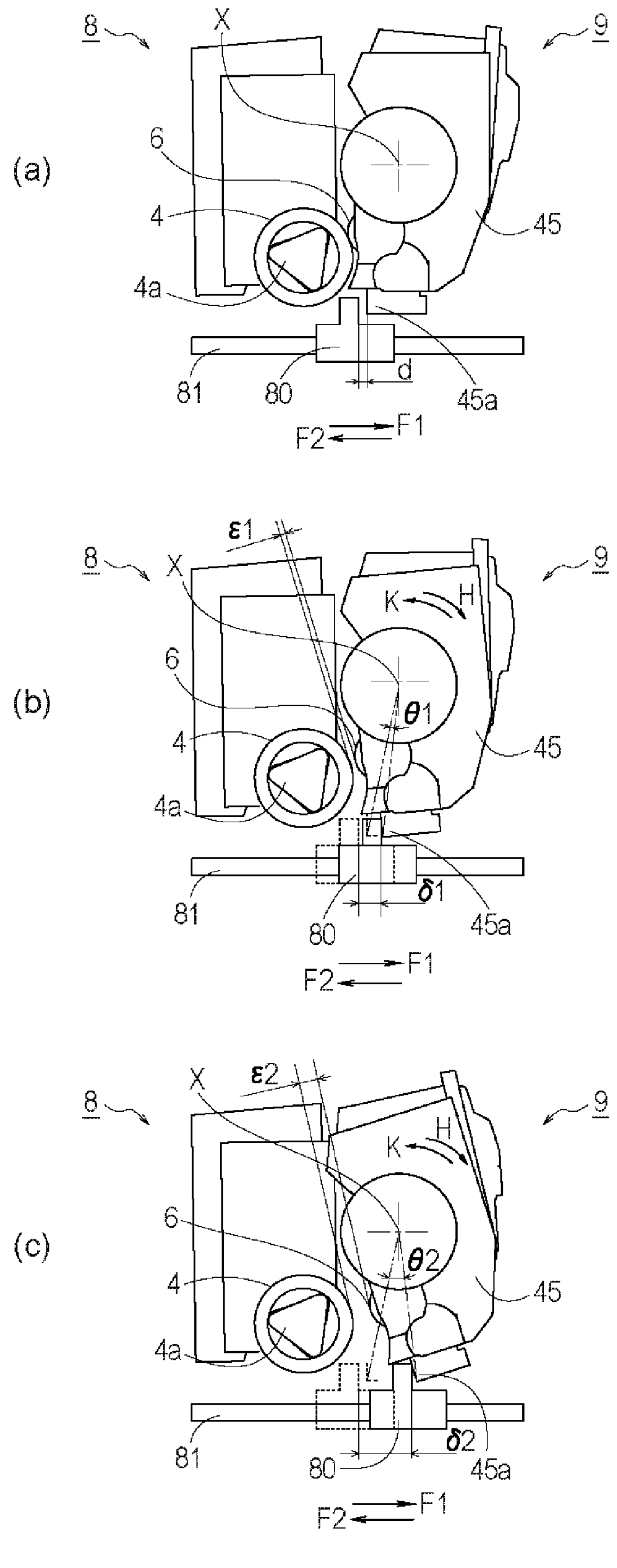
FIG. 7 is a side view of the process cartridge according to the first embodiment of the present invention.

FIG. 7 is a side view of the cartridge P as seen from the driving side. In this Figure, some parts are omitted for better illustration. When the cartridge P is mounted in the main assembly 2 of the apparatus, the drum unit 8 is positioned in place in the main assembly 2 of the apparatus.

In this embodiment, a force receiving portion 45*a* is provided on the bearing member 45. Here, the force receiving portion 45*a* may be provided on another portion (developing device frame or the like, for example) other than the bearing member 45. The force receiving portion 45*a* as an urging force receiving portion is engageable with a main assembly spacing member 80 as a main assembly side urging member (spacing force urging member) provided in the main assembly 2 of the apparatus.

The main assembly spacing member 80 as the main assembly side urging member (spacing force urging member) receives the driving force from the motor (unshown) and is movable along a rail 81 to the direction of arrows F1 and F2.

Part (a) of FIG. 7 shows a state in which the drum 4 and the developing roller 6 are contacted with each other. At this time, the force receiving portion 45*a* and the main assembly spacing member 80 are spaced by a gap d.

Part (b) of FIG. 7 shows a state in which the main assembly spacing member 80 is away from the position in the state of the part (a) of FIG. 7 in the direction of an arrow F1 by a distance $\delta 1$. At this time, the force receiving portion 45*a* is engaged with the main assembly spacing member 80. As described in the foregoing, the developing unit 9 is rotatable relative to the drum unit 8, and therefore, in the state of part (b) of FIG. 7, the developing unit 9 has rotated by an angle $\theta 1$ in the direction of the arrow K about the rotational center X. At this time, the drum 4 and the developing roller 6 are spaced from each other by distance $\varepsilon 1$.

Part (c) of FIG. 7 shows a state in which the main assembly spacing member 80 has moved in the direction of the arrow F1 from the position shown in part (a) of FIG. 7 by $\delta 2$ ($>\delta 1$). The developing unit 9 has rotated in the direction of the arrow K about the rotational center X by an angle $\theta 2$. At this time, the drum 4 and the developing roller 6 are spaced from each other by distance $\varepsilon 2$.

The distance between the force receiving portion 45*a* and the rotation axis of the drum 4 is 13 mm-33 mm in this embodiment and in the following embodiments.

The distance between the force receiving portion 45*a* and the rotational center X is 27 mm-32 mm in the embodiment and in the following embodiments.

[Structure of the Drive Connecting Portion]

Figure 9:
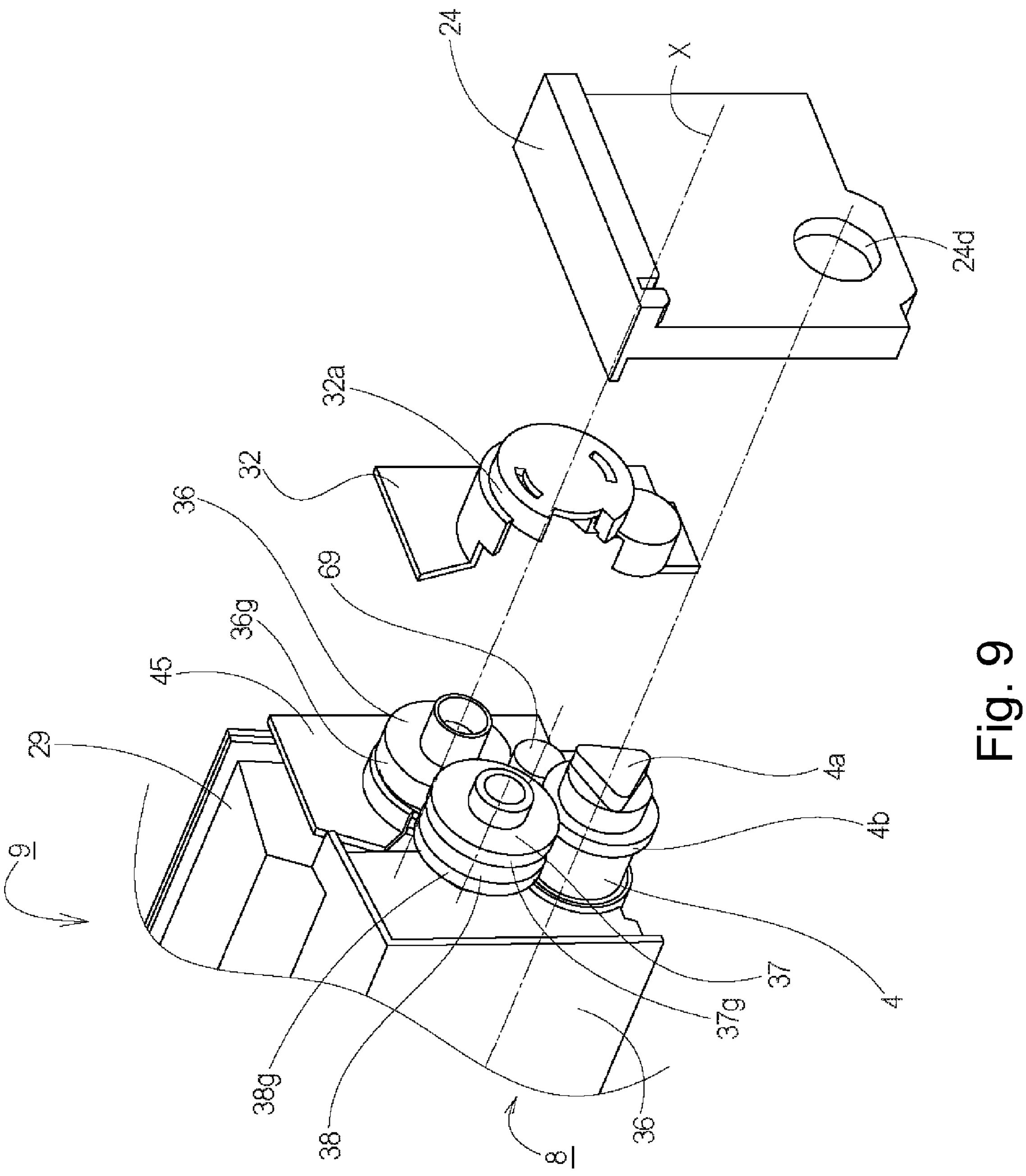
FIG. 9 is a perspective view of the process cartridge according to the first embodiment of the present invention.

Referring to FIGS. 1, 8 and 9, the structure of the drive connecting portion will be described. Here, the drive connecting portion is a mechanism for receiving the drive from the drum-driving-force-outputting member 61 of the main assembly of the apparatus 2, and transmitting or not transmitting the drive to the developing roller 6.

The general arrangement thereof will be described, first.

FIG. 9 is a perspective view of the process cartridge P as seen from the driving side, in which the driving side cartridge cover member 24 and developing device covering member 32 have been dismounted. The driving side cartridge cover member 24 is provided with an opening 24*d*. Through the opening 24*d*, the coupling member 4*a* provided at the end portion of the photosensitive drum 4 is exposed. As described above, the coupling member 4*a* is engageable with the drum-driving-force-outputting member 61 (61Y, 61M, 61C, 61K) of the main assembly 2 of the apparatus shown in part (b) of FIG. 3 to receive the driving force of the driving motor (unshown) of the main assembly of the apparatus.

In addition, at the end portion of the drum 4 as the photosensitive member, there is provided a drum gear 4*b* integral with the coupling 4*a*. At an end portion of the drum unit 8, there is provided a rotatable upstream drive transmission member 37 as a first drive transmission member, and a rotatable downstream drive transmission member 38 as a second drive transmission member. A gear portion 37 *g* of the upstream drive transmission member 37 is engaged with the drum gear 4*b*. As will be described hereinafter, the drive can be transmitted from the upstream drive transmission member 37 to the downstream drive transmission member 38 when claw portions of the upstream drive transmission member 37 and the downstream drive transmission member 38 are engaged with each other. A gear portion 38 *g* of the downstream drive transmission member 38 as the second drive transmission member is engaged with a gear portion 36 *g* of the development idler gear 36 as a third drive transmission member. The gear portion of the development idler gear 36 is engaged also with the developing roller gear 69. By this, the drive transmitted to the downstream drive transmission member 38 is transmitted to the developing roller 6 through the development idler gear 36 and the developing roller gear 69.

Figure 10:
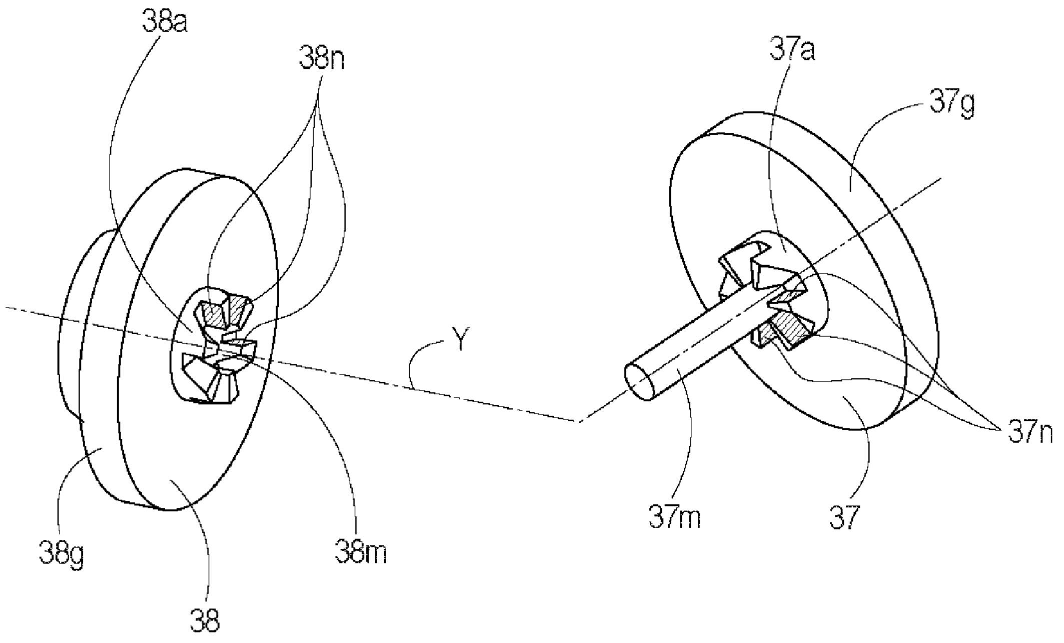
FIG. 10 is a perspective view of a drive connecting portion according to the first embodiment of the present invention.
Figure 11:
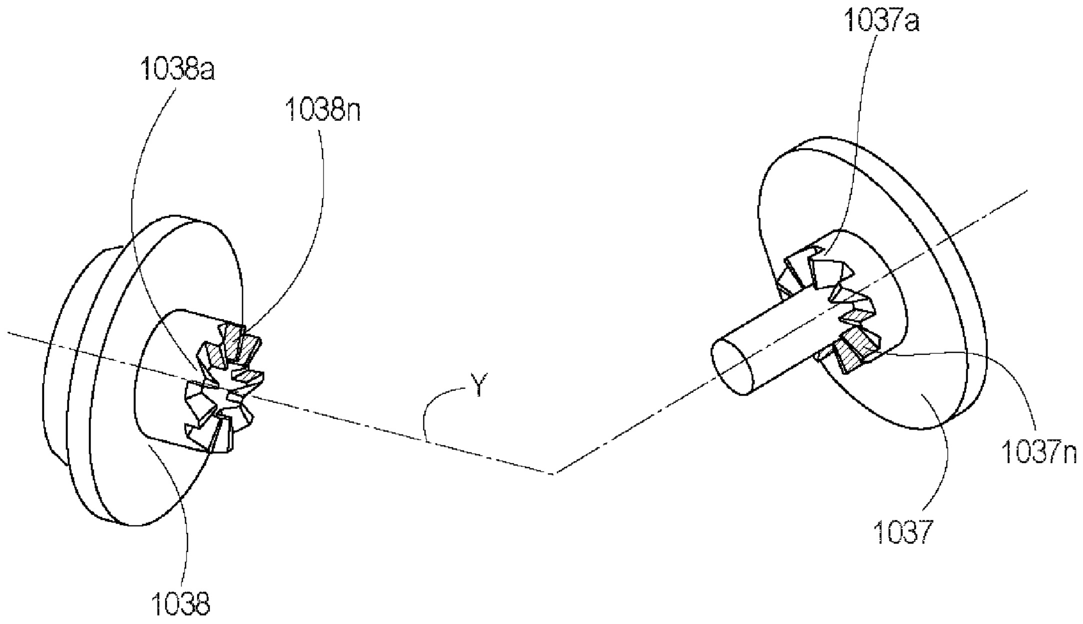
FIG. 11 is a perspective view of the drive connecting portion having nine claws in the first embodiment of the present invention.

Referring to FIG. 10, the structures of the upstream drive transmission member 37 and the downstream drive transmission member 38 will be described. The upstream drive transmission member 37 comprises a claw portion 37*a* as an engaging portion (coupling portion), and the downstream drive transmission member 38 comprises a claw portion 38*a* as an engaging portion (coupling portion). The claw portion 37*a* and the claw portion 38*a* are engageable with each other. In other words, the upstream drive transmission member 37 and the downstream drive transmission member 38 are connectable with each other. In this embodiment, the claw portion 37*a* and the claw portion 38*a* each have six claws. The numbers of the claws 37*a* and the claws 38*a* are not limiting, although they are six in this embodiment. For example, FIG. 11 shows an example in which the number of the claw portion 1037*a* of the upstream drive transmission member 1037 and the number of a claw portion 1038*a* are nine, respectively. With increase of the numbers of the claws, the loads on one claw decreases, so that deformation and/or wearing of the claws can be reduced. On the other hand, given the same outer diameter, the size of the claw may decrease with increase of the number of the claws. It is desired that the number of the claws is properly selected in consideration of the load on one claw and/or the required rigidity.

As shown in FIG. 10, a hole portion 38*m* is provided at the center portion of the downstream drive transmission member 38. The hole portion 38*m* engages with a small diameter cylindrical portion 37*m* of the upstream drive transmission member 37. In other words, the cylindrical portion 37*m* penetrates the hole portion 38*m*. By doing so, the upstream drive transmission member 37 is supported by the downstream drive transmission member 38 rotatably relative thereto and slidably along the axis.

Figure 13:
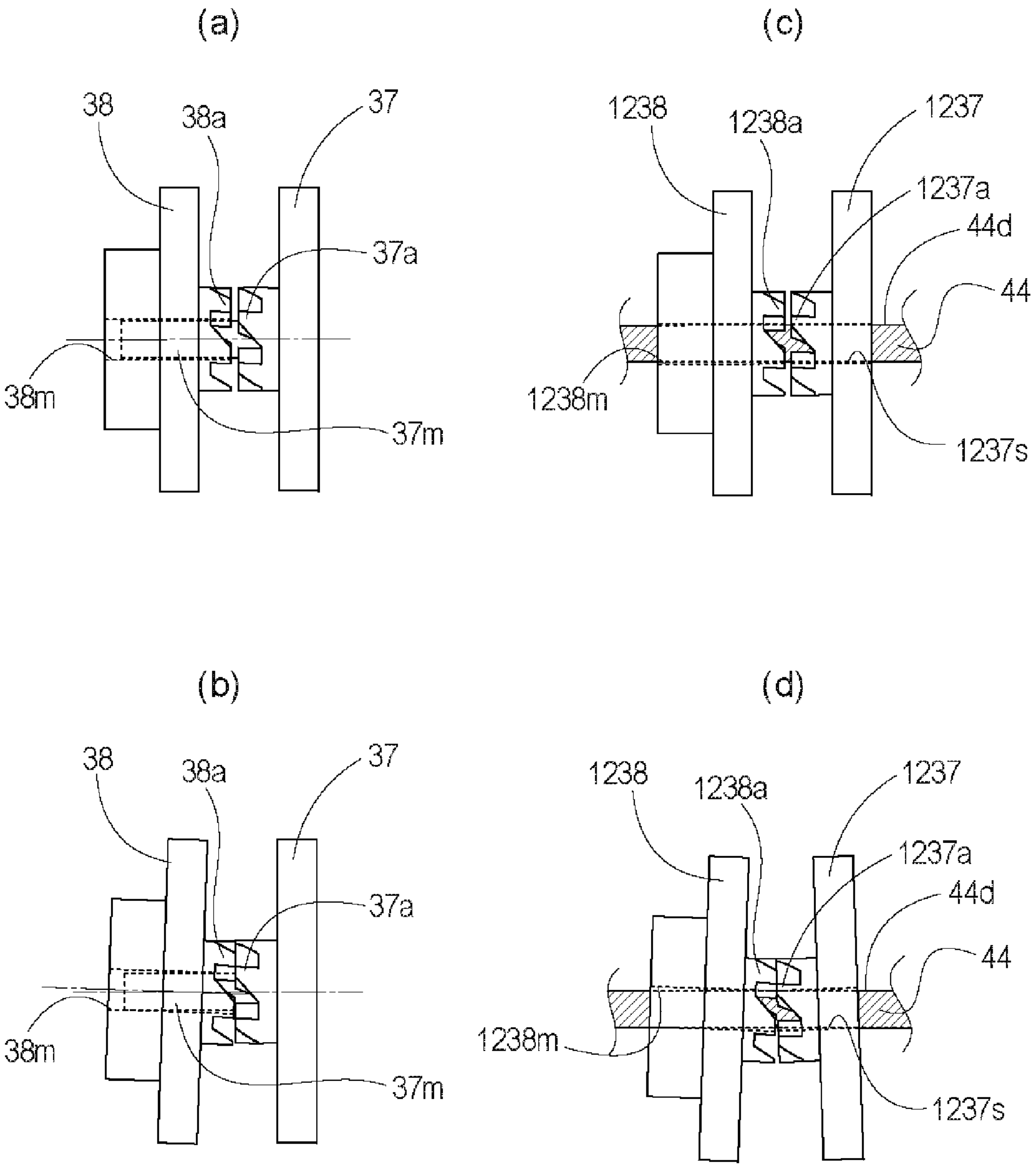
FIG. 13 is a sectional view of a modified example of a positioning structure for the drive connecting portion according to the first embodiment of the present invention.

FIG. 13 shows different positioning between the upstream drive transmission member 37 and the downstream drive transmission member 38. In part (a) of FIG. 13, the small diameter cylindrical portion 37*m* of the upstream drive transmission member 37 is directly engaged with the hole portion 38*m* of the downstream drive transmission member 38 shown in FIG. 10 by which they are positioned relative to each other. On the other hand, in part (c) of FIG. 13, the upstream drive transmission member 1237 and downstream of drive transmission member 1238 are positioned relative to each other through a shaft 44, that is, another member. More specifically, the outer peripheral portion 44*d* of the shaft 44 and the hole portion 1238*m* of the upstream drive transmission member 1237 are supported rotatably and slidably along the axis, and the outer peripheral portion 44*d* of the shaft 44 and the hole portion 1037*s* of the upstream drive transmission member 1037 are supported rotatably and slidably along the axis. By this, the downstream drive transmission member 1038 is positioned relative to the upstream drive transmission member 1037. In the case of the structure shown in part (c) of FIG. 13, the number of parts for positioning the upstream drive transmission member 1037 and the downstream drive transmission member 1038 is large, as compared with the structure shown in part (a) of FIG. 13.

Part (b) of FIG. 13 shows a state in which the upstream drive transmission member 37 and the downstream drive transmission member 38 shown in part (a) of FIG. 13 have not properly been shifted from a drive disconnected state to a drive transmission state. The drive transmission and disconnecting operation will be described hereinafter in detail. There is provided a play between the small diameter cylindrical portion 37*m* of the upstream drive transmission member 37 and the hole portion 38*m* of the downstream drive transmission member 38. In the Figure, the play is shown exaggerated for better or and restoration for better illustration. When the upstream drive transmission member 37 and the downstream drive transmission member 38 are to be engaged with each other, they may not be engaged properly due to misalignment therebetween because of the provision of the play (part (b) of FIG. 13).

Similarly, part (d) of FIG. 13 shows a state in which the upstream drive transmission member 1037 as the first drive transmission member and the downstream drive transmission member 1038 as the second drive transmission member shown in part (c) of FIG. 13 have not properly been shifted from the drive disconnected state to the drive transmission state. The upstream drive transmission member 1037 and the downstream drive transmission member 1038 are relatively misaligned as shown in the Figure due to the number of parts and dimensional errors of them. The amount of misalignment is larger than in the structure shown in part (b) of FIG. 13. In the shifting from the drive disconnected state to the drive transmission state, if the claw portion 1037*a* and the claw portion 1038*a* of the coupling are engaged in the state of misalignment between the upstream of drive transmission member 1037 and the downstream drive transmission member 1038, the claw portion 1037*a* and the claw portion 1038*a* of the coupling may be contacted to each other only at the free end portions, as shown in part (b) or part (d) of FIG. 13. In order to suppress deterioration of the rotational accuracy, the misalignment between the upstream drive transmission member 1037 and the downstream drive transmission member 1038 is desirably suppressed as much as possible. Therefore, the structure in which the upstream drive transmission member 37 and the downstream drive transmission member 38 are directly positioned relative to each other (the structures as shown in FIG. 10 and part (a) of FIG. 13) is desirable. Then, the number of parts can be reduced, and the number of assembling steps can be reduced.

Figure 14:
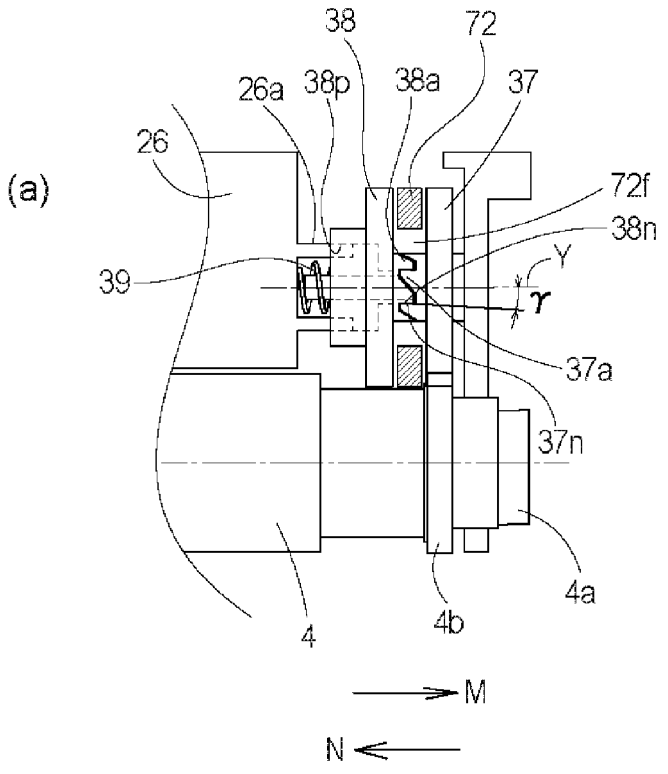
FIG. 14 is a sectional view of the drive connecting portion according to the first embodiment of the present invention.
Figure 14:
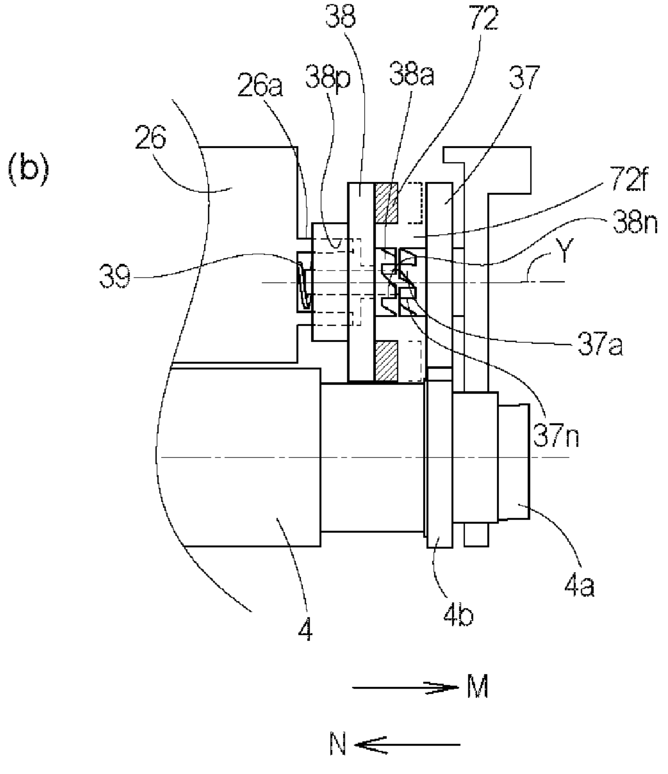

Part (a) of FIG. 14 is a sectional view illustrating a connection state (coupling state) between the upstream drive transmission member 37 and the downstream drive transmission member 38. An inner peripheral surface 38*p* of the downstream drive transmission member 38 is supported rotatably and slidably along the axis by a cylindrical portion 26*a* of the cleaner container 26. Between the downstream drive transmission member 38 and the cleaner container 26, there is provided a spring 39 which is an elastic member as an urging member to press the downstream drive transmission member 38 in the direction indicated by an arrow M.

In the state of part (a) of FIG. 14, a range of at least a part of the disconnecting cam 72 and a range of at least a part of the upstream drive transmission member 37 are overlapped with each other, when they are projected onto a phantom line parallel with a rotational axis of the developing roller 6. More specifically, the range of the disconnecting cam 72 is within the range of the upstream drive transmission member 37 in the projected state. With such a structure, the drive disconnecting mechanism can be downsized.

In addition, in the state of part (a) of FIG. 14, a range of at least a part of the disconnecting cam 72 and a range of at least a part of the downstream drive transmission member 38 are overlapped with each other, when the disconnecting cam 72 and the downstream drive transmission member 38 are projected onto a phantom line parallel with the rotational axis of the developing roller 6.

In addition, as shown in part (b) of FIG. 14, the downstream drive transmission member 38 is movable in a direction of an arrow N against an urging force of the spring 39. In this state, the coupling state (the state in which the rotational force transmission is capable) between the upstream drive transmission member 37 and the downstream drive transmission member 38 is not established. Even in such a state, the upstream drive transmission member 37 and the downstream drive transmission member 38 are maintained coaxial (aligned) by the direct engagement between the cylindrical portion 37*m* and the hole portion 38*m*.

As described hereinbefore, the gear portion 38 *g* of the downstream drive transmission member 38 is engaged with the gear portion 36 *g* of the development idler gear 36 as the third drive transmission member. More particularly, the gear portion 38 *g* of the downstream drive transmission member 38 is movable in the directions of the arrows M and N while being in engagement with the gear portion 36 *g* of the development idler gear 36. For easy movement of the downstream drive transmission member 38 in the directions of the arrows M and N, the gear portion 36 *g* of the downstream drive transmission member 38 and the gear portion 36 *g* of the development idler gear 36 in meshing engagement therewith are desirably spur gears rather than helical gears.

In the state of part (b) of FIG. 14, a range of the at least a part of the upstream drive transmission member 37 and a range of at least a part of the downstream drive transmission member 38 are overlapped with each other, when the upstream drive transmission member 37 and the downstream drive transmission member 38 are projected onto a phantom line parallel with the rotational axis of the developing roller 6. In more detail, the range of the downstream drive transmission member 38 is within the range of the upstream drive transmission member 37. With such a structure, the drive disconnecting mechanism can be downsized.

Suppose an axis Y is the rotational axis of the upstream drive transmission member 37 and the downstream drive transmission member 38. As shown in part (a) of FIG. 14, a contact portion 37*n* and a contact portion 38*n* where the claw portion 37*a* and the claw portion 38*a* contact with each other are inclined relative to the axis Y by an angle γ.

More particularly, the contact portion 38*n* of the downstream drive transmission member 38 is overlapped with at least a part of the upstream drive transmission member 37 with respect to a direction parallel with the axis Y. In other words, the contact portion 38*n* overhangs a part of the downstream drive transmission member 38, and the contact portion 37*n* overhangs a part of the upstream drive transmission member 37. In other words, the contact portion 38*n* overhangs a phantom plane perpendicular to the rotational axis of the downstream drive transmission member 38, and the contact portion 37*n* overhangs a phantom plane perpendicular to the rotational axis of the upstream drive transmission member 37. With such a structure, in the drive transmission, the claw portion 38*a* and the claw portion 37*a* mutually pull each other in the direction of the axis Y.

In the drive transmission, the drive is transmitted from the upstream drive transmission member 37 and the downstream drive transmission member 38.

To the upstream drive transmission member 37 and the downstream drive transmission member 38, a pulling force and an urging force of the spring 39 are applied. A resultant force thereof, the upstream drive transmission member 37 and the downstream drive transmission member 38 are connected with each other during the drive transmission. Here, the inclination angles γ of the contact portion 37*n* and the contact portion 38*n* relative to the axis Y is preferably approx. 1°-approx. 3.5°. During the drive transmission and disconnecting operations, the contact portion 37*n* and the contact portion 38*n* are worn by sliding (the drive transmission and disconnecting operations will be described hereinafter). In addition, the claws may be deformed during the drive transmission operation. With the structure in which the contact portion 37*n* and the contact portion 38*n* are always mutually pulled to each other, the upstream drive transmission member 37 and the downstream drive transmission member 38 can be assuredly connected to keep the drive transmission stable, even when the wearing and/or deformation of the contact portion 37*n* and contact portion 38*n* occurs. When the upstream drive transmission member 37 and the downstream drive transmission member 38 are separated from each other due to the wearing and/or deformation of the contact portion 37*n* and the contact portion 38*n*, the urging force of the spring 39 may be made larger to assure the connection between the upstream drive transmission member 37 and the downstream drive transmission member 38. However, in this case, in the drive disconnecting operation which will be described hereinafter in which the downstream drive transmission member 38 is retracted from the upstream drive transmission member 37 against the urging force of the spring 39, the required force is large. If the inclination angles of the contact portion 37*n* and the contact portion 38*n* relative to the axis Y is too large, the pulling force during the drive transmission is large, and therefore, the drive transmission is stabilization, but the force required to separate the upstream drive transmission member 37 and downstream of drive transmission member 38 from each other in the drive disconnection operation is large.

The number of the claws may be one, but in such a case, the downstream drive transmission member 38 and/or the upstream drive transmission member 37 is liable to tilt relative to the axis Y due to the force applied to the claw portion during the drive transmission. If this occurs, the drive transmission property may be deteriorated (non-uniform rotation and/or poor transmission efficiency). In order to suppression such a tilting, the supporting portion rotatably supporting the upstream drive transmission member 37 and/or the downstream drive transmission member 37 may be reinforced, but it is further preferable to employ a plurality of claws which are equidistantly arranged in the circumferential direction about the axis Y. When a plurality of claws are equidistantly arranged in the circumferential direction about the axis Y, a resultant force of the forces applied to the claw portions produces a moment rotating the downstream drive transmission member 38 and the upstream drive transmission member 37 about the axis Y. Therefore, the axis tilting of the downstream drive transmission member 38 and/or the upstream drive transmission member 37 relative to the axis Y can be suppressed. On the other hand, with increase of the number of claws, the size of the claws decreases with the result of decrease of the rigid of the claws even to a liability of breakage. Therefore, in the case that the contact portion 37*n* and the contact portion 38*n* mutually pull each other at all times, the numbers of the claws of the claw portion 37*a* and the claws of the claw portion 38*a* are two-nine, respectively.

In the foregoing, the contact portion 37*n* and the contact portion 38*n* mutually pull each other at all times, but this is not limiting. In other words, the contact portion 38*n* may not overhang a phantom plane perpendicular to the rotational axis of the downstream drive transmission member 38, and similarly, the contact portion 37*n* may not overhang a phantom plane perpendicular to the rotational axis of the upstream drive transmission member 37. In this case, the upstream drive transmission member 37 and the downstream drive transmission member 38 mutually repel. However, by properly adjusting the urging force of the spring 39, the engagement between the upstream drive transmission member 37 and the downstream drive transmission member 38 can be accomplished. Nevertheless, from the standpoint of stabilized drive transmission, the above-described mutually pulling structure is preferable.

Figure 12:
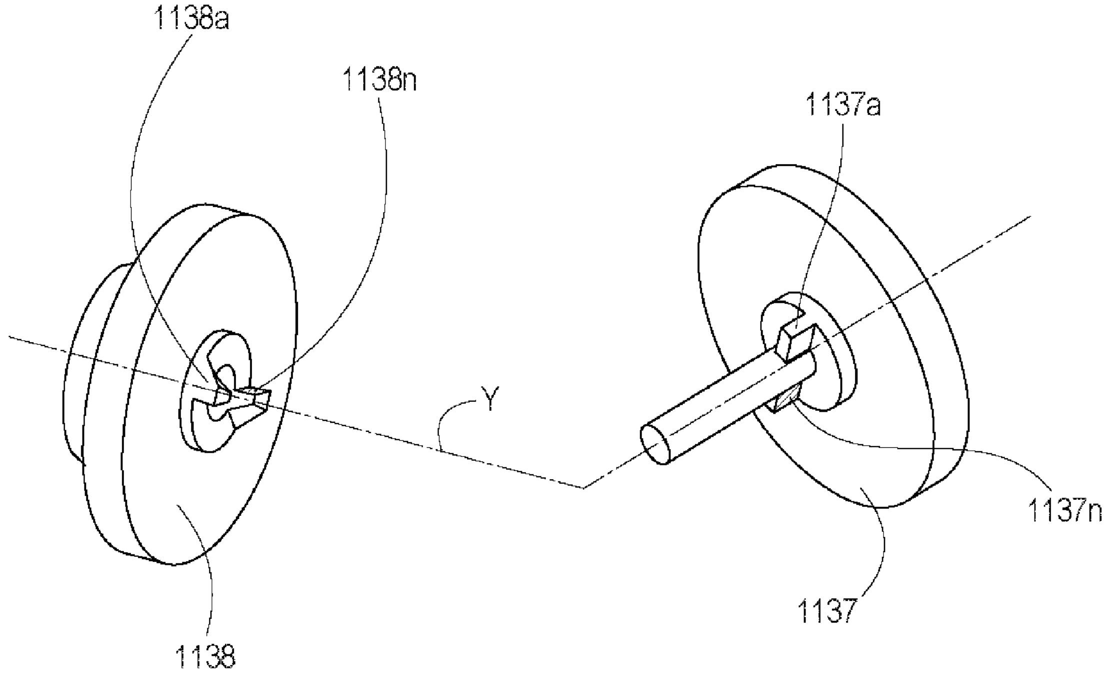
FIG. 12 is a perspective view of a modified example of the drive connecting portion according to the first embodiment of the present invention.

In addition, the configurations of the contact portion 37*n* and the contact portion 38*n* are not limited to the claw. For example, with respect to the engagement between an upstream drive transmission member 1137 and a downstream drive transmission member 1138 as shown in FIG. 12, a contact portion 1137*n* may have a claw configuration, and the contact portion 1138*n* may have a rib configuration.

The drive disconnecting mechanism will be described. As shown in FIGS. 1 and 8, a disconnecting cam 72 as a coupling releasing member which is a part of the disconnecting mechanism is provided between the development idler gear 36 and the developing device covering member 32. In other words, at least a part of the disconnecting cam 72 is between the development idler gear 36 and the developing device covering member 32 in a direction parallel with the rotational axis of the developing roller 6.

Figure 15:
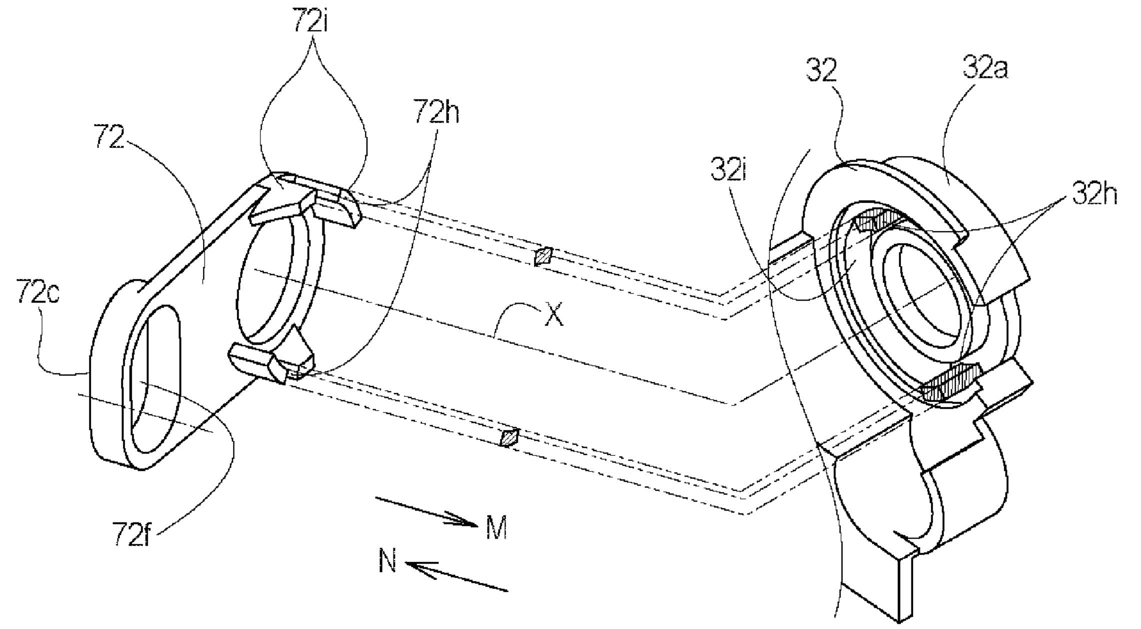
FIG. 15 is a perspective view of a releasing member and peripheral parts thereof according to the first embodiment of the present invention.

FIG. 15 is a perspective view illustrating an engaging relation between the disconnecting cam 72 and the developing device covering member 32.

The disconnecting cam 72 is substantially oval and has an outer surface 72*i*. The developing device covering member 32 has an inner peripheral surface 32*i*. The inner peripheral surface 32*i* is engageable with the outer peripheral surface 72*i*. By doing so, the disconnecting cam 72 is supported slidably relative to the developing device covering member 32. In other words, the disconnecting cam 72 is movable relative to the developing device covering member 32 substantially in parallel with the rotational axis of the developing roller 6. The outer peripheral surface 72*i* of the disconnecting cam 72 the inner peripheral surface 32*i* of the developing device covering member 32 and the outside circumference 32*a* of the developing device covering member 32 are co-axial with each other. That is, the rotational axes of the These members are aligned with respect to the rotation axis X of the developing unit 9 relative to the drum unit 8. Here, the alignment means that within the range of the dimensional tolerances of these parts, and this applies to the embodiment which will be described hereinafter.

The developing device covering member 32 is provided with a guide 32*h* as a (second) guide portion, and the disconnecting cam 72 is provided with a guide groove 72*h* as a (second) guided portion. Here, the guide 32*h* of the developing device covering member 32 is engaged with the guide groove 72*h* of the disconnecting cam 72. Here, the guide 32*h* and the guide groove 72*h* extend in parallel with the rotational axis X. By the engagement between the guide 32*h* and the guide groove 72*h*, the disconnecting cam 72 as the coupling releasing member is slidable relative to the developing device covering member 32 only in the axial direction (the directions of arrows M and N). It is not necessary that the guide 32*h* or the guide groove 72 has both sides parallel with the rotational axis X, but it will suffice if the sides contacting to each other are in parallel with the rotational axis X.

As shown in FIGS. 1, 8, the bearing member 45 rotatably supports the development idler gear 36. In detail, a first shaft receiving portion 45*p* (cylindrical outer surface) of the bearing member 45 rotatably supports a supported portion 36*p* (cylindrical inner surface) of the development idler gear 36.

Furthermore, the bearing member 45 rotatably supports the developing roller 6. In more detail, the second shaft receiving portion 45*q* (cylindrical inner surface) of the bearing member 45 rotatably supports a shaft portion 6*a* of the developing roller 6.

Figure 16:
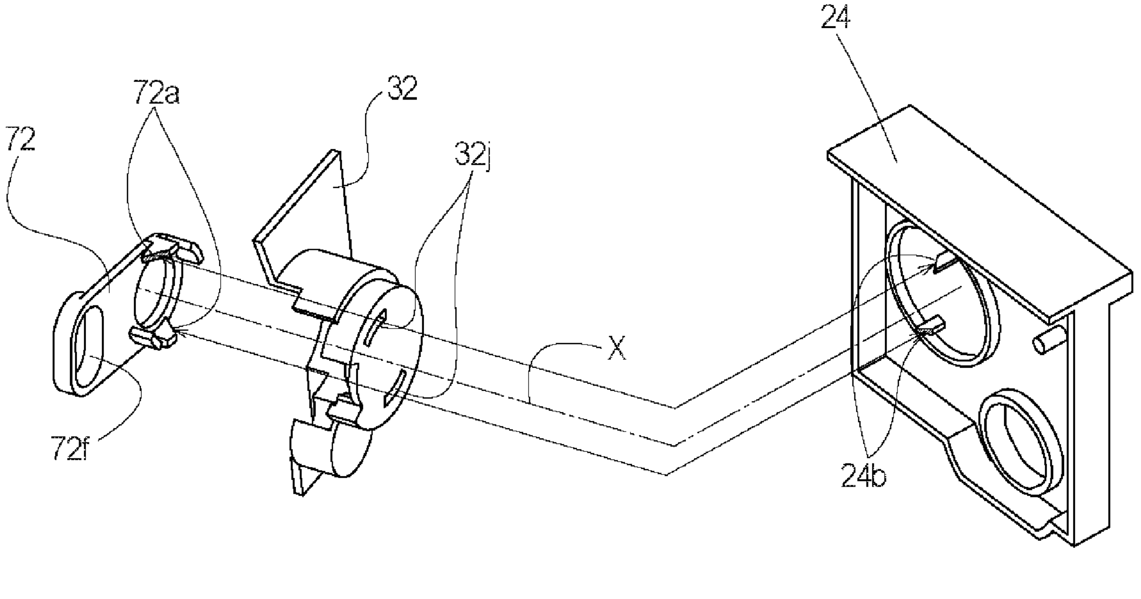
FIG. 16 is a perspective view of the releasing member and peripheral parts thereof according to the first embodiment of the present invention.

Longitudinally outside of the developing device covering member 32, the driving side cartridge cover member 24 is provided. FIG. 16 shows the structures of the disconnecting cam 72, the developing device covering member 32 and the driving side cartridge cover member 24.

The disconnecting cam 72 as the coupling releasing member includes a contact portion (inclined surface) 72*a* as a force receiving portion for receiving the force produced by main assembly 2 of the apparatus (main assembly spacing member 80). The driving side cartridge cover member 24 is provided with a contact portion (inclined surface) 24*b* as an operating member. Furthermore, the developing device covering member 32 is provided an opening 32*j*. A contact portion 72*a* of the disconnecting cam 72 and a contact portion 24*b* of the driving side cartridge cover member 24 are contactable to each other through the opening 32*j* of the developing device covering member 32.

Figure 17:
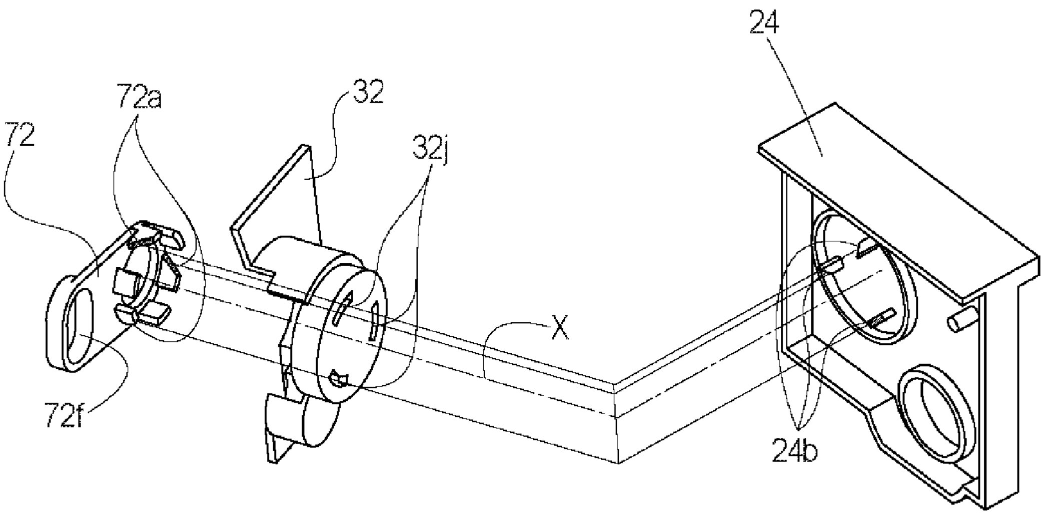
FIG. 17 is a perspective view in which three disconnecting cams are provided according to the first embodiment of the present invention.

In the foregoing, the number of the contact portions 72*a* of the disconnecting cam 72 and the number of the contact portions 24*b* of the cartridge cover member 24 are two, but the numbers are not limiting. For example, FIG. 17 shows the case in which the numbers of the respective contact portions are three.

The number of the contact portions may be one, but in such a case, the disconnecting cam 72 may tilt relative to the axis X by the force applied to the contact portion upon the disconnecting operation which will be described hereinafter. If the tilting occurs, the drive switching property such as the timing of the driving connection and the disconnecting operation may be deteriorated. In order to suppress axis tilting, it is desired to reinforce the supporting portion (the inner peripheral surface 32*i* of the developing device covering member 32) slidably (along the axis of the developing roller 6) supporting the disconnecting cam 72. It is further desirable to employ a plurality of contact portions which are substantially equidistantly arranged in the circumferential direction about the axis X. In this case, a resultant force of the forces applied to the contact portion produces a moment rotating the disconnecting cam 72 about the axis X. Therefore, the axis tilting of the disconnecting cam 72 relative to the axis X can be suppressed. When three or more contact portions are provided, a flat supporting plane for the disconnecting cam 72 relative to the axis X can be defined, so that the axis tilting of the disconnecting cam 72 relative to the axis X can be further suppressed. That is, the attitude of the disconnecting cam 72 can be stabilized.

As shown in FIGS. 1, 8, the upstream drive transmission member 37 and the downstream drive transmission member 38 are engaged with each other through an opening 72*f* of the disconnecting cam 72. FIG. 14 is a sectional view illustrating the dispositions of the upstream drive transmission member 37, the downstream drive transmission member 38 and the disconnecting cam 72. Through the opening 72*f* of the disconnecting cam 72, the claw portions 37*a* and 38*a* of the upstream drive transmission member 37 and the downstream drive transmission member 38 are provided.

[Drive Disconnecting Operation]

The operation of the drive connecting portion at the time of change from the contact state to the spaced state between the developing roller 6 and the drum 4 will be described.

[State 1]

Figure 18:
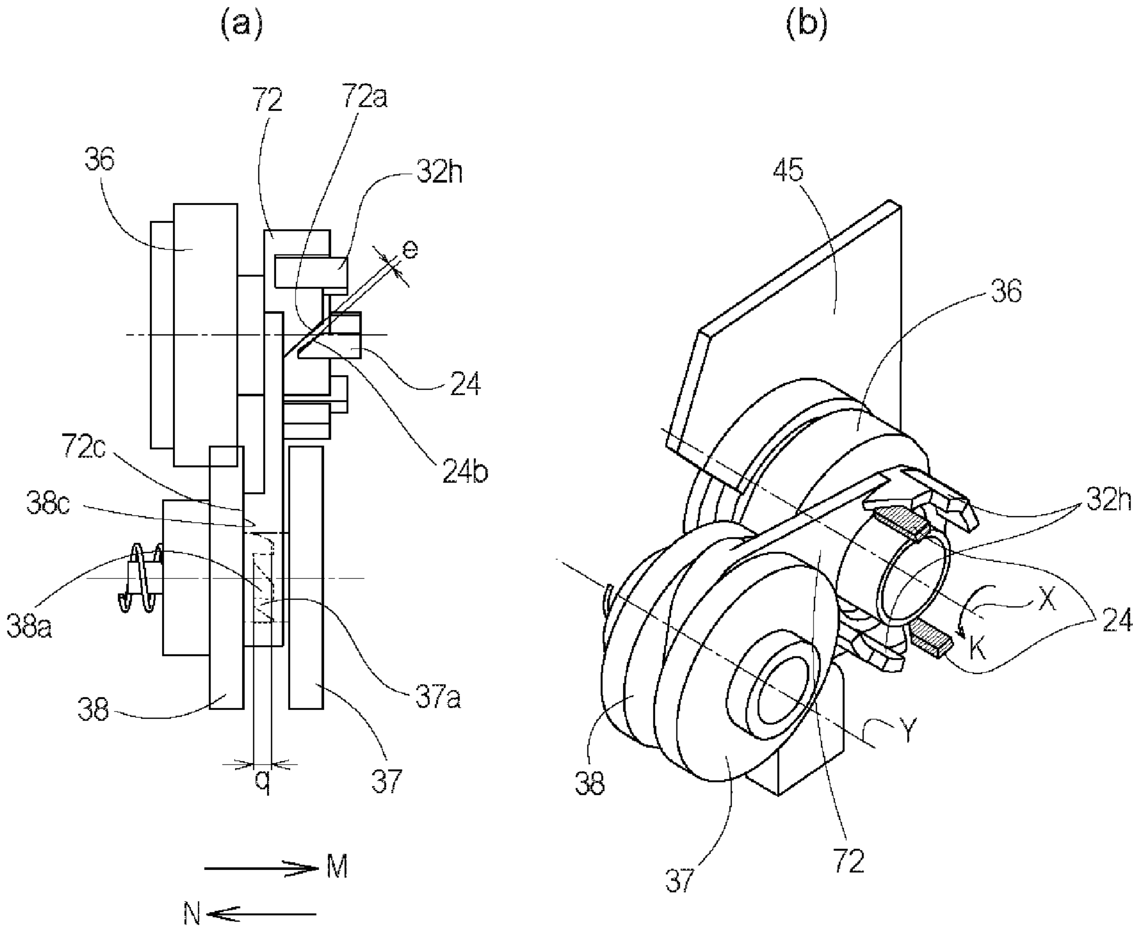
FIG. 18 is a schematic view and a perspective view of the drive connecting portion according to the first embodiment of the present invention.

As shown in part (a) of FIG. 7, the main assembly spacing member 80 and the force receiving portion 45*a* of the bearing member 45 are spaced by a gap d. At this time, the developing roller 6 is in contact with the drum 4 as the photosensitive member. This state will be called "state 1" of the main assembly spacing member 80. Part (a) of FIG. 18 schematically shows the drive connecting portion at this time. Part (b) of FIG. 18 is a perspective view of the drive connecting portion. In FIG. 18, some parts are omitted for better illustration. In part (b) of FIG. 18, only a part of the driving side cartridge cover member 24 including the contact portion 24*b* is shown, and only a part the developing device covering member 32 including the guide 32*h* is shown. Between the contact portion 72*a* of the disconnecting cam 72 and the contact portion 24*b* of the cartridge cover member 24, there is a gap e. At this time, the claws 37*a* of the upstream drive transmission member 37 and the claws 38*a* of the downstream drive transmission member 38 are engaged with each other by an engagement depth q. As described above, the downstream drive transmission member 38 is engaged with the development idler gear 36 as the third drive transmission member. And, the development idler gear 36 is engaged with the developing roller gear 69. The upstream drive transmission member 37 is always in engagement with the drum gear 4*b*. Therefore, the driving force inputted to the coupling 4*a* from the main assembly 2 of the apparatus is transmitted to the developing roller gear 69 through the upstream drive transmission member 37 and the downstream drive transmission member 38. By this, the developing roller 6 is driven. The positions of the parts at this time is called a contacting position, a development contact and drive transmission state.

[State 2]

When the main assembly spacing member 80 moves in the direction indicated by an arrow F1 by δ1 in the Figure from the development contact and drive transmission state, as shown in part (b) of FIG. 7, the developing unit 9 rotates about the axis X in the direction indicated by the arrow K by an angle θ1. As a result, the developing roller 6 is spaced from the drum 4 by a distance ε1. The disconnecting cam 72 and the developing device covering member 32 in the developing unit 9 rotate in the direction indicated by the arrow K by an angle θ1 in interrelation with the rotation of the developing unit 9. On the other hand, when the cartridge P is mounted to the main assembly 2 of the apparatus, the drum unit 8, the driving side cartridge cover member 24 and the non-driving side cartridge cover member 25 are positioned in place in the main assembly 2 of the apparatus. As shown in part (a) of FIG. 19 and part (b) of FIG. 19, the contact portion 24*b* of the driving side cartridge cover member 24 does not move. In the Figure, the contact portion 72*a* of the disconnecting cam 72 and the contact portion 24*b* of the driving side cartridge cover member 24 have just started contacting to each other, as a result of rotation of the disconnecting cam 72 in the direction of the arrow K in the Figure in interrelation with the rotation of the developing unit 9. At this time, the claw 37*a* of the upstream drive transmission member 37 and the claw 38*a* of the downstream drive transmission member 38 are kept engaging with each other (part (a) of FIG. 19). Therefore, the driving force inputted to the coupling 4*a* from the main assembly 2 of the apparatus is transmitted to the developing roller 6 through the upstream drive transmission member 37 and the downstream drive transmission member 38. The state of these parts in this state is called a developing device spacing and drive transmission state.

[State 3]

Figure 20:
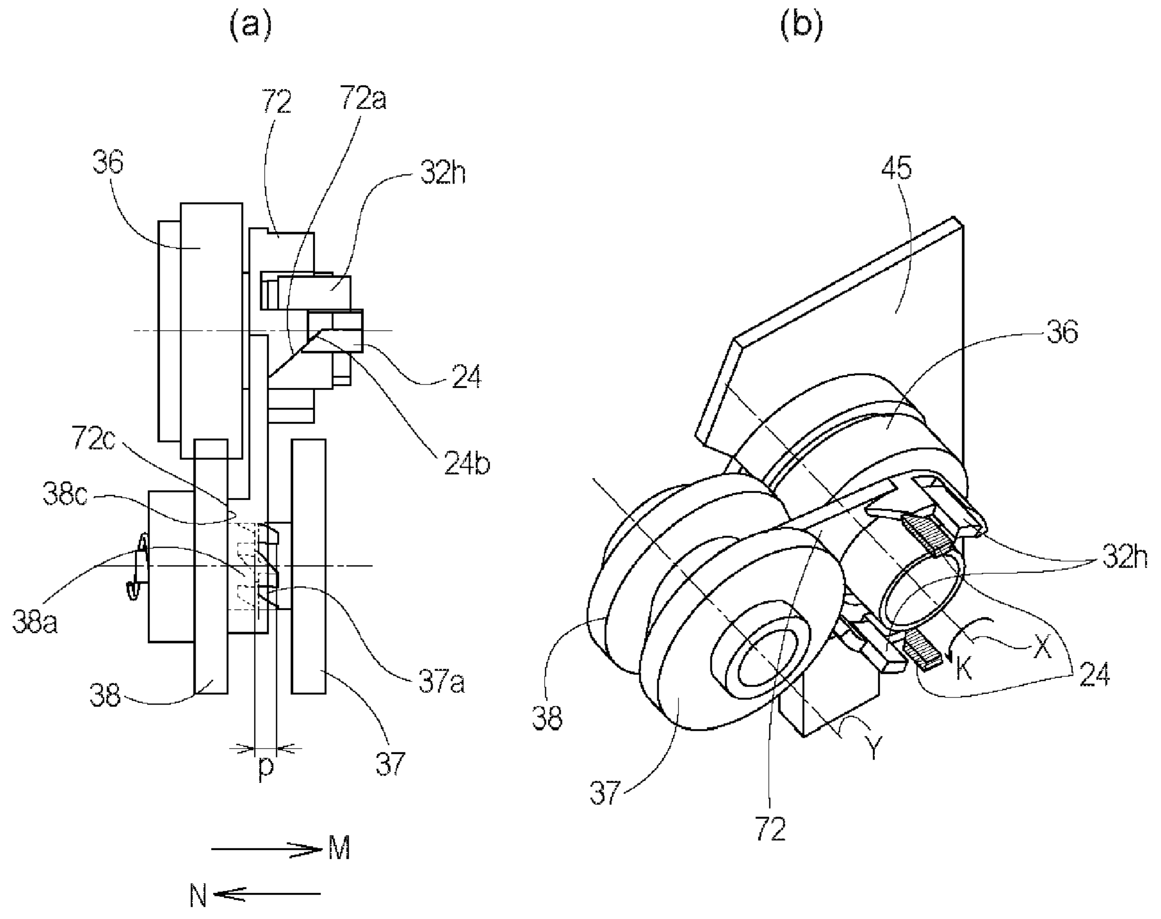
FIG. 20 is a schematic view and a perspective view of the drive connecting portion according to the first embodiment of the present invention.

Part (a) of FIG. 20 and part (b) of FIG. 20 show the drive connecting portion when the main assembly spacing member 80 moves from the developing device spacing and drive transmission state in the direction of the arrow F1 only δ2 in the Figure as shown in part (c) of FIG. 7. In interrelation with the rotation of the developing unit 9 by the angle θ2 (>θ1), the disconnecting cam 72 and the developing device covering member 32 rotate. On the other hand, the driving side cartridge cover member 24 does not change its position similarly to the foregoing, but the disconnecting cam 72 rotates in the direction of the arrow K in the Figure. At this time the contact portion 72*a* of the disconnecting cam 72 receives a reaction force from the contact portion 24*b* of the driving side cartridge cover member 24. In addition, as described above, the guide groove 72*h* of the disconnecting cam 72 is limited by engaging with the guide 32*h* of the developing device covering member 32 to be movable only in the axial direction (arrows M and N) (FIG. 15). As a result, the disconnecting cam 72 slides by p in the direction of the arrow N relative to the developing device covering member. In interrelation with the movement of the disconnecting cam 72 in the direction of the arrow N, an urging surface 72*c*, as the urging portion, of the disconnecting cam 72 urges the urged surface 38*c*, as the portion-to-be-urged, of the downstream drive transmission member 38. By this, the downstream drive transmission member 38 slides in the direction of the arrow N by p against the urging force of the spring 39 (FIG. 20 and parts (b) of FIG. 14).

At this time, the movement distance p is larger than the engagement depth q between the claws 37*a* of the upstream drive transmission member 37 and the claws 38*a* of the downstream drive transmission member 38, and therefore, the claws 37*a* and the claws 38*a* are disengaged from each other. In this manner, the upstream drive transmission member 37 continues to receive the driving force (rotational force) from the main assembly 2 of the apparatus, whereas the downstream drive transmission member 38 stops. As a result, the rotation of the developing roller gear 69, and therefore, the rotation of the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 is capable of spacing from the drum 4 while rotating. As a result, the drive for the developing roller 6 can be stopped in accordance with the space distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 37*a* of the upstream drive transmission member 37 and the claws 38*a* of the downstream drive transmission member 38 are in a disconnected state, as shown in FIG. 20.

Figure 19:
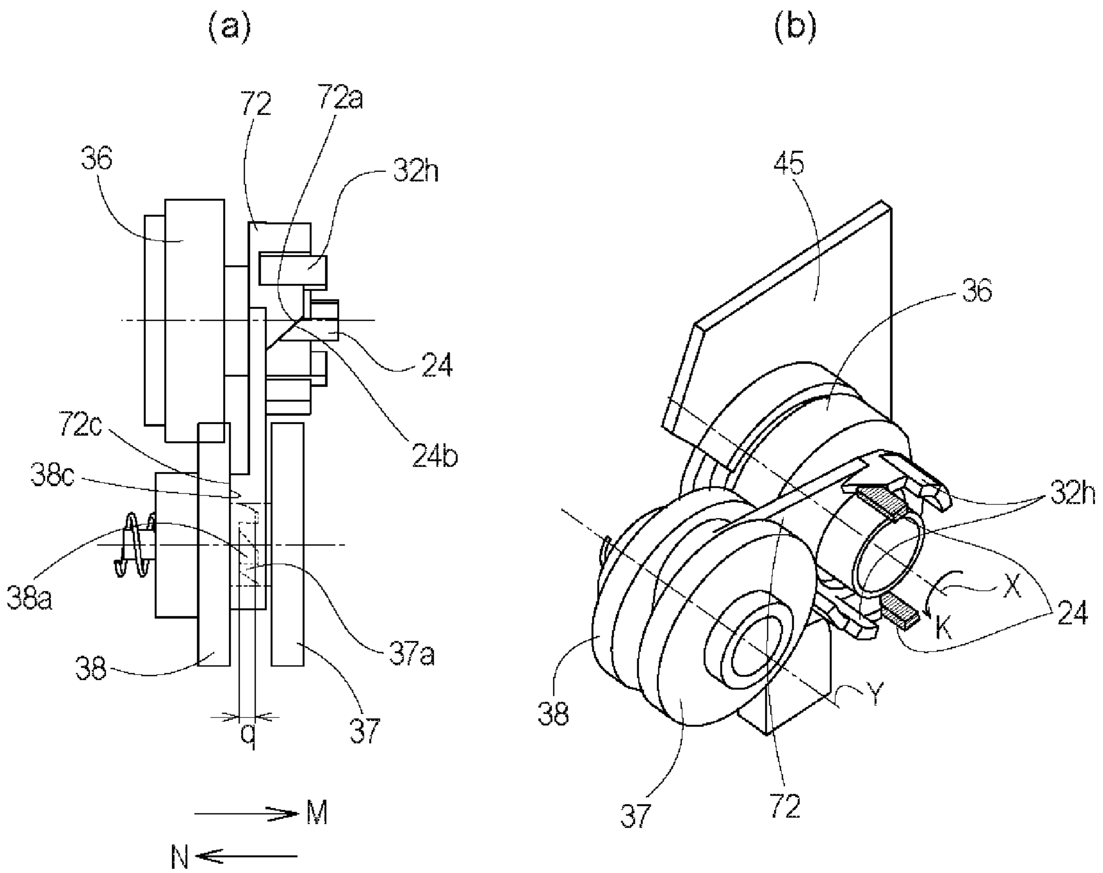
FIG. 19 is a schematic view and a perspective view of the drive connecting portion according to the first embodiment of the present invention.

In the angle θ1 position of the developing unit 9 (the state shown in part (b) of FIG. 7 and FIG. 19) by gradual rotation of the developing unit 9 in the direction of the arrow H shown in FIG. 7 from this state, the claws 37*a* of the upstream drive transmission member 37 and the claws 38*a* of the downstream drive transmission member 38 are engaged with each other by the movement of the downstream drive transmission member 38 by the urging force of the spring 39 in the direction of the arrow M. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

As described in the foregoing, according to the structures, the drive disconnection state and the drive transmission state to the developing roller 6 are determined firmly by the rotation angle of the developing unit 9.

In the following description, the contact portion 72*a* of the disconnecting cam 72 and the contact portion 24*b* of the driving side cartridge cover member 24 are in face to face contact, but this is not inevitable. For example, the contact may be between a surface and a ridge line, between a surface and a point, between a ridge line and a ridge line or between a ridge line and a point.

Figure 21:
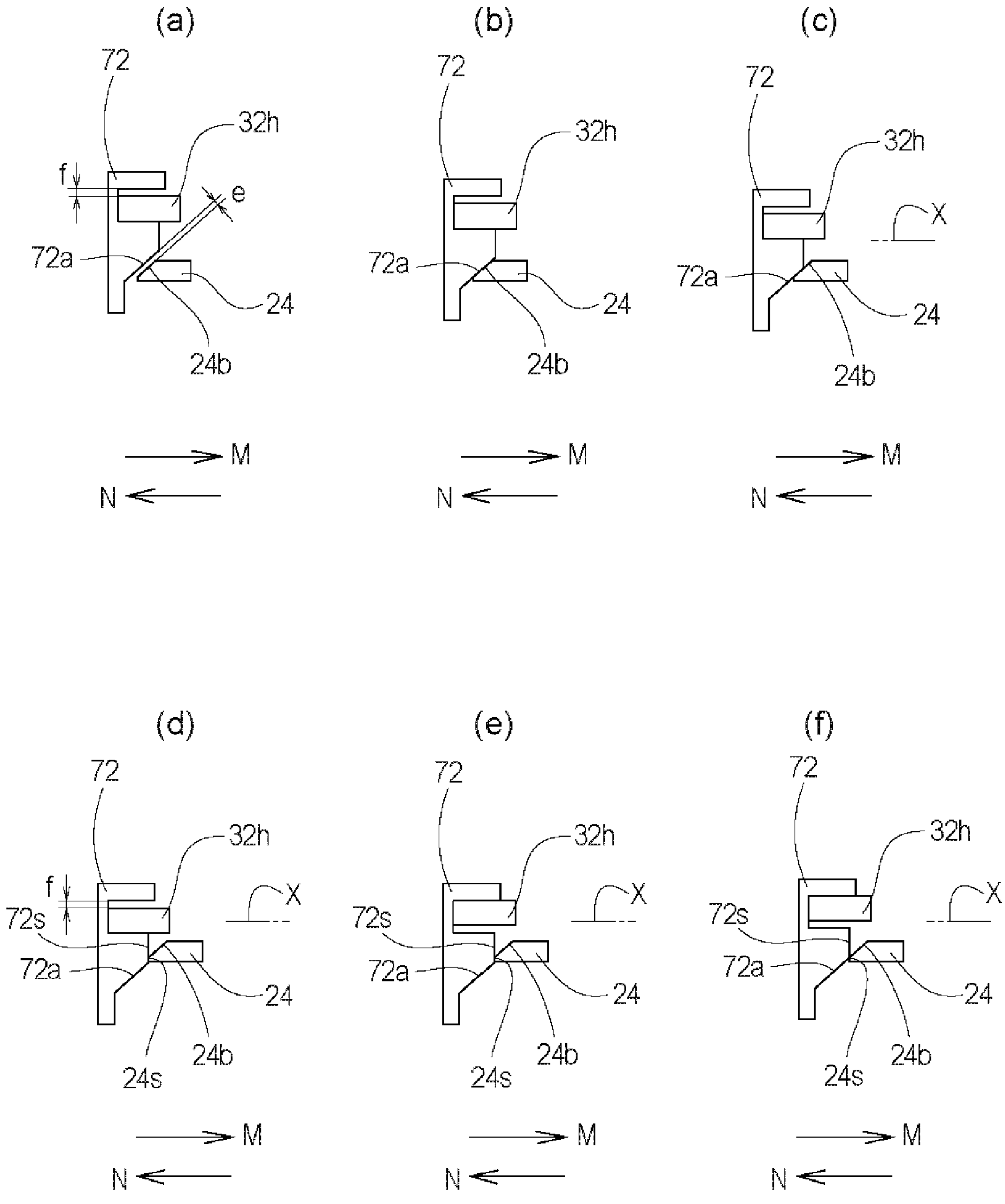
FIG. 21 is a schematic view illustrating a positional relation among the disconnecting cam, a driving side cartridge cover member and a guide for a developing device covering member.

FIG. 21 schematically shows a positional relation among the disconnecting cam 72, driving side cartridge cover member 24, and the guide 32*h* of the developing device covering member 32. Part (a) of FIG. 21 shows the development contact and drive transmission state; part (b) of FIG. 21 shows the developing device spacing and drive transmission state; and part (c) of FIG. 21 the developing device spacing and drive disconnection state. They are the same as the states shown in FIGS. 18, 19, 20, respectively. In part (c) of FIG. 21, the disconnecting cam 72 and the driving side cartridge cover member 24 contact with each other at the contact portion 72*a* and the contact portion 24*b* which are inclined relative to the rotation axis X. Here, in the developing device spacing and drive disconnection state, the disconnecting cam 72 with driving side cartridge cover member 24 may take the positional relation shown in part (d) of FIG. 21. After the contacting between the contact portion 72*a* and the contact portion 24*b* which are inclined relative to the rotation axis X, as shown in part (c) of FIG. 21, the developing unit 9 is further rotated. In this manner, the disconnecting cam 72 and the driving side cartridge cover member 24 contact to each other at a flat surface portion 72*s* and a flat surface portion 24*s* which are perpendicular to the rotation axis X.

When a gap f exists between the guide groove 72*h* of the disconnecting cam 72 and the guide 32*h* of the developing device covering member 32 as shown in part (a) of FIG. 21, the movement from the development contact and drive transmission state shown in part (a) of FIG. 21 to the developing device spacing and drive disconnection state shown in part (d) of FIG. 21 are the same as those explained in the foregoing. On the other hand, in the movement from the developing device spacing and drive disconnection state shown in part (d) of FIG. 21 to the driving connection state shown in part (a) of FIG. 21, the gap f between the guide groove 72*h* of the disconnecting cam 72 and the guide 32*h* of the developing device covering member 32 first disappears (part (e) of FIG. 21). Then, the state immediately before the contact portion 72*a* and the contact portion 24*b* are contacted to each other is reached (part (f) of FIG. 21). Then, the contact portion 72*a* and the contact portion 24*b* contact to each other (part (c) of FIG. 21). Subsequently, the relative positional relation between the disconnecting cam 72 and the driving side cartridge cover member 24 in the process from the spaced-developing-device-state to the contacted-developing-device-state of the developing unit 9 are the same as that described in the foregoing.

When the gap f is between the guide groove 72*h* of the disconnecting cam 72 and the guide 32*h* of the developing device covering member 32 as shown in FIG. 21, the disconnecting cam 72 does not move in the direction of the arrow M until the gap f disappears in the process from the spaced-developing-device-state to the contacted-developing-device-state. By the disconnecting cam 72 moving in the direction of the arrow M, the driving connection is established between the upstream drive transmission member 37 and the downstream drive transmission member 38. That is, the timing at which the disconnecting cam 72 moves in the direction of the arrow M and the timing of the establishment of the driving connection are synchronized with each other. In other words, the timing of the establishment of the driving connection can be controlled by the gap f between the guide groove 72*h* of the disconnecting cam 72 and the guide 32*h* of the developing device covering member 32.

On the other hand, the spaced-developing-device-state of the developing unit 9 is constructed as shown in FIG. 20 or part (c) of FIG. 21. More particularly, the state in which the disconnecting cam 72 and the driving side cartridge cover member 24 contact with each other at the contact portion 72*a* and the contact portion 24*b* which are inclined relative to the rotation axis X is the developing device spacing and drive disconnection. In this case, the timing of the movement of the disconnecting cam 72 in the direction of the arrow M is independent of the gap f between the guide groove 72*h* of the disconnecting cam 72 and the guide 32*h* of the developing device covering member 32. That is, the timing of the driving connection establishment can be controlled with high precision. In addition, movement distances of the disconnecting cam 72 in the directions of the arrows M, N can reduction so that the size of the process cartridge with respect to the axial direction can be reduced.

Figure 22:
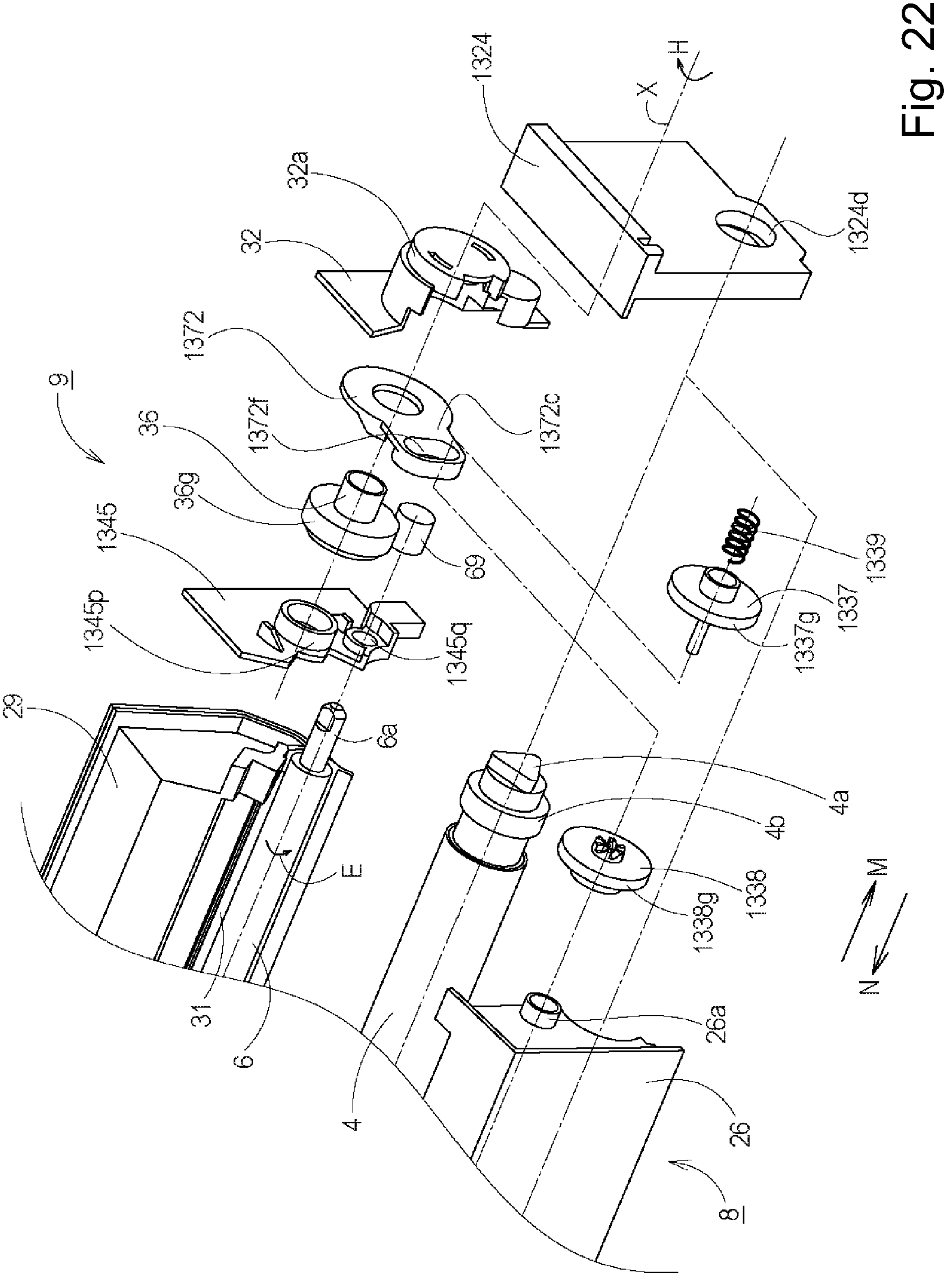
FIG. 22 is a perspective view a modified example of the drive connecting portion according to the first embodiment of the present invention, as seen from the driving side.
Figure 23:
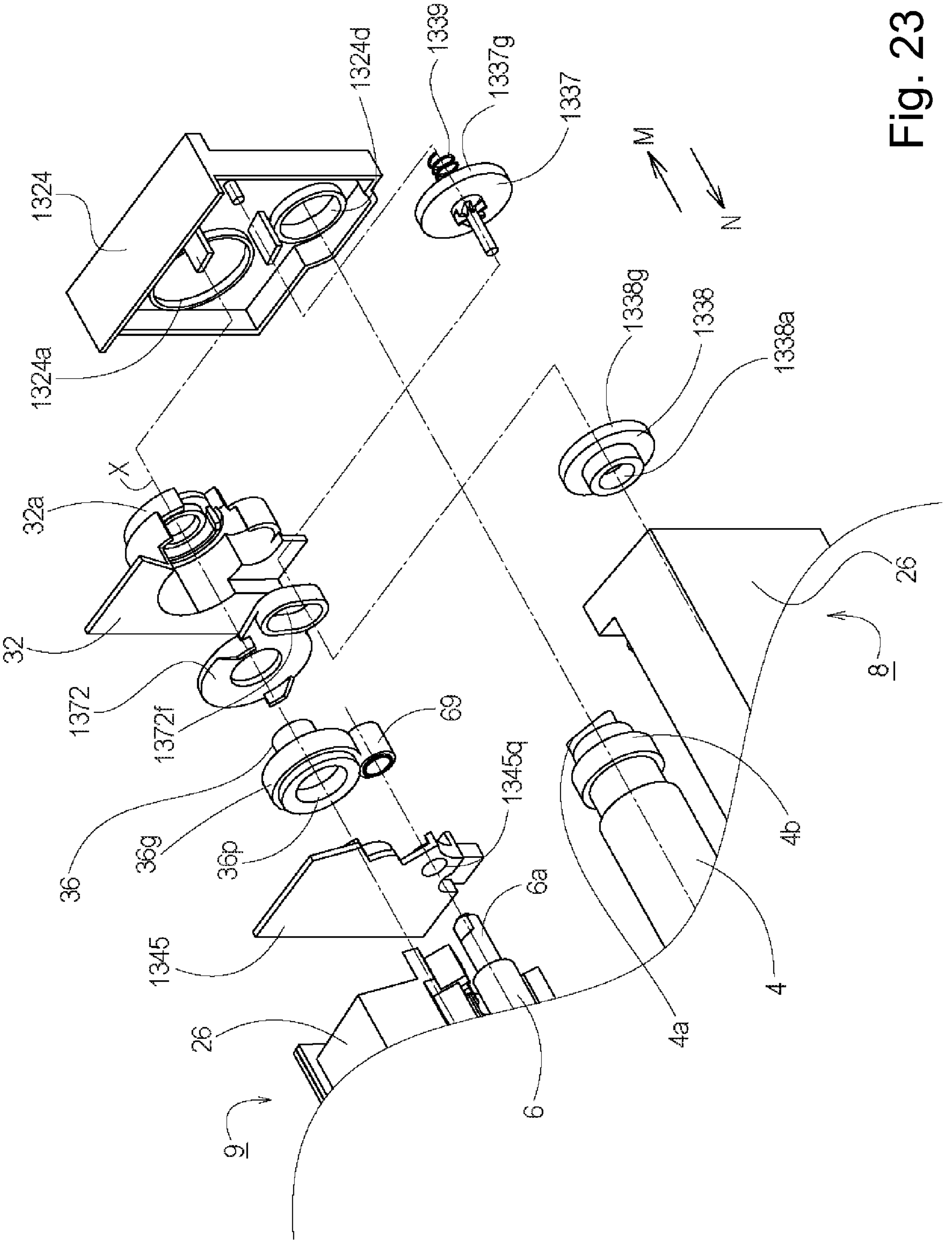
FIG. 23 is a perspective view a modified example of the drive connecting portion according to the first embodiment of the present invention, as seen from a non-driving side.

FIG. 22 to FIG. 25 show a modified example of this embodiment. In the above-described embodiment, in the switching of the drive, the downstream drive transmission member 1338 as the second drive transmission member moves in the axial directions, namely the directions of the arrows M and N. In the example of FIG. 22 from FIG. 25, the upstream drive transmission member 1337 as the first drive transmission member moves in the axial direction namely the directions of the arrows M and N, in the drive switching. FIG. 22 and FIG. 23 are a perspective view of the process cartridge as seen from the driving side and a perspective view as seen from the non-driving side, respectively. Between the upstream drive transmission member 1337 and the driving side cartridge cover member 1324, a spring 1339 is provided so as to urge the upstream drive transmission member 1337 in the direction of the arrow N.

Figure 24:
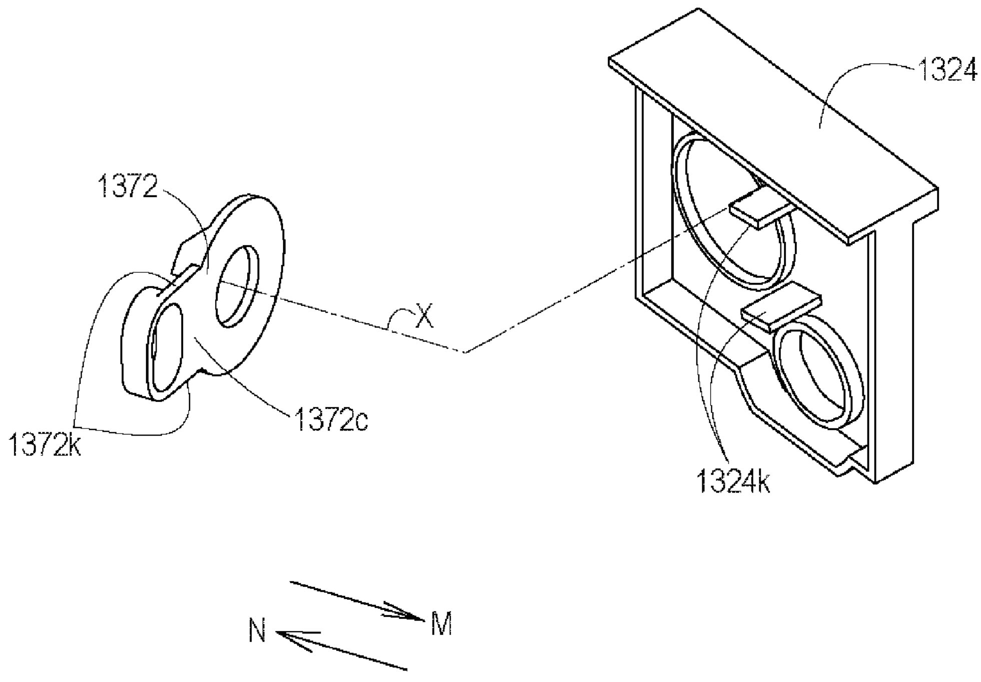
FIG. 24 is a perspective view of the disconnecting cam and the cartridge cover member according to the first embodiment of the present invention.

FIG. 24 is a perspective view illustrating an engaging relation between a disconnecting cam 1372 as the coupling releasing member and the driving side cartridge cover member 1324. The driving side cartridge cover member 1324 is provided with a guide 1324*k* as the second guide portion, and the disconnecting cam 1372 is provided with a guided portion 1372*k* as the second guided portion. The guide 1324*k* of the driving side cartridge cover member 1324 is engaged with the guided portion 1372*k* of the disconnecting cam 1372. By this, the disconnecting cam 1372 is slidable only in the axial direction (arrow M and N directions) relative to the driving side cartridge cover member 1324.

Figure 25:
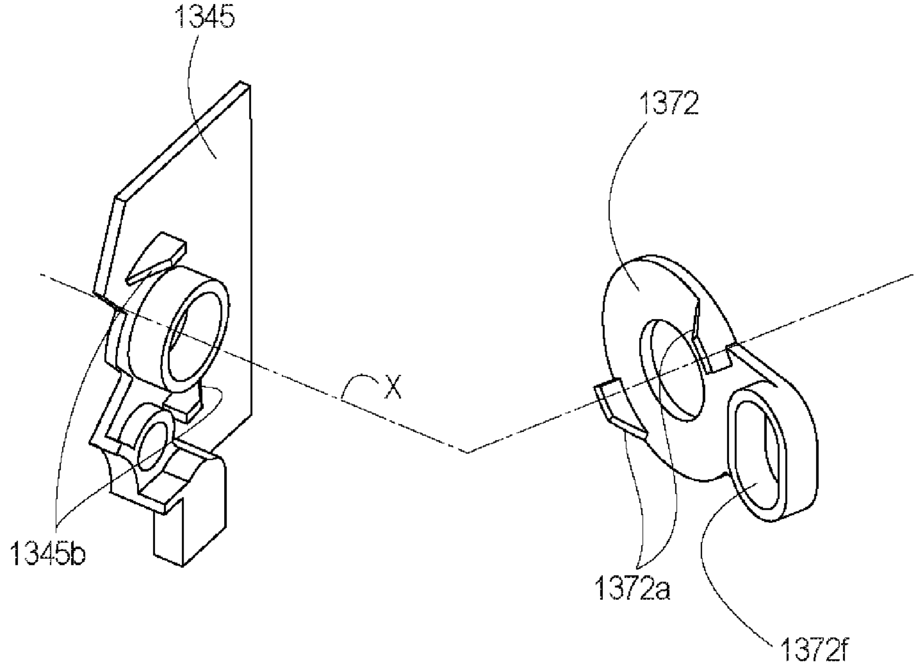
FIG. 25 is a perspective view of the disconnecting cam and a bearing member according to the first embodiment of the present invention.

FIG. 25 shows structures of the disconnecting cam 1372 and a bearing member 1345. The disconnecting cam 1372 has a contact portion (inclined surface) 1372*a* the force receiving portion. In addition, the bearing member 1345 is provided with a contact portion (inclined surface) 1345*b* as the operating member. The contact portion 1372*a* of the disconnecting cam 1372 and the contact portion 1345*b* of the bearing member 1345 are contactable to each other.

As shown in FIGS. 22 and 23, the upstream drive transmission member 1337 and the downstream drive transmission member 1338 are engaged with each other through an opening 1372*f* of the disconnecting cam 1372.

The description will be made as to the operation of the drive connecting portion when the developing roller 6 and the drum 4 contacted with each other are being spaced from each other. The disconnecting cam 1372 is movable (slidable) only in the axial direction (directions of arrows M and N) similarly to the foregoing. By contact between the contact portion 1372*a* of the disconnecting cam 1372 and the contact portion 1345*b* of the bearing member 1345, the disconnecting cam 1372 move in the direction of the arrow M. In interrelation with the movement of the disconnecting cam 1372 in the direction of the arrow M, an urging surface 1372*c* of the disconnecting cam 1372 as the urging portion urges an urged surface 1337*c* of the upstream drive transmission member 1337 functioning as a portion-to-be-urged (FIGS. 22 and 23). By this, the upstream drive transmission member 1337 moves in the direction of the arrow M against the urging force of the spring 1339. This disengages the upstream drive transmission member 1337 and the downstream drive transmission member 1338 from each other.

On the other hand, the operation when the developing roller 6 and the drum 4 spaced from each other are contacted to each other is opposite the above-described operation. The structure in which the upstream drive transmission member 1337 moves in the axial direction (arrows M and N) upon the switching of the drive as shown in FIG. 22 to FIG. 25, is also implementable.

It will suffice if the upstream drive transmission member 37 or the downstream drive transmission member 38 moves in the axial direction upon the switching of the drive. In addition, both of the upstream drive transmission member 37 and the downstream drive transmission member 38 may be spaced from each other along the axial direction. The drive switching is effected at least by the change of the relative position between the upstream drive transmission member 37 and the downstream drive transmission member 38 in the axial direction.

Figure 26:
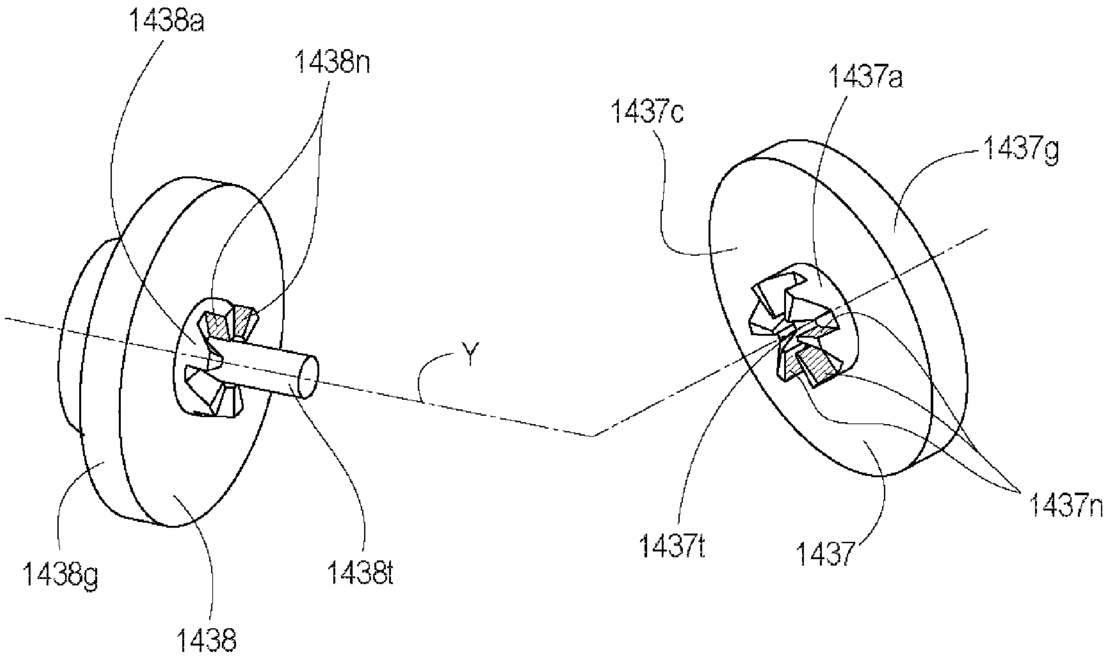
FIG. 26 is a perspective view of a modified example of the drive connecting portion according to the first embodiment of the present invention.

In the above-described structure, the center portion hole portion 38*m* of the downstream drive transmission member 38 is engaged with the small diameter cylindrical portion 37*m* of the upstream drive transmission member 37, but the engagement between the downstream drive transmission member 38 and the upstream drive transmission member 37 is not limited to such an example. For example, as shown in FIG. 26, it may be that the downstream drive transmission member 1438 as the second drive transmission member is provided with a small diameter cylindrical portion 1438*t* at the center portion, and the upstream drive transmission member 1437 as the first drive transmission member is provided with a hole portion 1437*t* at the center portion, in which the cylindrical portion 1438*t* and the hole portion 1437*t* are engaged.

In the following description, the contact portion 72*a* of the disconnecting cam 72 and the contact portion 24*b* of the driving side cartridge cover member 24 are in face to face contact, but this is not inevitable. For example, the contact may be between a surface and a ridge line, between a surface and a point, between a ridge line and a ridge line or between a ridge line and a point

Difference from the Conventional Example

Differences from the conventional structure will be described.

In Japanese Laid-open Patent Application 2001-337511, a coupling for receiving the drive from the main assembly of the image forming apparatus and a spring clutch for switching the drive are provided at the end portion of the developing roller. In addition, a link interrelated with the rotation of the developing unit is provided in the process cartridge. When the developing roller is spaced from the drum by the rotation of the developing unit, the link operates a spring clutch provided at the end portion of the developing roller to stop the drive of the developing roller.

The spring clutch per se involves variations. More particularly, a time lug tends to occur from the actuation of the spring clutch to the actual stop of the drive transmission. Furthermore, dimension variations of the link mechanism and the variations of the rotation angle of the developing unit may vary the timing at which the link mechanism operates the spring clutch. The link mechanism for operating the spring clutch is away from the rotational center between the developing unit and the drum unit.

On the contrary, according to this embodiment, drive transmission to the developing roller is switched by the structure including the contact portion 72*a* of the disconnecting cam 72, the contact portion 24*b* as the operating portion, for operating it, of the driving side cartridge cover member 24, the contact portion (inclined surface) 72*a* of the disconnecting cam 72 and the contact portion the inclined surface) 24*b*) of the driving side cartridge cover member 24, a control variation in the rotation time of the developing roller can be reduced.

In addition, the structures of the clutch is coaxial with the rotational center about which the developing unit is rotatable relative to the drum unit. Here, the rotational center is the position where the relative position error between the drum unit and the developing unit is the least. By providing the clutch for switching the drive transmission to the developing roller at the rotational center, the clutch switching timing relative to the rotation angle of the developing unit can be controlled with highest precision. As a result, the rotation time of the developing roller can be controlled with high precision, and therefore, the deteriorations of the developer and/or the developing roller can be suppressed.

In some conventional examples of the image forming apparatus using the process cartridge, the clutch for effecting the drive switching for the developing roller is provided in the image forming apparatus.

When a monochromatic printing is carried out in a full-color image forming apparatus, for example, the drive to the developing device for non-black colors is stopped using an clutch. In addition, when the electrostatic latent images on the drum are developed by the developing device also in the monochromatic image forming apparatus, the drive is transmitted to the developing devices, and when the developing operation is not carried out, the drive to the developing devices can be stopped, by an operation of the clutch. By stopping a drive to the developing device during the non-image-formation period, the rotation time of the developing roller can be suppressed, and therefore, the deterioration of the developer and/or the developing roller can be suppressed.

Figure 27:
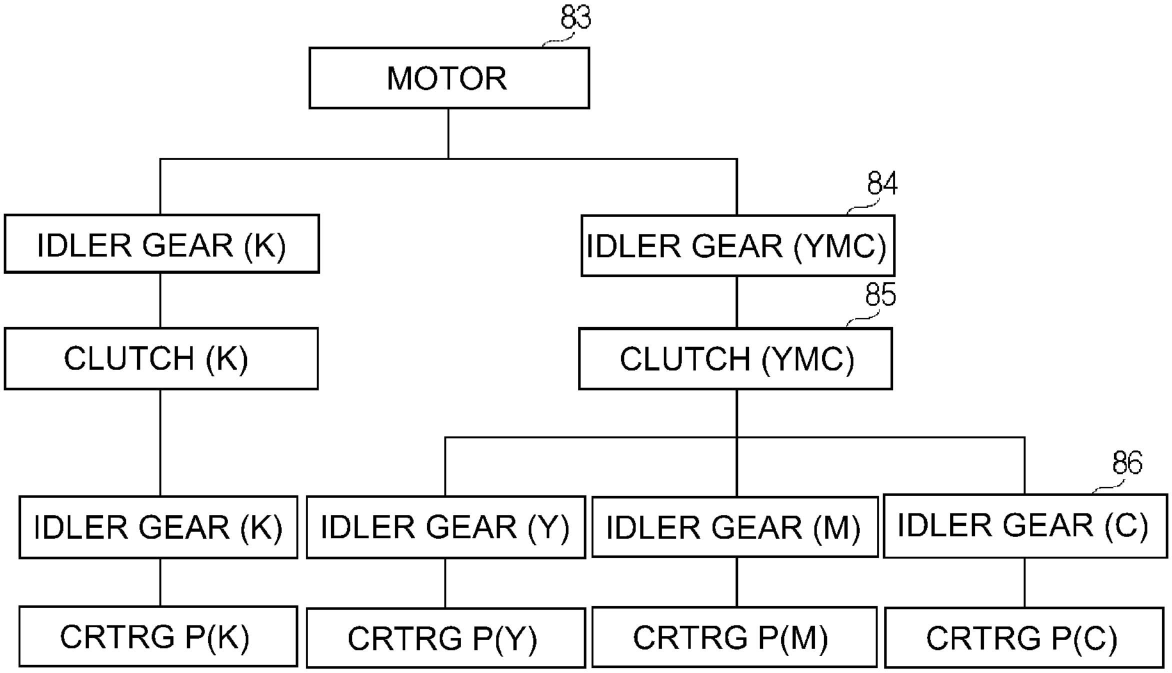
FIG. 27 is a block diagram of an example of a gear arrangement of the image forming apparatus.

As compared with the case in which the clutch for switching the drive for the developing roller is provided in the image forming apparatus, the provision of the clutch in the process cartridge can downsize the clutch. FIG. 27 is a block diagram of an example of a gear arrangement in the image forming apparatus, for transmission of the drive to the process cartridge from the motor (driving source) provided in the image forming apparatus. When the drive is transmitted to the process cartridge P (PK) from the motor 83, it is effected through an idler gear 84 (K), a clutch 85 (K) and an idler gear 86 (K). When the drive is transmitted to the process cartridge P (PY, PM, PC) from the motor 83, it is effected through an idler gear 84 (YMC), a clutch 85 (YMC) and idler gears 86 (YMC). The drive of the motor 83 is branched to the idler gear 84 (K) and the idler gear 84 (YMC), in addition, the drive from the clutch 85 (YMC) is branched to the idler gear 86 (Y), the idler gear 86 (M) and the idler gear 86 (C).

For example, when a monochromatic printing is carried out by the full-color image forming apparatus, the drives to the developing devices containing the developers other than the black color developer are stopped using the clutch 85 (YMC). In the case of the full-color printing, the drives of the motor 83 are transmitted to the process cartridges P through the clutches 85 (YMC). At this time, the load for driving the process cartridge P is concentrated on the clutch 85 (YMC). The load to the clutch 85 (K) is three time the load on the clutch 85 (YMC). In addition, the load variations of the color developing devices apply to one clutch 85 (YMC), similarly. In order to transmit the drive without deteriorating the rotational accuracy of the developing roller even when the load is concentrated and the load variations occur, it is desirable to enhance the rigidity of the clutch. Therefore, the clutch may be upsized, and/or a high stiffness material such as sintered metal may be used. When the clutch is provided in the process cartridge, the load and/or the load variations applied on each clutch is only the load and/or the load variation of the associated developing device. Therefore, as compared with the described example, it is unnecessary that the rigid is enhanced, and each clutch can be downsized.

In the gear arrangement for drive transmission to the black color process cartridge P (PK) shown in FIG. 27, it is desired to reduce the load applied to the clutch 85 (K) as much as possible. In the gear arrangement for the drive transmission to the process cartridge P, the closer to the process cartridge P (driven member), the lower the load applied to the gear shaft, taking into account the drive transmission efficiency of the gear. Therefore, the clutch for the drive switching can be downsized by providing the clutch in the cartridge, as compared with providing the clutch in the main assembly of the image forming apparatus. The clutch may be provided on the inner peripheral surface of the gear engaging with the developing roller gear, or the clutch is provided at a longitudinal end portion of the developing device frame 29, as will be described with respect to Embodiments 2 and et seqq., so that the clutch can be disposed in the process cartridge while suppressing the increase of the longitudinal size of the process cartridge.

Embodiment 2

The cartridge according to a second embodiment of the present invention will be described. In the description of this embodiment, the detailed description of the portions having the same structures as in the first embodiment will be omitted.

[Structure of Developing Unit]

Figure 28:
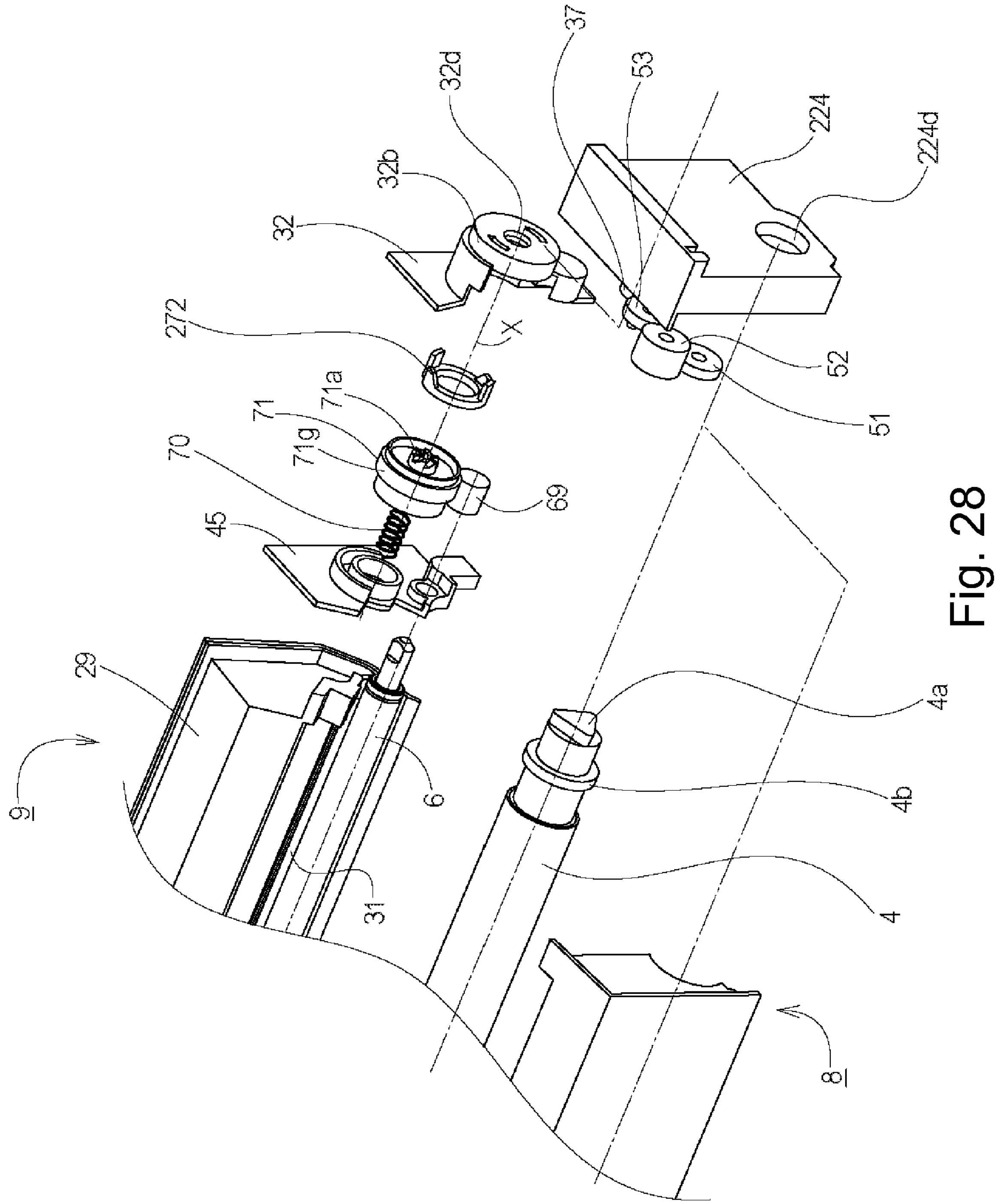
FIG. 28 is the exploded perspective view of the drive connecting portion according to a second embodiment of the present invention, as seen from a driving side.
Figure 29:
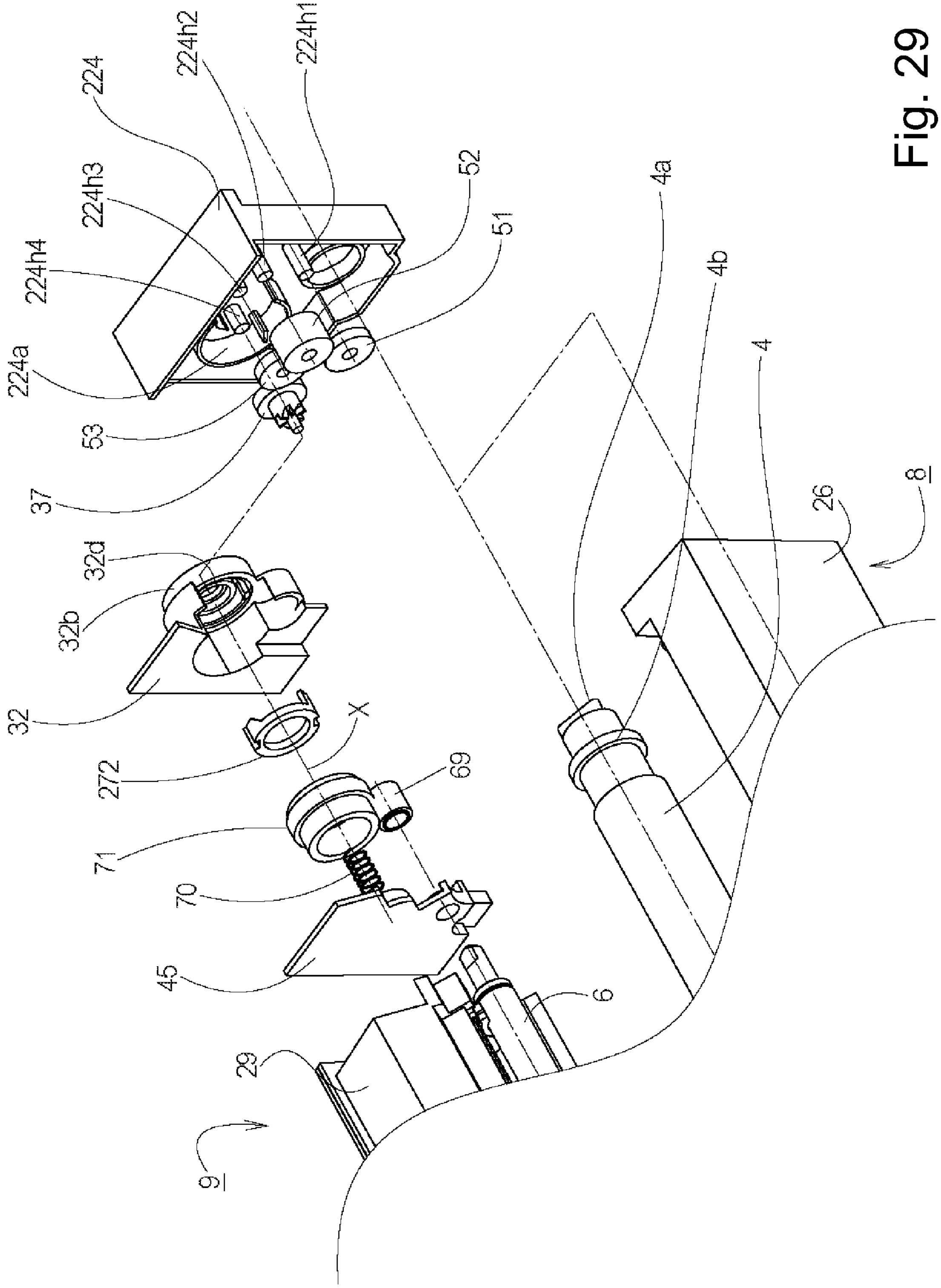
FIG. 29 is an exploded perspective view of a drive connecting portion according to the second embodiment of the present invention, as seen from a non-driving side.

As shown in FIGS. 28 and 29, the developing unit 9 comprises the developing roller 6, a developing blade 31, the developing device frame 29, a bearing member 45, a developing device covering member 32 and so on.

In addition, as shown in FIG. 28, the bearing member 45 is fixed to one longitudinal end portion of the developing device frame 29. The bearing member 45 also rotatably supports a downstream drive transmission member 71 as a second drive transmission member. The downstream drive transmission member 71 transmits a driving force to a developing roller gear 69 as a third drive transmission member. This will be described in detail hereinafter.

[Structure of the Drive Connecting Portion]

Referring to FIGS. 28, 29, 30 and 31, the structure of the drive connecting portion will be described.

The general arrangement thereof will be described, first.

Figure 30:
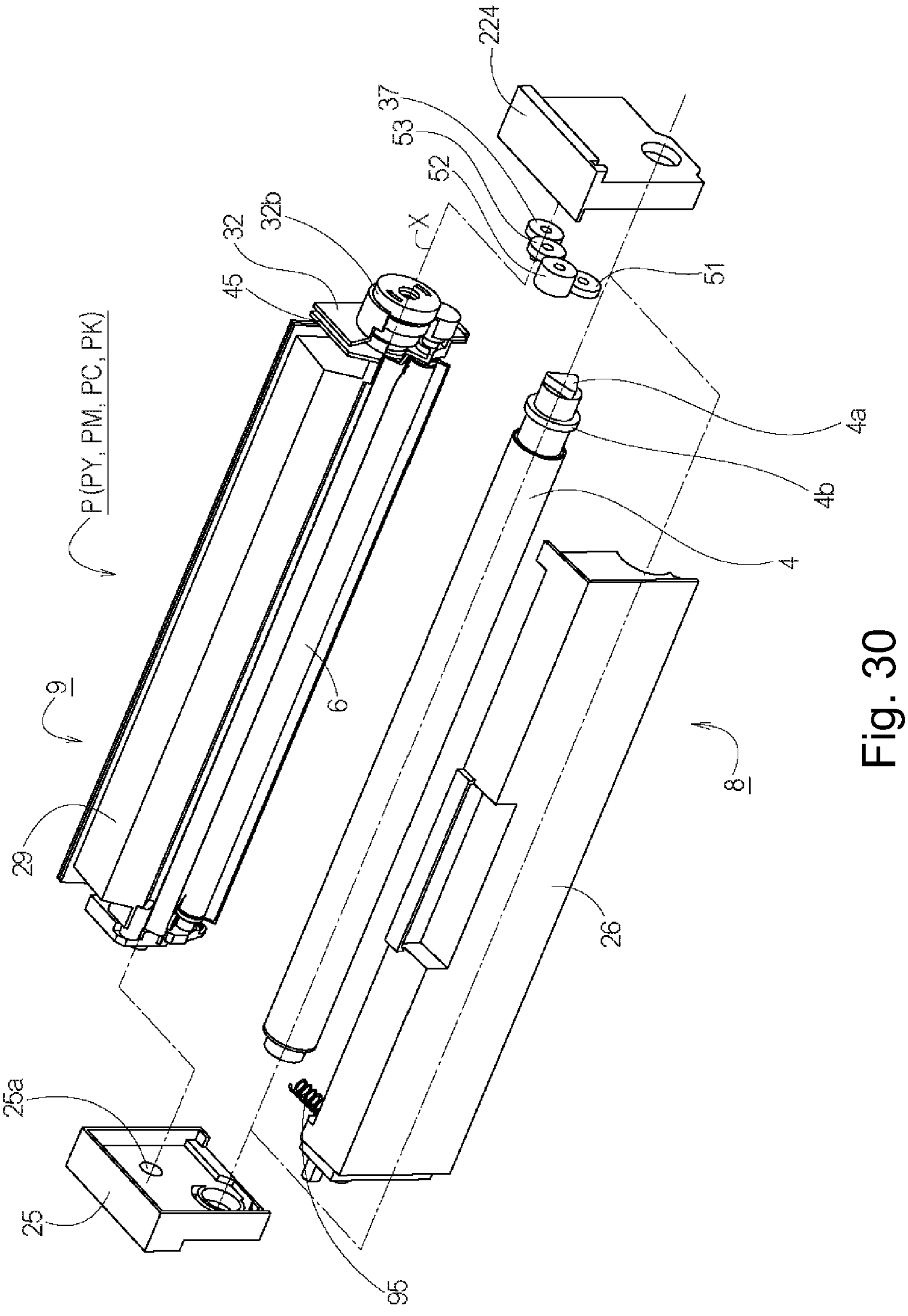
FIG. 30 is an exploded perspective view of a process cartridge according to the second embodiment of the present invention.
Figure 31:
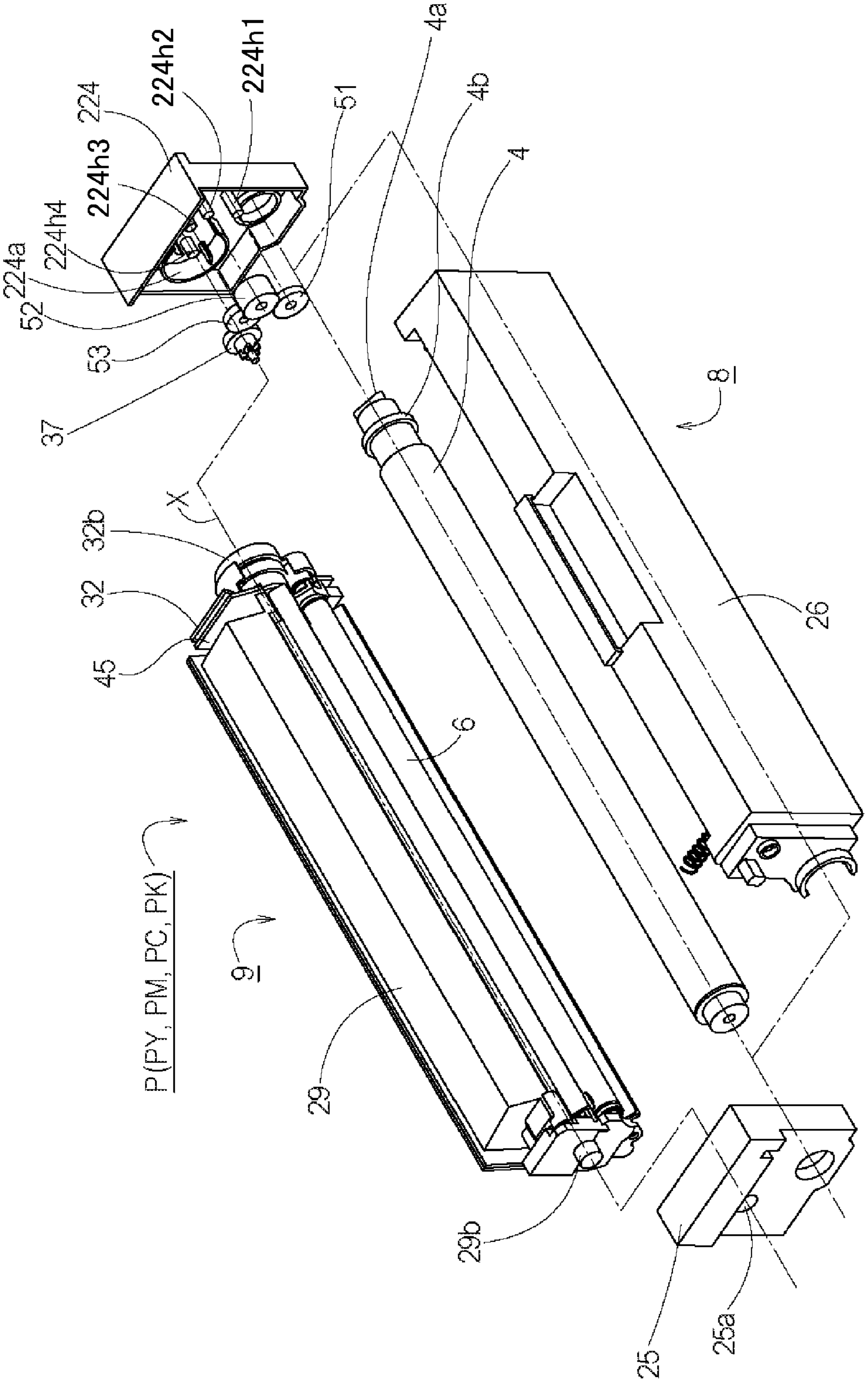
FIG. 31 is an exploded perspective view of the process cartridge according to the second embodiment of the present invention.

FIG. 30 is a perspective view of a process cartridge P as seen from a driving side, and FIG. 31 is a perspective view of the process cartridge P as seen from a non-driving side. As shown in FIG. 31, a driving side cartridge cover member 224 is provided with cylindrical bosses **224*h*1, 224*h*2, 224*h*3 and 224*h*4. The bosses 224*h*1, 224*h*2, 224*h*3 and 224*h*4 rotatably and slidably support a first idler gear 51, a second idler gear 52, a third idler gear 53 and an upstream drive transmission member 37 as a first drive transmission member, respectively. The first idler gear 51 is engaged with a drum gear 4*b* provided at the end portion of the photosensitive drum 4. The first idler gear 51 and the second idler gear 52, the second idler gear 52 and the third idler gear 53, and the third idler gear 53 and the upstream drive transmission member 37** are meshing engagement, respectively.

As shown in FIG. 28, between the bearing member 45 with driving side cartridge cover member 224, a spring 70 is an elastic member as an urging member, the downstream drive transmission member 71 as the second drive transmission member, a disconnecting cam 272 as a coupling releasing member which is a part of a disconnecting mechanism, and the developing device covering member 32 are provided in the order named in the direction from the bearing member 45 toward the driving side cartridge cover member 224. They will be described in detail.

A claw portion **37*a* of the upstream drive transmission member 37 and a claw portion 71*a* of the downstream drive transmission member 71** can be engaged with each other through an opening 32*d* of the developing device covering member 32. When These claw portions are engaged with each other, a drive can be transmitted from the upstream drive transmission member 37 to the downstream drive transmission member 71.

Figure 32:
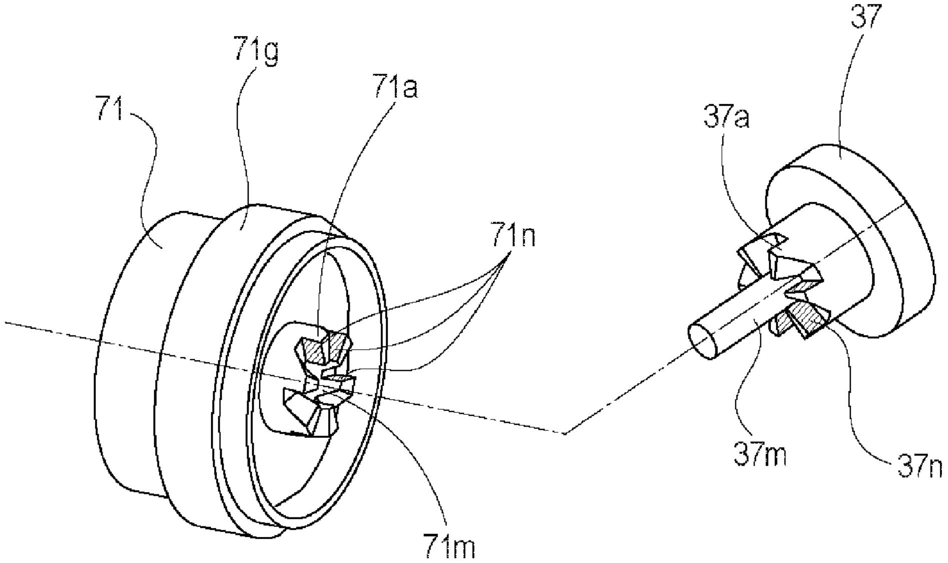
FIG. 32 is a perspective view of a drive connecting portion according to the second embodiment of the present invention.

Referring to FIG. 32, the structures of the upstream drive transmission member 37 and the downstream drive transmission member 71 will be described. The upstream drive transmission member 37 comprises a claw portion 37*a* as an engaging portion (coupling portion), and the downstream drive transmission member 71 comprises a claw portion 71*a* as an engaging portion (coupling portion). The claw portion 37*a* and the claw portion 71*a* are engageable with each other. In other words, the upstream drive transmission member 37 and the downstream drive transmission member 71 are connectable with each other. In addition, the downstream drive transmission member 71 is provided with a hole portion 71*m* at the center portion. The hole portion 71*m* engages with a small diameter cylindrical portion 37*m* of the upstream drive transmission member 37. By doing so, the upstream drive transmission member 37 is slidable (rotatable and slidable) along respective axes relative to the downstream drive transmission member 71.

In addition, as shown in FIG. 28, a gear portion 71 *g* of the downstream drive transmission member 71 is engaged also with the developing roller gear 69 By this, the drive transmitted to the downstream drive transmission member 71 is transmitted to the developing roller 6 through the developing roller gear 69. Between the bearing member 45 and the downstream drive transmission member 71, the spring 70 as an elastic member as the urging member is provided. The spring 70 urges the downstream drive transmission member 71 in the direction of an arrow M.

Figure 33:
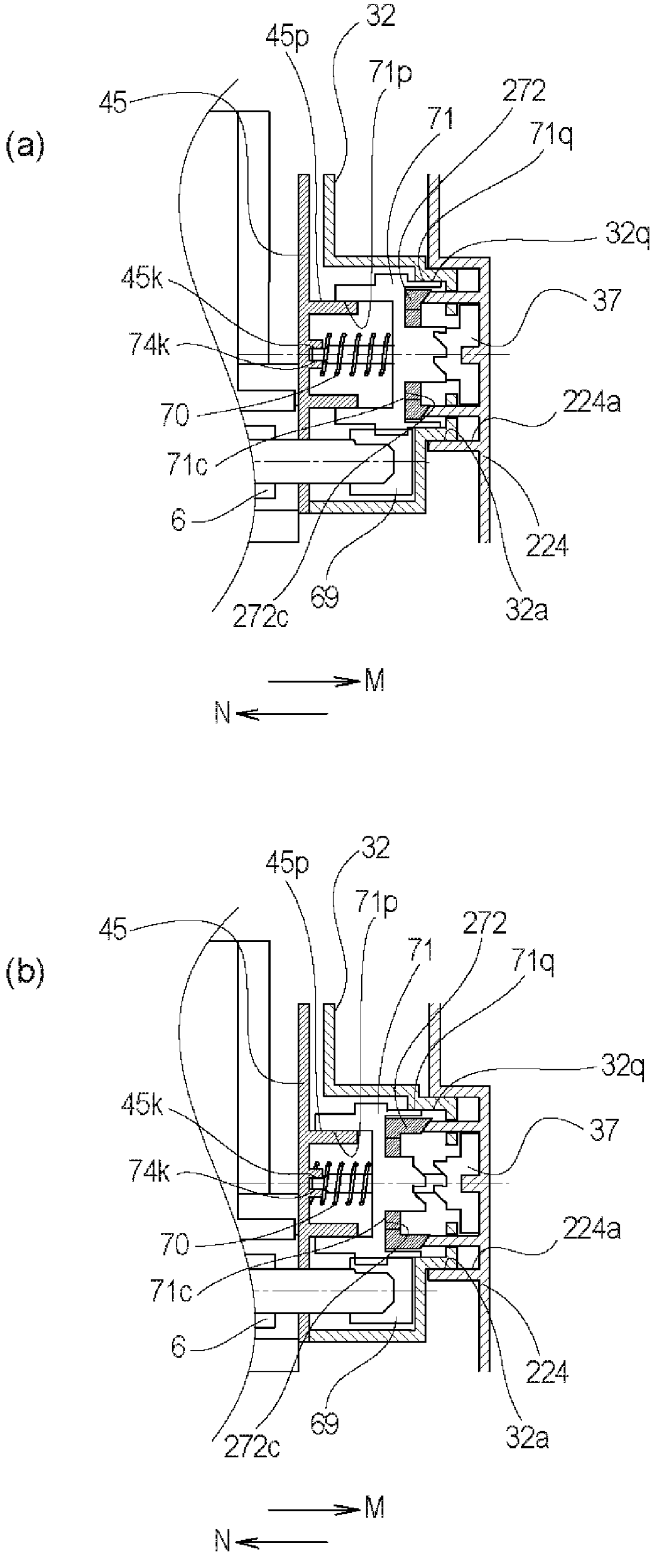
FIG. 33 is a sectional view of the drive connecting portion according to the second embodiment the present invention.

Part (a) of FIG. 33 is a sectional view illustrating a connection state between the upstream drive transmission member 37 and the downstream drive transmission member 71. The first shaft receiving portion 45*p* of the bearing member 45 (cylindrical outer surface) as a first guide portion rotatably supports a supported portion 71*p* (cylindrical inner surface), as a first guided portion, of the downstream drive transmission member 71. In the state that the supported portion 71*p* (cylindrical inner surface) is engaged with the first shaft receiving portion 45*p* (cylindrical outer surface), the downstream drive transmission member 71 is movable along a rotation axis (rotational center) X. In other words, the bearing member 45 supports is downstream drive transmission member 71 slidably along the rotation axis. Further, in other words, the downstream drive transmission member 71 is slidable (reciprocable) in the directions of arrows M and N relative to the bearing member 45. Part (a) of FIG. 33 is sectional views of the related parts, part (b) of FIG. 33 shows the state in which the downstream drive transmission member 71 has moved relative to the bearing member 45 in the direction of the arrow N from the position shown in part (a) of FIG. 33. The downstream drive transmission member 71 is movable in the directions of arrows M and N in engagement with the developing roller gear 69. In order to make easier the movement of the downstream drive transmission member 71 in the directions of arrows M and N, the gear portion 71*g* of the downstream drive transmission member 71 is preferably a spur gear rather than a helical gear.

Figure 34:
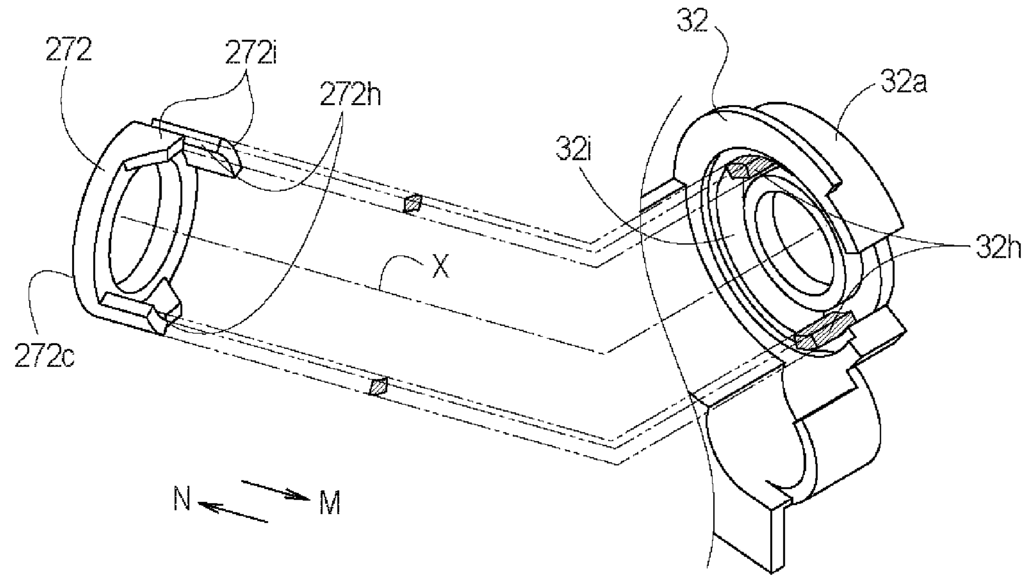
FIG. 34 is a perspective view of the releasing member and peripheral parts thereof according to the second embodiment of the present invention.

The drive disconnecting mechanism in this embodiment will be described. As shown in FIG. 28 and FIG. 29, between the downstream drive transmission member 71 and the developing device covering member 32, the disconnecting cam 272 as a disconnecting member which is a part of the disconnecting mechanism is provided. FIG. 34 is a perspective view illustrating an engaging relation between the disconnecting cam 272 and the developing device covering member 32.

The disconnecting cam 272 has a ring portion 272*j* having a substantial ring configuration and an outer peripheral surface 272*i* as a projected portion. The outer peripheral surface 272*i* projects from the ring portion 272*j* in the direction perpendicular to a phantom plane including the ring portion 272*j* (projects in parallel with the rotational axis X). The developing device covering member 32 has an inner peripheral surface 32*i*. The inner peripheral surface 32*i* is engageable with the outer peripheral surface 272*i*. By this, the disconnecting cam 272 is slidable relative to the developing device covering member 32 (slidable along the axis of the developing roller 6). The outer peripheral surface 272*i* of the disconnecting cam 272 the inner peripheral surface 32*i* of the developing device covering member 32 and the outside circumference 32*a* of the developing device covering member 32 are co-axial with each other. That is, the rotational axes of these members are aligned with respect to the rotation axis X of the developing unit 9 relative to the drum unit 8.

In addition, in this embodiment, the rotational axes of the upstream drive transmission member 37 and the downstream drive transmission member 71 are also coaxial with the rotation axis X of the developing unit 9 relative to the drum unit 8.

The developing device covering member 32 is provided with a guide 32*h* as a (second) guide portion, and the disconnecting cam 272 is provided with a guide groove 272*h* as a (second) guided portion. Here, the guide 32*h* and the guide groove 272*h* extend in parallel with the rotation axis X. Here, the guide 32*h* of the developing device covering member 32 is engaged with the guide groove 272*h* of the disconnecting cam 272. By the engagement between the guide 32*h* and the guide groove 272*h*, the disconnecting cam 272 is slidable relative to the developing device covering member 32 only in the axial direction (arrows M and N).

Figure 35:
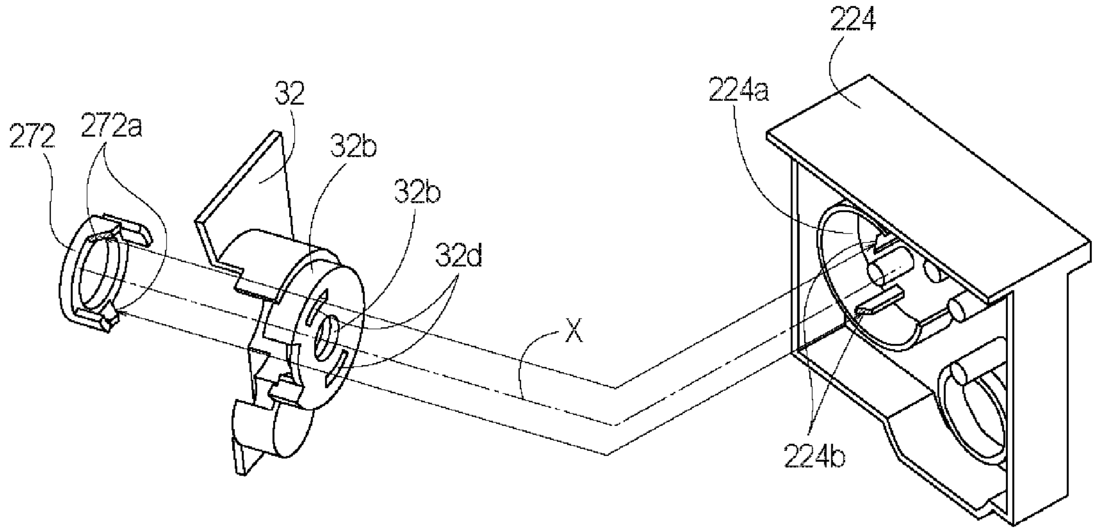
FIG. 35 is a perspective view of the releasing member and peripheral parts thereof according to the second embodiment of the present invention.

Longitudinally outside of the developing device covering member 32, the driving side cartridge cover member 224 is provided. FIG. 35 shows structures of the disconnecting cam 272, the developing device covering member 32 and the driving side cartridge cover member 224.

The disconnecting cam 272 as the coupling releasing member is provided with a contact portion (inclined surface) 272*a* as a force receiving portion. The driving side cartridge cover member 224 is provided with a contact portion (inclined surface) 224*b* as an operating member. Furthermore, the developing device covering member 32 is provided an opening 32*j*. A contact portion 272*a* of the disconnecting cam 272 and a contact portion 224*b* of the driving side cartridge cover member 224 are contactable to each other through the opening 32*j* of the developing device covering member 32.

[Drive Disconnecting Operation]

The operation of the drive connecting portion at the time of change from the contact state to the spaced state between the developing roller 6 and the drum 4 will be described.

[State 1]

Figure 36:
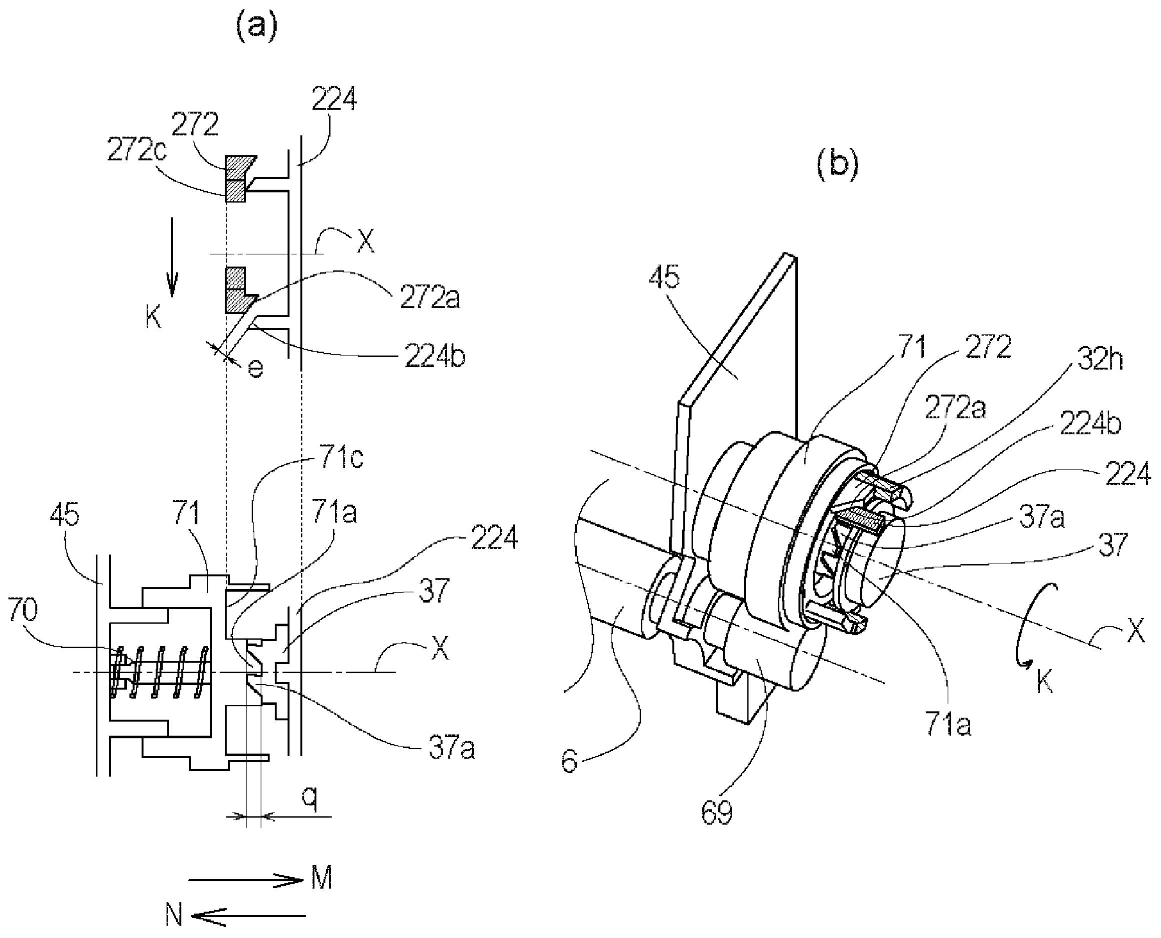
FIG. 36 is a schematic view and a perspective view of the drive connecting portion according to the second embodiment of the present invention.

As shown in part (a) of FIG. 7, the main assembly spacing member 80 and the force receiving portion 45*a* of the bearing member 45 are spaced by a gap d. At this time, the drum 4 and the developing roller 6 contact to each other. This state will be called "state 1" of the main assembly spacing member 80. As shown in FIG. 7, as seen in the direction along the axis of the developing roller, the force receiving portion (spacing force receiving portion) 45*a* projects at a position in a side substantially opposite from the rotational axis X with respect to the developing roller 6. Part (a) of FIG. 36 schematically shows the drive connecting portion at this time. Part (b) of FIG. 36 is a perspective view of the drive connecting portion. In FIG. 36, some parts are omitted for better illustration. In addition, in part (a) of FIG. 36, a pair of the upstream drive transmission member 37 and the downstream drive transmission member 71, and a pair of the disconnecting cam 272 and the driving side cartridge cover member 224 are separately shown. In part (b) of FIG. 36, only a part of the driving side cartridge cover member 224 including the contact portion 224*b* is shown, and only a part the developing device covering member 32 including the guide 32*h* is shown. Between the contact portion 272*a* of the disconnecting earn 272 and the contact portion 224*b* as the operating portion of the driving side cartridge cover member 224, there is a gap e. At this time, the claws 37*a* of the upstream drive transmission member 37 and the claws 71*a* of the downstream drive transmission member 71 are engaged with each other by an engagement depth q. As described above, the downstream drive transmission member 71 is engaged with the developing roller gear 69 (FIG. 28). Therefore, the driving force supplied from the main assembly 2 of the apparatus to the coupling member 4*a* provided at the end portion of the photosensitive drum 4 is transmitted to the developing roller gear 69 through the first idler gear 51, the second idler gear 52, the third idler gear 53, the upstream drive transmission member 37 and the downstream drive transmission member 71. By this, the developing roller 6 is driven. The positions of the parts at this time is called a contacting position, a development contact and drive transmission state.

[State 2]

When the main assembly spacing member 80 moves in the direction indicated by an arrow F1 by δ1 in the Figure from the development contact and drive transmission state, as shown in part (b) of FIG. 7, the developing unit 9 rotates about the axis X in the direction of an arrow K by and angle θ1. As a result, the developing roller 6 is spaced from the drum 4 by a distance ε1. The disconnecting cam 272 and the developing device covering member 32 in the developing unit 9 rotate in the direction indicated by the arrow K by an angle θ1 in interrelation with the rotation of the developing unit 9. On the other hand, when the cartridge P is mounted to the main assembly 2 of the apparatus, the drum unit 8, the driving side cartridge cover member 224 and the non-driving side cartridge cover member 25 are positioned in place in the main assembly 2 of the apparatus. As shown in part (a) of FIG. 37 and part (b) of FIG. 37, the contact portion 224*b* of the driving side cartridge cover member 224 does not move. In the Figure, the disconnecting cam 272 rotates in the direction of the arrow K in the Figure in interrelation with the rotation of the developing unit 9 the contact portion 272*a* of the disconnecting cam 272 and the contact portion 224*b* of the driving side cartridge cover member 224 start to contact to each other. At this time, the claw 37*a* of the upstream drive transmission member 37 and the claw 71*a* of the downstream drive transmission member 71 are kept engaging with each other (part (a) of FIG. 37). The driving force supplied from the main assembly 2 of the apparatus is transmitted to the developing roller 6 through the upstream drive transmission member 37, the downstream drive transmission member 71 and the developing roller gear 69. The state of these parts in this state is called a developing device spacing and drive transmission state.

[State 3]

Figure 38:
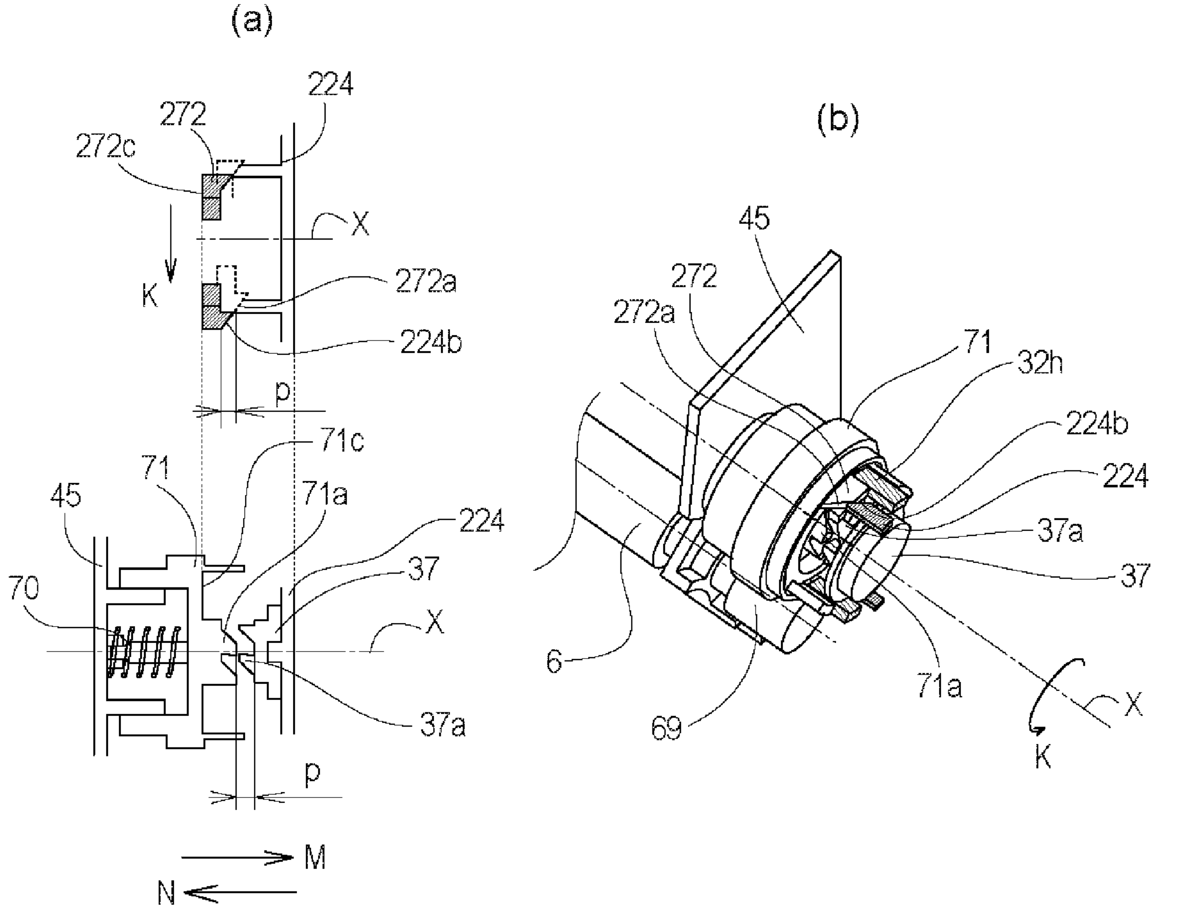
FIG. 38 is a schematic view and a perspective view of the drive connecting portion according to the second embodiment of the present invention.

Part (a) of FIG. 38 and part (b) of FIG. 38 show the drive connecting portion when the 80 moves from the developing device spacing and drive transmission state in the direction of the arrow F1 only δ2 in the Figure as shown in part (c) of FIG. 7. In interrelation with the rotation of the developing unit 9 by the angle θ2 (>θ1), the disconnecting cam 272 and/or the developing device covering member 32 rotate. On the other hand, the driving side cartridge cover member 224 does not change its position similarly to the foregoing, but the disconnecting cam 272 rotates in the direction of the arrow K in the Figure. At this time the contact portion 272*a* of the disconnecting cam 272 receives a reaction force from the contact portion 224*b* of the driving side cartridge cover member 224. In addition, as described above, the guide groove 272*h* of the disconnecting cam 272 is limited by engaging with the guide 32*h* of the developing device covering member 32 to be movable only in the axial direction (arrows M and N) (FIG. 34). Therefore, as a result, the disconnecting cam 272 slides in the direction of the arrow N by a movement distance p. In interrelation with the movement of the disconnecting cam 272 in the direction of the arrow N, an urging surface 272*c*, as the urging portion, of the disconnecting cam 272 urges the urged surface 71*c*, as the portion-to-be-urged, of the downstream drive transmission member 71. By this, the downstream drive transmission member 71 slides in the direction of the arrow N by p against the urging force of the spring 70 (parts (b) FIG. 38 and FIG. 33).

At this time, the movement distance p is larger than the engagement depth q between the claws 37*a* of the upstream drive transmission member 37 and the claws 71*a* of the downstream drive transmission member 71, and therefore, the claws 37*a* and the claws 71*a* are disengaged from each other. Then, since the upstream drive transmission member 37 receives the driving force from the main assembly 2 of the apparatus, it continues to rotate, and on the other hand, the downstream drive transmission member 71 stops. As a result, the rotation of the developing roller gear 69, and therefore, the rotation of the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 can space from the drum 4 while rotating, so that the drive to the developing roller 6 can be stopped in accordance with the spacing distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 37*a* of the upstream drive transmission member 37 and the claws 71*a* of the downstream drive transmission member 71 are in a disconnected state, as shown in FIG. 38.

Figure 37:
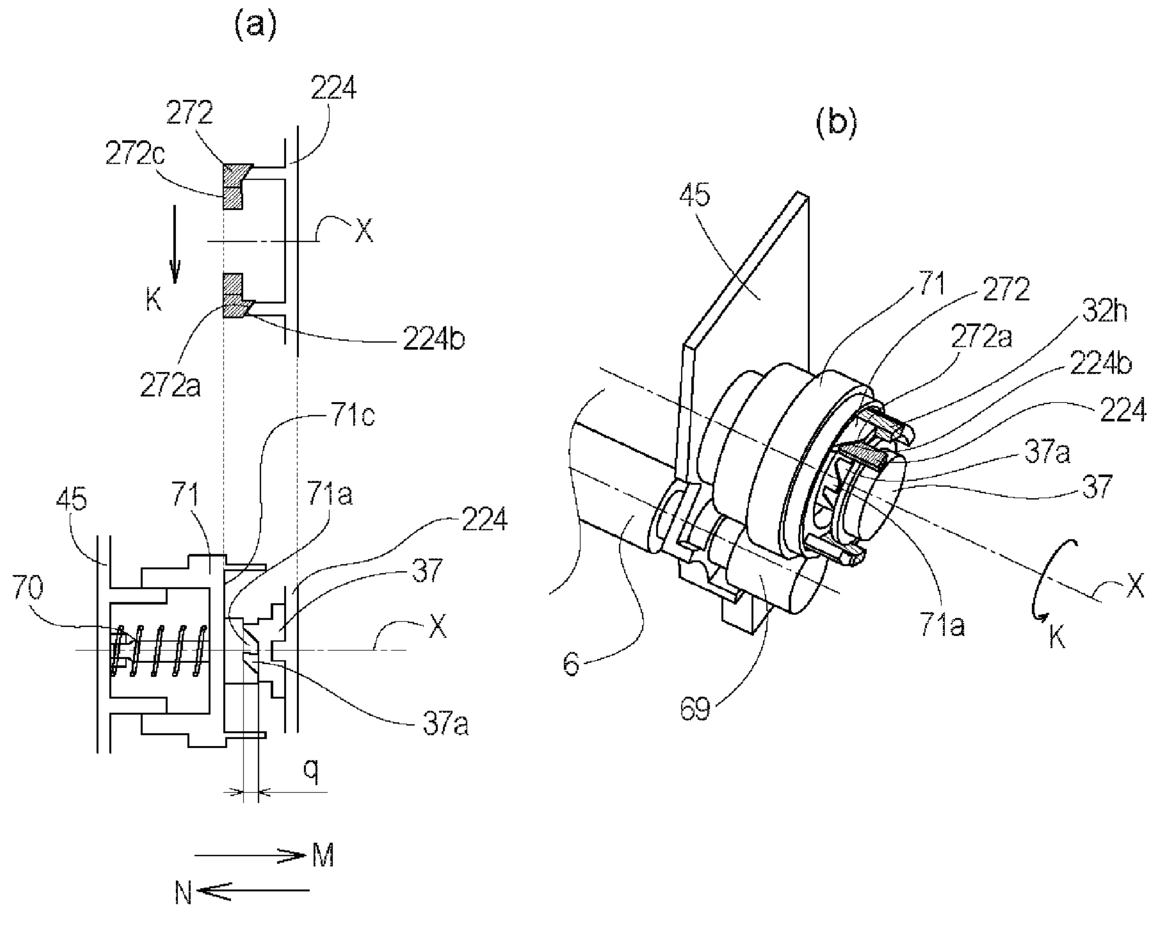
FIG. 37 is a schematic view and a perspective view of the drive connecting portion according to the second embodiment of the present invention.

In the angle θ1 position of the developing unit 9 (the state shown in part (b) of FIG. 7 and FIG. 37) by gradual rotation of the developing unit 9 in the direction of the arrow H shown in FIG. 7 from this state, the claws 37*a* of the upstream drive transmission member 37 and the claws 71*a* of the downstream drive transmission member 71 are engaged with each other by moving in the direction of an arrow M by the urging force of the spring 70. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

Also in this embodiment, the clutch for switching the drive transmission to the developing roller (the contact portion 272*a* of the disconnecting cam 272 and the contact portion 224*b* as the operating portion of the driving side cartridge cover member 224) is coaxial with the rotational center of the rotation of the developing unit including the developing roller relative to the drum unit. Here, the rotational center is the position where the relative position error between the drum unit and the developing unit is the least. By providing the clutch for switching the drive transmission to the developing roller at the rotational center, the clutch switching timing relative to the rotation angle of the developing unit can be controlled with highest precision. As a result, the rotation time of the developing roller can be controlled with high precision, and therefore, the deteriorations of the developer and/or the developing roller can be suppressed.

Embodiment 3

A cartridge according to a third embodiment of the invention will be described. In the description of this embodiment, the detailed description of the portions having the same structures as in the first and second embodiments will be omitted.

Figure 39:
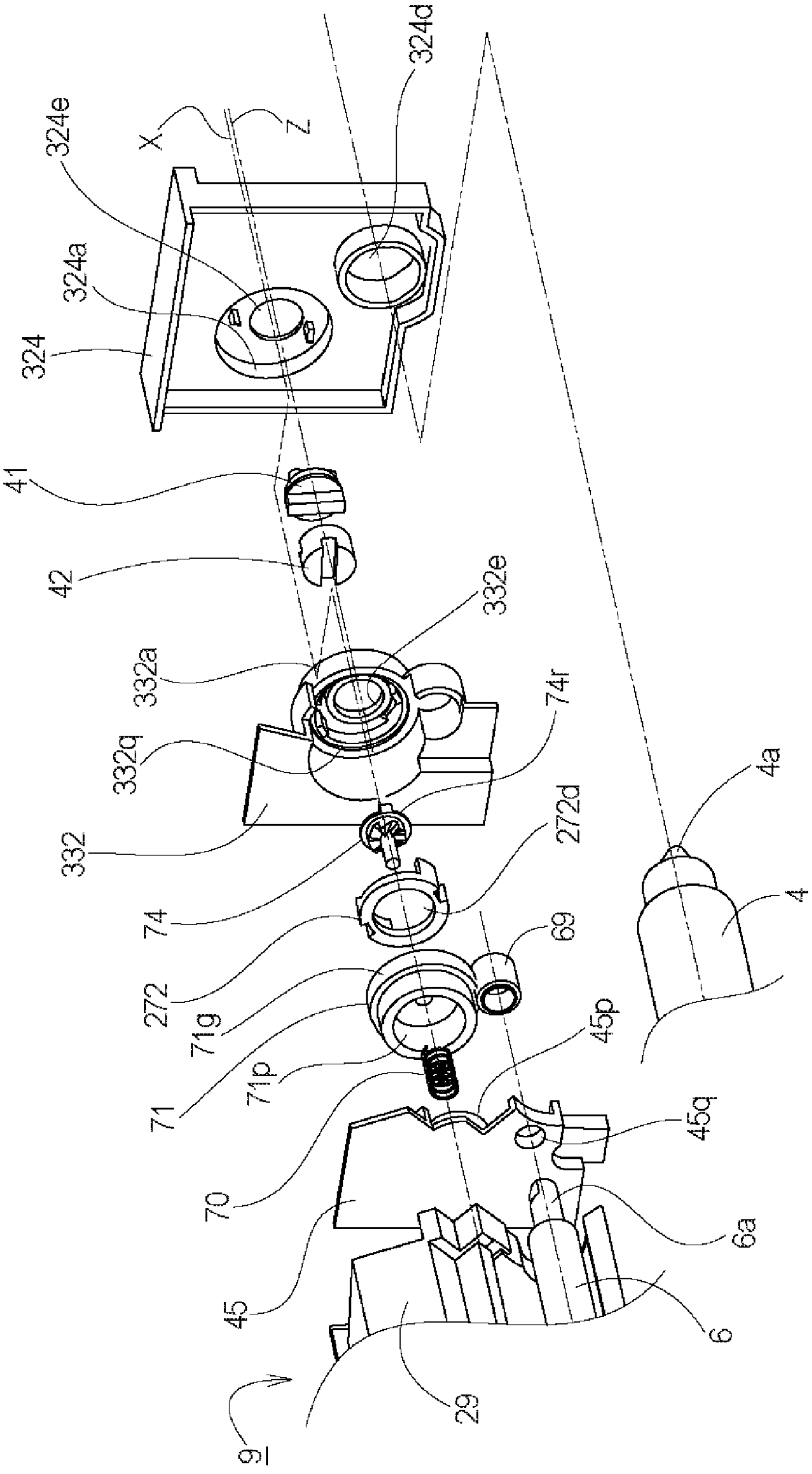
FIG. 39 is an exploded perspective view of a drive connecting portion according to a third embodiment the present invention, as seen from a non-driving side.
Figure 40:
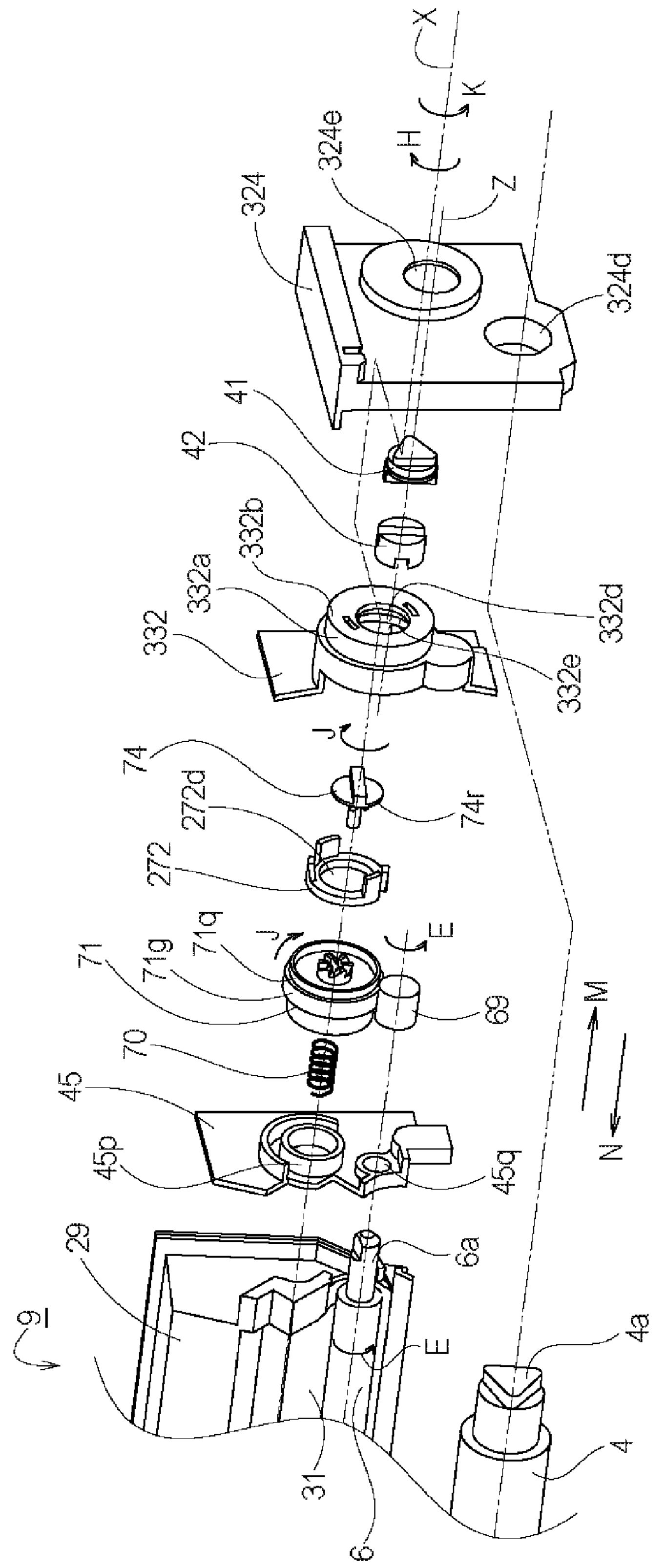
FIG. 40 is an exploded perspective view of the drive connecting portion according the third embodiment of the present invention as seen from a driving side.
Figure 41:
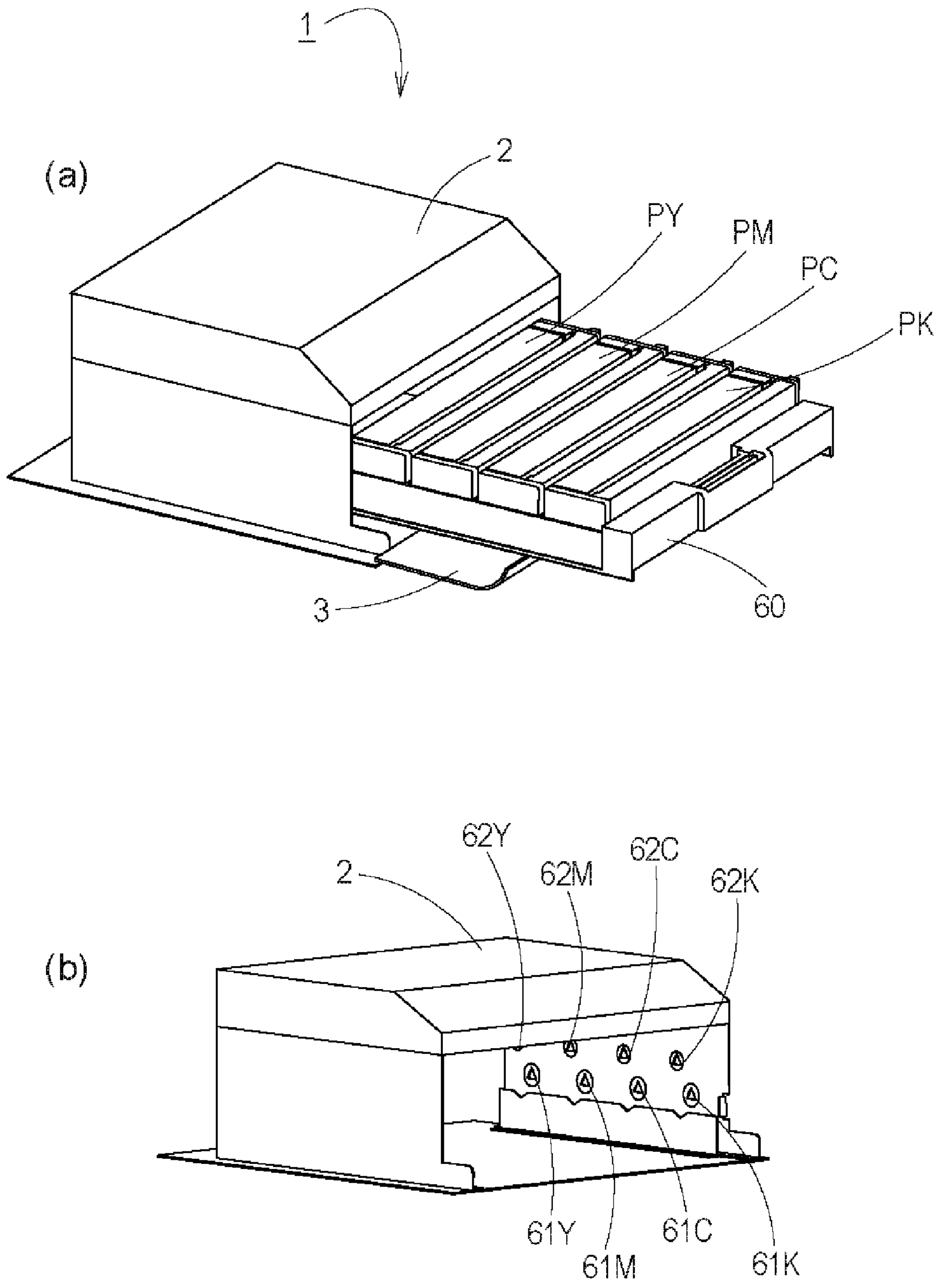
FIG. 41 is a perspective view of an image forming apparatus according to the third embodiment of the present invention.

FIG. 39 and FIG. 40 are perspective views of a cartridge of the third embodiment. FIG. 41 shows an image forming apparatus 1 used with the cartridge of this embodiment. A coupling member 4*a* is provided at an end portion of a photosensitive drum 4 and is engageable with a drum-driving-force-outputting member 61 (61Y, 61M, 61C, 61K) of a main assembly 2 of the apparatus shown in FIG. 41 to receive the driving force of a driving motor (unshown) of the main assembly of the apparatus. In addition, an Oldham coupling (upstream member 41) is provided at a driving side end portion of a developing unit 9 and is engageable with a developing device-drive output member 62 (62Y, 62M, 62C, 62K) as a main assembly side drive transmission member of the main assembly 2 shown in FIG. 41 to transmit the driving force from the driving motor (unshown) provided in the main assembly 2 of the apparatus.

[Structure of the Drive Connecting Portion]

Referring to FIGS. 39 and 40, the structure of the drive connecting portion will be described.

The general arrangement thereof will be described, first.

A driving side cartridge cover member 324 is provided with an opening 324*d* and an opening 324*e*. Through the opening 324*d*, the coupling member 4*a* provided at the end portion of the photosensitive drum 4 is exposed, and through the opening 324*e*, the Oldham coupling upstream member 41 provided at the end portion of the developing unit 9 is exposed. As described above, the coupling member 4*a* engages with the drum-driving-force-outputting member 61 (61Y, 61M, 61C, 61K) of the main assembly 2 of the apparatus shown in part (b) of FIG. 41, and the Oldham coupling upstream member 41 engages with the developing device-drive output member 62 (62Y, 62M, 62C, 62K) to receives the driving force of the driving motor (unshown) of the main assembly of the apparatus.

Between a bearing member 45 and the driving side cartridge cover member 324, there are provided and arranged in the direction from the bearing member 45 to the driving side cartridge cover member 324, a spring 70 which is an elastic member as an urging member, a downstream drive transmission member 71 as a second drive transmission member, a disconnecting cam 272 as a disconnecting member which is a part of a disconnecting mechanism, an upstream drive transmission member 74 as a downstream member of the Oldham coupling which is a first drive transmission member, a developing device covering member 332, an intermediary member 42 of the Oldham coupling and an upstream member 41 of the Oldham coupling. Is upstream drive transmission member 74 is slidably supported by developing device covering member 332 and the downstream drive transmission member 71 at the opposite end portions with respect to the axial direction. In more detail, a shaft receiving portion 332*e* of the developing device covering member 332 slidably (rotatably) supports a supported portion 74*r* of the upstream drive transmission member 74, and a central hole portion 71*m* of the downstream drive transmission member 71 slidably (rotatable and slidable along the axis) a small diameter cylindrical portion 74*m* of the upstream drive transmission member 74.

Figure 42:
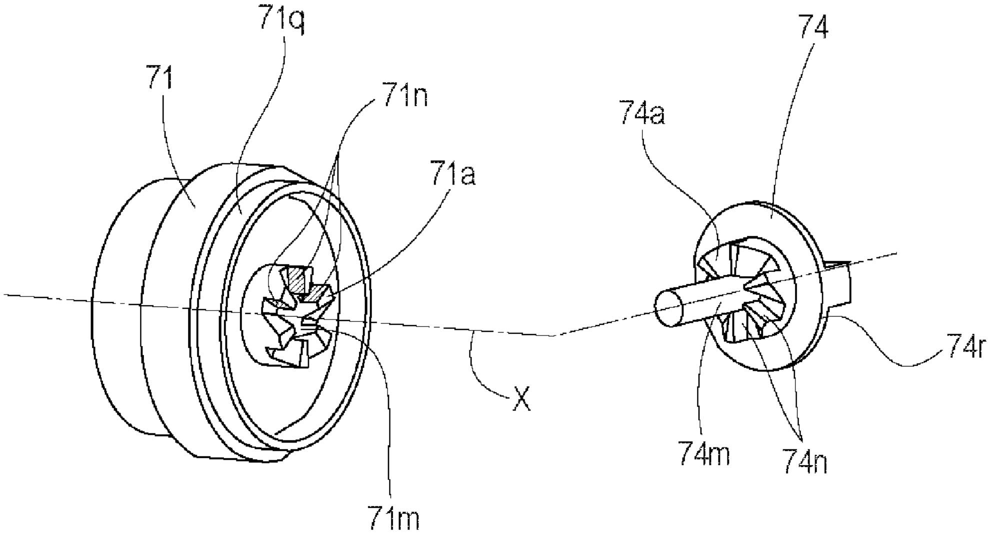
FIG. 42 is a perspective view of the drive connecting portion according to the third embodiment of the present invention.

FIG. 42 shows structures of the upstream drive transmission member (first drive transmission member) 74 and the downstream drive transmission member (second drive transmission member) 71. In FIG. 42, the disconnecting cam 272 between the upstream drive transmission member 74 and the downstream drive transmission member 71 is omitted.

The downstream drive transmission member 71 is provided with a claw portion 71*a* as an engaging portion (coupling portion), and the upstream drive transmission member 74 is provided with a claw portion 74*a* as an engaging portion (coupling portion). The claw portion 71*a* and the claw portion 74*a* are engageable with each other. That is, the downstream drive transmission member 71 is connectable with the upstream drive transmission member 74.

An engaging relation between the downstream drive transmission member 71 and the upstream drive transmission member 74 in this embodiment is similar to the engaging relation between the upstream drive transmission member 37 and the downstream drive transmission member 71 in Embodiment 2 (FIG. 32). Furthermore, the engaging relation (FIG. 34) between the disconnecting cam 272 and the developing device covering member 332, and the engaging relation (FIG. 35) among the disconnecting cam 272, the developing device covering member 332 and the driving side cartridge cover member 324 are also similar to the engaging relation in Embodiment 2.

In this embodiment, at least the disconnecting cam 272 is coaxial with the rotation axis X of the developing unit 9 relative to the drum unit 8. On the other hand, in FIGS. 39 and 40, the Oldham coupling upstream member 41 for receiving the driving force by engagement with the developing device-drive output member 62 (62Y, 62M, 62C, 62K)

of the main assembly 2 of the apparatus is disposed at a position different from the rotation axis X of the developing unit 9 relative to the drum unit 8. Here, a rotation axis of the Oldham coupling upstream member 41 is Z.

Even when the positional change of the developing unit 9 between the development contact state and the spaced-developing-device-state, it is required to assuredly transmit the driving force supplied from the main assembly 2 of the apparatus to the developing roller 6 through the downstream drive transmission member 71 and the upstream drive transmission member 74. In this embodiment, the rotation axis X of the developing unit 9 relative to the drum unit 8 is not coaxial with the rotation axis Z of the Oldham upstream drive transmission member 41. Therefore, when the positional change of the developing unit 9 occurs between the development contact state and the spaced-developing-device-state, the relative position between the Oldham upstream drive transmission member 41 and the developing roller gear 69 as the third drive transmission member changes. In view of this, a universal joint (the Oldham coupling) is provided to accomplish the drive transmission even when the relative positional deviation occurs between the upstream drive transmission member 41 and the developing roller gear 69. More specifically, in this embodiment, the Oldham upstream drive transmission member 41, the Oldham coupling middle member 42 and the upstream drive transmission member 74 (three parts) constitutes the Oldham coupling.

The drive transmission and drive disconnecting mechanism at the time when the developing unit 9 changes between the development contact drive transmission state and the developing device spacing drive disconnection state are similar to the those in Embodiment 2. That is, the disconnecting cam 272 co-axial with the rotation axis X of the developing unit 9 moves in the longitudinal directions (directions of arrows M and N) in response to the contacting and spacing operation of the developing unit 9. By this, the driving connection and disconnection can accomplished between the downstream drive transmission member 71 and the upstream drive transmission member 74. In the case of this embodiment, the rotation axis of the developing device-drive output member 62 driven by the main assembly 2 of the apparatus is different from the rotation axis X of the developing unit 9. However, the contact portion 272*a* of the disconnecting cam 272 for disconnecting the driving connection, and the contact portion 324*b* as the operating portion of the driving side cartridge cover member 324 acting on the contact portion 272*a* are co-axially with the rotation axis X of the developing unit 9. Therefore, the drive switching timing can be controlled with high accuracy.

In this embodiment and the following embodiments, the constituent parts can be assembled unidirectionally, that is, the direction of the arrow M in the Figure).

Embodiment 4

A cartridge according to a fourth embodiment of the invention will be described. In the description of this embodiment, the description of the structures similar to those of the foregoing embodiments will be omitted.

[Structure of the Developing Unit]

Figure 43:
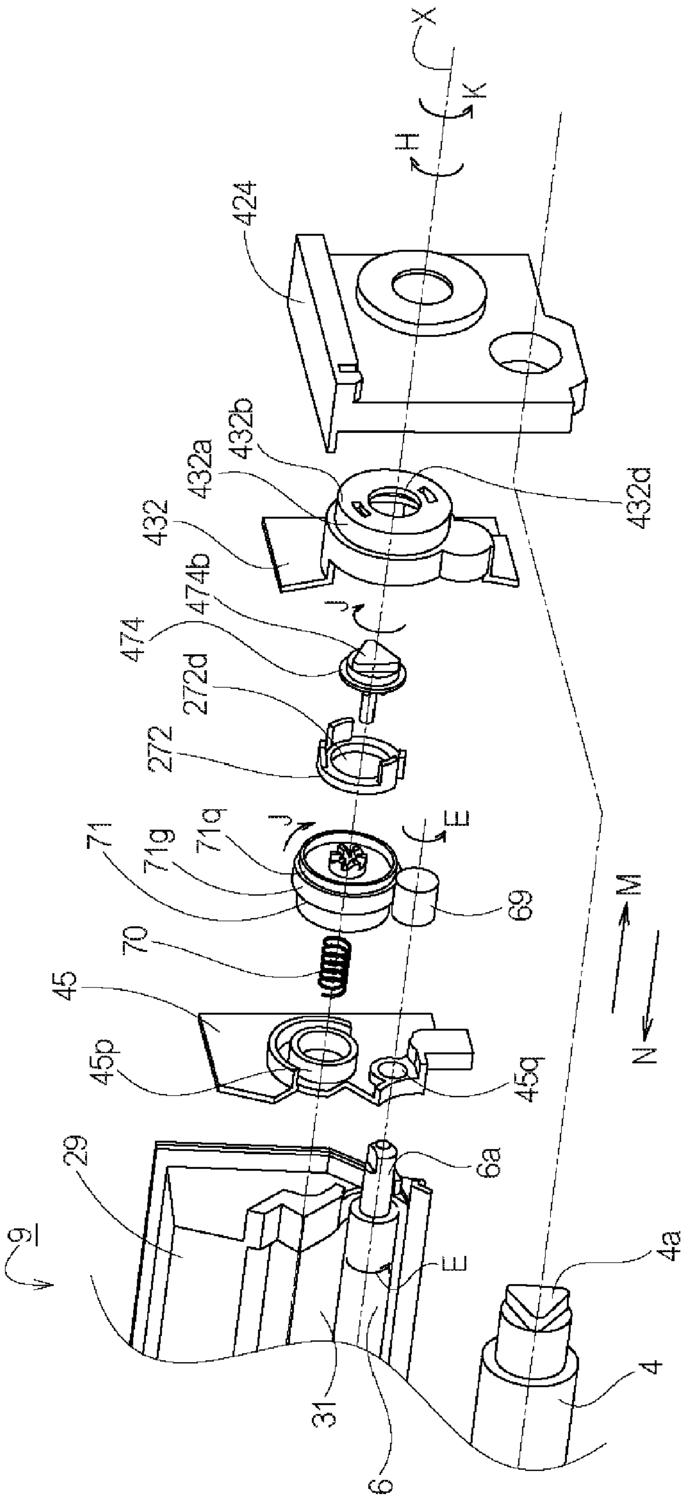
FIG. 43 is an exploded perspective view of a drive connecting portion according to a fourth embodiment of the present invention, as seen from a driving side.

As shown in FIGS. 43 and 4, a developing unit 9 comprises a developing roller 6, a developing blade 31, developing device frame 29, a bearing member 45, a developing device covering member 432 and so on.

The developing device frame 29 includes the developer accommodating portion 49 accommodating the developer to be supplied to the developing roller 6, and the developing blade 31 for regulating a layer thickness of the developer on the peripheral surface of the developing roller 6.

In addition, as shown in FIG. 43, the bearing member 45 is fixed to one longitudinal end portion of the developing device frame 29. The bearing member 45 rotatably supports the developing roller 6. The developing roller 6 is provided with a developing roller gear 69 at a longitudinal end portion. The bearing member 45 rotatably supports a downstream drive transmission member 71 for transmitting the driving force to the developing roller gear 69 as well. This will be described in detail hereinafter.

Figure 44:
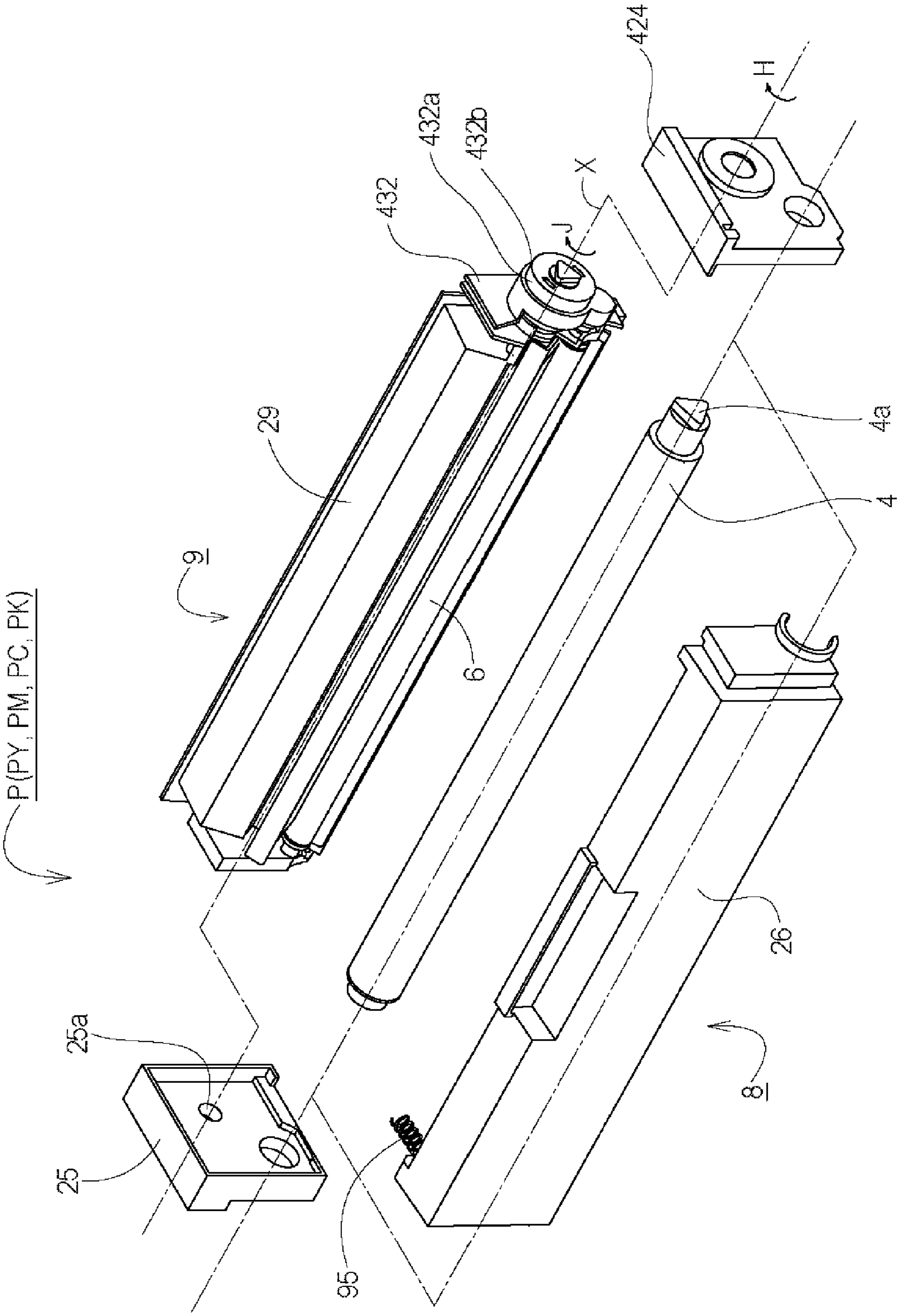
FIG. 44 is an exploded perspective view of a process cartridge according to the fourth embodiment of the present invention.
Figure 49:
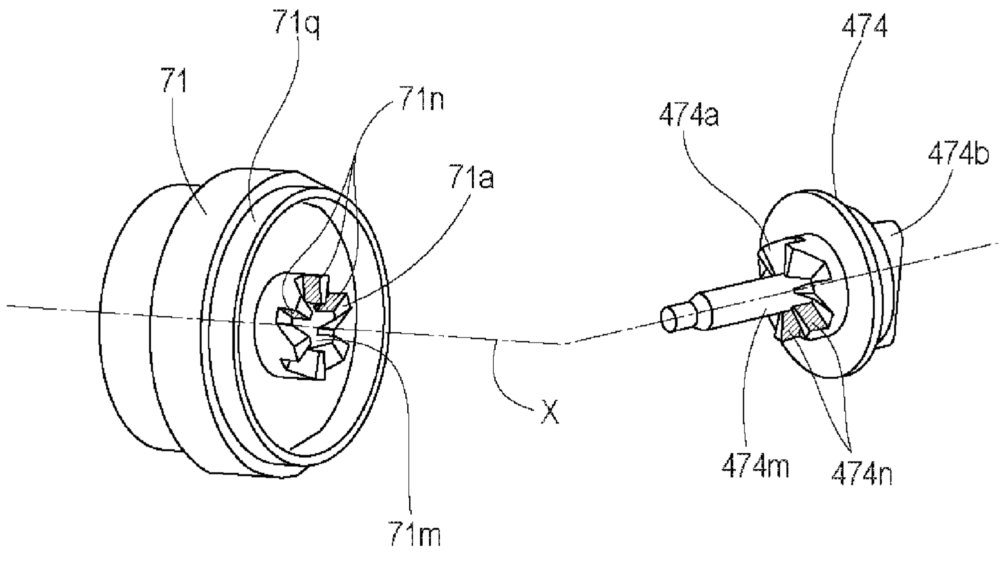
FIG. 49 is a perspective view of first and second coupling members according to the fourth embodiment of the present invention.

The developing device covering member 432 is fixed to an outside of the bearing member 45 with respect to the longitudinal direction of the cartridge P. The developing device covering member 432 covers the developing roller gear 69, the downstream drive transmission member (second drive transmission member) 71, and the upstream drive transmission member (first drive transmission member) 474 as the development input coupling. As shown in FIGS. 43 and 44, the developing device covering member 432 is provided with a cylindrical portion 432*b*. Through an inside opening 432*d* of the cylindrical portion 432*b*, a drive inputting portion 474*b* as a rotational force receiving portion, of an upstream drive transmission member 474 is exposed. The drive inputting portion 474*b* is provided at one end portion of the upstream drive transmission member 474 with respect to the axial direction, whereas a shaft portion 474*m* is provided at the other end portion of the drive transmission member 474. In addition, a coupling portion 474*a* is provided between the drive inputting portion 474*b* and the shaft portion 474*m* with respect to the direction substantially parallel with the rotational axis X of the upstream drive transmission member 474 (FIG. 49). The coupling portion 474*a* is remoter from the rotational axis X than the shaft portion 474*m* in a radial direction of the upstream drive transmission member 474.

When the cartridge P (PY, PM, PC, PK) is mounted in the main assembly 2 of the apparatus, the drive inputting portion 474*b* is engaged with a developing device-drive output member 62 (62Y, 62M, 62C, 62K) shown in part (b) of FIG. 3 to transmit the driving force from the driving motor (unshown) provided in the main assembly 2 of the apparatus. The driving force inputted to the upstream drive transmission member 474 from the main assembly 2 of the apparatus is transmitted to the developing roller gear 69 as a third drive transmission member and to the developing roller 6 through the downstream drive transmission member 71. That is, the driving force from the main assembly of the apparatus 2 can be transmitted to the developing roller through the upstream drive transmission member 474 and the downstream drive transmission member 71.

[Assembling of the Drum Unit and the Developing Unit]

Figure 45:
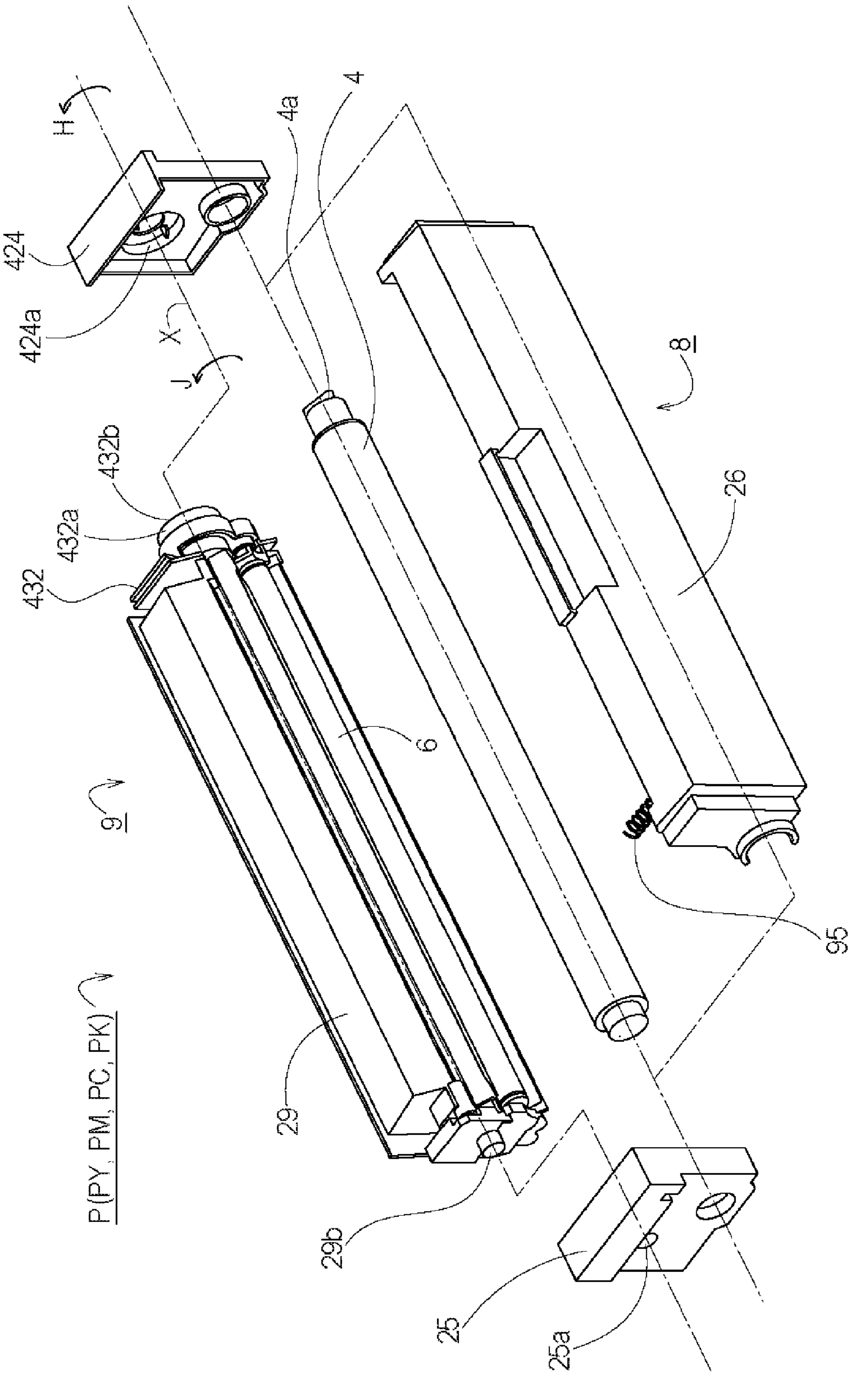
FIG. 45 is an exploded perspective view of the process cartridge according to the fourth embodiment of the present invention.

FIGS. 44, 45 show the disassembled developing unit 9 and the drum unit 8. At one longitudinal end portion side of the cartridge P, an outside circumference 432*a* of the cylindrical portion 432*b* of the developing device covering member 432 is rotatably engaged with a supporting portion 424*a* of the driving side cartridge cover member 424. In addition, at the other longitudinal end portion side of the cartridge P, a projected portion 29*b* projected from the developing device frame 29 is rotatably engaged with a supporting hole portion 25*a* of a non-driving side cartridge cover member 25. By this, the developing unit 9 is supported rotatably relative to the drum unit 8. Here, a rotational center (rotation axis) of the developing unit 9 relative to the drum unit is called "rotational center (rotation axis) X". The rotational center X is an axis resulting the center of the supporting hole portion 424*a* and the center of the supporting hole portion 25*a*.

[Contact Between the Developing Roller and the Drum]

As shown in FIGS. 4, 44 and 45, developing unit 9 is urged by an urging spring 95 which is an elastic member as an urging member so that the developing roller 6 is contacted to the drum 4 about the rotational center X. That is, the developing unit 9 is pressed in the direction indicated by an arrow G in FIG. 4 by an urging force of the urging spring 95 which produces a moment in the direction indicated by an arrow H about the rotational center X.

In addition, in FIG. 43, the upstream drive transmission member 474 receives a rotation in the direction of an arrow J from the developing device-drive output member 62 is an main assembly coupling provided in the main assembly 2 of the apparatus shown in part (b) of FIG. 3. Then, the downstream drive transmission member 71 is rotated in the direction of the arrow J by the driving force inputted to the upstream drive transmission member 474. By this, the developing roller gear 69 engaged with the downstream drive transmission member 71 rotates in the direction of an arrow E. By this, the developing roller 6 rotates in the direction of the arrow E. The driving force required to rotate the developing roller 6 is inputted to the upstream drive transmission member 474, by which the developing unit 9 receives a rotation moment in the direction of the arrow H.

By an urging force of the above-described urging spring 95 and the rotational force supplied from the main assembly 2 of the apparatus, the developing unit 9 receives a moment in the direction of the arrow H about the rotational center X. By this, the developing roller 6 can contacted to the drum 4 at a predetermined pressure. The position of the developing unit 9 relative to the drum unit 8 at this time is a contacting position. In this embodiment, in order to urge the developing roller 6 to the drum 4, two forces, namely, the urging force by the urging spring 95, and the rotational force from the main assembly 2 of the apparatus are used. However, but this is not inevitable, and the developing roller 6 may be urged to the drum 4 one of such forces.

[Spacing Between the Developing Roller and the Drum]

FIG. 7 is a side view of the cartridge P as seen from the driving side. In this Figure, some parts are omitted for better illustration. When the cartridge P is mounted to the main assembly 2 of the apparatus, the drum unit 8 is fixedly positioned relative to the main assembly 2 of the apparatus.

The bearing member 45 is provided with a force receiving portion 45*a*. The force receiving portion 45*a* is engageable with a main assembly spacing member 80 provided in the main assembly 2 of the apparatus.

The main assembly spacing member 80 receives the driving force from the motor (unshown) to move in the directions of an arrow F1 and F2 along a rail 81.

Part (a) of FIG. 7 shows a state in which the drum 4 and the developing roller 6 are contacted with each other. At this time, the force receiving portion 45*a* and the main assembly spacing member 80 are spaced by a gap d.

Part (b) of FIG. 7 shows a state in which the main assembly spacing member 80 is away from the position in the state of the part (a) of FIG. 7 in the direction of an arrow F1 by a distance $\delta 1$. At this time, the force receiving portion 45*a* is engaged with the main assembly spacing member 80. As described in the foregoing, the developing unit 9 is rotatable relative to the drum unit 8, and therefore, in the state of part (b) of FIG. 7, the developing unit 9 has rotated by an angle $\theta 1$ in the direction of the arrow K about the rotational center X. At this time, the drum 4 and the developing roller 6 are spaced from each other by distance $\varepsilon 1$.

Part (c) of FIG. 7 shows a state in which the main assembly spacing member 80 has moved in the direction of the arrow F1 from the position shown in part (a) of FIG. 7 by $\delta 2$ ($>\delta 1$). The developing unit 9 has rotated in the direction of the arrow K about the rotational center X by an angle $\theta 2$. At this time, the drum 4 and the developing roller 6 are spaced from each other by distance $\varepsilon 2$.

[Structure of the Drive Connecting Portion]

Figure 46:
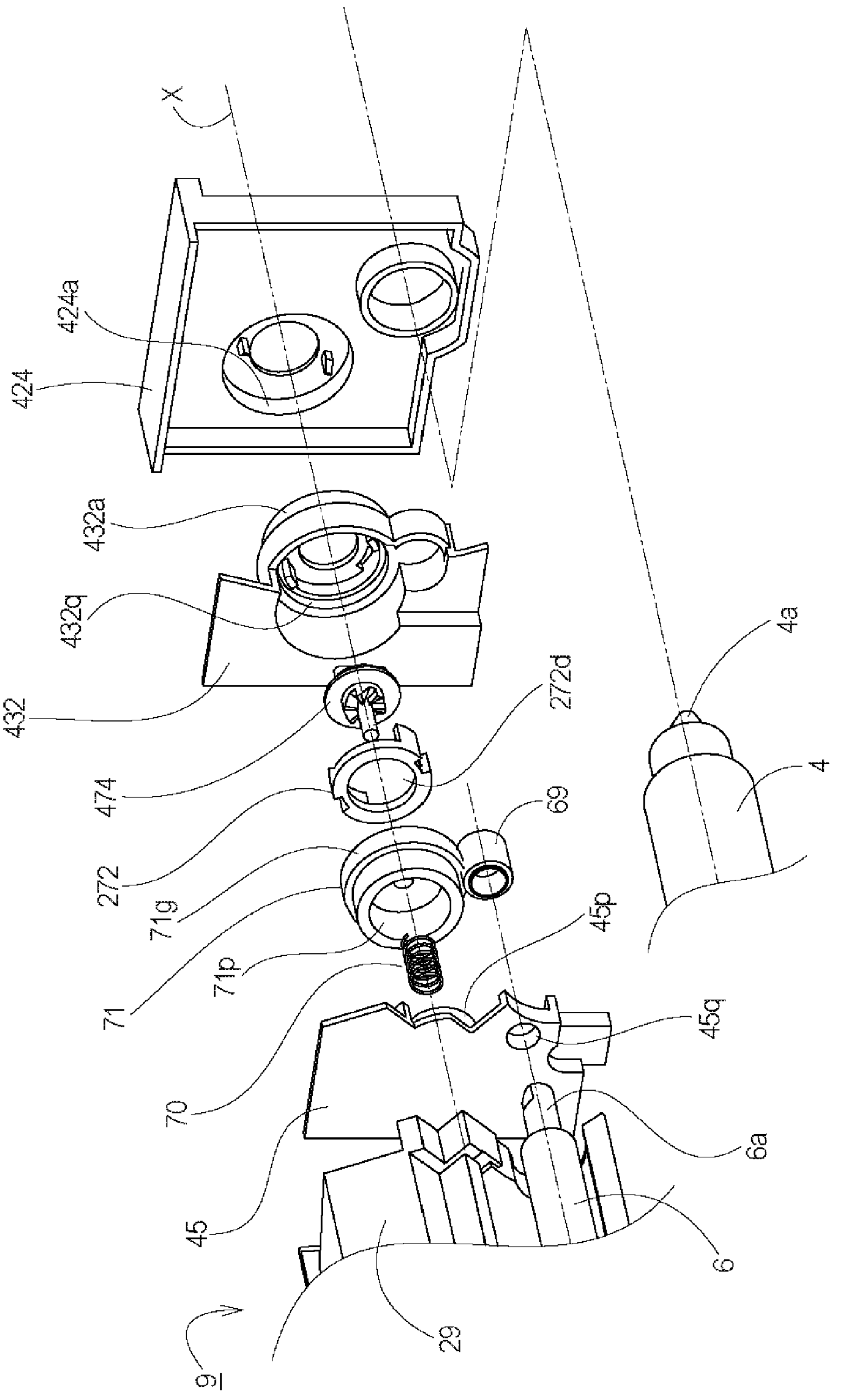
FIG. 46 is an exploded perspective view of a drive connecting portion according to the fourth embodiment of the present invention as seen from a non-driving side.

Referring to FIGS. 43 and 46, the structure of the drive connecting portion will be described. Here, the drive connecting portion is a mechanism for receiving the drive from the developing device-drive output member 62 of the main assembly of the apparatus 2, and transmitting or stopping the drive to the developing roller 6.

The general arrangement thereof will be described, first.

Between the bearing member 45 and the driving side cartridge cover member 424, there are provided a spring 70 which is an elastic portion as the urging member, a downstream drive transmission member 71 as a second coupling member, a disconnecting cam 272 as a disconnecting member which is a part of a disconnecting mechanism, an upstream drive transmission member 474 as a first coupling member, and the developing device covering member 432, in the order named in the direction from the bearing member 45 to the driving side cartridge cover member 424. These members are co-axial with the upstream drive transmission member 474. That is, the rotational axes of the These members are aligned with the rotational axis of the upstream drive transmission member 474. Here, here, the alignment means that within the range of the dimensional tolerances of these parts, and this applies to the embodiment which will be described hereinafter. In this embodiment the drive connecting portion is constituted by the spring 70, the downstream drive transmission member 71, the disconnecting cam 272, upstream of drive transmission member 474, the developing device covering member 432 and the driving side cartridge cover member 424. They will be described in detail.

The bearing member 45 rotatably supports the downstream drive transmission member 71. In more detail, the first shaft receiving portion 45*p* (cylindrical outer surface) of the bearing member 45 rotatably supports a supported portion 71*p* (cylindrical inner surface) of the downstream drive transmission member 71 (FIGS. 43 and 47).

Further, the bearing member 45 rotatably supports the developing roller 6. In more detail, the second shaft receiving portion 45*q* (cylindrical inner surface) of the bearing member 45 rotatably supports a shaft portion 6*a* of the developing roller 6.

The shaft portion 6*a* of the developing roller 6 is fitted into the developing roller gear 69. An outer peripheral surface 71 *g* of the downstream drive transmission member 71 is formed into a gear portion engaged with the developing roller gear 69. In this manner, the rotational force is transmitted to the developing roller 6 through the developing roller gear 69 from the downstream drive transmission member 71.

Figure 47:
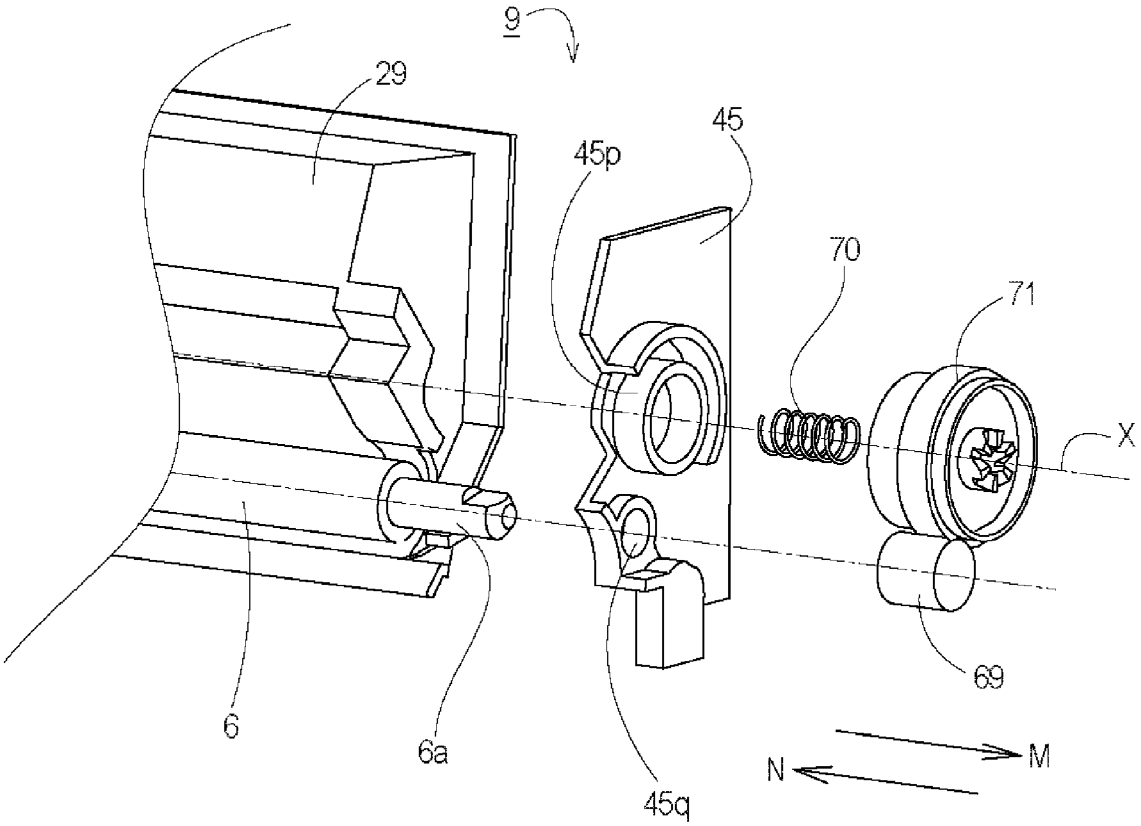
FIG. 47 is an exploded perspective view of the drive connecting portion according to the fourth embodiment of the present invention, as seen from a driving side.
Figure 48:
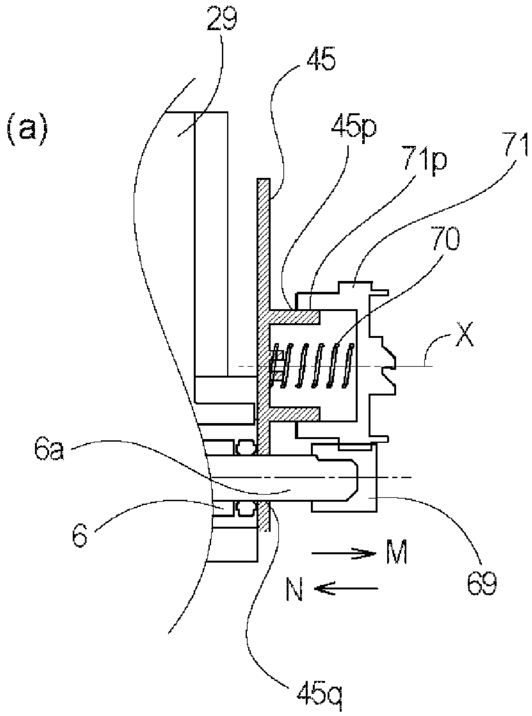
FIG. 48 is a sectional view of the process cartridge according to the fourth embodiment of the present invention.
Figure 48:
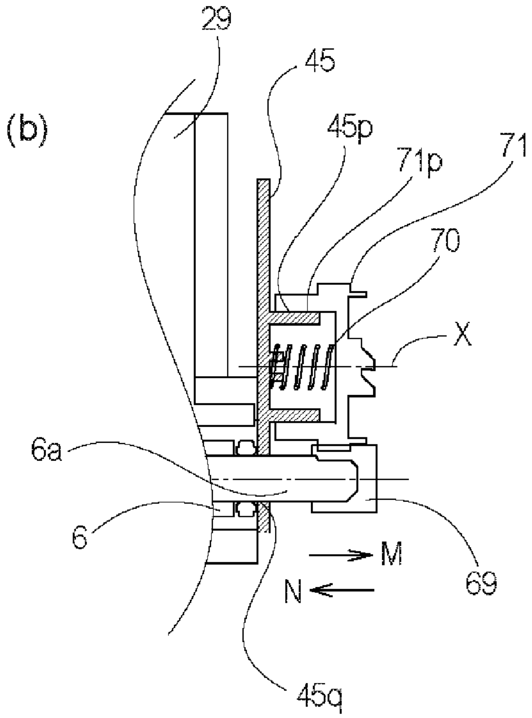

FIG. 47 shows structures of the bearing member 45, the spring 70, the downstream drive transmission member 71 and the developing roller gear 69. FIG. 48 is a sectional view of the parts.

The first shaft receiving portion 45*p* (cylindrical outer surface), as a first guide portion, of the bearing member 45 rotatably supports the supported portion 71*p* (cylindrical inner surface), as a first guided portion, the downstream drive transmission member 71 (FIG. 48). In the state that the supported portion 71*p* (cylindrical inner surface) is engaged with the first shaft receiving portion 45*p* (cylindrical outer surface), the downstream drive transmission member 71 is movable along a rotation axis (rotational center) X. In other words, the bearing member 45 supports is downstream drive transmission member 71 slidably along the rotation axis X In other words, the downstream drive transmission member 71 is slidable in directions of arrows M and N relative to the bearing member 45. Part (a) of FIG. 48 is sectional views of the related parts, part (b) of FIG. 48 shows the state in which the downstream drive transmission member 71 has moved relative to the bearing member 45 in the direction of the arrow N from the position shown in part (a) of FIG. 48. The downstream drive transmission member 71 is movable in the directions of arrows M and N in engagement with the developing roller gear 69. In order to make easier the movement of the downstream drive transmission member 71 in the directions of arrows M and N, the gear portion 71*g* of the downstream drive transmission member 71 is preferably a spur gear rather than a helical gear.

Between the bearing member 45 and the downstream drive transmission member 71, the spring 70 which is the elastic member as the urging member is provided. The spring 70 urges the downstream drive transmission member 71 in the direction of the arrow M.

FIG. 49 shows structures of the upstream drive transmission member 474 as the first coupling member and the downstream drive transmission member 71 as the second coupling member. In FIG. 49, the disconnecting cam 272 between the upstream drive transmission member 474 and the downstream drive transmission member 71 is omitted.

The downstream drive transmission member 71 is provided with a claw portion 71*a* as an engaging portion, and the upstream drive transmission member 474 is provided with a claw portion 474*a* as an engaging portion. The claw portion 71*a* and the claw portion 474*a* are engageable with each other. That is, the downstream drive transmission member 71 is connectable with the upstream drive transmission member 474. In this embodiment, the claw portion 71*a* and the claw portion 474*a* each have six claws.

Figure 50:
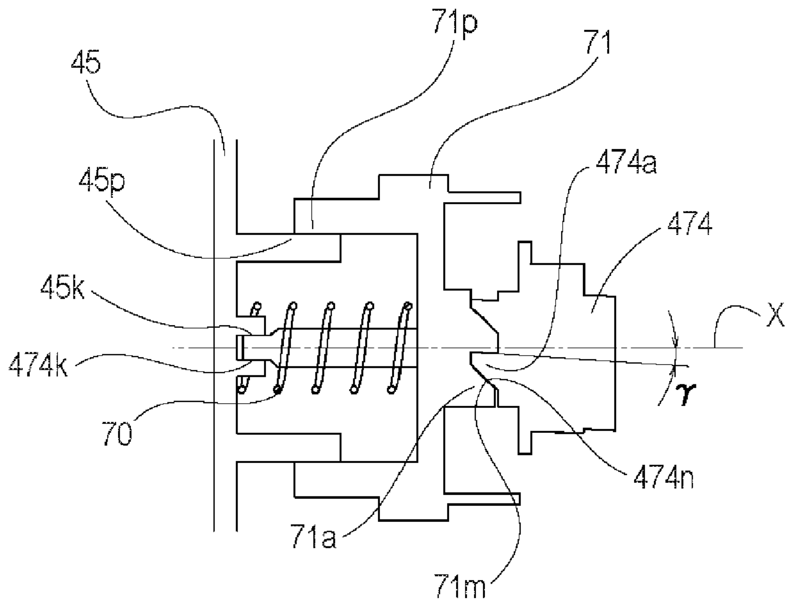
FIG. 50 is a sectional view of the first and second coupling members and peripheral parts thereof.

FIG. 50 is a sectional view of the drive connecting portion including the downstream drive transmission member 71 and the upstream drive transmission member 474. In FIG. 50, the disconnecting cam 272 between the upstream drive transmission member 474 and the downstream drive transmission member 71 is omitted. As shown in the Figure, the contact portion 71*n* and the contact portion 474*n* between the claw portion 71*a* and the claw portion 474*a* is inclined only an angle γ relative to the axis X. More particularly, the contact portion 71*n* of the downstream drive transmission member 71 overlaps at least a part of the upstream drive transmission member 474 with respect to a direction parallel with the rotational center X. In other words, the contact portion 71*n* overhangs a part of the downstream drive transmission member 71, and the contact portion 474*n* overhangs a part of the downstream drive transmission member 474. Further in other words, the contact portion 71*n* overhangs a phantom plane perpendicular to the rotational axis of the downstream drive transmission member 71, and the contact portion 474*n* overhangs a phantom plane perpendicular to the rotational axis of the downstream drive transmission member 474. With such a structure, in the drive transmission, the claw portion 71*a* and the claw portion 474*a* mutually pull each other in the direction of the axis X.

In the drive transmission, the drive is transmitted from the upstream drive transmission member 474 and the downstream drive transmission member 71. To the upstream drive transmission member 474 and the downstream drive transmission member 71, a pulling force and an urging force of the spring 70 are applied. A resultant force thereof, the upstream drive transmission member 474 and the downstream drive transmission member 71 are connected with each other during the drive transmission. Here, the inclination angles γ of the contact portion 71*n* and the contact portion 474*n* relative to the axis X is preferably approx. 1°-approx. 3.5°. During the drive transmission and disconnecting operations, the contact portion 471*n* and the contact portion 71*n* are worn by sliding (the drive transmission and disconnecting operations will be described hereinafter). In addition, the claws may be deformed during the drive transmission operation. Even if the wearing and/or deformation of the contact portion 71*n* and the contact portion 474*n* occurs, the contact portion 71*n* and the contact portion 474*n* pull to each other, so that the connection between the upstream drive transmission member 474 and the downstream drive transmission member 71 can be assured, and therefore, the drive transmission is stable. When the upstream drive transmission member 474 and the downstream drive transmission member 71 are separated from each other due to the wearing and/or deformation of the contact portion 71*n* and the contact portion 474*n*, the urging force of the spring 70 may be made larger to assure the connection between the upstream drive transmission member 474 and the downstream drive transmission member 71. However, in this case, in the drive disconnecting operation which will be described hereinafter in which the downstream drive transmission member 71 is retracted from the upstream drive transmission member 474 against the urging force of the spring 70, the required force is large. If the inclination angles of the contact portion 71*n* and the contact portion 474*n* relative to the axis X is too large, the pulling force during the drive transmission is large, and therefore, the drive transmission is stabilization, but the force required to separate the upstream drive transmission member 474 and downstream of drive transmission member 71 from each other in the drive disconnection operation is large.

The upstream drive transmission member 474 is provided with the drive inputting portion 474*b* engageable with the developing device-drive output member 62 shown in part (b) of FIG. 3 from the main assembly 2 of the apparatus. The drive inputting portion 474*b* has a substantially triangular prism twisted by a small angle.

As shown in FIG. 49, a hole portion 71*m* is provided at the center portion of the downstream drive transmission member 71. The hole portion 71*m* engages with a small diameter cylindrical portion 474*m* of the upstream drive transmission member 474. By doing so, the downstream drive transmission member 71 is supported slidably relative to the upstream drive transmission member 474 (rotatable and slidable in the axis directions).

As shown in FIG. 43 and FIG. 46, the disconnecting cam 272 is disposed between the downstream drive transmission member 71 and the upstream drive transmission member 474.

Figure 51:
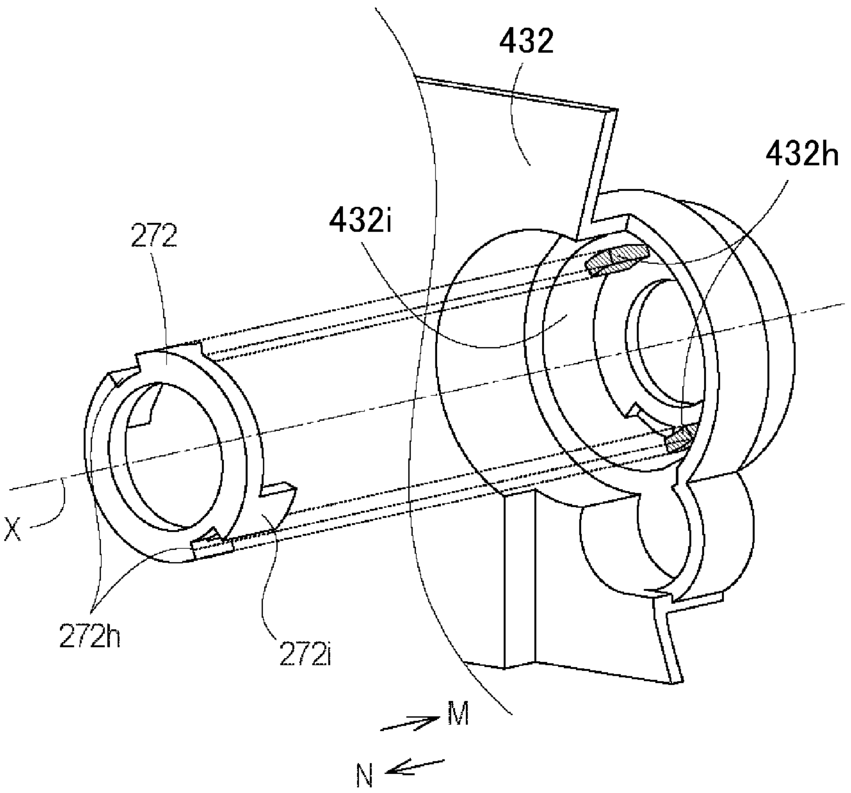
FIG. 51 is a perspective view of a releasing member and peripheral parts thereof according to the fourth embodiment of the present invention.

FIG. 51 shows a relationship between the disconnecting cam 272 and the developing device covering member 432. In FIG. 51, the upstream drive transmission member 474 disposed between the disconnecting cam 272 and the developing device covering member 432 is omitted.

The disconnecting cam 272 has a substantially ring configuration and has an outer peripheral surface 272*i*, and the developing device covering member 432 has an inner peripheral surface 432*i*. The inner peripheral surface 432*i* is engageable with the outer peripheral surface 272*i*. By this, the disconnecting cam 272 is slidable relative to the developing device covering member 432 (slidable along the axis of the developing roller 6).

The developing device covering member 432 is provided with a guide 432*h* as a (second) guide portion, and the disconnecting cam 272 is provided with a guide groove 272*h* as a (second) guided portion. The guide 432*h* and the guide groove 272*h* are in parallel with the axial direction. Here, the guide 432*h* of the developing device covering member 432 is engaged with the guide groove 272*h* of the disconnecting cam 272. By the engagement between the guide 432*h* and the guide groove 272*h*, the disconnecting cam 272 is slidable relative to the developing device covering member 432 only in the axial direction (arrows M and N).

Figure 52:
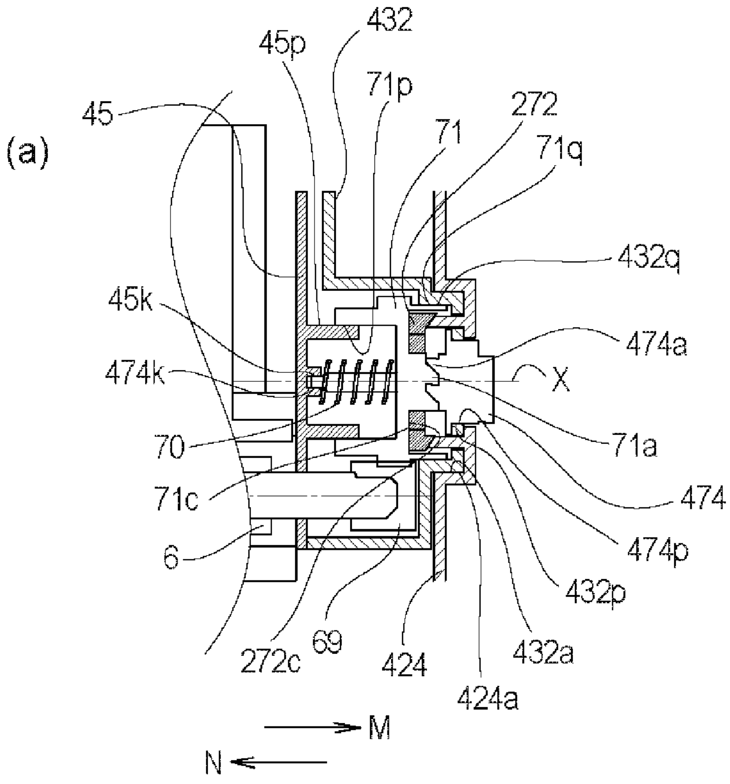
FIG. 52 is a sectional view of a drive connecting portion according to the fourth embodiment of the present invention.
Figure 52:
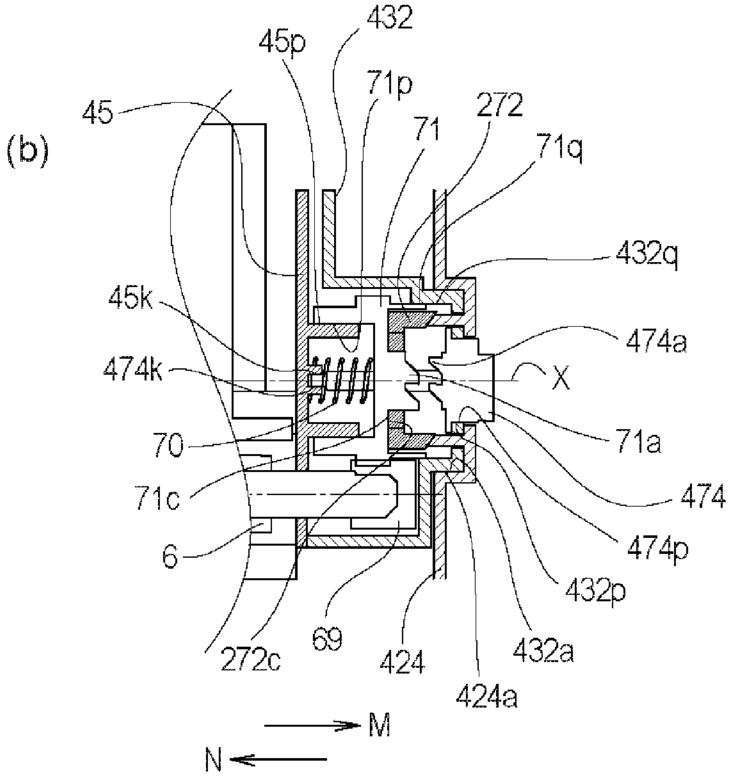

FIG. 52 is a sectional view of the drive connecting portion.

As described above, the supported portion 71*p* (cylindrical inner surface) of the downstream drive transmission member 71 and the first shaft receiving portion 45*p* (cylindrical outer surface) of the bearing 45 are engaged with each other. In addition, a cylindrical portion 71*q* of the downstream drive transmission member 71 and an inside circumference 432*q* of the developing device covering member 432 are engaged with each other. That is, the downstream drive transmission member 71 is rotatably supported at the opposite end portions thereof by the bearing member 45 and the developing device covering member 432.

In addition, a hole portion 432*p* as a supporting portion for supporting one end portion side of-the developing device covering member 432 rotatably supports a cylindrical portion 474*p* as a supported portion at one end portion side of-the upstream drive transmission member 474 (FIG. 52). Also, a hole portion 45*k* as a supporting portion for supporting the other end portion side of-the bearing member 45 rotatably supports a small diameter cylindrical portion 474*k* as a supported portion at the other end portion side of-the upstream drive transmission member 474. In other words, the upstream drive transmission member 474 is rotatably supported at the opposite end portions thereof by the bearing member 45 and the developing device covering member 432. At a position between the opposite end portions, the small diameter cylindrical portion 474*m* as the engaging portion of the upstream drive transmission member 474 is engaged with the hole portion 71*m* as the engaging portion of the downstream drive transmission member 71 (FIG. 49).

The first shaft receiving portion 45*p* (cylindrical outer surface) of the bearing member 45, the inside circumference 432*q* of the developing device covering member 432 and the hole portion 432*p* are aligned with the rotational center X of the developing unit 9. That is, the upstream drive transmission member 474 is supported rotatably about the rotational center X of the developing unit 9. In addition, the downstream drive transmission member 71 is also supported rotatably about the rotational center X of the developing unit 9. By this, the drive to the developing roller can be switched accurately in interrelation with the spacing operation of the developing roller 6.

As described hereinbefore, the disconnecting cam 272 is provided between the downstream drive transmission member 71 and the upstream drive transmission member 474.

As shown in FIGS. 43 and 46, the claws 71*a* of the downstream drive transmission member 71 and the claws 474*a* of the upstream drive transmission member 474 are engaged with each other through a hole 272*d* of the disconnecting cam 272. In other words, the engaging portion between the downstream drive transmission member 71 and the upstream drive transmission member 474 are overlapped at least partly with the disconnecting cam 272 with respect to the direction parallel with the rotational center X.

Part (a) of FIG. 52 is a sectional view of the drive connecting portion illustrating a state in which the claws 71*a* of the downstream drive transmission member 71 and the claws 474*a* of the upstream drive transmission member 474 are engaged with each other. Part (b) of FIG. 52 is a sectional view of the drive connecting portion in which the claws 71*a* of the downstream drive transmission member 71 and the claws 474*a* of the upstream drive transmission member 474 are spaced from each other.

Figure 53:
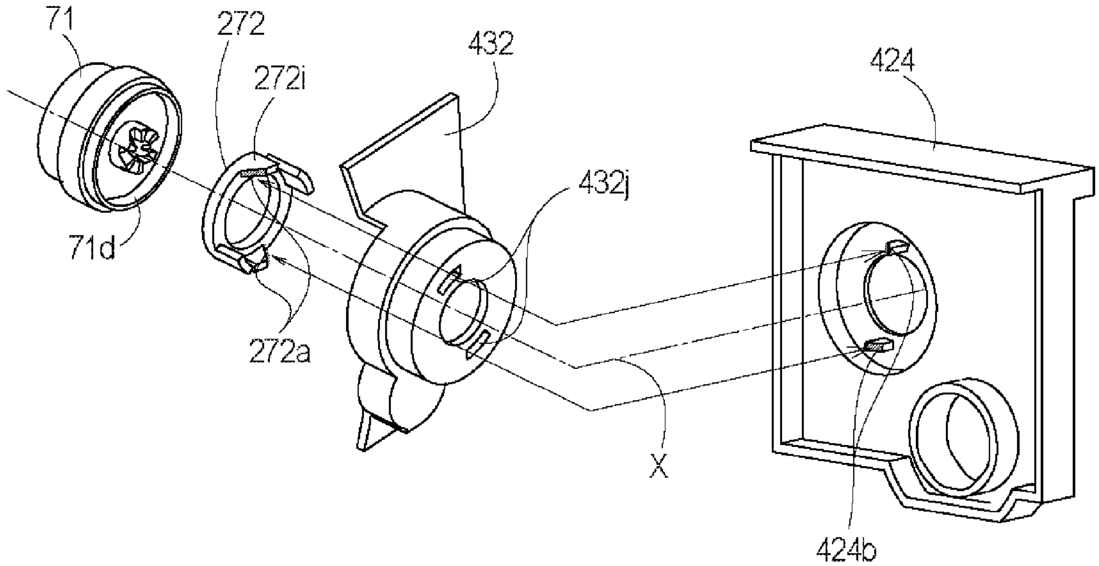
FIG. 53 is a perspective view of the drive connecting portion according to the fourth embodiment of the present invention.

Longitudinally outside of the developing device covering member 432, the driving side cartridge cover member 424 is provided. FIG. 53 shows the arrangement of the downstream drive transmission member 71, the disconnecting cam 272, the developing device covering member 432 and the driving side cartridge cover member 424. In FIG. 53, the upstream drive transmission member 474 disposed between the disconnecting cam 272 and the developing device covering member 432 is omitted.

The disconnecting cam 272 is provided with a contact portion (inclined surface) 272*a*, and the driving side cartridge cover member 424 is provided with a contact portion (inclined surface 424*b* as an operating member. Furthermore, the developing device covering member 432 is provided an opening 432*j*. A contact portion 272*a* of the disconnecting cam 272 and a contact portion 424*b* of the driving side cartridge cover member 424 are contactable to each other through the opening 432*j* of the developing device covering member 432.

[Drive Disconnecting Operation]

The operation of the drive connecting portion at the time of change from the contact state to the spaced state between the developing roller 6 and the drum 4 will be described.

[State 1]

Figure 54:
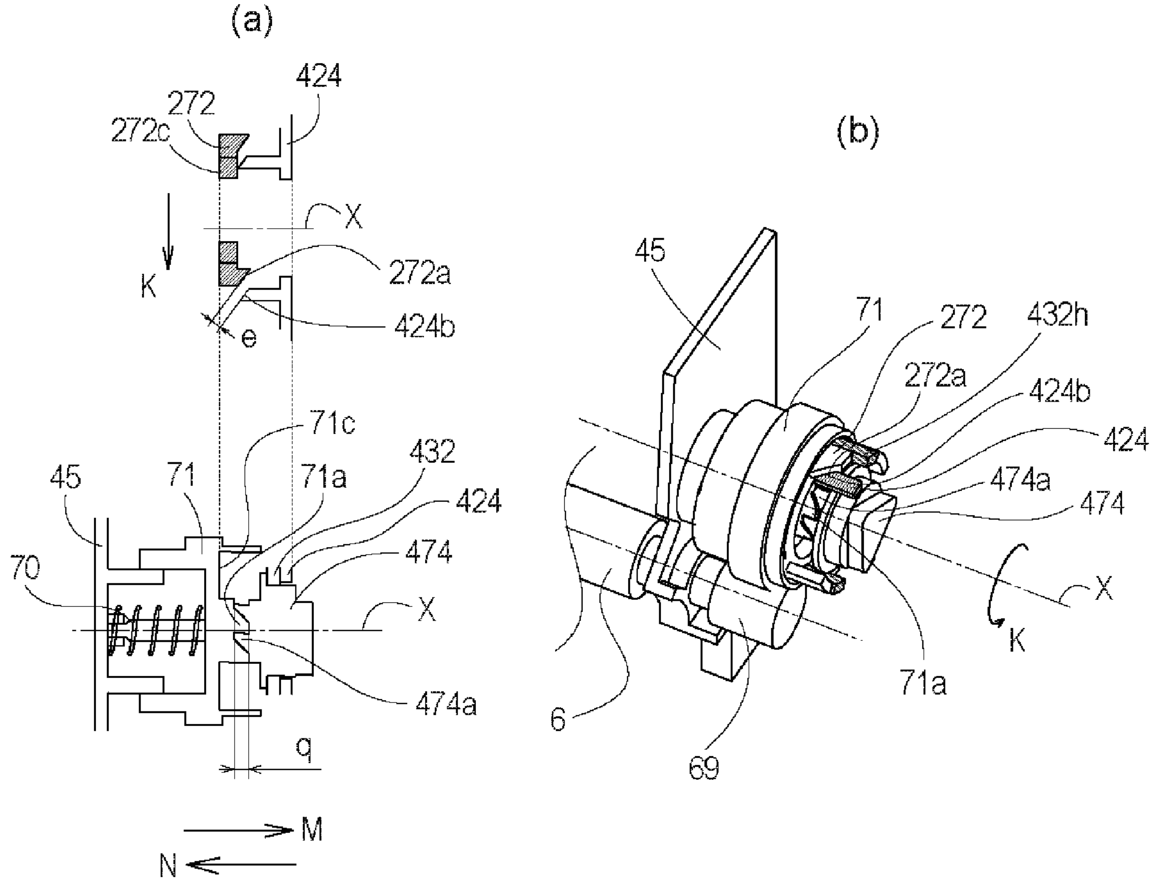
FIG. 54 is a schematic view and a perspective view of the drive connecting portion according to the fourth embodiment of the present invention.

As shown in part (a) of FIG. 7, the main assembly spacing member 80 and the force receiving portion 45*a* of the bearing member 45 are spaced by a gap d. At this time, the drum 4 and the developing roller 6 contact to each other. This state will be called "state 1" of the main assembly spacing member 80. Part (a) of FIG. 54 schematically shows the drive connecting portion at this time. As shown in FIG. 7, as seen in the direction of the axis developing roller, the force receiving portion (spacing force receiving portion) 45*a* projects in the substantially opposite side from the upstream drive transmission member 474 (rotational axis X) across the developing roller 6. Part (b) of FIG. 54 is a perspective view of the drive connecting portion. In FIG. 54, some parts are omitted for better illustration. In addition, in part (a) of FIG. 54, a pair of the upstream drive transmission member 474 and the downstream drive transmission member 71, and a pair of the disconnecting cam 272 and the driving side cartridge cover member 424 are separately shown. In part (b) of FIG. 54, only a part of the driving side cartridge cover member 424 including the contact portion 424*b* is shown, and only a part the developing device covering member 432 including the guide 432*h* is shown. Between the contact portion 272*a* of the disconnecting cam 272 and the contact portion 424*b* of the cartridge cover member 424, there is a gap e. At this time, the claws 474*a* of the upstream drive transmission member 474 and the claws 71*a* of the downstream drive transmission member 71 are engaged with each other by an engagement depth q. As described above, the downstream drive transmission member 71 is engaged with the developing roller gear 69 (FIG. 47). Therefore, the driving force inputted to the upstream drive transmission member 474 from the main assembly 2 of the apparatus is transmitted to the developing roller gear 69 through the downstream drive transmission member 71. By this, the developing roller 6 is driven. The positions of the parts at this time is called a contacting position, a development contact and drive transmission state.

[State 2]

When the main assembly spacing member 80 moves in the direction indicated by an arrow F1 by δ1 in the Figure from the development contact and drive transmission state, as shown in part (b) of FIG. 7, the developing unit 9 rotates about the rotation axis X in the direction of the arrow K by the angle θ1, as described in the foregoing. As a result, the developing roller 6 is spaced from the drum 4 by a distance ε1. The disconnecting cam 272 and the developing device covering member 432 in the developing unit 9 rotate in the direction indicated by the arrow K by an angle θ1 in interrelation with the rotation of the developing unit 9. On the other hand, when the cartridge P is mounted to the main assembly 2 of the apparatus, the drum unit 8, the driving side cartridge cover member 424 and the non-driving side cartridge cover member 25 are positioned in place in the main assembly 2 of the apparatus. As shown in part (a) of FIG. 55 and part (b) of FIG. 55, the contact portion **424*b* of the driving side cartridge cover member 424 does not move. In the Figure, the disconnecting cam 272 rotates in the direction of the arrow K in the Figure in interrelation with the rotation of the developing unit 9 the contact portion 272*a* of the disconnecting cam 272 and the contact portion 424*b* of the driving side cartridge cover member 424 start to contact to each other. At this time, the claw 474*a* of the upstream drive transmission member 474 and the claw 71*a* of the downstream drive transmission member 71 are kept engaging with each other (part (a) of FIG. 55). Therefore, the driving force inputted to the upstream drive transmission member 474 from the main assembly of the apparatus 2 is transmitted to the developing roller 6 through the downstream drive transmission member 71 and the developing roller gear 69**. The state of these parts in this state is called a developing device spacing and drive transmission state.

[State 3]

Figure 56:
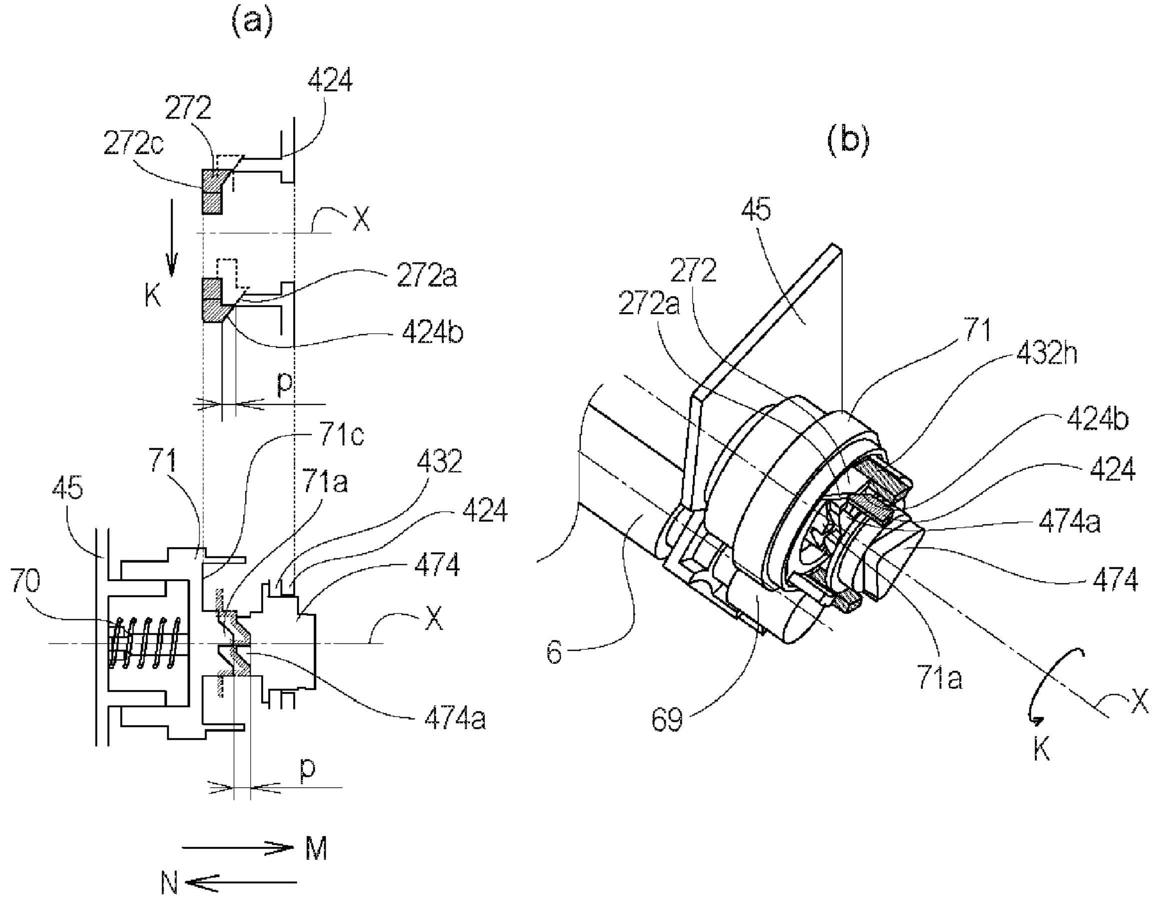
FIG. 56 is a schematic view and a perspective view of the drive connecting portion according to the fourth embodiment of the present invention.

Part (a) of FIG. 56 and part (b) of FIG. 56 show the drive connecting portion when the main assembly spacing member 80 moves from the developing device spacing and drive transmission state in the direction of the arrow F1 only δ2 in the Figure as shown in part (c) of FIG. 7. In interrelation with the rotation of the developing unit 9 by the angle θ2 (>δ1), the disconnecting cam 272 and the developing device covering member 432 rotate. On the other hand, the driving side cartridge cover member 424 does not change its position similarly to the foregoing, but the disconnecting cam 272 rotates in the direction of the arrow K in the Figure. At this time the contact portion **272*a* of the disconnecting cam 272 receives a reaction force from the contact portion 424*b* of the driving side cartridge cover member 424. In addition, as described above, the guide groove 272*h* of the disconnecting cam 272 is limited by engaging with the guide 432*h* of the developing device covering member 432 to be movable only in the axial direction (arrows M and N) (FIG. 51). As a result, the disconnecting cam 272 slides by p in the direction of the arrow N relative to the developing device covering member. In interrelation with the movement of the disconnecting cam 272 in the direction of the arrow N, an urging surface 272*c* of the disconnecting cam 272 urges an urged surface 71*c* of the downstream drive transmission member 71. By this, the downstream drive transmission member 71 slides in the direction of the arrow N by p against the urging force of the spring 70 (parts (b) FIG. 52 and FIG. 56**).

At this time, the movement distance p is larger than the engagement depth q between the claws **474*a* of the upstream drive transmission member 474 and the claws 71*a* of the downstream drive transmission member 71, and therefore, the claws 474*a* and the claws 71*a* are disengaged from each other. Then, since the upstream drive transmission member 474 receives the driving force from the main assembly 2 of the apparatus, it continues to rotate, and on the other hand, the downstream drive transmission member 71 stops. As a result, the rotation of the developing roller gear 69, and therefore, the rotation of the developing roller 6** stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 is capable of spacing from the drum 4 while rotating. As a result, the drive for the developing roller 6 can be stopped in accordance with the space distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws **474*a* of the upstream drive transmission member 474 and the claws 71*a* of the downstream drive transmission member 71 are in a disconnected state, as shown in FIG. 56**.

Figure 55:
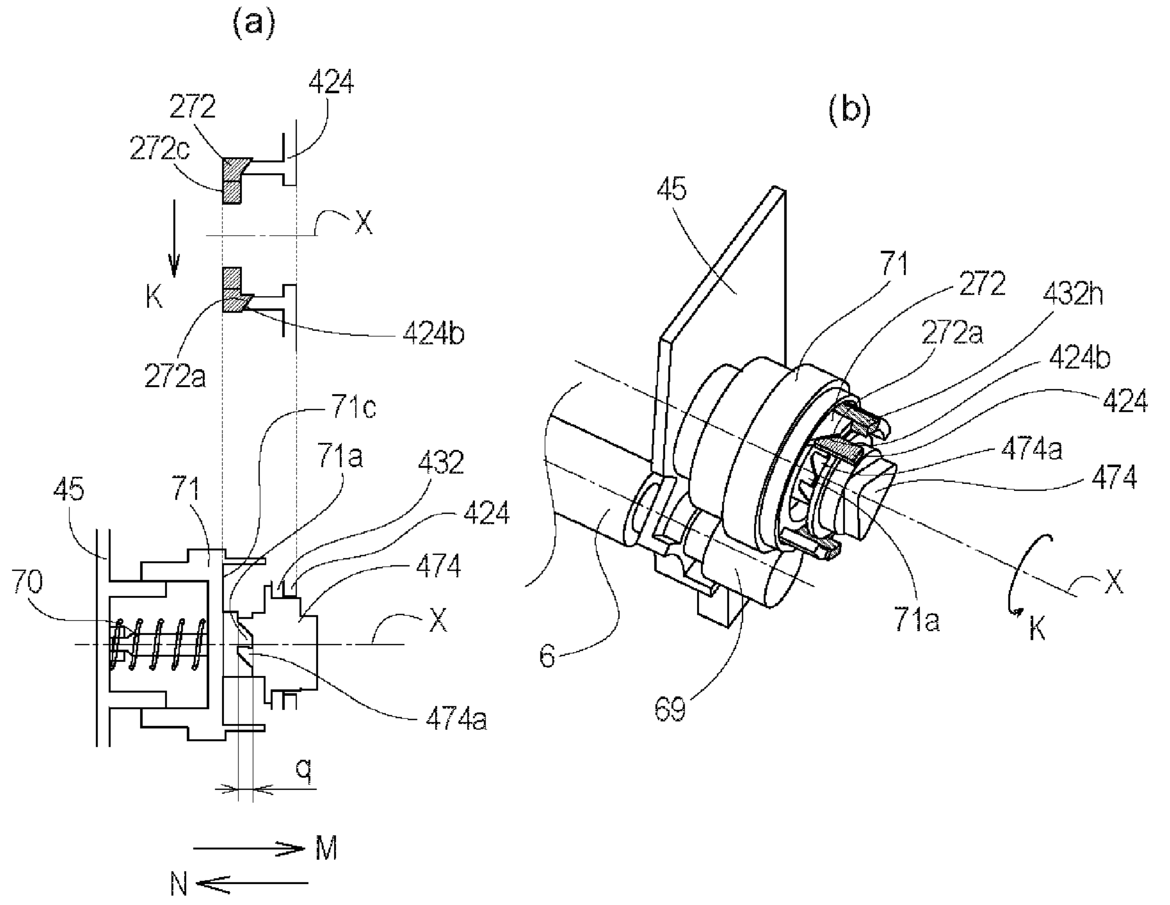
FIG. 55 is a schematic view and a perspective view of the drive connecting portion according to the fourth embodiment of the present invention.

In the angle θ1 position of the developing unit 9 (the state shown in part (b) of FIG. 7 and FIG. 55) by gradual rotation of the developing unit 9 in the direction of the arrow H shown in FIG. 7 from this state, the claws **474*a* of the upstream drive transmission member 474 and the claws 71*a* of the downstream drive transmission member 71 are engaged with each other by the downstream drive transmission member 71 moving in the direction of the arrow M by the urging force of the spring 70. By this, the driving force from the main assembly 2 is transmitted to the developing roller 6 to rotate the developing roller 6. At this time, the developing roller 6 and the drum 4** are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

As described in the foregoing, according to the structures, the drive disconnection state and the drive transmission state to the developing roller 6 are determined firmly by the rotation angle of the developing unit 9.

Embodiment 5

A cartridge according to a fifth embodiment of the invention will be described. In the description of this embodiment, the description of the structures similar to those of the foregoing embodiments will be omitted.

[Structure of the Developing Unit]

Figure 57:
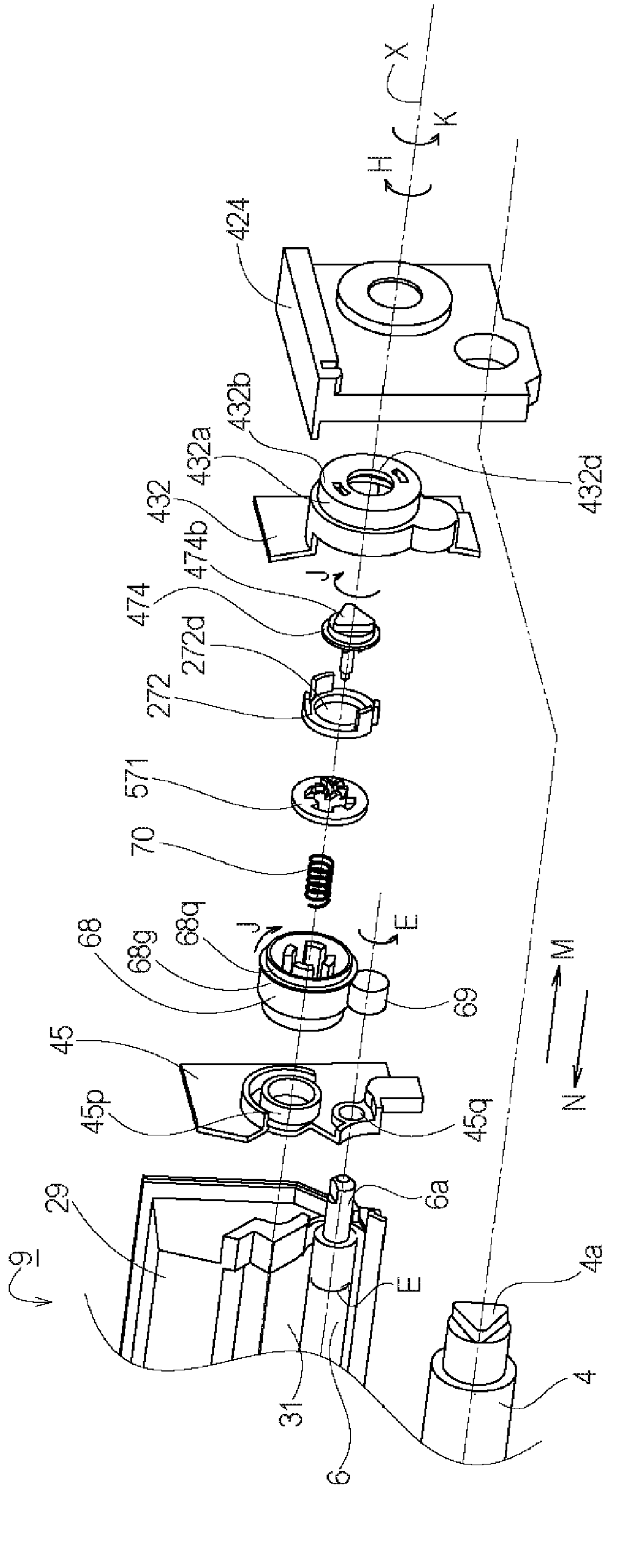
FIG. 57 is an exploded perspective view of the drive connecting portion according to a fifth embodiment of the present invention, as seen from a driving side.
Figure 58:
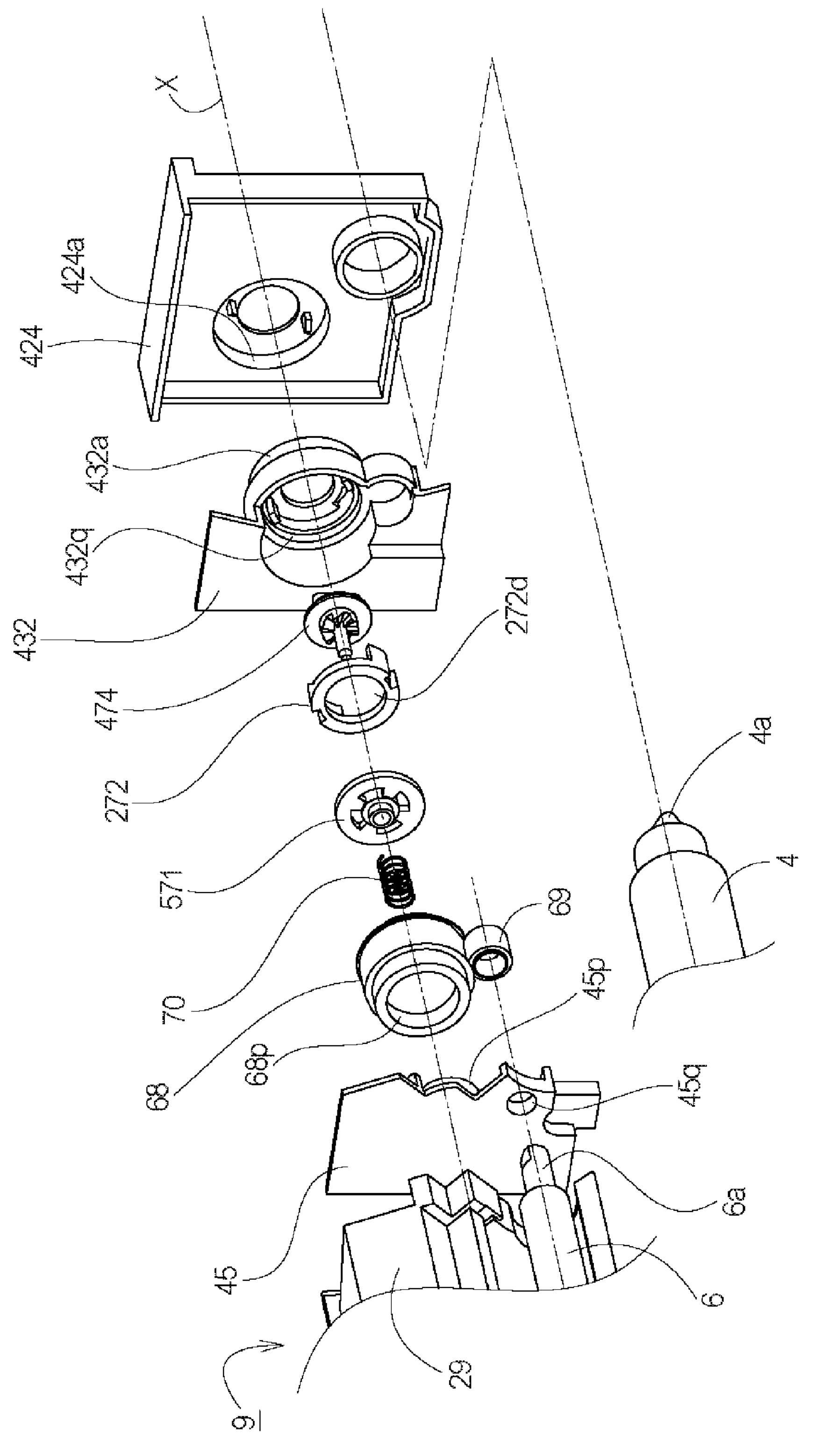
FIG. 58 is an exploded perspective view of the drive connecting portion according to the fifth embodiment of the present invention, as seen from a driven side.

As shown in FIGS. 57 and 58, the developing unit 9 comprises the developing roller 6, a developing blade 31, the developing device frame 29, a bearing member 45, a developing device covering member 432 and so on.

In addition, as shown in FIG. 57, the bearing member 45 is fixed to one longitudinal end portion of the developing device frame 29. The bearing member 45 rotatably supports the developing roller 6. The developing roller 6 is provided with a developing roller gear 69 at a longitudinal end portion. Also, the bearing member 45 rotatably supports an idler gear 68 as a third drive transmission member for transmitting the driving force to the developing roller gear 69. The idler gear 68 has a substantially cylindrical shape.

The developing device covering member 432 is fixed to an outside of the bearing member 45 with respect to the longitudinal direction of the cartridge P. The developing device covering member 432 covers the developing roller gear 69, the idler gear 68, the upstream drive transmission member 474 a first drive transmission member, and the downstream drive transmission member 571 as a second drive transmission member. Furthermore, the developing device covering member 432 is provided with a cylindrical portion 432*b*. The cylindrical portion 432*b* is provided with an inside opening 432*d* through which the drive inputting portion 474*b* of the upstream drive transmission member 474 is exposed. When the cartridge P (PY, PM, PC, PK) is mounted to the main assembly 2 of the apparatus, the drive inputting portion 474*b* engages with the developing device-drive output member 62 (62Y, 62M, 62C, 62K) shown in part (b) of FIG. 3 to transmit the driving force from the driving motor (unshown) provided in the main assembly 2 of the apparatus. That is, the upstream drive transmission member 474 functions as a development input coupling. The driving force inputted to the upstream drive transmission member 474 from the main assembly 2 of the apparatus is transmitted to the developing roller gear 69 and the developing roller 6 through the downstream drive transmission member 571 and the idler gear 68 as the third drive transmission member. The structures of a drive connecting portion will be described in detail hereinafter.

[Structure of the Drive Connecting Portion]

Referring to FIGS. 57 and 58, the structure of the drive connecting portion will be described.

The general arrangement thereof will be described, first.

Between the bearing member 45 and the driving side cartridge cover member 424, there are provided the idler gear 68, a spring 70 which is an elastic member as an urging member, the downstream drive transmission member 571 as a second coupling member, a disconnecting cam 272 as a disconnecting member which is a part of a disconnecting mechanism, the upstream drive transmission member 474 as a first coupling member, and the developing device covering member 432, in the order named, in the direction from the bearing member 45 toward the driving side cartridge cover member 424. These members are coaxial with the upstream drive transmission member 474. In this embodiment, the drive connecting portion is constituted by the idler gear 68, the spring 70, the downstream drive transmission member 571, the disconnecting cam 272, the upstream drive transmission member 474, the developing device covering member 432 and the driving side cartridge cover member 424. They will be described in detail.

The bearing member 45 rotatably supports the idler gear 68 as the rotational force transmission member. In more detail, the first shaft receiving portion 45*p* (cylindrical outer surface) of the bearing member 45 rotatably supports a supported portion 68*p* (cylindrical inner surface) of the idler gear 68 (FIGS. 57 and 58). Here, the idler gear 68 is provided with a gear portion 68 *g* at an outer periphery portion thereof.

The bearing member 45 rotatably supports the developing roller 6. In more detail, the second shaft receiving portion 45*q* (cylindrical inner surface) of the bearing member 45 rotatably supports a shaft portion 6*a* of the developing roller 6.

The shaft portion 6*a* of the developing roller 6 is fitted into the developing roller gear 69. By doing so, the rotational force is transmitted to the developing roller 6 through the developing roller gear 69 from the idler gear 68.

Figure 59:
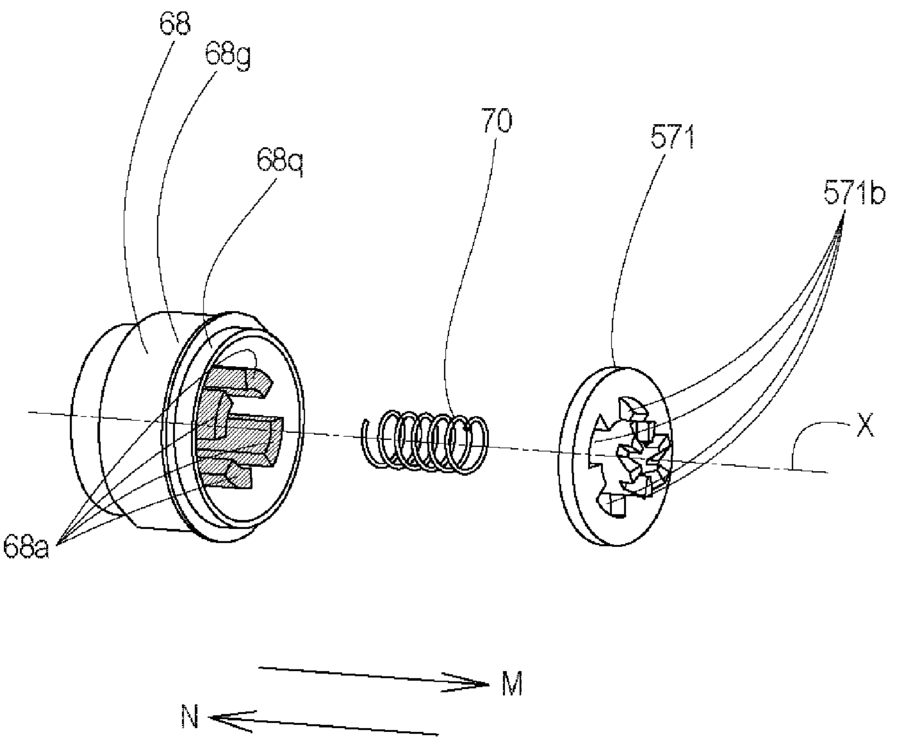
FIG. 59 is a perspective view of a second coupling member and peripheral parts thereof according to the fifth embodiment of the present invention.
Figure 59:
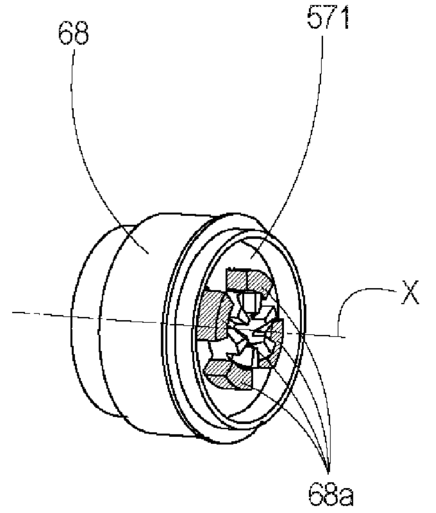

FIG. 59 shows the structures of the idler gear 68, the spring 70 and the downstream drive transmission member 571. Part (b) of FIG. 59 shows a state in which the parts are assembled.

The idler gear 68 has a substantially cylindrical shape and is provided with a guide 68*a* as a first guide portion therein. The guide portion 68*a* is in the form of a shaft portion extending substantial in parallel with the rotational axis X. On the other hand, the downstream drive transmission member 571 is provided with a hole portion 571*b* as a first guided portion. In a state that the guide 68*a* is in engagement with the hole portion 571*b*, the downstream drive transmission member 571 is movable along the rotational center X. In other words, the idler gear 68 holds therein the downstream drive transmission member 571 slidably along the rotational axis. Further in other words, the downstream drive transmission member 571 is slidable in the directions of arrows M and N relative to the idler gear 68.

Here, the guide portion 68*a* receives the rotational force for rotating the developing roller 6 from the hole portion 571*b*.

In this embodiment, the guide 68*a* is provided at each of four positions 90 degrees away from adjacent ones about the rotational center X, and extends in parallel with the rotational center X. Correspondingly, the hole portion 571*b* is provided at each of four positions 90 degrees away from adjacent ones about the rotational center X. The numbers of the guide 68*a* and the hole portion 571*b* are not limited to four. It is preferable that the numbers of the guides 68*a* and the hole portions 571*b* are plural and that they are disposed equidistantly along a circumference about the axis X. In this case, a resultant force of the forces applied in the guides 68*a* or the hole portions 571*b* produces a moment of rotating the downstream drive transmission member 571 and the idler gear 68 about the axis X. Then, tilting of the downstream drive transmission member 571 and the idler gear 68 relative to the axis X can be suppressed.

In addition, between the idler gear 68 and the downstream drive transmission member 571, the spring 70 which is the elastic member as the urging member is provided. To state shown in part (b) of FIG. 59, the spring 70 is provided inside the idler gear 68 to urge the downstream drive transmission member 571 in the direction of the arrow M. That is, the downstream drive transmission member 571 is movable into the idler gear 68 against the elastic force of the spring 70.

The downstream drive transmission member 571 is disconnected from the upstream drive transmission member 474 by moving into the idler gear 68.

Figure 60:
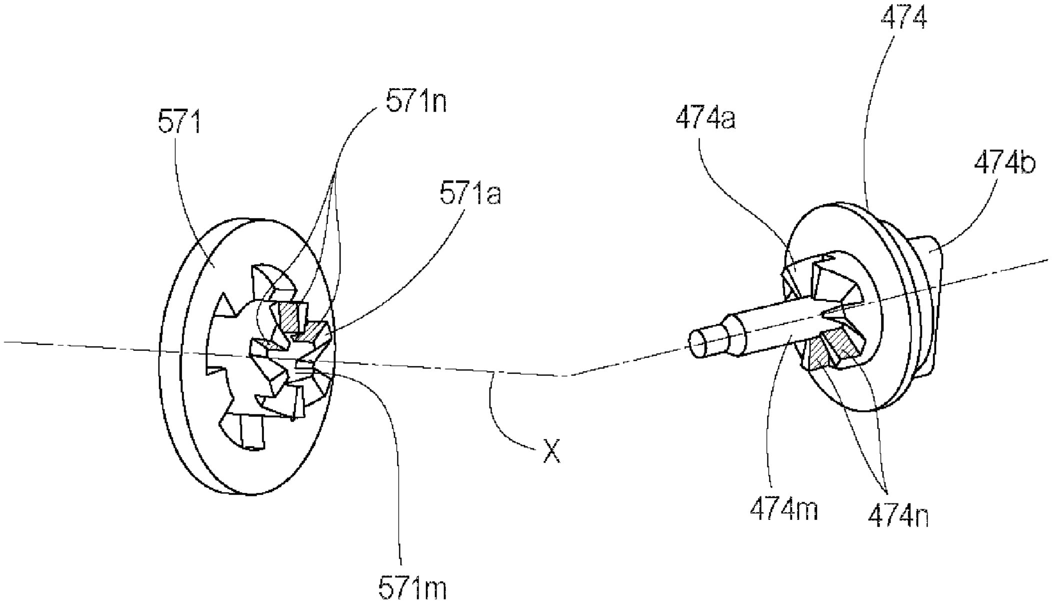
FIG. 60 is a perspective view of first and second coupling members according to the fifth embodiment of the present invention.

FIG. 60 shows structures of the upstream drive transmission member 474 as the first coupling member and the downstream drive transmission member 571 as the second coupling member. In FIG. 60, the disconnecting cam 272 between the upstream drive transmission member 474 and the downstream drive transmission member 571 is omitted.

The downstream drive transmission member 571 is provided with a claw portion 571*a* as an engaging portion, and the upstream drive transmission member 474 is provided with a claw portion 474*a* as an engaging portion. The claw portion 571*a* and the claw portion 474*a* are engageable with each other. In this embodiment, the claw portion 571*a* and the claw portion 474*a* each have six claws.

The upstream drive transmission member 474 is provided with the drive inputting portion 474*b* engageable with the developing device-drive output member 62 shown in part (b) of FIG. 3 from the main assembly 2 of the apparatus. The drive inputting portion 474*b* has a substantially triangular prism twisted by a small angle.

The downstream drive transmission member 571 is provided with a hole portion 571*m* as an engaging portion at a center portion. The hole portion 571*m* is engaged with a small diameter cylindrical portion 474*m* as an engaging portion of the upstream drive transmission member 474. By doing so, the downstream drive transmission member 571 is supported slidably relative to the upstream drive transmission member 474 (rotatable and slidable along the axes).

Here, as shown in FIGS. 57 and 58, the disconnecting cam 272 is disposed between the downstream drive transmission member 571 and the upstream drive transmission member 474. Similarly to the first embodiment, the disconnecting cam 272 is slidable only in the axial direction relative to the developing device covering member 432 (directions of the arrows M and N) (FIG. 51).

Figure 61:
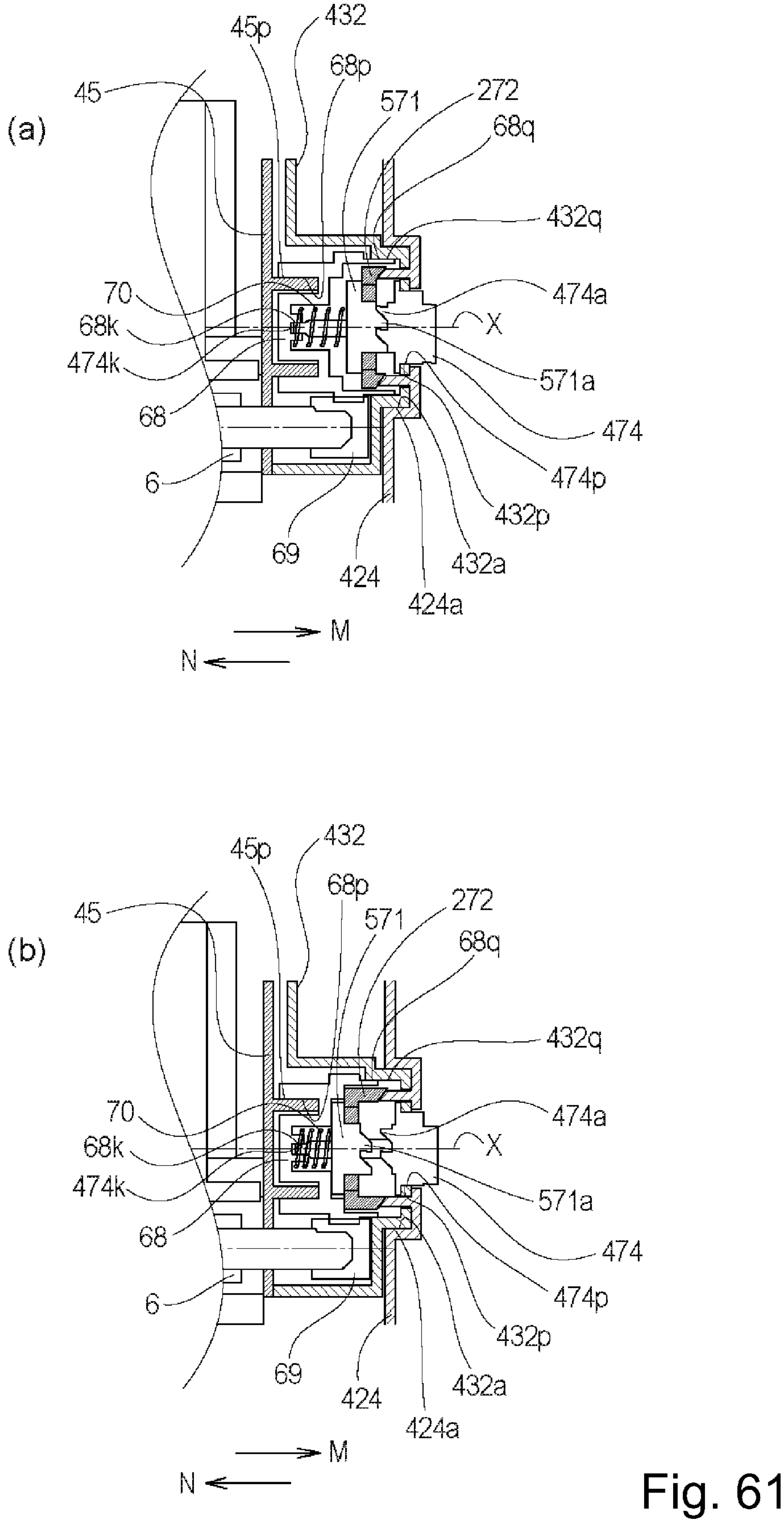
FIG. 61 is a sectional view of a drive connecting portion according to the fifth embodiment of the present invention.

FIG. 61 is a sectional view of the drive connecting portion.

As described above, the cylindrical portion 68*p* of the idler gear 68 and the first shaft receiving portion 45*p* (cylindrical outer surface) of the bearing 45 are engaged with each other. In addition, the cylindrical portion 68*q* of the idler gear 68 and the inside circumference 432*q* of the developing device covering member 432 are engaged with each other. That is, the idler gear 68 is rotatably supported at the opposite end portions by the bearing member 45 and the developing device covering member 432.

By the engagement between the cylindrical portion 474*p* of the upstream drive transmission member 474 and the hole portion 432*p* of the developing device covering member 432, the upstream drive transmission member 474 is slidably supported relative to the developing device covering member 432 (slidable along the axis of the developing roller).

The first shaft receiving portion 45*p* (cylindrical outer surface) of the bearing member 45, the inside circumference 432*q* of the developing device covering member 432 and the hole portion 432*p* are aligned with the rotational center X of the developing unit 9. That is, the upstream drive transmission member 474 is supported rotatably about the rotational center X of the developing unit 9. As described above, the cylindrical portion 474*m* of the upstream drive transmission member 474 and the hole portion 571*m* of the downstream drive transmission member 571 are engaged with each other rotatably and slidably along the rotation axis X (FIG. 60). By doing so, as a result, the downstream drive transmission member 571 is also supported rotatably about the rotational center X of the developing unit 9.

In the sectional view of the drive connecting portion shown in part (a) of FIG. 61, the claws 571*a* as the coupling portion of the downstream drive transmission member 571 and the claws 474*a* as the coupling portion of the upstream drive transmission member 474 are engaged with each other. Part (b) of FIG. 61 is a sectional view of the drive connecting portion in which the claws 571*a* of the downstream drive transmission member 571 and the claws 474*a* of the upstream drive transmission member 474 are spaced from each other.

[Drive Disconnecting Operation]

The operation of the drive connecting portion at the time of change from the contact state to the spaced state between the developing roller 6 and the drum 4 will be described.

[State 1]

Figure 62:
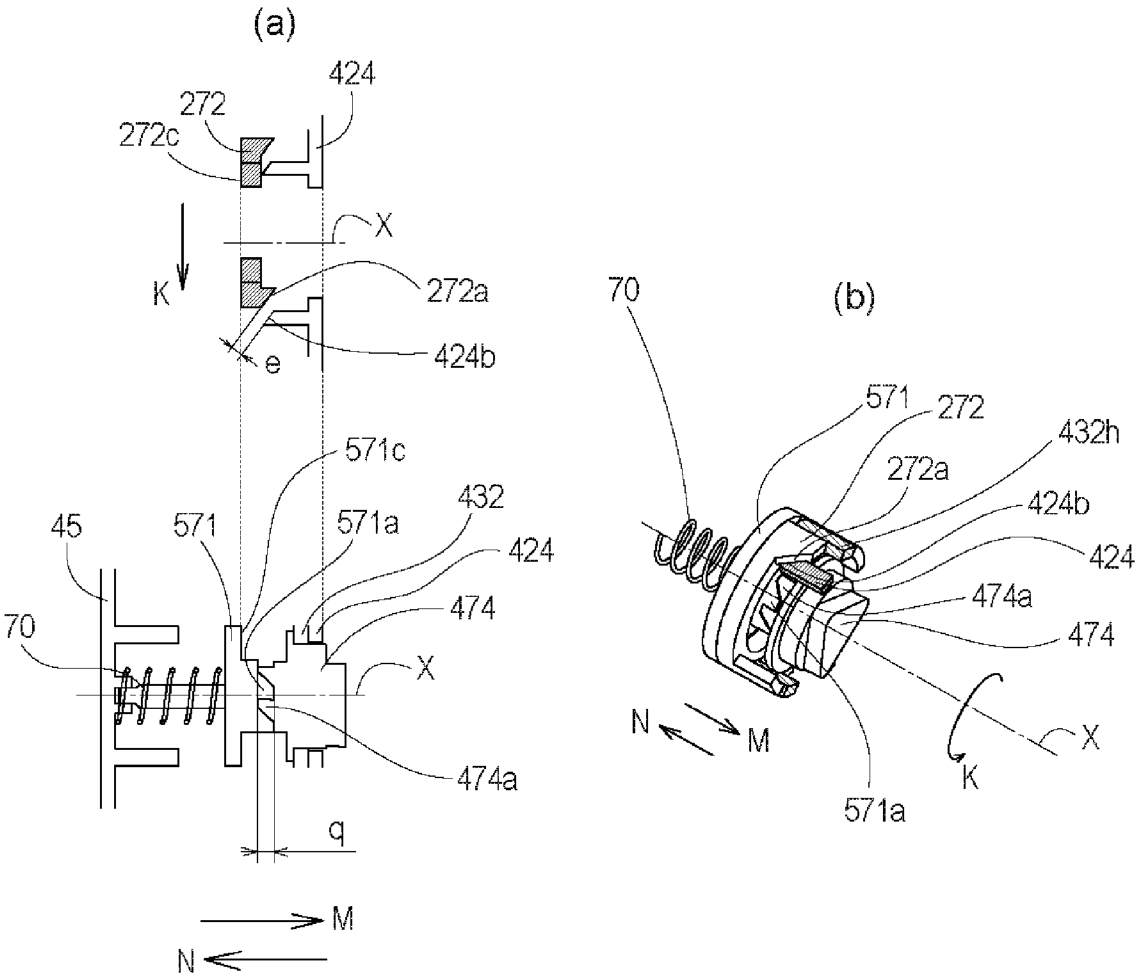
FIG. 62 is a schematic view and a perspective view of the drive connecting portion according to the fifth embodiment of the present invention.

As shown in part (a) of FIG. 7, the main assembly spacing member 80 and the force receiving portion 45*a* of the bearing member 45 are spaced by a gap d. At this time, the drum 4 and the developing roller 6 contact to each other. This state will be called "state 1" of the main assembly spacing member 80. Part (a) of FIG. 62 schematically shows the drive connecting portion at this time. Part (b) of FIG. 62 is a perspective view of the drive connecting portion. In FIG. 62, some parts are omitted for better illustration. In addition, in part (a) of FIG. 62, a pair of the upstream drive transmission member 474 and the downstream drive transmission member 571, and a pair of the disconnecting cam 272 and the driving side cartridge cover member 424 are separately shown. In part (b) of FIG. 62, only a part of the driving side cartridge cover member 424 including the contact portion 424*b* is shown, and only a part the developing device covering member 432 including the guide 432*h* is shown. Between the contact portion 272*a* of the disconnecting cam 272 and contact portion 424*b* as the operating portion of the driving side cartridge cover member 424, there is a gap e. At this time, the claws 474*a* of the upstream drive transmission member 474 and the claws 571*a* of the downstream drive transmission member 571 are engaged with each other by an engagement depth q. In addition, as described above, the downstream drive transmission member 571 engages with the idler gear 68 (FIG. 59). Therefore, the driving force inputted to the upstream drive transmission member 474 from the main assembly of the apparatus 2 is transmitted to the idler gear 68 and developing roller gear 69 through the downstream drive transmission member 571. By this, the developing roller 6 is driven. The positions of the parts at this time is called a contacting position, a development contact and drive transmission state.

[State 2]

When the main assembly spacing member 80 moves in the direction indicated by an arrow F1 by δ1 in the Figure from the development contact and drive transmission state, as shown in part (b) of FIG. 7, the developing unit 9 rotates about the rotation axis X in the direction of an arrow K by an angle θ1. As a result, the developing roller 6 is spaced from the drum 4 by a distance ε1. The disconnecting cam 272 and the developing device covering member 432 in the developing unit 9 rotate in the direction indicated by the arrow K by an angle θ1 in interrelation with the rotation of the developing unit 9. On the other hand, when the cartridge P is mounted to the main assembly 2 of the apparatus, the drum unit 8, the driving side cartridge cover member 424 and the non-driving side cartridge cover member 25 are positioned in place in the main assembly 2 of the apparatus. As shown in part (a) of FIG. 63 and part (b) of FIG. 63, the contact portion 424*b* of the driving side cartridge cover member 424 does not move. In the Figure, the disconnecting cam 272 rotates in the direction of the arrow K in the Figure in interrelation with the rotation of the developing unit 9 the contact portion 272*a* of the disconnecting cam 272 and the contact portion 424*b* of the driving side cartridge cover member 424 start to contact to each other. At this time, the claw 474*a* of the upstream drive transmission member 474 and the claw 571*a* of the downstream drive transmission member 571 are kept engaging with each other (part (a) of FIG. 63). Therefore, the driving force inputted to the upstream drive transmission member 474 from the main assembly 2 of the apparatus is transmitted to the developing roller 6 through the downstream drive transmission member 571, the idler gear 68 and the developing roller gear 69. The state of these parts in this state is called a developing device spacing and drive transmission state.

[State 3]

Figure 64:
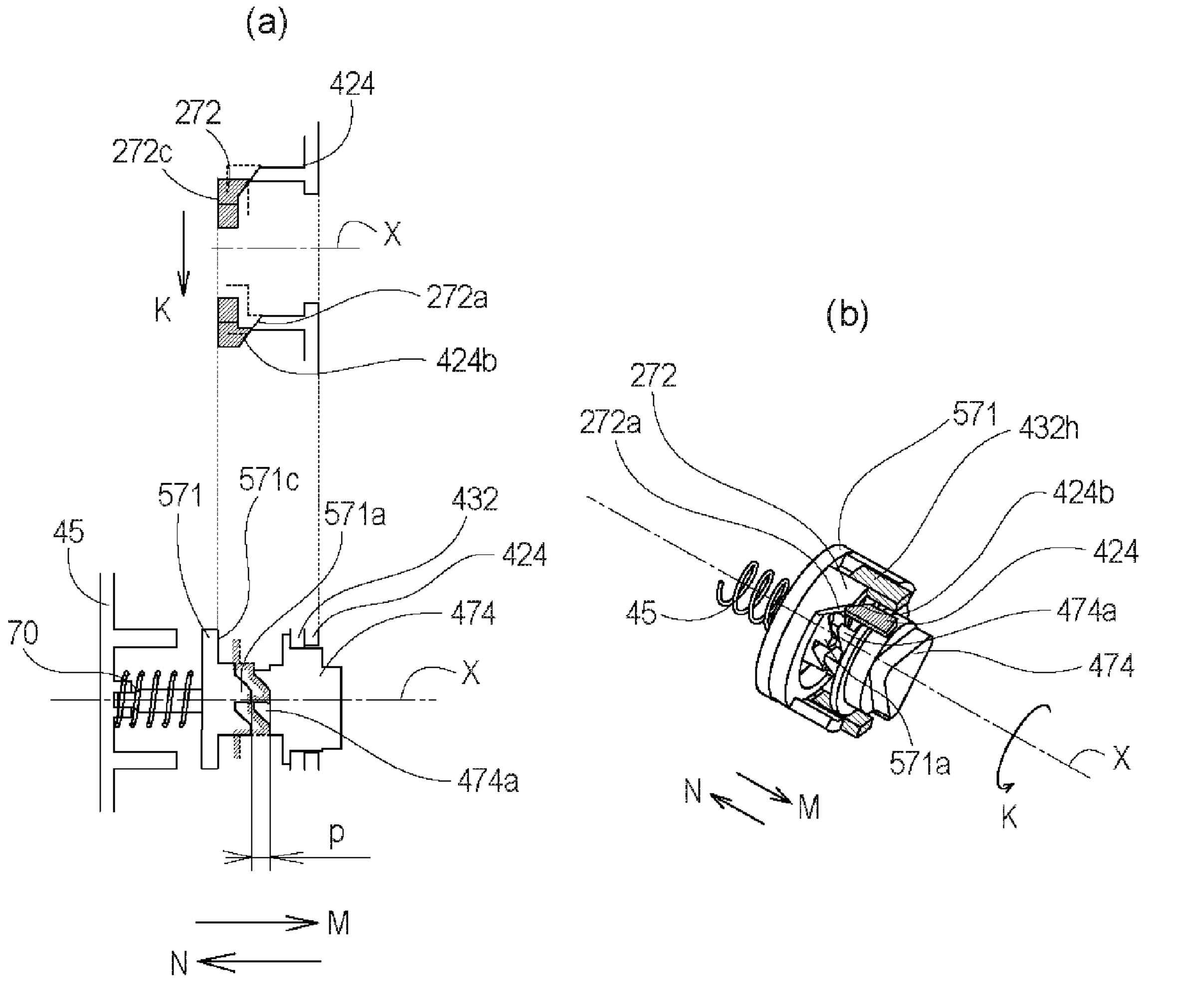
FIG. 64 is a schematic view and a pespsectional view of the drive connecting portion according to a fifth embodiment of the present invention.

Part (a) of FIG. 64 and part (b) of FIG. 64 show the drive connecting portion when the main assembly spacing member 80 moves from the developing device spacing and drive transmission state in the direction of the arrow F1 only δ2 in the Figure as shown in part (c) of FIG. 7. In interrelation with the rotation of the developing unit 9 by the angle θ2 (>θ1), the disconnecting cam 272 and the developing device covering member 432 rotate. On the other hand, the driving side cartridge cover member 424 does not change its position similarly to the foregoing, but the disconnecting cam 272 rotates in the direction of the arrow K in the Figure. At this time the contact portion 272*a* of the disconnecting cam 272 receives a reaction force from the contact portion 424*b* of the driving side cartridge cover member 424. In addition, as described above, the guide groove 272*h* of the disconnecting cam 272 is limited by engaging with the guide 432*h* of the developing device covering member 432 to be movable only in the axial direction (arrows M and N) (FIG. 51). Therefore, as a result, the disconnecting cam 272 slides in the direction of the arrow N by a movement distance p. In interrelation with the movement of the disconnecting cam 272 in the direction of the arrow N, an urging surface 272*c* of the disconnecting cam 272 urges an urged surface 571*c* of the downstream drive transmission member 571. By this, the downstream drive transmission member 571 slides in the direction of the arrow N by p against the urging force of the spring 70 (FIG. 64 and parts (b) of FIG. 61).

At this time, the movement distance p is larger than the engagement depth q between the claws 474*a* of the upstream drive transmission member 474 and the claws 571*a* of the downstream drive transmission member 571, and therefore, the claws 474*a* and the claws 571*a* are disengaged from each other. Then, since the upstream drive transmission member 474 receives the driving force from the main assembly 2 of the apparatus, it continues to rotate, and on the other hand, the downstream drive transmission member 571 stops. As a result, the rotations of the idler gear 68, the developing roller gear 69 and the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 can space from the drum 4 while rotating, so that the drive to the developing roller 6 can be stopped in accordance with the spacing distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 474*a* of the upstream drive transmission member 474 and the claws 571*a* of the downstream drive transmission member 571 are in a disconnected state, as shown in FIG. 64.

Figure 63:
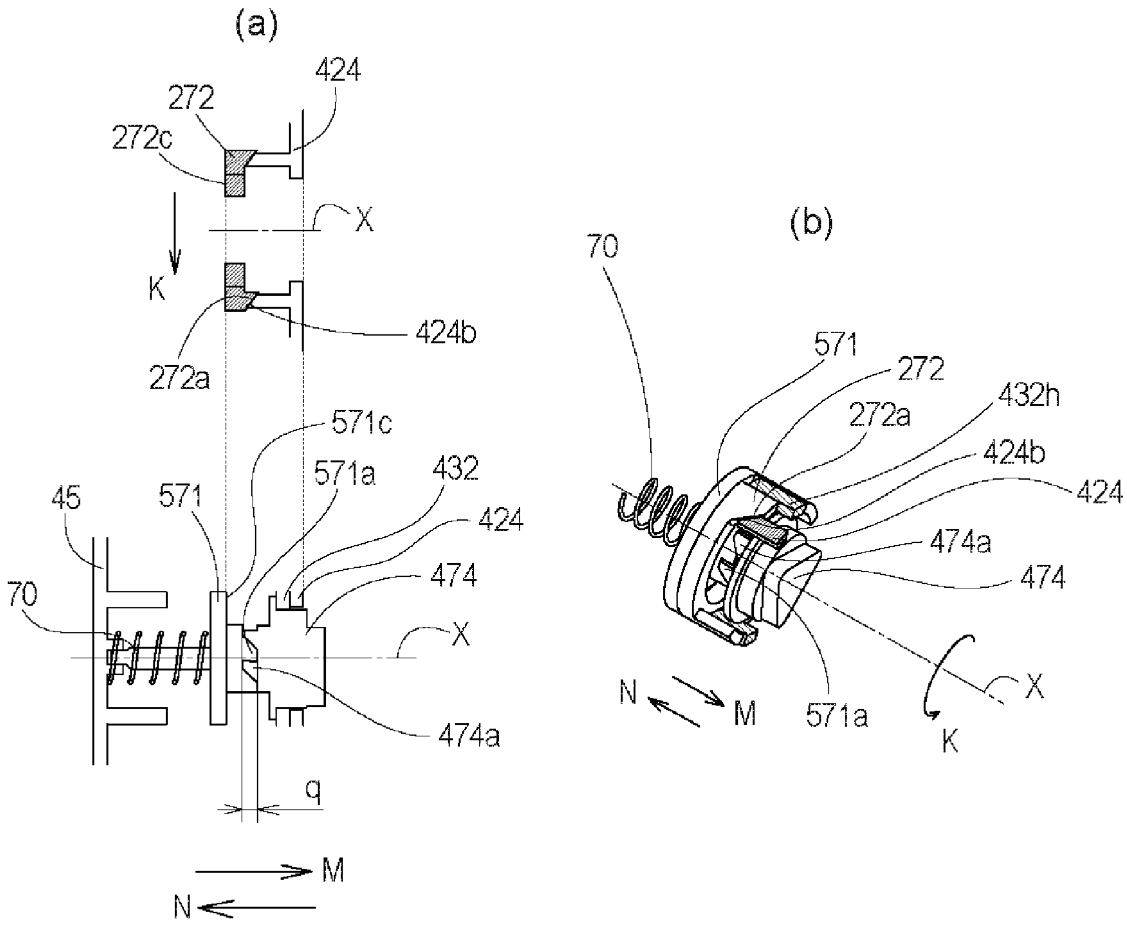
FIG. 63 is a schematic view and a perspective view of the drive connecting portion according to the fifth embodiment of the present invention.

In the angle θ1 position of the developing unit 9 (the state shown in part (b) of FIG. 7 and FIG. 63) by gradual rotation of the developing unit 9 in the direction of the arrow H shown in FIG. 7 from this state, the claws 474*a* of the upstream drive transmission member 474 and the claws 571*a* of the downstream drive transmission member 571 are engaged with each other by the downstream drive transmission member 571 moving in the direction of the arrow M by the urging force of the spring 70. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

Particularly in the case of this embodiment, when the switching between the drive disconnection and the drive transmission to the developing roller 6 is effected, it is unnecessary to move the idler gear 68 relative to the developing roller gear 69 in the axial direction. If the gears are helical gears, a thrust force (force in the axial direction) is produced in the gear drive transmitting portion. Therefore, in the case of the first embodiment, in order to move the idler gear 68 as the second coupling member in the axial direction (arrow M or N), a force against the thrust force is required.

On the other hand, in the case of this embodiment, the downstream drive transmission member 571 engages with the guide 68*a* of the idler gear 68 to move in the axial direction. Therefore, the force required when the downstream drive transmission member 571 as the second coupling member is moved in the axial direction can be made smaller.

Figure 65:
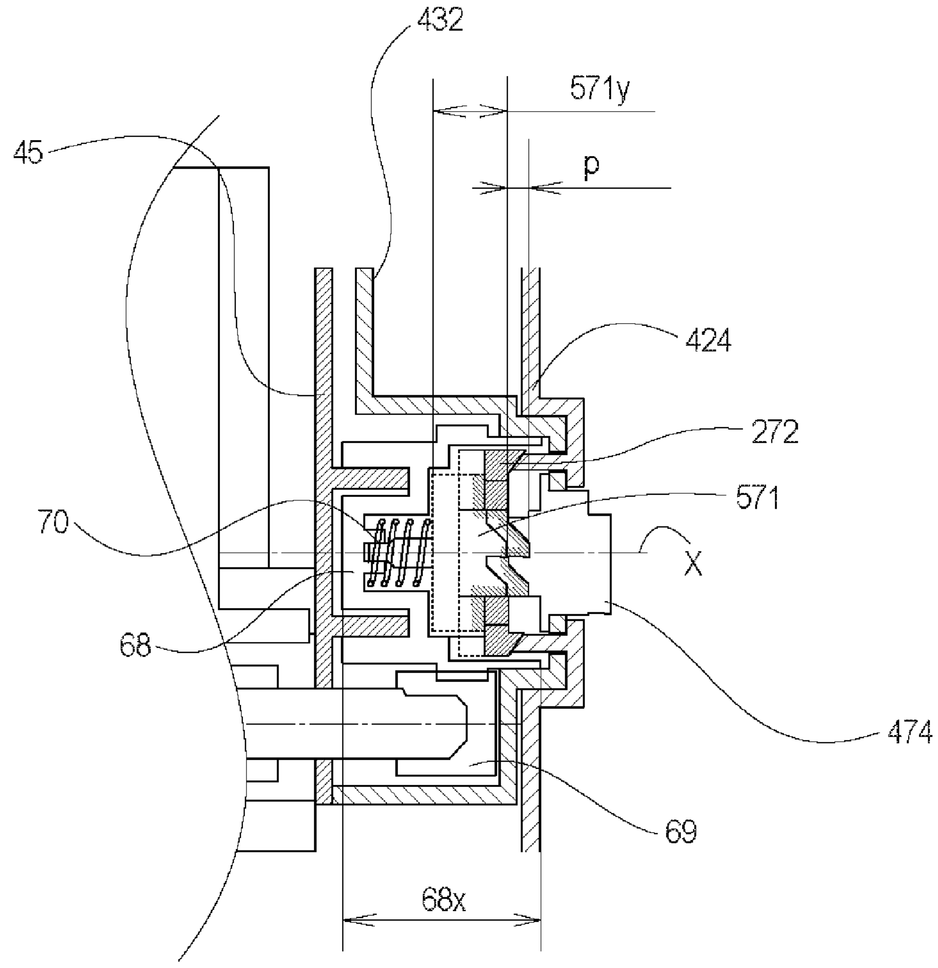
FIG. 65 is a sectional view of a drive connecting portion according to the fifth embodiment of the present invention.

Furthermore, if the downstream drive transmission member 571 can be disposed in the inside circumference of the idler gear 68, the longitudinal size of the entire developing unit 9 can be reduced. FIG. 65 is a sectional view of the drive connecting portion of this embodiment. In the axial direction, a width 571*y* of the downstream drive transmission member 571, a movement space p of the downstream drive transmission member 571 and a width 68*x* of the idler gear 68 are required. The width 571*y* of the downstream drive transmission member 571 and the entirety or a part of the movement space p can be overlapped with the inside of the width 68*x* of the idler gear 68, by which the longitudinal size of the entire developing unit 9 can be reduced.

Embodiment 6

A cartridge according to a sixth embodiment of the invention will be described. In the description of this embodiment, the description of the structures similar to those of the foregoing embodiments will be omitted.

[Structure of the Drive Connecting Portion]

Figure 66:
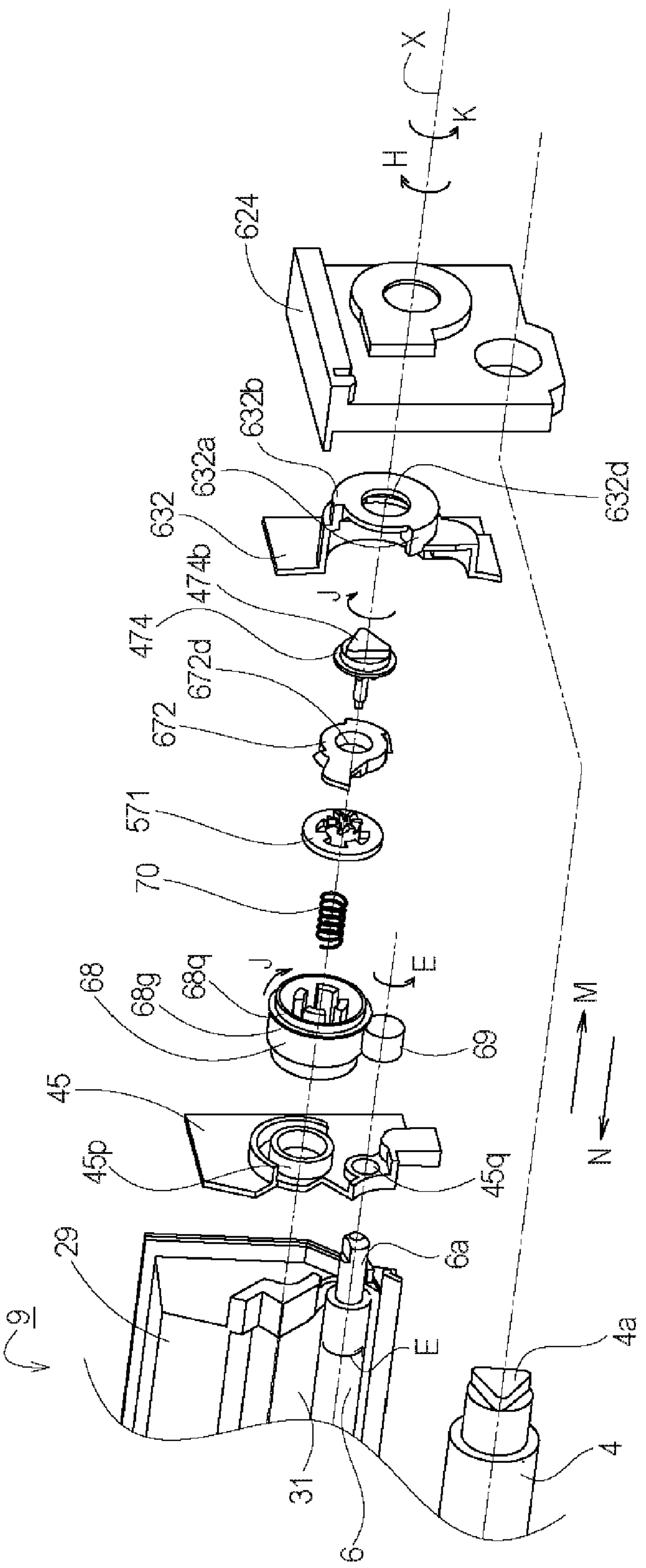
FIG. 66 is an exploded perspective view of a drive connecting portion according to a sixth embodiment of the present invention, as seen from a driving side.
Figure 67:
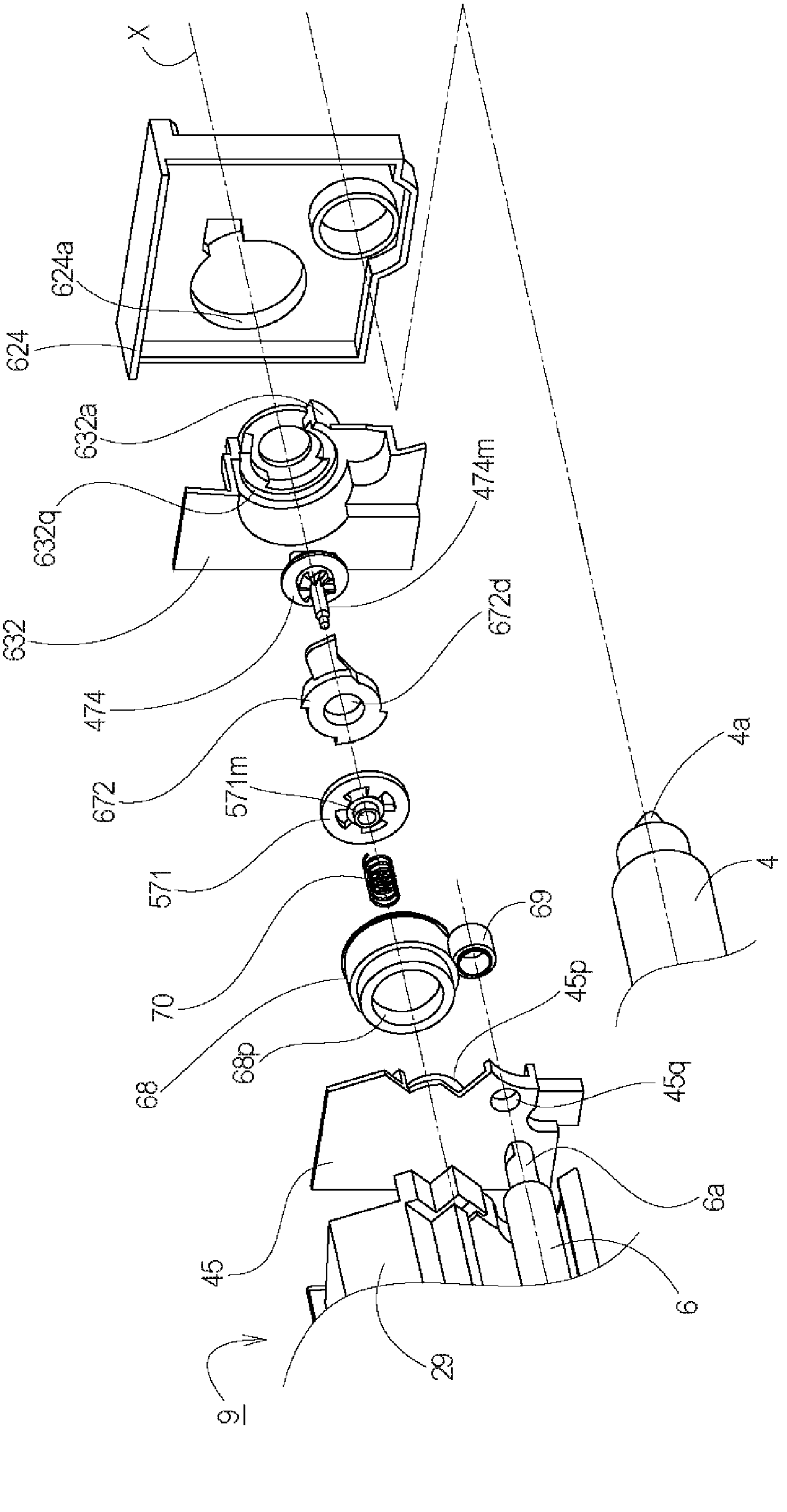
FIG. 67 is an exploded perspective view of the drive connecting portion according to the sixth embodiment of the present invention, as seen from a non-driving side.

Referring to FIGS. 66 and 67, the structure of the drive connecting portion will be described.

The general arrangement thereof will be described, first.

Between the bearing member 45 and the driving side cartridge cover member 624, there are provided, in the order named in the direction from the bearing member 45 toward the driving side cartridge cover member 624, an idler gear 68 as a third drive transmission member, a spring 70 which is an elastic member as an urging member, a downstream drive transmission member 571 as a second coupling member, a disconnecting cam 672 as an operating member which is a coupling releasing member and which is a part of a disconnecting mechanism, an upstream drive transmission member 474 as a first coupling member, and a developing device covering member 632. These members are coaxial with the upstream drive transmission member 474. In this embodiment, the drive connecting portion is constituted by the idler gear 68, the spring 70, the downstream drive transmission member 571, the disconnecting cam 672, the upstream drive transmission member 474, the developing device covering member 632 and the driving side cartridge cover member 624.

Figure 68:
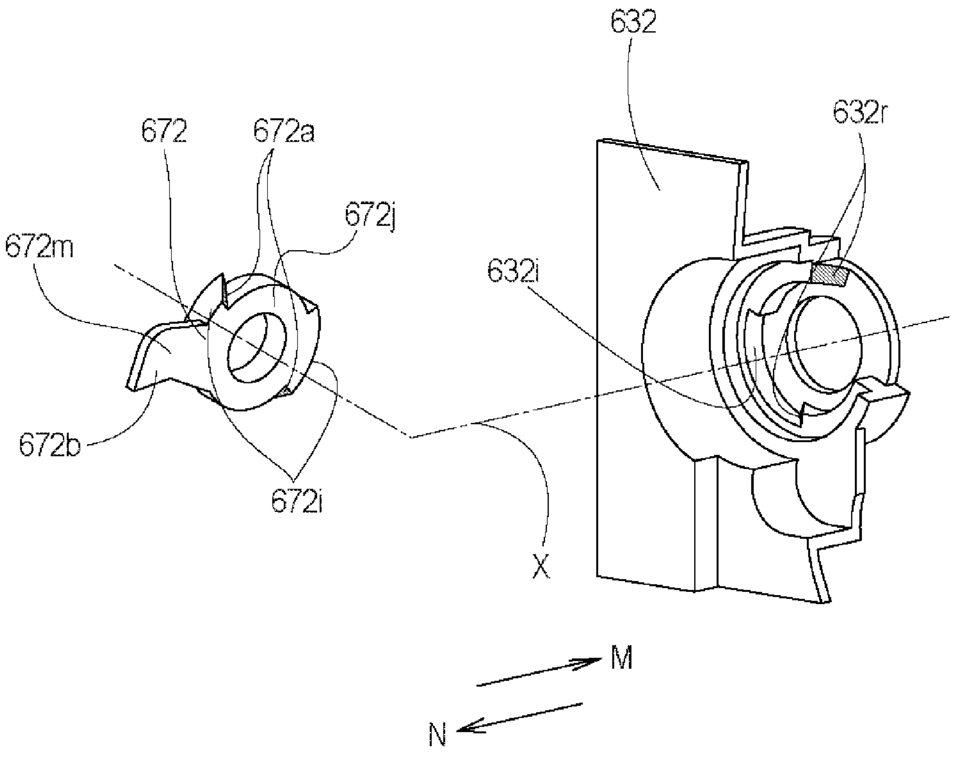
FIG. 68 is a perspective view of a releasing member and peripheral parts thereof according to the sixth embodiment of the present invention.

FIG. 68 shows a relationship between the disconnecting cam 672 and the developing device covering member 632. In FIG. 68, the upstream drive transmission member 474 disposed between the disconnecting cam 672 and the developing device covering member 632 is omitted. The disconnecting cam 672 is provided with a ring portion 672*j* having a substantially ring configuration. The ring portion 672*j* is provided with an outer peripheral surface 672*i* as a second guided portion, and the developing device covering member 632 is provided with an inner peripheral surface 632*i* as a part of a second guide portion. The inner peripheral surface 632*i* is engageable with the outer peripheral surface 672*i*. In addition, the outer peripheral surface 672*i* of the disconnecting cam 672 and the inner peripheral surface 632*i* of the developing device covering member 632 are co-axial with the rotational center X. That is, the disconnecting cam 672 is supported slidably in the axial direction relative to the developing device covering member 632 and developing unit 9 and rotatably in the rotational moving direction about the axis X.

In addition, the ring portion 672*j* of the disconnecting cam 672 as the coupling releasing member is provided with a contact portion (inclined surface) 672*a* as a force receiving portion. The developing device covering member 632 is provided with a contact portion (inclined surface) 632*r*. Here, a contact portion 672*a* of the disconnecting cam 672 and a contact portion 632*r* of the developing device covering member 632 are contactable to each other.

Figure 69:
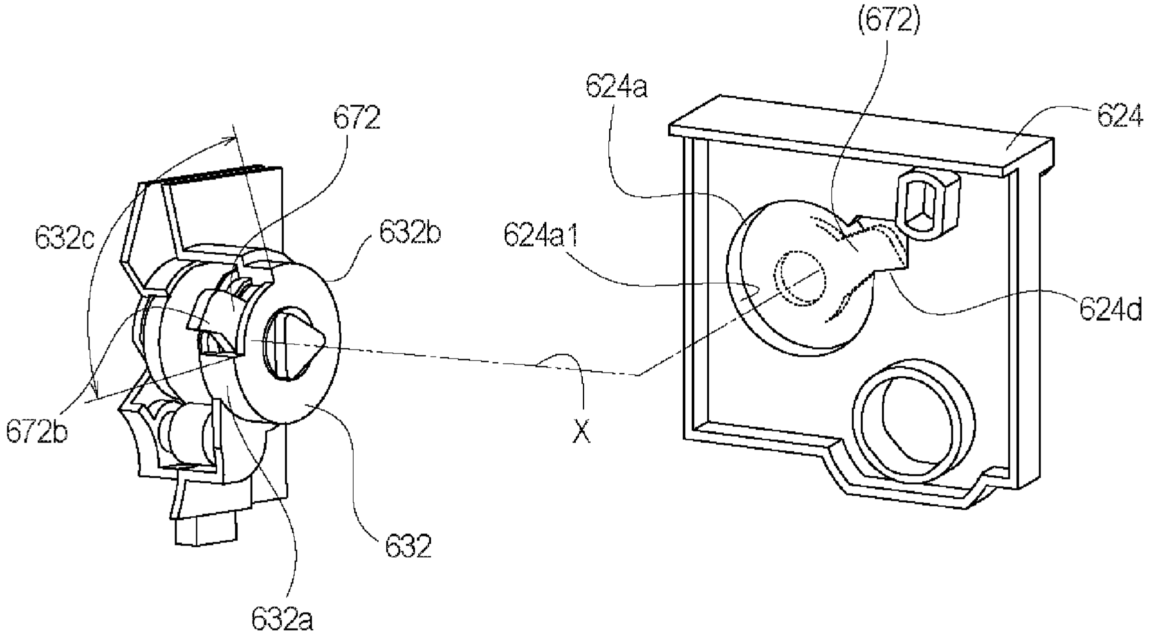
FIG. 69 is a perspective view of the drive connecting portion according to the sixth embodiment of the present invention.

FIG. 69 shows structures of the drive connecting portion and the driving side cartridge cover member 624. The disconnecting cam 672 includes a projected portion 672*m* projected from the ring portion 672*j*. The projected portion has a force receiving portion 672*b* as the second guided portion. The force receiving portion 672*b* receives a force from the driving side cartridge cover member 624 by the engagement with a regulating portion 624*d* as a part of the second guide portion of the driving side cartridge cover member 624. The force receiving portion 672*b* projects through an opening 632*c* provided in a part of a cylindrical portion 632*b* of the developing device covering member 632 to be engageable with the regulating portion 624*d* of the driving side cartridge cover member 624. By the engagement between the regulating portion 624*d* and the force receiving portion 672*b*, the disconnecting cam 672 is slidable only in the axial direction (arrows M and N) relative to the driving side cartridge cover member 624. Similarly to the first and second embodiments, an outside circumference 632*a* of the cylindrical portion 632*b* of the developing device covering member 632 slides on a sliding portion 624*a* (cylindrical inner surface) of the driving side cartridge cover member 624. That is, the outside circumference 632*a* is rotatably connected with the sliding portion 624*a*.

Figure 70:
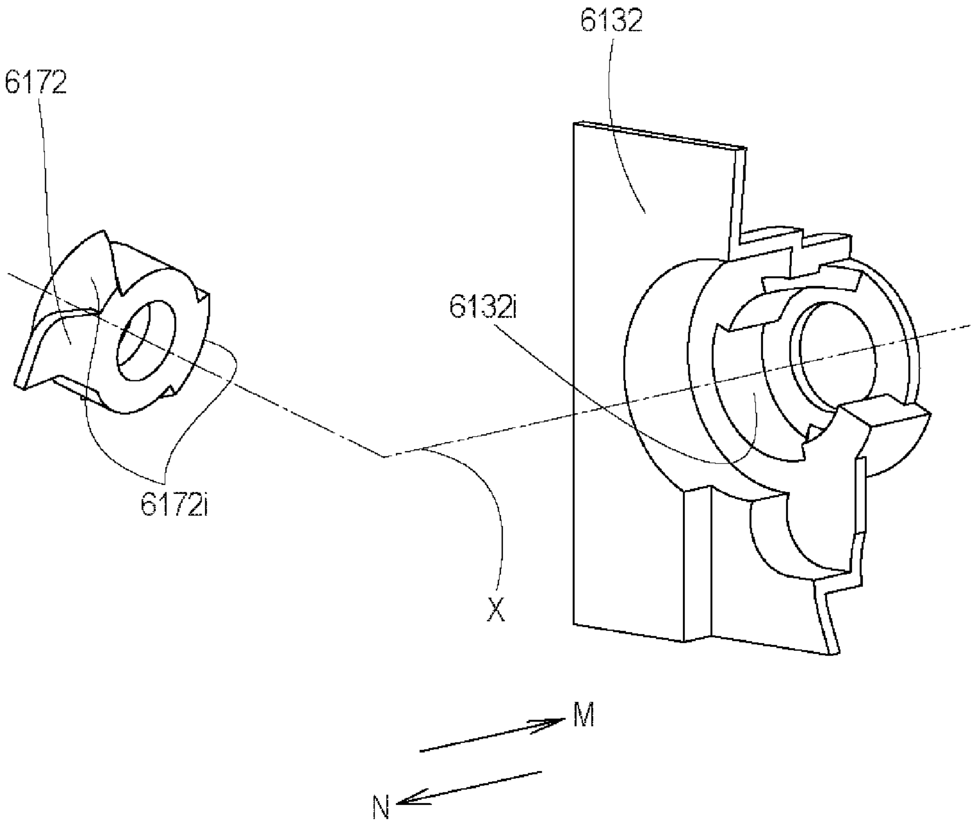
FIG. 70 is a perspective view of disconnecting cam and developing device covering member according to the sixth embodiment of the present invention.

In a drive switching operation which will be described hereinafter, when the disconnecting cam 672 slides in the axial direction (arrows M and N), an axis tilting may occur relative to the axial direction. If the tilting occurs, the drive switching property such as the timing of the driving connection and the disconnecting operation may be deteriorated. In order to suppress the axis tilting of the disconnecting cam 672, it is preferable that a sliding resistance between the outer peripheral surface 672*i* of the disconnecting cam 672 and the inner peripheral surface 632*i* of the developing device covering member 632, and a sliding resistance between the force receiving portion 672*b* of the disconnecting cam 672 with regulating portion 624*d* of the driving side cartridge cover member 624 are reduced. In addition, as shown in FIG. 70, it is also preferable that an outer peripheral surface 6172*i* of the disconnecting cam 6172 and an inner peripheral surface 6132*i* of the developing device covering member 6132 are extended in the axial direction to increase the engagement depth of the disconnecting cam 6172 with respect to the axial direction.

As will be understood from the foregoing, the disconnecting cam 672 is engaged both with the inner peripheral surface 632*i* of the developing device covering member 632 which is a part of the second guide portion and with the regulating portion 624*d* of the driving side cartridge cover member 624 which is a part of the second guide portion. Thus, the disconnecting cam 672 is slidable (rotatable) in the rotational moving direction about the axis X and in the axial direction (arrows M and N) relative to the developing unit 9, and is slidable only in the axial direction (arrows M and N) relative to the drum unit 8 and the driving side cartridge cover member 624 fixed to the drum unit 8.

Figure 71:
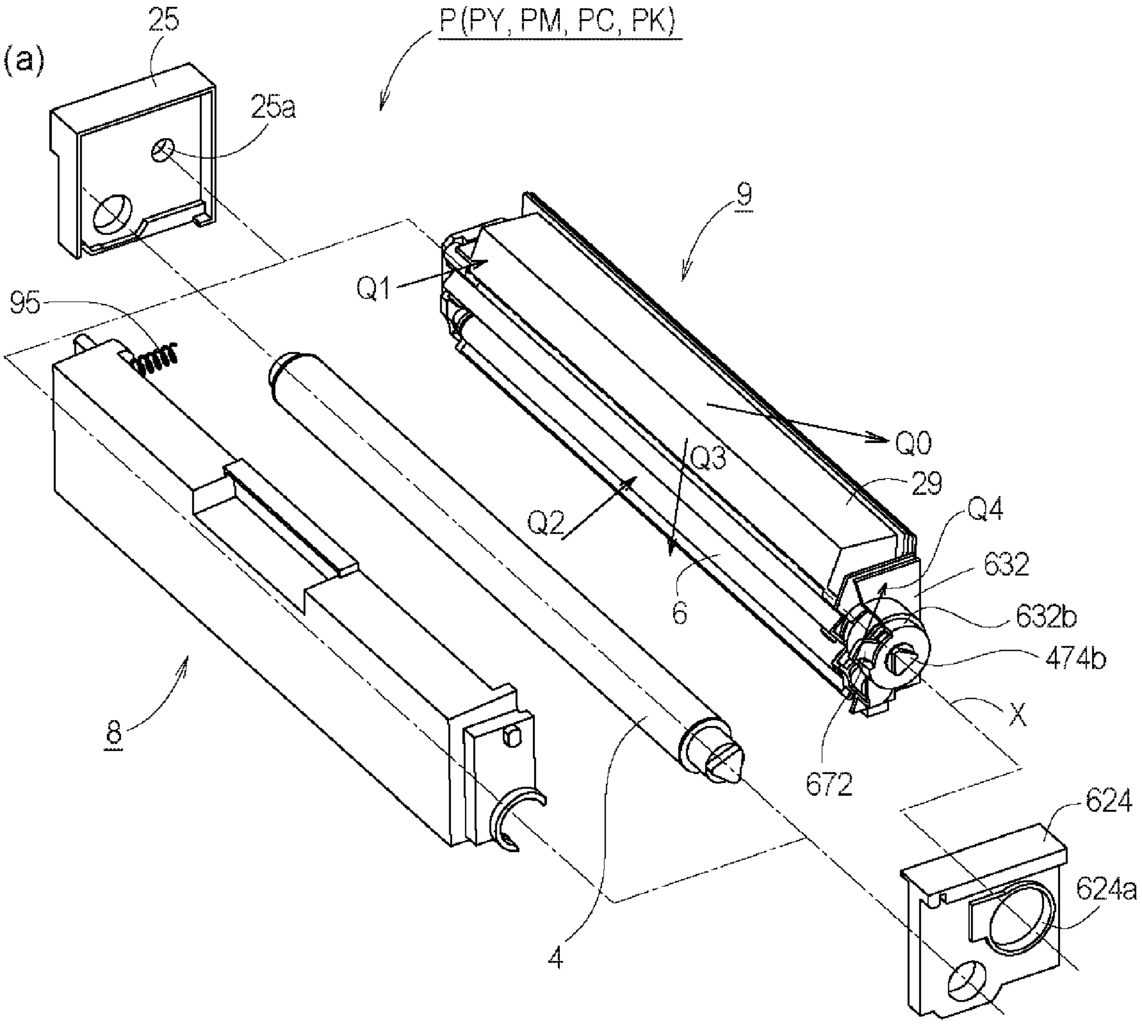
FIG. 71 is an exploded perspective view of a process cartridge according to the sixth embodiment of the present invention.
Figure 71:
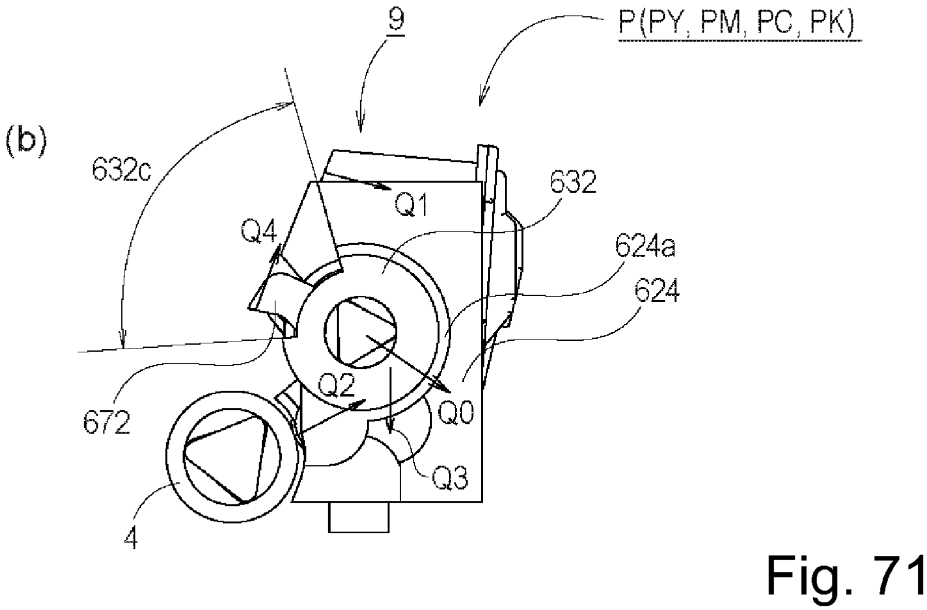

Part (a) of FIG. 71 is a perspective view of the cartridge P in which the force applied to the developing unit 9 is schematically shown, and part (b) of FIG. 71 is a side view of a part of the cartridge P as seen in the direction along the direction of the axis X.

To the developing unit 9, a reaction forced Q1 applied from the urging spring 95, a reaction force Q2 applied from the drum 4 through the developing roller 6, and the weight Q3 thereof and so on are applied. In addition, during a drive disconnecting operation, the disconnecting cam 672 engages with the driving side cartridge cover member 624 to receive a reaction force Q4 (will be described hereinafter in detail). The resultant force Q0 of the reaction forces Q1, Q2 and Q4 and the weight Q3 is applied to supporting hole portions 624*a*, 25*a* of the driving side rotatably supporting the developing unit 9 and non-driving side cartridge cover members 624 and 25.

Therefore, the sliding portion 624*a* of the driving side cartridge cover member 624 contacting the developing device covering member 632 in the direction of the resultant force Q0 when the cartridge P is seen in the direction along the axial direction (part (b) of FIG. 71) is required. The sliding portion 624*a* of the driving side cartridge cover member 624 is provided with a resultant force receiving portion 624*a*1 for receiving the resultant force Q0 (FIG. 69). On the other hand, with respect to the direction other than the direction of the resultant force Q0, the cylindrical portion 632*b* of the developing device covering member 632 or the sliding portion 624*a* of the driving side cartridge cover member 624 is not inevitable. In this embodiment, in view of the above, the opening 632*c* is provided in a part of the cylindrical portion 632*b* of the developing device covering member 632 slidable relative to the driving side cartridge cover member 624 in the direction different from the direction of the resultant force Q0 (opposite side with respect to the resultant force Q0 in this embodiment). In the opening 632*c*, the disconnecting cam 672 engageable with the regulating portion 624*d* of the driving side cartridge cover member 624.

Figure 72:
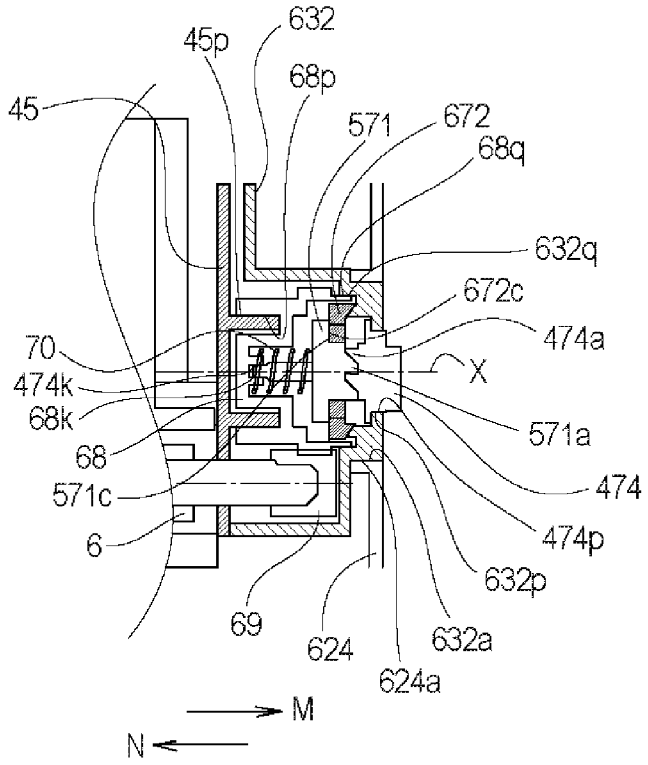
FIG. 72 is a sectional view of the drive connecting portion according to the sixth embodiment of the present invention.
Figure 72:
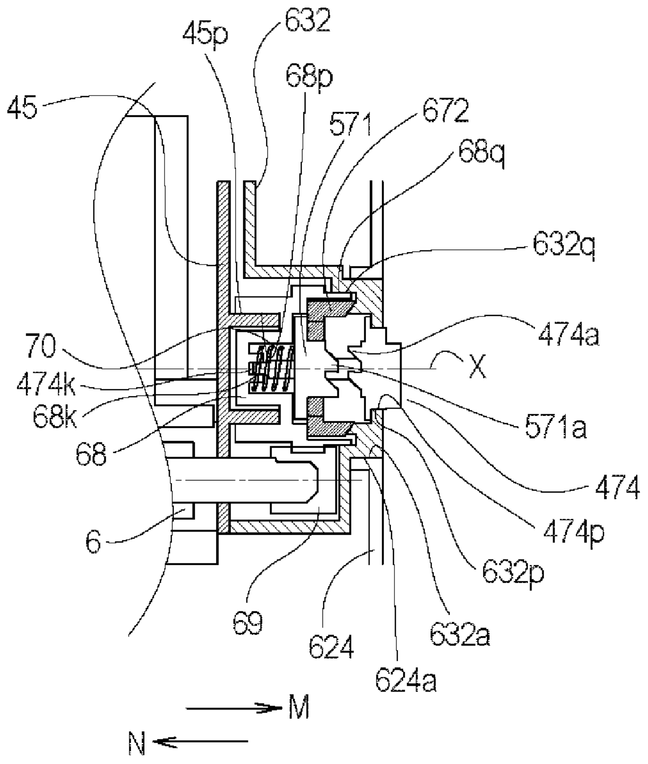

FIG. 72 is a sectional view of the drive connecting portion.

The cylindrical portion 68*p* (cylindrical inner surface) of the idler gear 68 and the first shaft receiving portion 45*p* (cylindrical outer surface) of the bearing 45 are engaged with each other. In addition, the cylindrical portion 68*q* (cylindrical outer surface) of the idler gear 68 and the inside circumference 632*q* of the developing device covering member 632 are engaged with each other. That is, the idler gear 68 is rotatably supported at the opposite end portions by the bearing member 45 and the developing device covering member 632.

In addition, the cylindrical portion 474*p* (cylindrical outer surface) of the upstream drive transmission member 474 and the hole portion 632*p* of the developing device covering member 632 are engaged with each other. By this, the upstream drive transmission member 474 is supported slidably (rotatably) relative to the developing device covering member 632.

The first shaft receiving portion 45*p* (cylindrical outer surface) of the bearing member 45, the inside circumference 632*q* of the developing device covering member 632 and the hole portion 632*p* are aligned with the rotational center X of the developing unit 9. That is, the upstream drive transmission member 474 is supported rotatably about the rotational center X of the developing unit 9. As described above, the cylindrical portion 474*m* of the upstream drive transmission member 474 and the hole portion 571*m* of the downstream drive transmission member 571 are engaged with each other (FIG. 60). By doing so, as a result, the downstream drive transmission member 571 is also supported rotatably about the rotational center X of the developing unit 9.

Part (a) of FIG. 72 is a sectional view of the drive connecting portion illustrating a state in which the claws 571*a* of the downstream drive transmission member 571 and the claws 474*a* of the upstream drive transmission member 474 are engaged with each other. Part (b) of FIG. 72 is a sectional view of the drive connecting portion in which the claws 571*a* of the downstream drive transmission member 571 and the claws 474*a* of the upstream drive transmission member 474 are spaced from each other.

[Drive Disconnecting Operation]

The operation of the drive connecting portion at the time of change from the contact state to the spaced state between the developing roller 6 and the drum 4 will be described.

[State 1]

Figure 73:
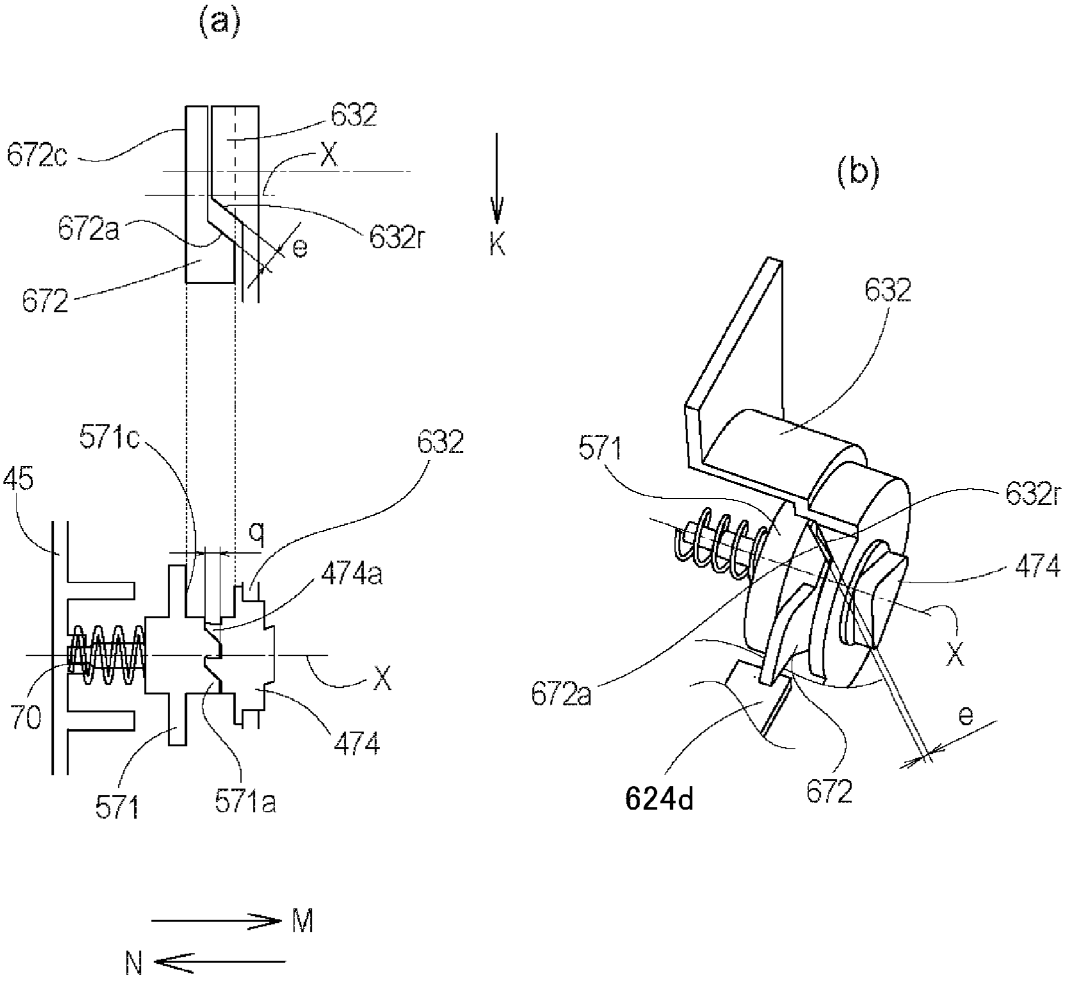
FIG. 73 is a schematic view and a perspective view of the drive connecting portion according to the sixth embodiment of the present invention.

As shown in part (a) of FIG. 7, the main assembly spacing member 80 and the force receiving portion 45*a* of the bearing member 45 are spaced by a gap d. At this time, the drum 4 and the developing roller 6 contact to each other. This state will be called "state 1" of the main assembly spacing member 80. Part (a) of FIG. 73 schematically shows the drive connecting portion at this time. Part (b) of FIG. 73 is a perspective view of the drive connecting portion. In FIG. 73, some parts are omitted for better illustration. In part (a) of FIG. 73, the pair of the upstream drive transmission member 474 and the downstream drive transmission member 571, and the pair of the disconnecting cam 672 and the developing device covering member 632 are shown separately. In part (b) of FIG. 73, only a part of the developing device covering member 632 including the contact portion 632*r* is shown, and only a part of the cartridge cover member 624 including the regulating portion 624*d* is shown. Between the contact portion 672*a* of the disconnecting cam 672 and the contact portion 632*r* of the developing device covering member 632, there is a gap e. At this time, the claws 474*a* of the upstream drive transmission member 474 and the claws 571*a* of the downstream drive transmission member 571 are engaged with each other by an engagement depth q. In addition, as described above, the downstream drive transmission member 571 engages with the idler gear 68 (FIG. 59). Therefore, the driving force inputted to the upstream drive transmission member 474 from the main assembly of the apparatus 2 is transmitted to the idler gear 68 and the developing roller gear 69 through the downstream drive transmission member 571. By this, the developing roller 6 is driven. The positions of the parts at this time is called a contacting position, a development contact and drive transmission state.

[State 2]

Figure 74:
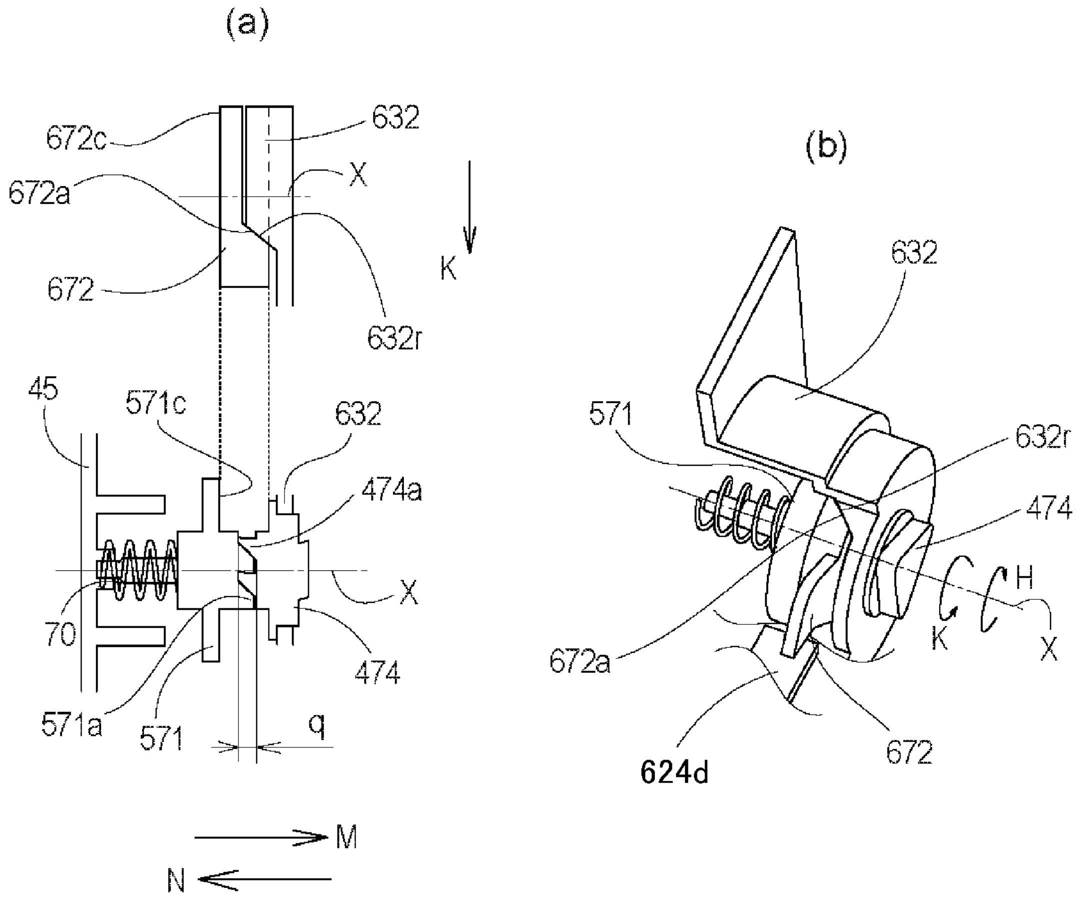
FIG. 74 is a schematic view and a perspective view of the drive connecting portion according to the sixth embodiment of the present invention.

When the main assembly spacing member 80 moves in the direction indicated by an arrow F1 by δ1 in the Figure from the development contact and drive transmission state, as shown in part (b) of FIG. 7, the developing unit 9 rotates about the rotation axis X in the direction of an arrow K by an angle θ1 As a result, the developing roller 6 is spaced from the drum 4 by a distance ε1. The disconnecting cam 672 and the developing device covering member 632 in the developing unit 9 rotate in the direction indicated by the arrow K by an angle θ1 in interrelation with the rotation of the developing unit 9. The disconnecting cam 672 is incorporated in the developing unit 9, but as shown in FIG. 69, the force receiving portion 672*b* is engaged with an engaging portion 624*d* of the driving side cartridge cover member 624. Therefore, even if the developing unit 9 rotates, the position of the disconnecting cam 672 does not change. In other words the disconnecting cam 672 moves relative to the developing unit 9. As shown in part (a) of FIG. 74 and part (b) of FIG. 74 show the state in which the contact portion 672*a* of the disconnecting cam 672 and the contact portion 632*r* of the developing device covering member 632 start to contact to each other. At this time, the claw 474*a* of the upstream drive transmission member 474 and the claw 571*a* of the downstream drive transmission member 571 are kept engaging with each other (part (a) of FIG. 74). Therefore, the driving force inputted to the upstream drive transmission member 474 from the main assembly 2 of the apparatus is transmitted to the developing roller 6 through the downstream drive transmission member 571, the idler gear 68 and the developing roller gear 69. The state of these parts in this state is called a developing device spacing and drive transmission state. In the state 1, it is not inevitable that the force receiving portion 672*b* contacts the engaging portion 624*d* of the driving side cartridge cover member 624. More particularly, in the state 1, the force receiving portion 672*b* may be spaced from the engaging portion 624*d* of the driving side cartridge cover member 624. In this case, in the process of shifting operation from the state 1 to the state 2, the gap between the force receiving portion 672*b* and the engaging portion 624*d* of the driving side cartridge cover member 624 disappears, that is, the force receiving portion 672*b* is brought into contact to the engaging portion 624*d* of the driving side cartridge cover member 624.

[State 3]

Figure 75:
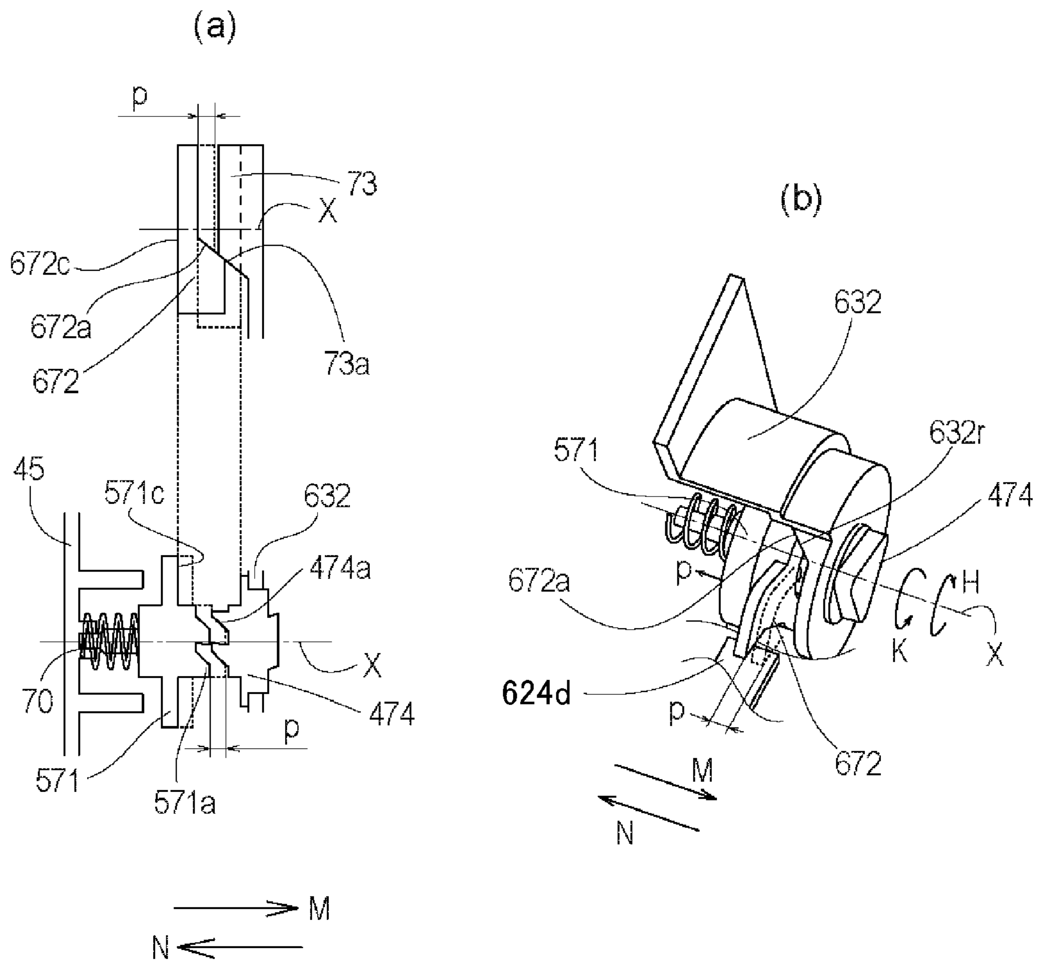
FIG. 75 is a schematic view and a perspective view of the drive connecting portion according to the sixth embodiment of the present invention.

Part (a) of FIG. 75 and part (b) of FIG. 75 show the drive connecting portion when the main assembly spacing member 80 moves from the developing device spacing and drive transmission state in the direction of the arrow F1 only δ2 in the Figure as shown in part (c) of FIG. 7. In interrelation with the rotation of the developing unit 9 to the angle θ2 (>θ1), the developing device covering member 632 rotates. At this time, the contact portion 672*a* of the disconnecting cam 672 receives a reaction force from the contact portion 632*r* of the developing device covering member 632. As described above, the disconnecting cam 672 is movably only in the axial direction (arrows M and N) by the engagement of the force receiving portion 672*b* with the engaging portion 624*d* of the driving side cartridge cover member 624 (FIG. 69). Therefore, as a result, the disconnecting cam 672 slides in the direction of the arrow N by a movement distance p. In interrelation with the movement of the disconnecting cam 672 in the direction of the arrow N, an urging surface 672*c*, as the urging portion, of the disconnecting cam 672 urges the urged surface 571*c*, as the portion-to-be-urged, of the downstream drive transmission member 571. By this, the downstream drive transmission member 571 slides in the direction of the arrow N by p against the urging force of the spring 70 (FIG. 75 and parts (b) of FIG. 72).

At this time, the movement distance p is larger than the engagement depth q between the claws 474*a* of the upstream drive transmission member 447 and the claws 571*a* of the downstream drive transmission member 571, and therefore, the claws 474*a* and the claws 571*a* are disengaged from each other. Then, since the upstream drive transmission member 474 receives the driving force from the main assembly 2 of the apparatus, it continues to rotate, and on the other hand, the downstream drive transmission member 571 stops. As a result, the rotations of the idler gear 68, the developing roller gear 69 and the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 can space from the drum 4 while rotating, so that the drive to the developing roller 6 can be stopped in accordance with the spacing distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 474*a* of the upstream drive transmission member 474 and the claws 571*a* of the downstream drive transmission member 571 are in a disconnected state, as shown in FIG. 75.

In the angle θ1 position of the developing unit 9 (the state shown in part (b) of FIG. 7 and FIG. 74) by gradual rotation of the developing unit 9 in the direction of the arrow H shown in FIG. 7 from this state, the claws 474*a* of the upstream drive transmission member 474 and the claws 571*a* of the downstream drive transmission member 571 are engaged with each other by the downstream drive transmission member 571 moving in the direction of the arrow M by the urging force of the spring 70. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

In the foregoing description, the force receiving portion 672*b* of the disconnecting cam 672 is engaged with the regulating portion 624*d* of the driving side cartridge cover member 624, but this is not inevitable, and it may be engaged with the cleaner container 26, for example.

In this embodiment, particularly, the disconnecting cam 672 is provided with the contact portion 672*a*, and the contact portion 632*r* as the operating portion contacting thereto is provided on the developing device covering member 632. In addition, the engaging portion 672*b* relative to the drum unit 8 is projected through the opening 632*c* provided in a part of the cylindrical portion 632*b* of the developing device covering member 632. Therefore, the latitude of the arrangement of the engaging portion 672*b* and the engaging portion 624*d* as a part of the second guide portion actable thereon increases. More specifically, it is not necessary that the operating member is extended from a outside of the developing device covering member 632, with respect to the axial direction, through the hole 632*j* of the developing device covering member 632 as in the first and second embodiments.

Figure 76:
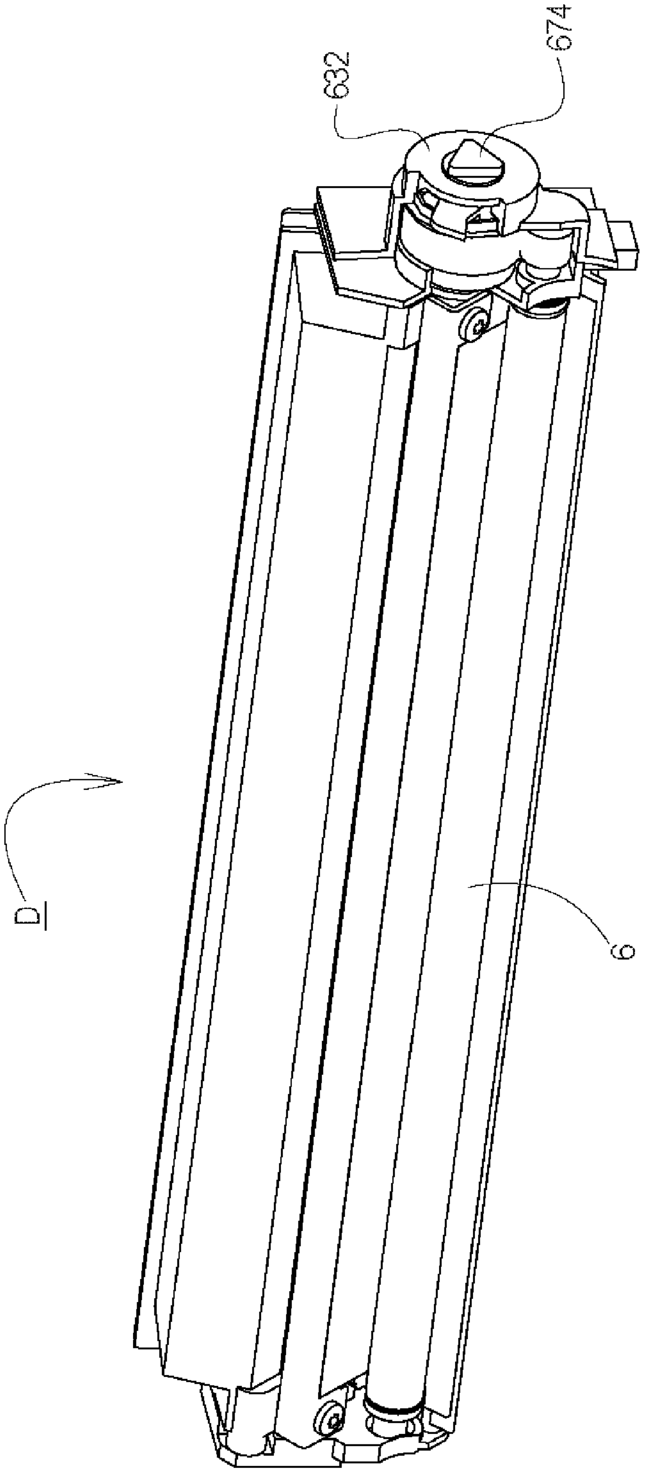
FIG. 76 is a perspective view of a developing cartridge according the sixth embodiment of the present invention.

In the foregoing description, a process cartridge P detachably mountable to the image forming apparatus is taken as an example, but the present invention is applicable to a developing cartridge D detachably mountable to the image forming apparatus as shown in FIG. 76, similarly to Embodiment 8 which will be described hereinafter.

Figure 77:
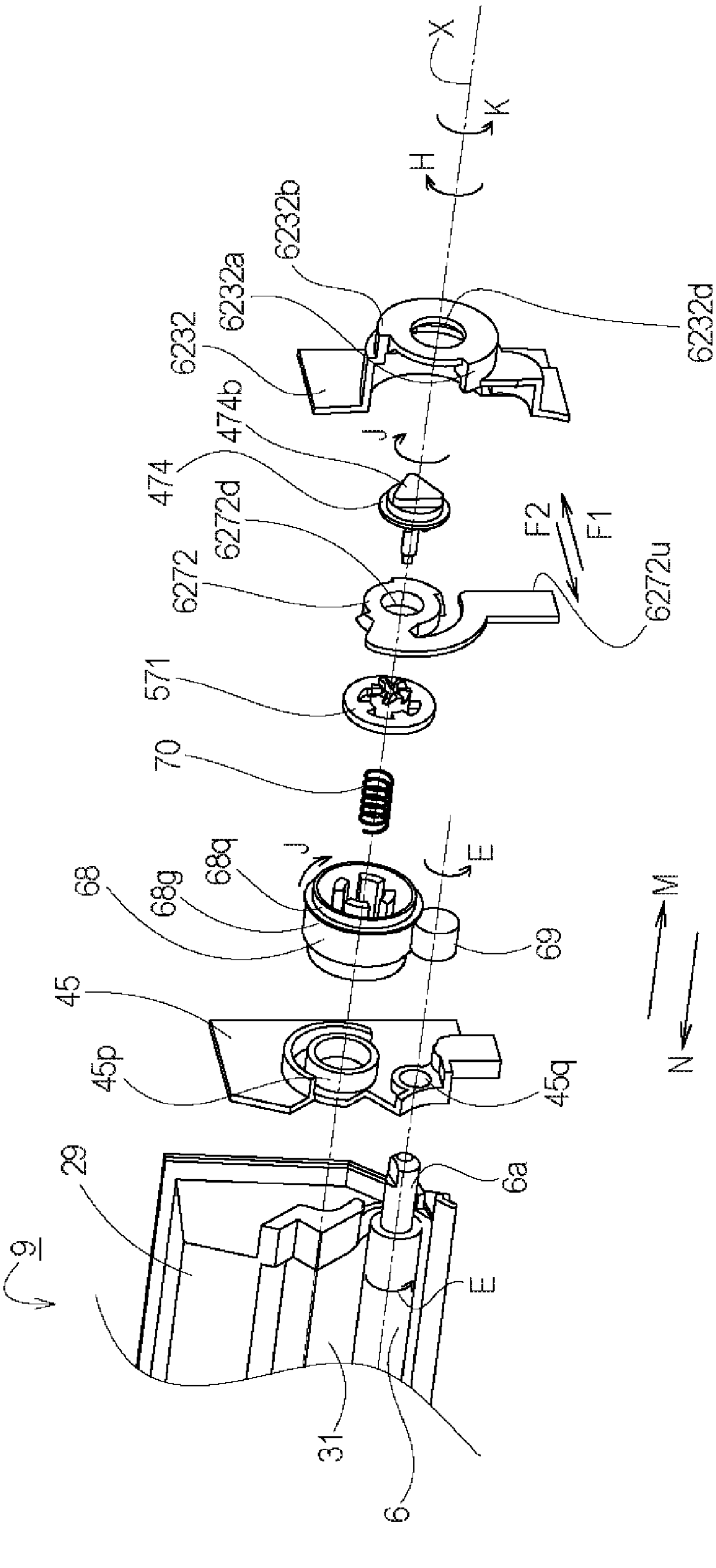
FIG. 77 is an exploded perspective view of the drive connecting portion of the developing cartridge according to the sixth embodiment of the present invention.

As a further analogous example, FIG. 77 shows a developing cartridge D detachably mountable to the image forming apparatus. FIG. 77 shows parts provided at a driving side end portion of the developing cartridge D, and similarly to Embodiment 6, the parts include the downstream drive transmission member 571 and the upstream drive transmission member 474. Here, a disconnecting cam 6272 as the coupling releasing member has a force receiving portion 6272*u* for receiving a force in the direction of an arrow F2 from the main assembly of the image forming apparatus. When the disconnecting cam 6272 receives the force in the direction of the arrow F2 from the main assembly of the image forming apparatus, it rotates in the direction of the arrow H about a rotation axis X. Similarly to the above-described example, a contact portion 6272*a* as the force receiving portion provided on the disconnecting cam 6272 receives a reaction force from a contact portion 6232*r* of a developing device covering member 6232. By this, the disconnecting cam 6272 moves in the direction of the arrow N. Then, the upstream drive transmission member 474 and the downstream drive transmission member 571 are disengaged from each other, thus stopping the rotation of the developing roller 6.

When the drive is transmitted to the developing roller 6, the disconnecting cam 6272 is moved in the direction of the arrow M to engage the upstream drive transmission member 474 and the downstream drive transmission member 571 with each other. At this time, the force to the disconnecting cam 6272 in the direction of the arrow F2 is removed so that the disconnecting cam 6272 is moved in the direction of the arrow M using the reaction force of the spring 70.

As described in the foregoing, the drive transmission to the developing roller 6 can be switched even in the case that the developing roller 6 is always in contact with the drum 4.

In the foregoing, the present invention is applied to the developing cartridge D, but the cartridge may be of another type, for example, it may be a process cartridge P including a drum. More particularly, the structure of this embodiment is applicable to the structure in which the drive transmission to the developing roller is switched in the state that the drum 4 and the developing roller 6 contact to each other in the process cartridge P.

In the foregoing embodiments, when the electrostatic latent image on the drum 4 is developed, the developing roller 6 is in contact with the drum 4 (contact-type developing system), but another developing system is usable. For example, a non-contact type developing system in which a small gap is provided between the drum 4 and the developing roller 6 during the development of the electrostatic latent image on the drum 4 is usable.

As described in the foregoing, the cartridge detachably mountable to the image forming apparatus may be a process cartridge P including a drum or a developing cartridge D.

Embodiment 7

A cartridge according to a seventh embodiment of the invention will be described. In the description of this embodiment, the description of the structures similar to those of the foregoing embodiments will be omitted.

[Structure of the Developing Unit]

Figure 78:
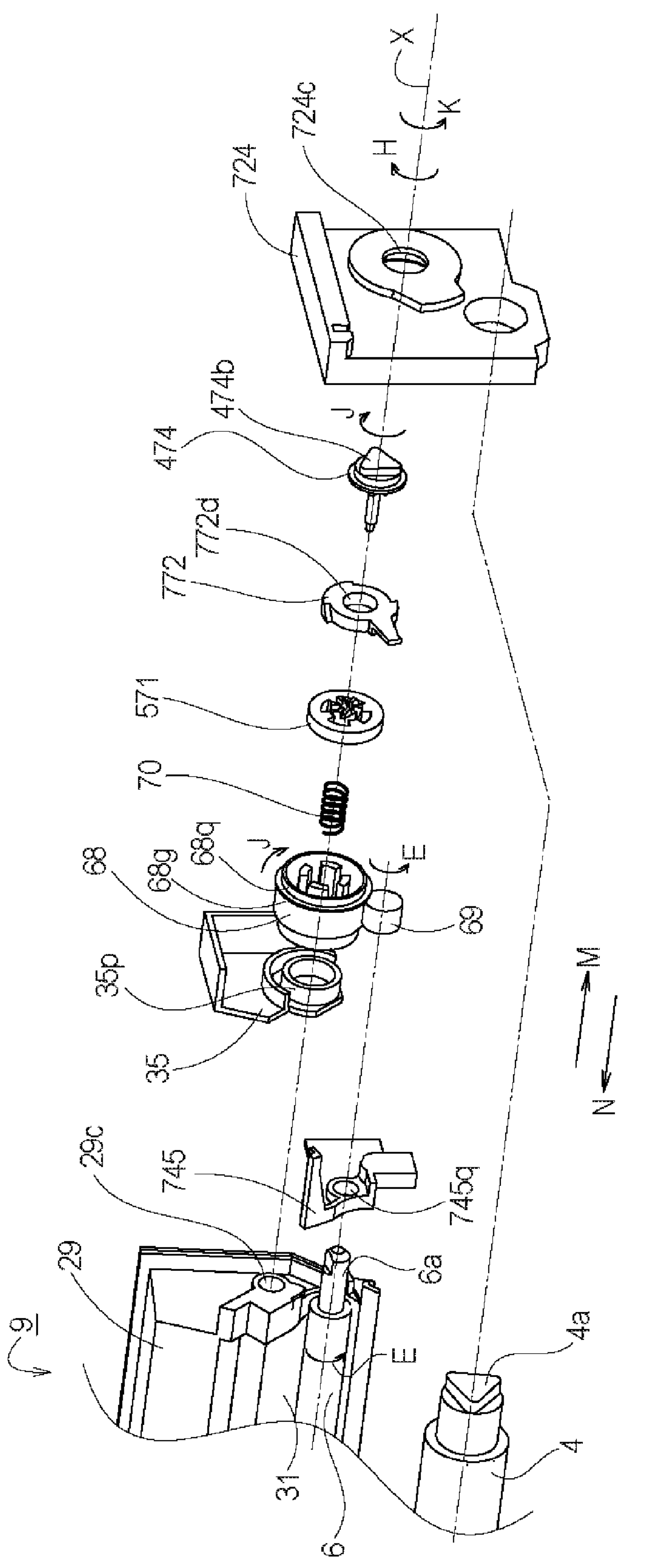
FIG. 78 is an exploded perspective view of a drive connecting portion according to the seventh embodiment of the present invention, as seen from a driving side.
Figure 79:
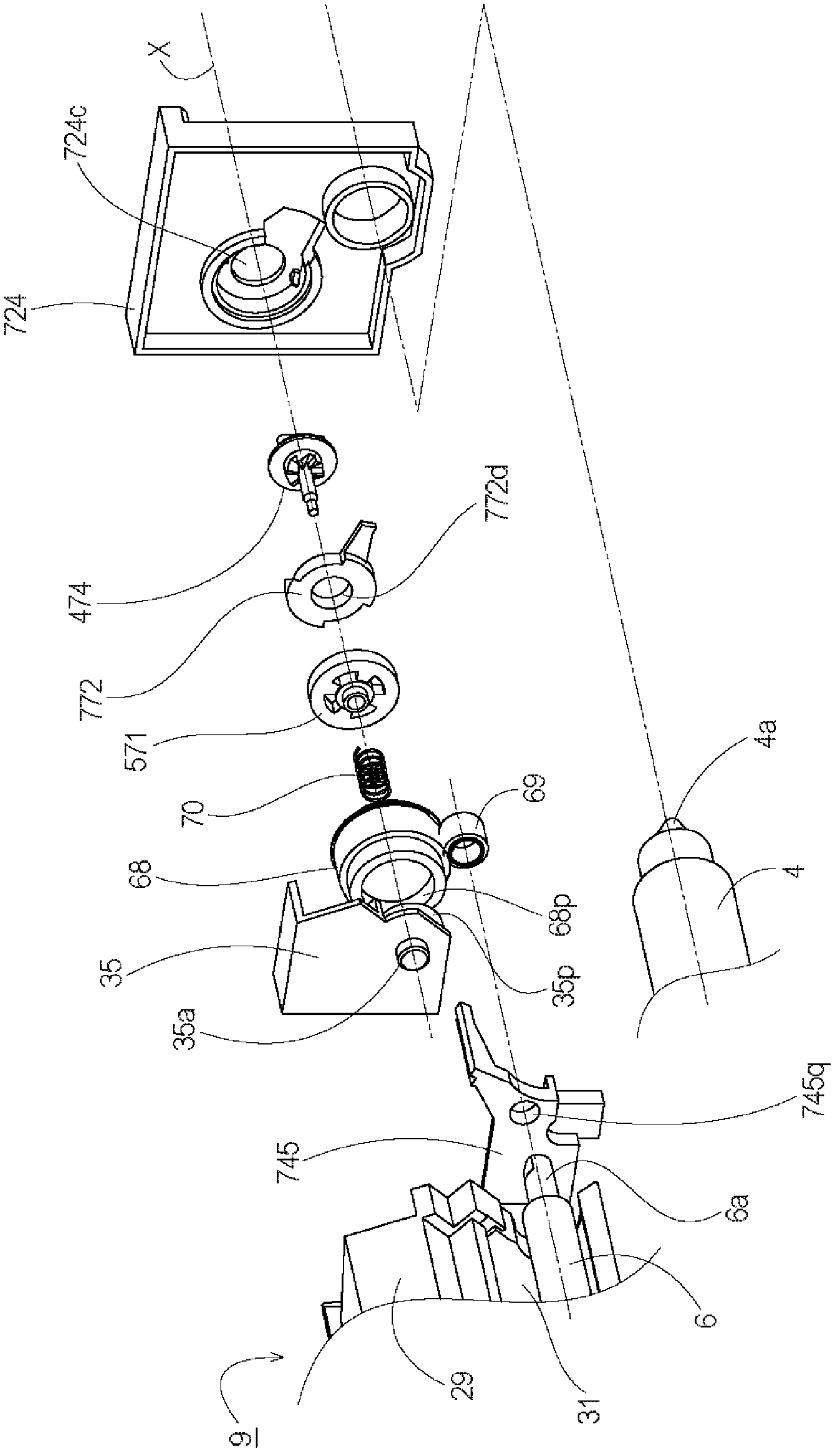
FIG. 79 is an exploded perspective view of the drive connecting portion according to the seventh embodiment of the present invention as seen from a non-driving side.

As shown in FIGS. 78 and 79, the developing unit 9 comprises a developing roller 6, a developing blade 31, a developing device frame 29 and a bearing member 745 and so on.

In addition, as shown in FIG. 78, the bearing member 745 is fixed to one longitudinal end portion of the developing device frame 29. The bearing member 745 rotatably supports the developing roller 6. The developing roller 6 is provided with a developing roller gear 69 at a longitudinal end portion.

Figure 81:
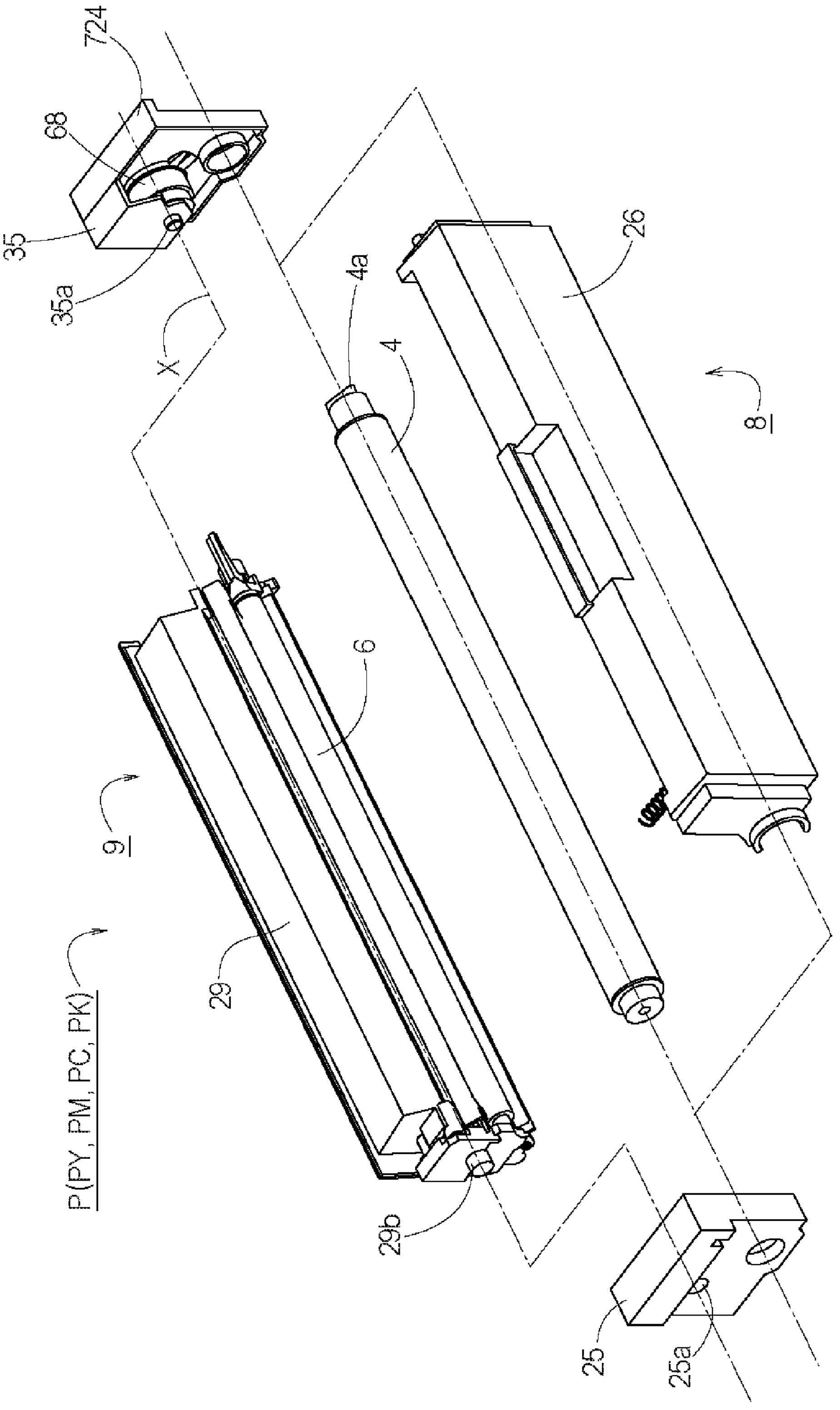
FIG. 81 is an exploded perspective view of a process cartridge according to the seventh embodiment of the present invention.

In addition, to a driving side cartridge cover member 724, another bearing member 35 is fixed (FIG. 81). Between said another bearing member 35 and the driving side cartridge cover member 724, there are provided an idler gear 68 as a third drive transmission member for transmitting the driving force to the developing roller gear 69, and a downstream drive transmission member 571 for transmitting the driving force to the idler gear 68.

Figure 80:
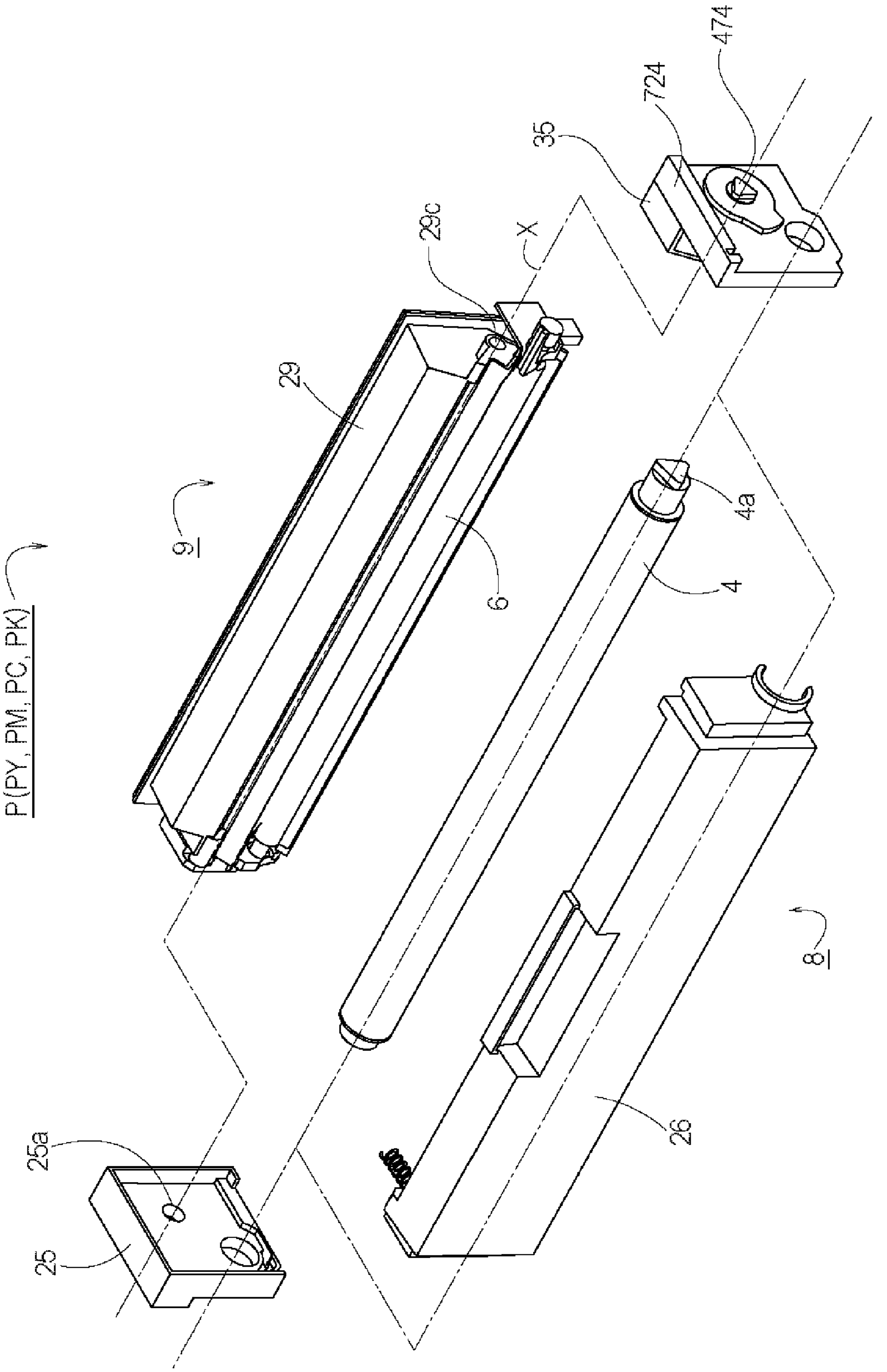
FIG. 80 is an exploded perspective view of a process cartridge according to the seventh embodiment of the present invention.

The bearing member 35 rotatably supports the idler gear 68 for transmitting the driving force to the developing roller gear 69. The driving side cartridge cover member 724 is provided with an opening 724*c*. Through the opening 724*c*, a drive inputting portion 474*b* of the upstream drive transmission member 474 is exposed. When the cartridge P is mounted to the main assembly 2 of the apparatus, the drive inputting portion 474*b* is engaged with a developing device-drive output member 62 (62Y, 62M, 62C, 62K) shown in part (b) of FIG. 3 to transmit the driving force from a driving motor (unshown) provided in the main assembly 2 of the apparatus. That is, the upstream drive transmission member 474 functions as a development input coupling. The driving force inputted to the upstream drive transmission member 474 from the main assembly 2 of the apparatus is transmitted to the developing roller gear 69 and the developing roller 6 through the downstream drive transmission member 571 and the idler gear 68. FIG. 80 and FIG. 81 are perspective views illustrating the developing unit 9, a drum unit 8 and the driving side cartridge cover member 724 to which the bearing member 35 is fixed. As shown in FIG. 81, the bearing member 35 is fixed to the driving side cartridge cover member 724. The bearing member 35 is provided with a supporting portion 35*a*. On the other hand, the developing device frame 29 is provided with a rotation hole 29*c* (FIG. 80). When the developing unit 9 and drum unit 8 are connected with each other, the rotation hole 29*c* of the developing device frame 29 is engaged with the supporting portion 35*a* of the bearing member 35 in a one longitudinal end portion side of the cartridge P. In addition, in the other longitudinal end portion side of the cartridge P, a projected portion 29*b* projected from the developing device frame 29 is engaged with a supporting hole portion 25*a* of the non-driving side cartridge cover member. By this, the developing unit 9 is supported rotatably relative to the drum unit 8. In this case, the rotational center X which is a rotational center of the developing unit 9 relative to the drum unit 8 is aligned with a line connecting the center of the supporting portion 35*a* of the bearing member 35 and the center of the supporting hole portion 25*a* of the cartridge cover member 25.

[Structure of the Drive Connecting Portion]

Referring to FIGS. 78 and 79, the structure of the drive connecting portion will be described.

The general arrangement thereof will be described, first.

Between the bearing member 35 and the driving side cartridge cover member 724, there are provided, in the order named in the direction from the bearing member 35 toward the driving side cartridge cover member 724, the idler gear 68, a spring 70 which is an elastic member as an urging member, the downstream drive transmission member 571 as a second coupling member, a disconnecting cam 772 which is a part of a disconnecting mechanism and which is an operating member, and the upstream drive transmission member 474 as a first coupling member. These members are coaxial with the upstream drive transmission member 474. In this embodiment, the drive connecting portion comprises the spring 70, the downstream drive transmission member 571, the disconnecting cam 772, upstream drive transmission member 474, the driving side cartridge cover member 724, and the bearing member 745 fixed to the one longitudinal end portion of the developing device frame 29. They will be described in detail.

The other bearing member 35 rotatably supports the idler gear 68. In more detail, the first shaft receiving portion 35*p* (cylindrical outer surface) the other bearing member 35 rotatably supports a supported portion 68*p* (cylindrical inner surface) of the idler gear 68 (FIGS. 78 and 79).

Figure 82:
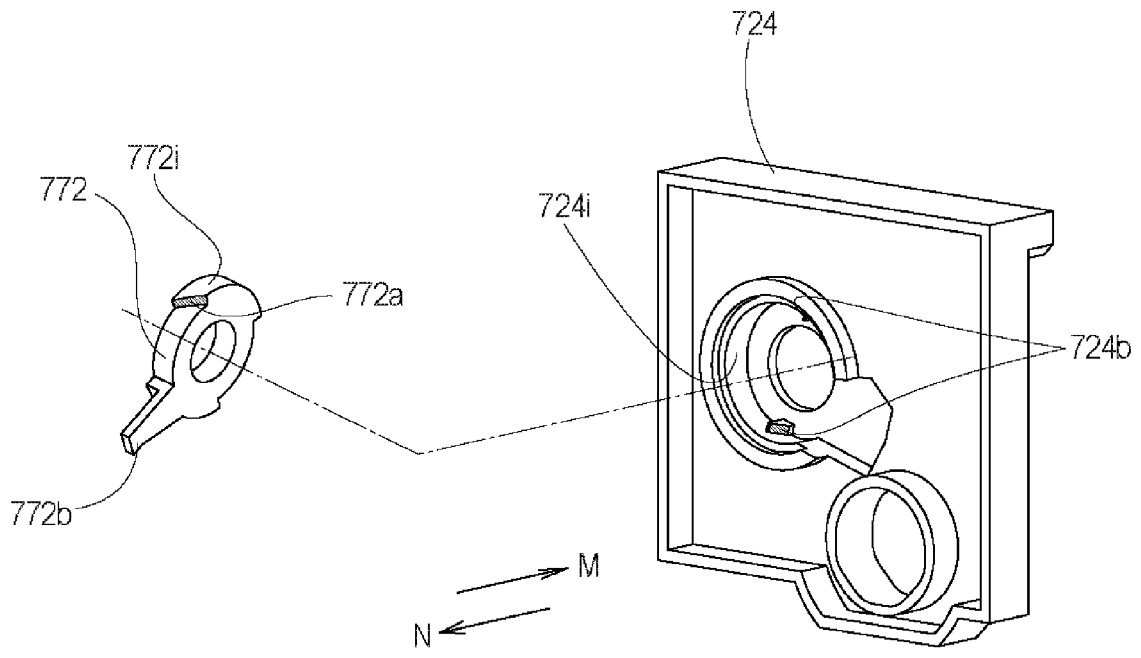
FIG. 82 is a perspective view of a releasing member and peripheral parts thereof according the seventh embodiment of the present invention.

FIG. 82 shows a relation between the disconnecting cam 772 as a coupling releasing member and the driving side cartridge cover member 724. The disconnecting cam 772 has a substantially ring configuration, and has an outer peripheral surface 772*i* as a second guided portion, wherein the driving side cartridge cover member 724 has an inner peripheral surface 724*i* as a part of a second guide portion. The inner peripheral surface 724*i* is engageable with the outer peripheral surface 772*i*. In addition, the outer peripheral surface 772*i* of the disconnecting cam 772 and the inner peripheral surface 724*i* of the driving side cartridge cover member 724 are co-axial with the rotational center X. More particularly, the disconnecting cam 772 is slidable in the axial direction relative to the driving side cartridge cover member 724 and the developing unit 9, and is also slidable in the rotational moving direction (rotatable) about the axis X.

The disconnecting cam 772 as the coupling releasing member is provided with a contact portion (inclined surface the 772*a* as a force receiving portion, and the driving side cartridge cover member 724 is provided with a contact portion (inclined surface the 724*b* as an operating portion. Here, the contact portion 772*a* of the disconnecting cam 772 and the contact portion 724*b* of the driving side cartridge cover member 724 are contactable to each other.

Figure 83:
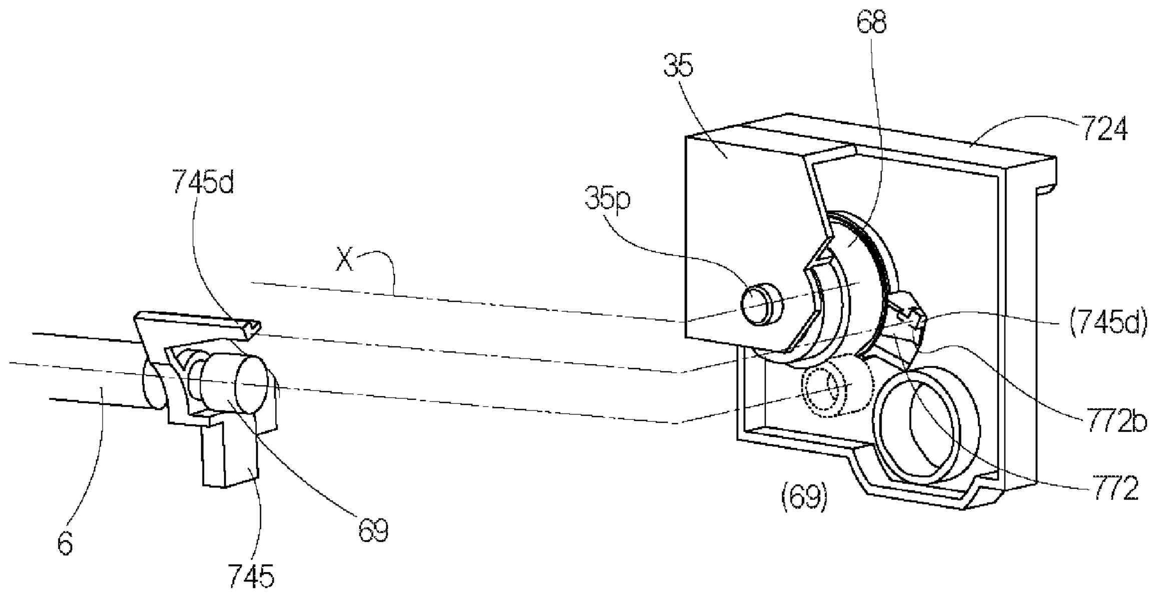
FIG. 83 is a perspective view of a drive connecting portion according to the seventh embodiment of the present invention.
Figure 84:
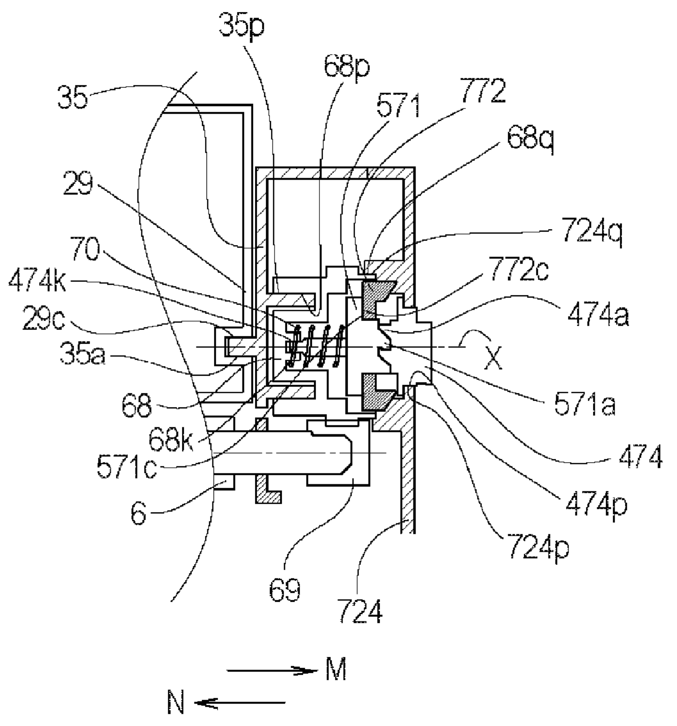
FIG. 84 is a sectional view of the drive connecting portion according to the seventh embodiment of the present invention.
Figure 84:
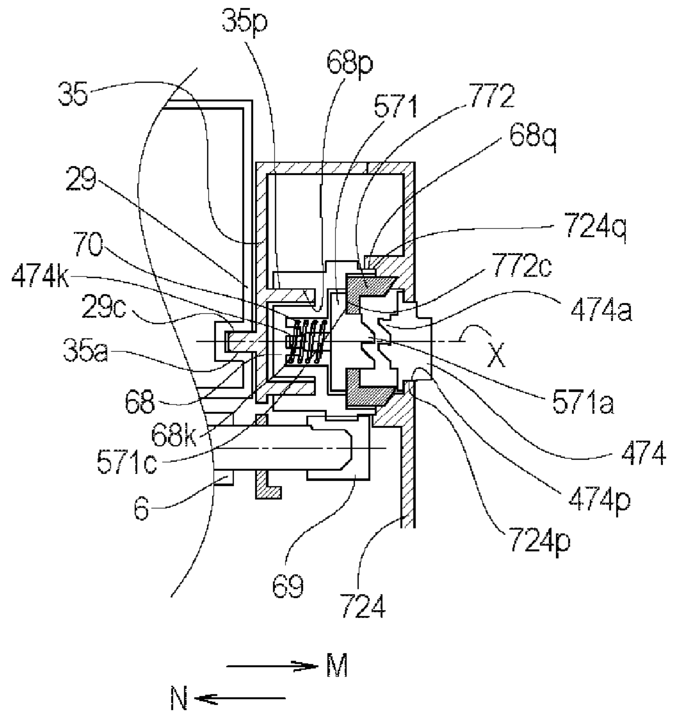

FIG. 83 shows structures of the drive connecting portion, the driving side cartridge cover member 724 and the bearing member 745. The bearing member 745 is provided with a regulating portion 745*d* as a part of the second guide portion. The regulating portion 745*d* is engaged with the force receiving portion 772*b* functioning second guided portion of the disconnecting cam 772 held between the driving side cartridge cover member 724 and the other bearing member 35. By the engagement between the regulating portion 745*d* and the force receiving portion 772*b*, the disconnecting cam 772 is prevented in the relative movement around axis X relative to the bearing member 745 and the developing unit 9. FIG. 84 is a sectional view of the drive connecting portion.

The cylindrical portion 68*p* of the idler gear 68 and the first shaft receiving portion 35*p* (cylindrical outer surface) of the other bearing member 35 are engaged with each other. The cylindrical portion 68*q* of the idler gear 68 and the inside circumference 724*q* of the driving side cartridge cover member 724 are engaged with each other. That is, the idler gear 68 is rotatably supported at the opposite end portions thereof by the other bearing member 35 and the driving side cartridge cover member 724.

In addition, by the engagement between the cylindrical portion 474*p* of the upstream drive transmission member 474 and the hole portion 724*p* of the driving side cartridge cover member 724 with each other, the upstream drive transmission member 474 is supported rotatably relative to the driving side cartridge cover member 724.

Furthermore, the first shaft receiving portion 35*p* (cylindrical outer surface) of the other bearing member 35, the inside circumference 724*q* of the driving side cartridge cover member 724, and the hole portion 724*p* are co-axial with the rotational center X of the developing unit 9. That is, the upstream drive transmission member 474 is supported rotatably about the rotational center X of the developing unit 9. Similarly to the foregoing embodiments, the cylindrical portion 474*m* of the upstream drive transmission member 474 and the hole portion 571*m* of the downstream drive transmission member 571 are engaged with each other (FIG. 60). By doing so, as a result, the downstream drive transmission member 571 is also supported rotatably about the rotational center X of the developing unit 9.

Part (a) of FIG. 84 is a sectional view of the drive connecting portion, in which the claw 571*a* of the downstream drive transmission member 571 and the claw 474*a* of the drive input coupling 474 are engaged with each other. Part (b) of FIG. 84 is a sectional view of the drive connecting portion in which the claws 571*a* of the downstream drive transmission member 571 and the claws 474*a* of the upstream drive transmission member 474 are spaced from each other.

[Drive Disconnecting Operation]

The operation of the drive connecting portion at the time of change from the contact state to the spaced state between the developing roller 6 and the drum 4 will be described.

[State 1]

Figure 85:
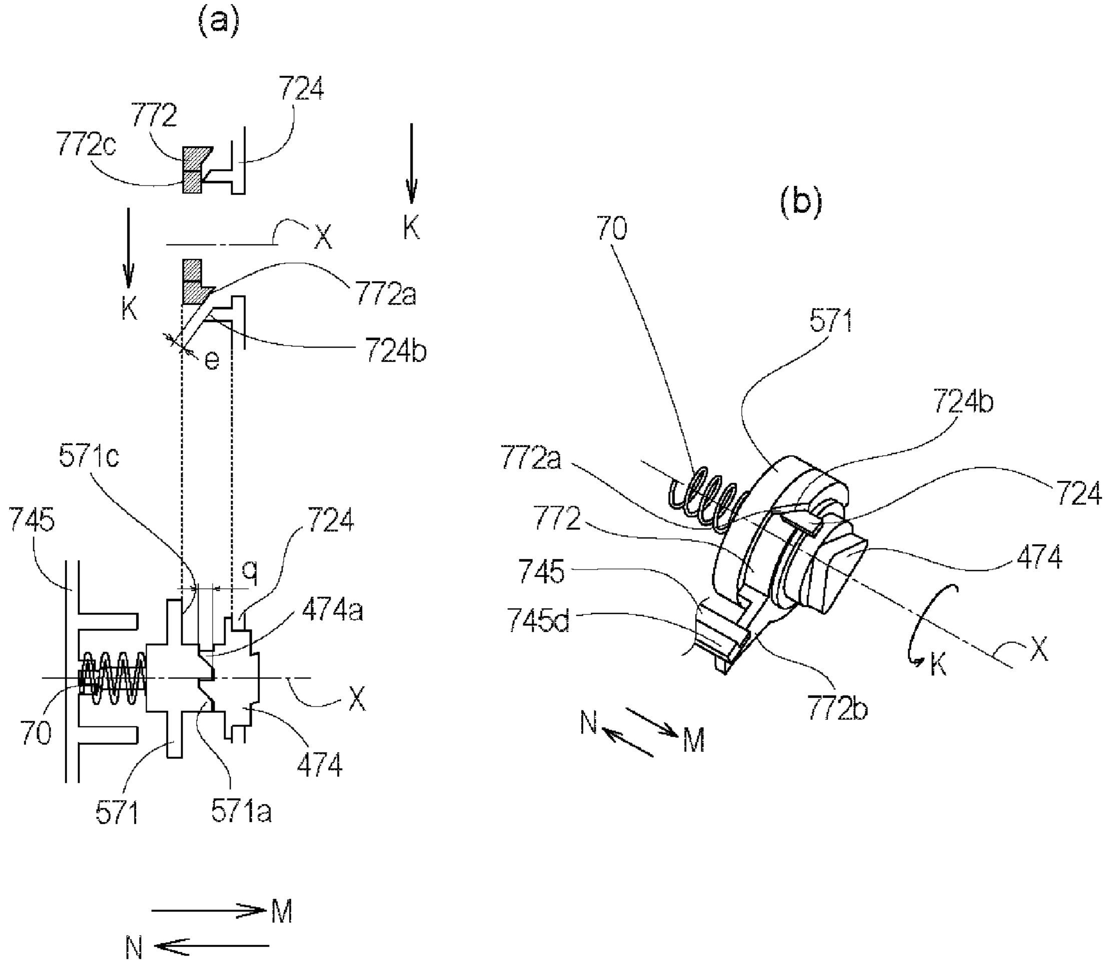
FIG. 85 is a schematic view and a perspective view of the drive connecting portion according to the seventh embodiment of the present invention.

As shown in part (a) of FIG. 7, the main assembly spacing member 80 and the force receiving portion 745*a* of the bearing member 745 are spaced by a gap d. At this time, the drum 4 and the developing roller 6 contact to each other. This state will be called "state 1" of the main assembly spacing member 80. Part (a) of FIG. 85 schematically shows the drive connecting portion at this time. Part (b) of FIG. 85 is a perspective view of the drive connecting portion. In FIG. 85, some parts are omitted for better illustration. In addition, in part (a) of FIG. 85, a pair of the upstream drive transmission member 474 and the downstream drive transmission member 571, and a pair of the disconnecting cam 772 and the driving side cartridge cover member 724 are separately shown. In part (b) of FIG. 85, only a part of the driving side cartridge cover member 724 including the contact portion 724*b*, and only a part of the bearing member 745 including the regulating portion 745*d* are shown. Between the contact portion 772*a* of the disconnecting cam 772 and the contact portion 724*b* of the cartridge cover member 724, there is a gap e. In addition, at this time, the claw 474*a* of the upstream drive transmission member 474 and the claw 571*a* of the downstream drive transmission member 571 are engaged with each other by an engagement depth q, so that the drive transmission is possible (part (a) of FIG. 85). In addition, as described above, the downstream drive transmission member 571 engages with the idler gear 68 (FIG. 59). Therefore, the driving force inputted to the upstream drive transmission member 474 from the main assembly of the apparatus 2 is transmitted to the idler gear 68 and the developing roller gear 69 through the downstream drive transmission member 571. By this, the developing roller 6 is driven. The positions of the parts at this time is called a contacting position, a development contact and drive transmission state.

[State 2]

When the main assembly spacing member 80 moves in the direction indicated by an arrow F1 by δ1 in the Figure from the development contact and drive transmission state, as shown in part (b) of FIG. 7, the developing unit 9 rotates about the rotation axis X in the direction of an arrow K by an angle θ1. As a result, the developing roller 6 is spaced from the drum 4 by a distance ε1. The bearing member 745 in the developing unit 9 rotates in the direction of an arrow K by an angle θ1 in interrelation with the rotation of the developing unit 9. On the other hand, the disconnecting cam 772 is in the drum unit 8, but as shown in FIG. 83, the force receiving portion 772*b* is engaged with the engaging portion 745*d* of the bearing member 745. Therefore, in interrelation with the rotation of the developing unit 9, the disconnecting cam 772 rotates in the direction of the arrow K inside the drum unit 8. As shown in part (a) the FIG. 86 and part (b) of FIG. 86, the contact portion 772*a* of the disconnecting cam 772 and the contact portion 724*b* of the driving side cartridge cover member 724 start to contact with each other. At this time, the claw 474*a* of the upstream drive transmission member 474 and the claw 571*a* of the downstream drive transmission member 571 are kept engaged with each other. Therefore, the driving force inputted to the upstream drive transmission member 474 from the main assembly 2 of the apparatus is transmitted to the developing roller 6 through the downstream drive transmission member 571, the idler gear 68 and the developing roller gear 69. The state of these parts in this state is called a developing device spacing and drive transmission state.

[State 3]

Figure 87:
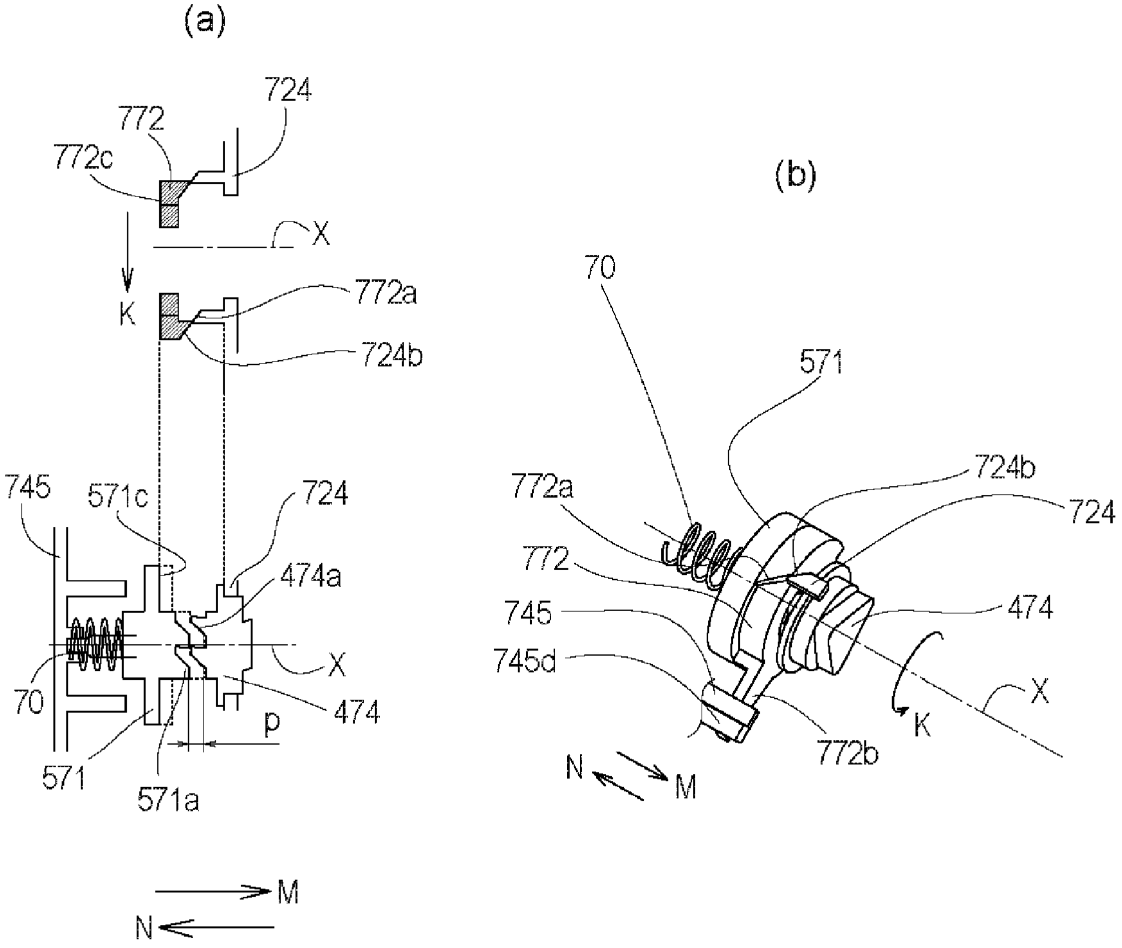
FIG. 87 is a schematic view and a perspective view of the drive connecting portion according to the seventh embodiment of the present invention.

Part (a) of FIG. 87 and part (b) of FIG. 87 show the drive connecting portion when the main assembly spacing member 80 moves from the developing device spacing and drive transmission state in the direction of the arrow F1 only δ2 in the Figure as shown in part (c) of FIG. 7. In interrelation with the rotation of the developing unit 9 by angle θ2 (>θ1), the bearing member 745 is rotated. At this time the contact portion 772*a* of the disconnecting cam 772 receives a reaction force from the contact portion 724*b* of the driving side cartridge cover member 724. As described above, the force receiving portion 772*b* of the disconnecting cam 772 engages with the engaging portion 745*d* of the bearing member 745 so that it is movable only in the axial direction (arrows M and N) relative to the developing unit 9 (FIG. 83). Therefore, as a result, the disconnecting cam 772 slides in the direction of the arrow N by a movement distance p. In interrelation with the movement of the disconnecting cam 772 in the direction of the arrow N, an urging surface 772*c*, as the urging portion, of the disconnecting cam 772 urges the urged surface 571*c*, as the portion-to-be-urged, of the downstream drive transmission member 571. By this, the downstream drive transmission member 571 slides in the direction of the arrow N against an urging force of the spring 70 by the movement distance p.

At this time, the movement distance p is larger than the engagement depth q between the claws 474*a* of the upstream drive transmission member 474 and the claws 571*a* of the downstream drive transmission member 571, and therefore, the claws 474*a* and the claws 571*a* are disengaged from each other. Then, since the upstream drive transmission member 474 receives the driving force from the main assembly 2 of the apparatus, it continues to rotate, and on the other hand, the downstream drive transmission member 571 stops. As a result, the rotations of the idler gear 68, the developing roller gear 69 and the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 can space from the drum 4 while rotating, so that the drive to the developing roller 6 can be stopped in accordance with the spacing distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 474*a* of the upstream drive transmission member 474 and the claws 571*a* of the downstream drive transmission member 571 are in a disconnected state, as shown in FIG. 87.

Figure 86:
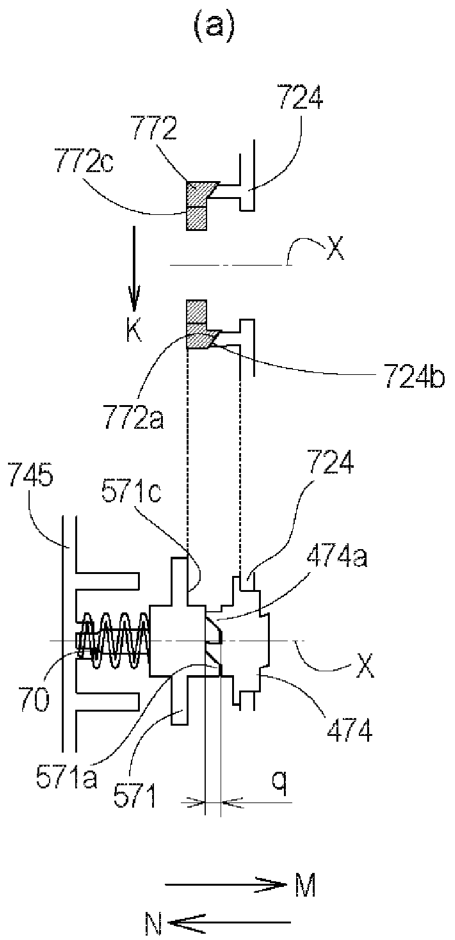
FIG. 86 is a schematic view and a perspective view of the drive connecting portion according to the seventh embodiment of the present invention.
Figure 86:
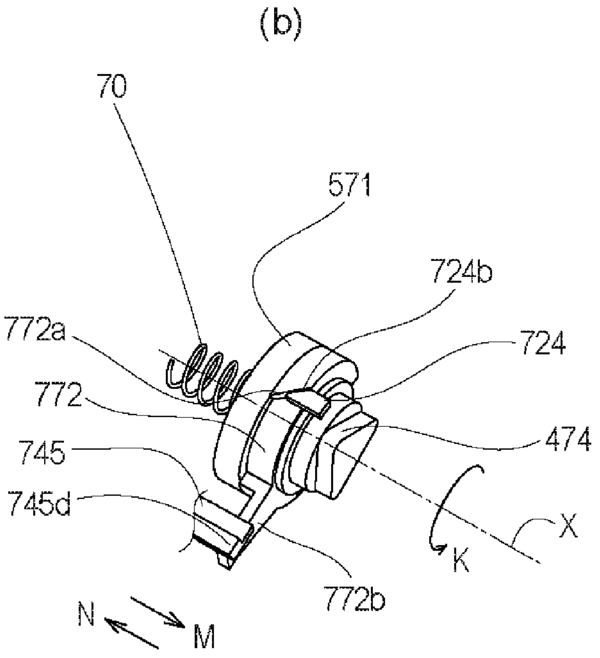

In the angle θ1 position of the developing unit 9 (the state shown in part (b) of FIG. 7 and FIG. 86) by gradual rotation of the developing unit 9 in the direction of the arrow H shown in FIG. 7 from this state, the claws 474*a* of the upstream drive transmission member 474 and the claws 571*a* of the downstream drive transmission member 571 are engaged with each other by the movement, in the direction of the arrow M, of the downstream drive transmission member 571 by the urging force of the spring 70. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

In the foregoing, the force receiving portion 772*b* of the disconnecting cam 772 is engaged with the regulating portion 745*d* of the bearing member 745, but this is not inevitable, and it may be engaged with the developing device frame 29, for example.

As in this embodiment, the upstream drive transmission member 474 as the first coupling member and the downstream drive transmission member 571 as the second coupling member may be provided on the drum unit 8.

Embodiment 8

A cartridge according to an eighth embodiment of the invention will be described. In the description of this embodiment, the description of the structures similar to those of the foregoing embodiments will be omitted.

[Structure of the Developing Unit]

Figure 88:
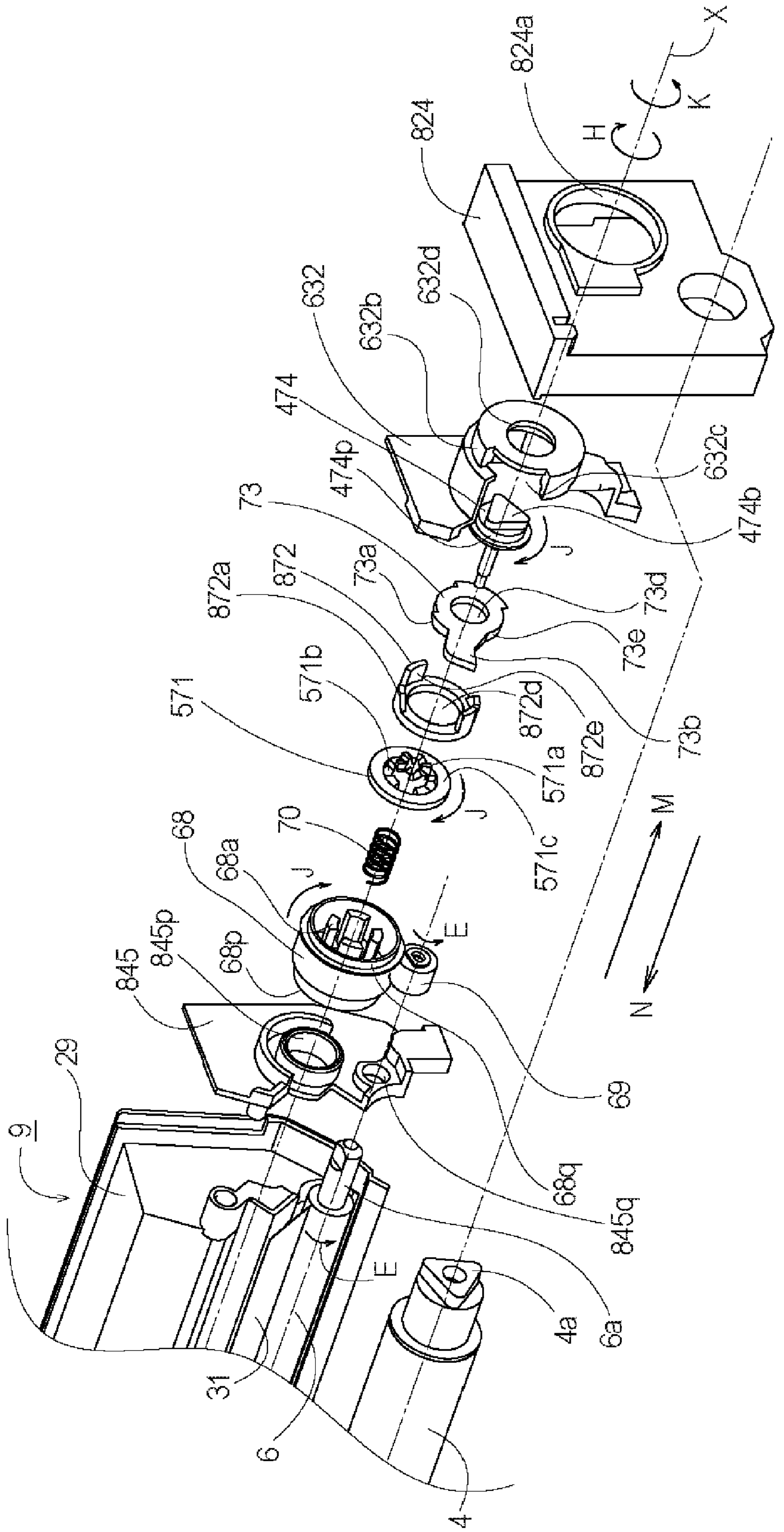
FIG. 88 is an exploded perspective view of a drive connecting portion of a process cartridge according to an eighth embodiment of the present invention.
Figure 89:
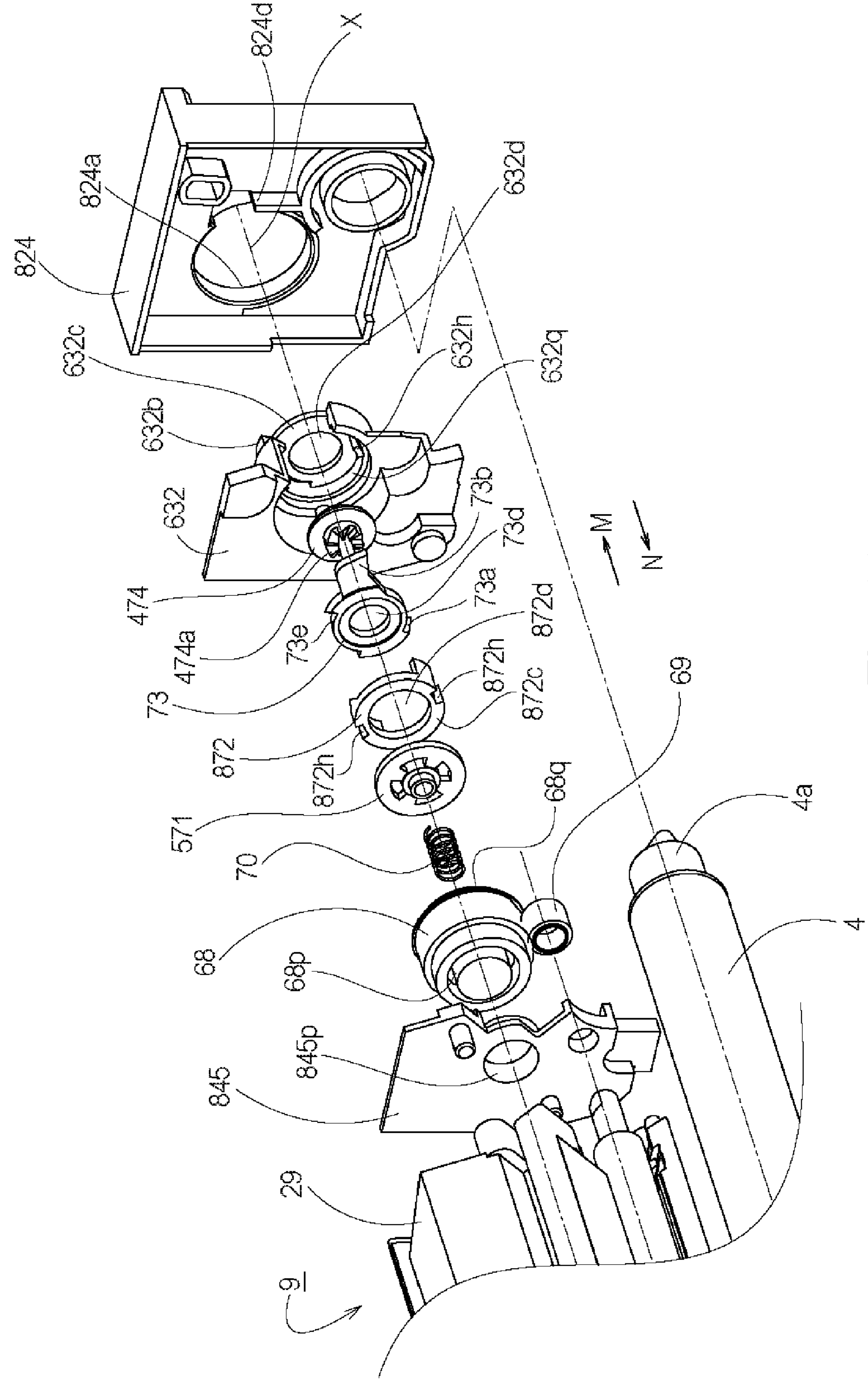
FIG. 89 is an exploded perspective view of the drive connecting portion of the process cartridge according to the eighth embodiment of the present invention, as seen from a non-driving side.

As shown in FIGS. 88 and 89, the developing unit 9 comprises a developing roller 6, a developing blade 31, a developing device frame 29, a bearing member 845, a developing device covering member 632 and so on.

In addition, as shown in FIG. 88, the bearing member 845 is fixed to one longitudinal end portion of the developing device frame 29. The bearing member 845 rotatably supports the developing roller 6. The developing roller 6 is provided with a developing roller gear 69 at a longitudinal end portion. Also, the bearing member 845 rotatably supports an idler gear 68 as a third drive transmission member for transmitting the driving force to the developing roller gear 69.

In addition, there is provided a downstream drive transmission member 571 and so on as the drive connecting portion for transmitting the drive to the idler gear 68 in the proper order.

The developing device covering member 632 is fixed to an outside of the bearing member 845 with respect to the longitudinal direction of the cartridge P. The developing device covering member 632 covers the developing roller gear 69, the idler gear 68, an upstream drive transmission member 474 as the first drive transmission member, a downstream drive transmission member 571 as the second drive transmission member. As shown in FIGS. 88 and 89, the developing device covering member 632 is provided with a cylindrical portion 632*b*. The cylindrical portion 632*b* is provided with an inside opening 632*d* through which the drive inputting portion 474*b* of the upstream drive transmission member 474 is exposed. When the cartridge P (PY, PM, PC, PK) is mounted to the main assembly 2 of the apparatus, the drive inputting portion 474*b* engages with the developing device-drive output member 62 (62Y, 62M, 62C, 62K) shown in part (b) of FIG. 3 to transmit the driving force from the driving motor (unshown) provided in the main assembly 2 of the apparatus. That is, the upstream drive transmission member 474 functions as a development input coupling. Therefore, the driving force inputted to the upstream drive transmission member 474 from the main assembly 2 of the apparatus is transmitted to the developing roller gear 69 and the developing roller 6 through the idler gear 68. The structures of a drive connecting portion will be described in detail hereinafter.

[Assembling of the Drum Unit and the Developing Unit]

Figure 90:
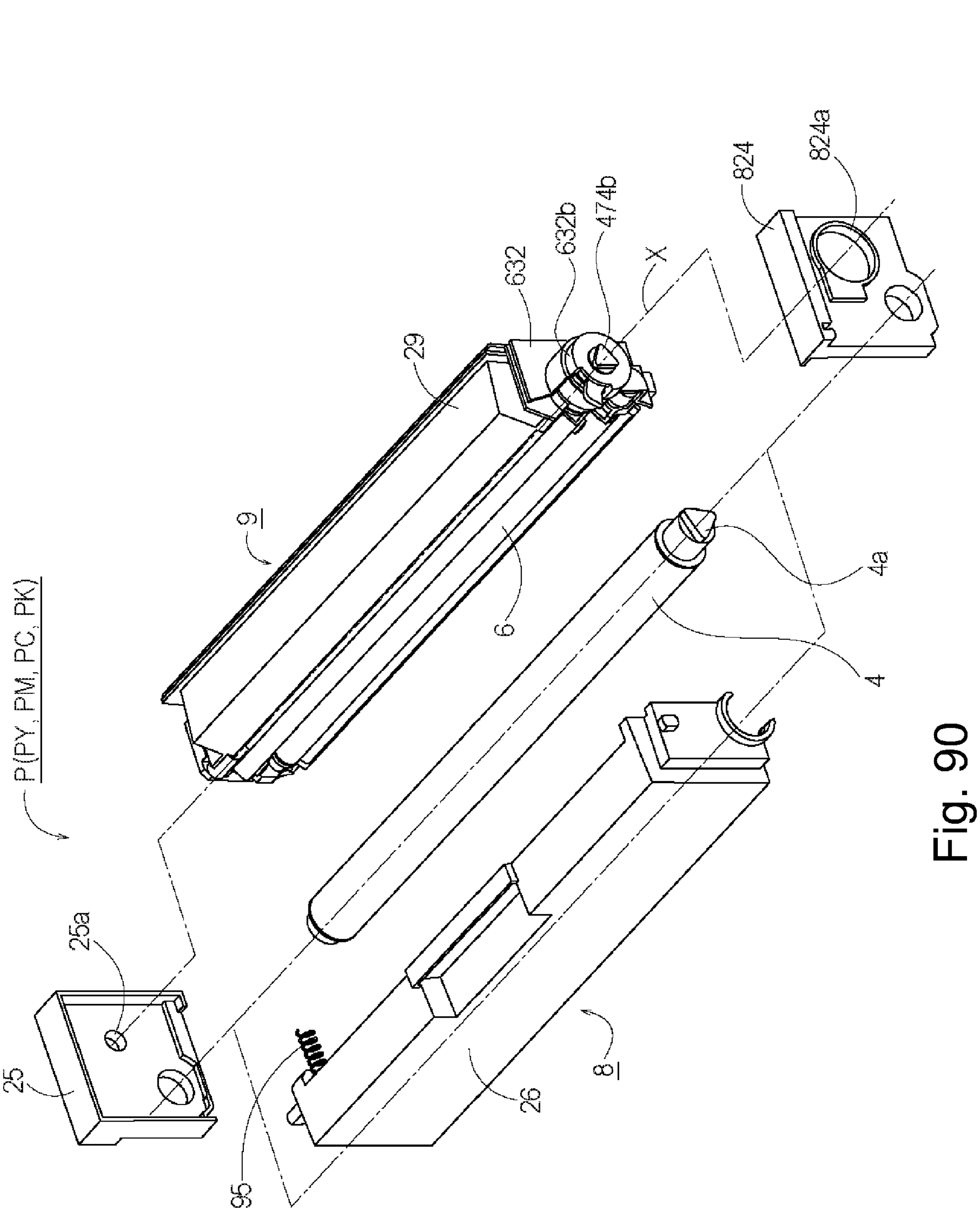
FIG. 90 is an exploded perspective view of the process cartridge according to the eighth embodiment of the present invention.
Figure 91:
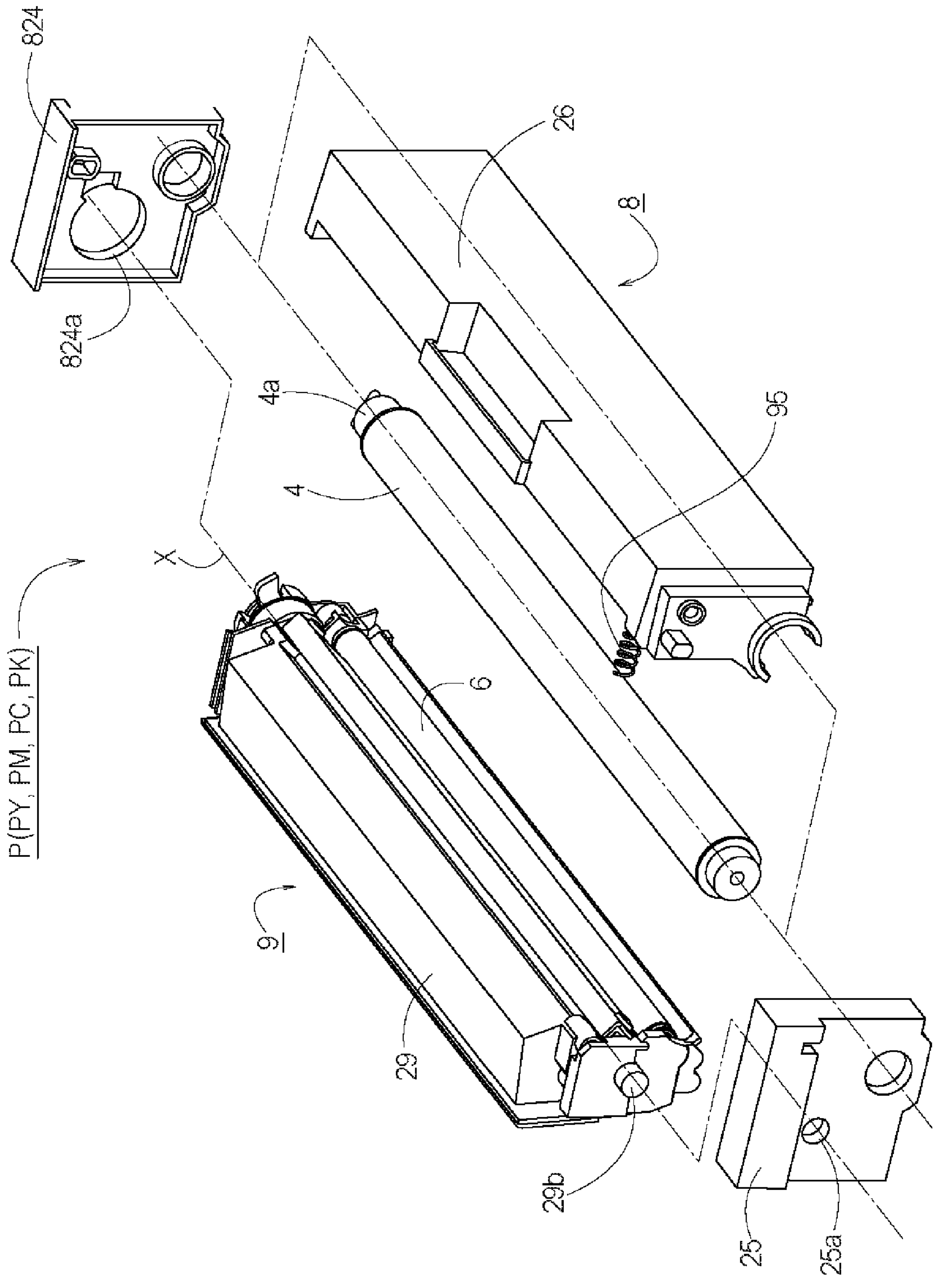
FIG. 91 is an exploded perspective view of the process cartridge according to the eighth embodiment of the present invention.

As shown in FIGS. 90 and 91, when the developing unit 9 and drum unit 8 are connected with each other, an outside circumference 632*a* of a cylindrical portion 632*b* of the developing device covering member 632 is engaged with a supporting portion 824*a* of the driving side cartridge cover member 824 at one end portion side of-the cartridge P. At the other end portion side of-the of the cartridge P, a projected portion 29*b* projected from the developing device frame 29 is engaged into a supporting hole portion 25*a* of the non-driving side cartridge cover member. By this, the developing unit 9 is supported rotatably relative to the drum unit 8. Here, the rotational center of the developing unit 9 relative to the drum unit is called “rotational center X”. The rotational center X is an axis resulting the center of the supporting hole portion 824*a* and the center of the supporting hole portion 25*a*.

[Structure of the Drive Connecting Portion]

Referring to FIGS. 88 and 89, the structure of the drive connecting portion will be described.

The general arrangement thereof will be described, first.

Between the bearing member 845 and the driving side cartridge cover member 824, there are provided, in the order named in the direction from the bearing member 845 toward driving side cartridge cover member 824, the idler gear 68, a spring 70 which is an elastic member as an urging member, the downstream drive transmission member 571 as the second drive transmission member, a disconnecting cam 872 as a coupling releasing member which is a part of a disconnecting mechanism, a disconnecting lever 73 as an operating member (rotatable member) which is a part of the disconnecting mechanism, and the developing device covering member 632, the upstream drive transmission member 474 as the first drive transmission member. These members are coaxial with the upstream drive transmission member 474. This embodiment, the drive connecting portion comprises the idler gear 824, the spring 70, the downstream drive transmission member 571, the disconnecting cam 872, the disconnecting lever 73, the upstream drive transmission member 474, the developing device covering member 632 and the driving side cartridge cover member 824. They will be described in detail.

The bearing member 845 rotatably supports the idler gear 68 as the third drive transmission member. In more detail, the first shaft receiving portion 845*p* (cylindrical outer surface) of the bearing member 845 rotatably supports a supported portion 68*p* (cylindrical inner surface) of the idler gear 68 (FIGS. 88, 89).

Furthermore, the bearing member 845 rotatably supports the developing roller 6. In more detail, the second shaft receiving portion 845*q* (cylindrical inner surface) of the bearing member 845 rotatably supports a shaft portion 6*a* of the developing roller 6.

The shaft portion 6*a* of the developing roller 6 is fitted into the developing roller gear 69. By doing so, the rotational force is transmitted to the developing roller 6 through the developing roller gear 69 from the idler gear 68.

Figure 92:
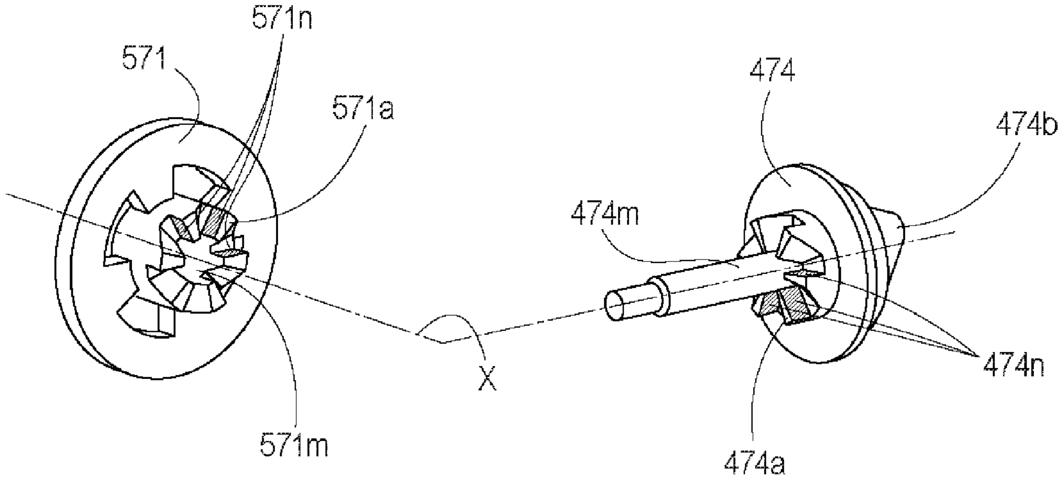
FIG. 92 is a perspective view of first and second coupling members according to the eighth embodiment of the present invention.

FIG. 92 shows structures of the upstream drive transmission member 474 as the first drive transmission member and the downstream drive transmission member 571 as the second drive transmission member. In addition, the downstream drive transmission member 571 is provided with a hole portion 571*m* at the center portion. The hole portion 571*m* engages with a small diameter cylindrical portion 474*m* of the upstream drive transmission member 474. By doing so, the downstream drive transmission member 571 is supported slidably relative to the upstream drive transmission member 474 (rotatable and slidable along the axes).

Here, as shown in FIGS. 88 and 89, the disconnecting cam 872 is disposed between the downstream drive transmission member 571 and the upstream drive transmission member 474. As described above, the disconnecting cam 872 has a substantially ring configuration, and has an outer peripheral surface 872*i*, and the developing device covering member 632 is provided with an inner peripheral surface 632*i* (FIG. 51). The inner peripheral surface 632*i* is engageable with the outer peripheral surface 872*i*. By doing so, the disconnecting cam 872 is slidable relative to the developing device covering member 632 (slidable in parallel with the axis of the developing roller 6).

The developing device covering member 632 is provided with a guide 632*h* as a second guide portion, and the disconnecting cam 872 is provided with a guide groove 872*h* as a second guided portion. Here, the guide 632*h* and the guide groove 872*h* are in parallel with the axial direction (arrows M and N). Here, the guide 632*h* of the developing device covering member 632 is engaged with the guide groove 872*h* of the disconnecting cam 872. By the engagement between the guide 632*h* and the guide groove 872*h*, the disconnecting cam 872 is slidable relative to the developing device covering member 632 only in the axial direction (arrows M and N).

Figure 93:
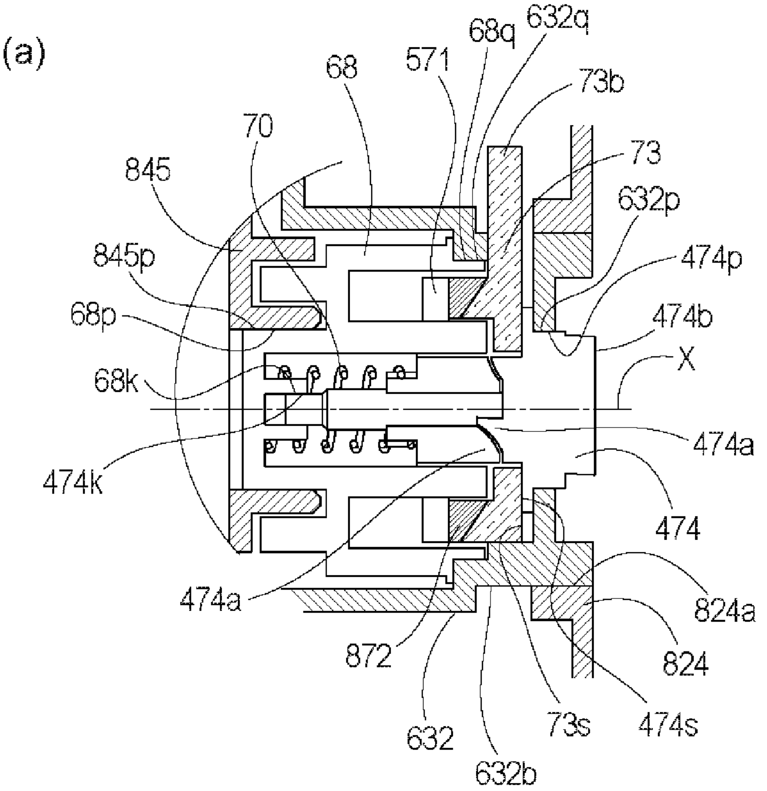
FIG. 93 is a sectional view of a drive connecting portion according to the eighth embodiment of the present invention.
Figure 93:
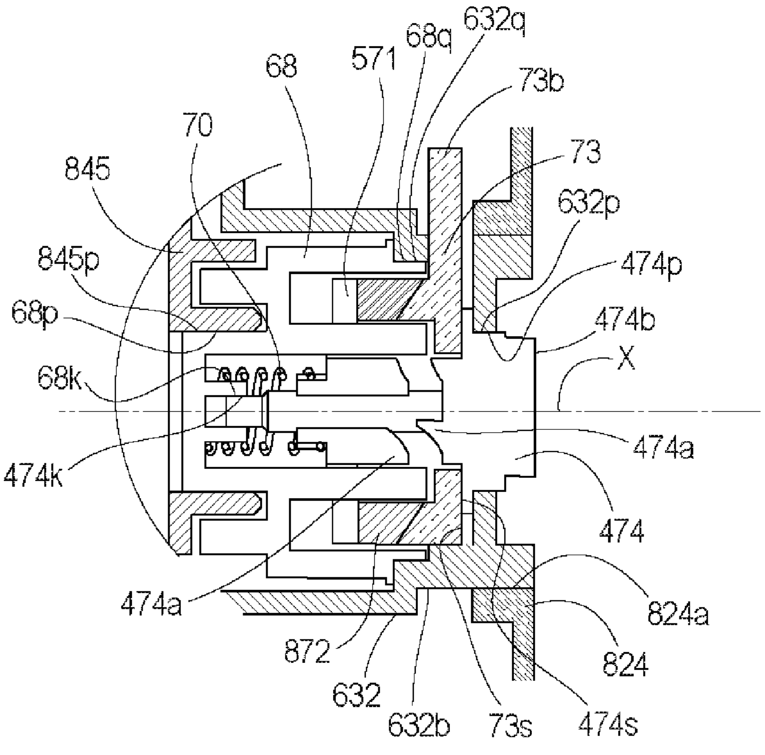

FIG. 93 is a sectional view of the drive connecting portion.

A cylindrical portion 68*p* (cylindrical outer surface) of the idler gear 68 and the first shaft receiving portion 845*p* (cylindrical inner surface) of the bearing 845 are engaged with each other. In addition, the cylindrical portion 68*q* of the idler gear 68 and the inside circumference 632*q* of the developing device covering member 632 are engaged with each other. That is, the idler gear 68 is rotatably supported at the opposite end portions by the bearing member 845 and the developing device covering member 632.

In addition, a cylindrical portion 474*k* (the other end portion side supported portion) of the upstream drive transmission member 474 which has a small diameter and the hole portion 68*k* (the other end portion side supporting portion) of the idler gear 68 are rotatably engaged with each other (FIG. 93). Also, a cylindrical portion 474*p* (one end portion side supported portion) of the upstream drive transmission member 474 and a hole portion 632*p* (one end portion side supporting portion) of the developing device covering member 632 are rotatably engaged with each other. That is, the upstream drive transmission member 474 is rotatably supported at the opposite end portions thereof by the idler gear 68 and the developing device covering member 632.

Here, the cylindrical portion 474*k* is provided at a free end of a shaft portion 74*m*, and the cylindrical portion 474*p* is provided between the drive inputting portion 474*b* and the claw portion 474*a*.

In addition, the cylindrical portion 474*p* is further from the rotational axis X than the claw portion 474*a* in a radial direction of rotation of the upstream drive transmission member 474.

The cylindrical portion 474*p* is further from the rotational axis X than the drive inputting portion 474*b* in the radial direction of rotation of the upstream drive transmission member 474.

Furthermore, the first shaft receiving portion 845*p* (cylindrical inner surface) of the bearing member 845, the inside circumference 632*q* of the developing device covering member 632 and the hole portion 632*p* are co-axial with the rotational center X of the developing unit 9. That is, the upstream drive transmission member 474 is supported rotatably about the rotational center X of the developing unit 9. As described above, the cylindrical portion 474*m* of the upstream drive transmission member 474 and the hole portion 571*m* of the downstream drive transmission member 571 are engaged with each other (FIG. 92). By doing so, as a result, the downstream drive transmission member 571 is also supported rotatably about the rotational center X of the developing unit 9.

A guided surface 73*s* of the disconnecting lever 73 is contacted to a guiding surface 474*s* of the upstream drive transmission member 474. By this, the disconnecting lever 73 is limited in the movement in the direction of the axis X.

Part (a) of FIG. 93 is a sectional view of the drive connecting portion illustrating a state in which the claws 571*a* of the downstream drive transmission member 571 and the claws 474*a* of the upstream drive transmission member 474 are engaged with each other. Part (b) of FIG. 93 is a sectional view of the drive connecting portion in which the claws 571*a* of the downstream drive transmission member 571 and the claws 474*a* of the upstream drive transmission member 474 are spaced from each other. Here, at least a part of the disconnecting lever 73 is between the downstream drive transmission member 571 and the upstream drive transmission member 474.

Figure 94:
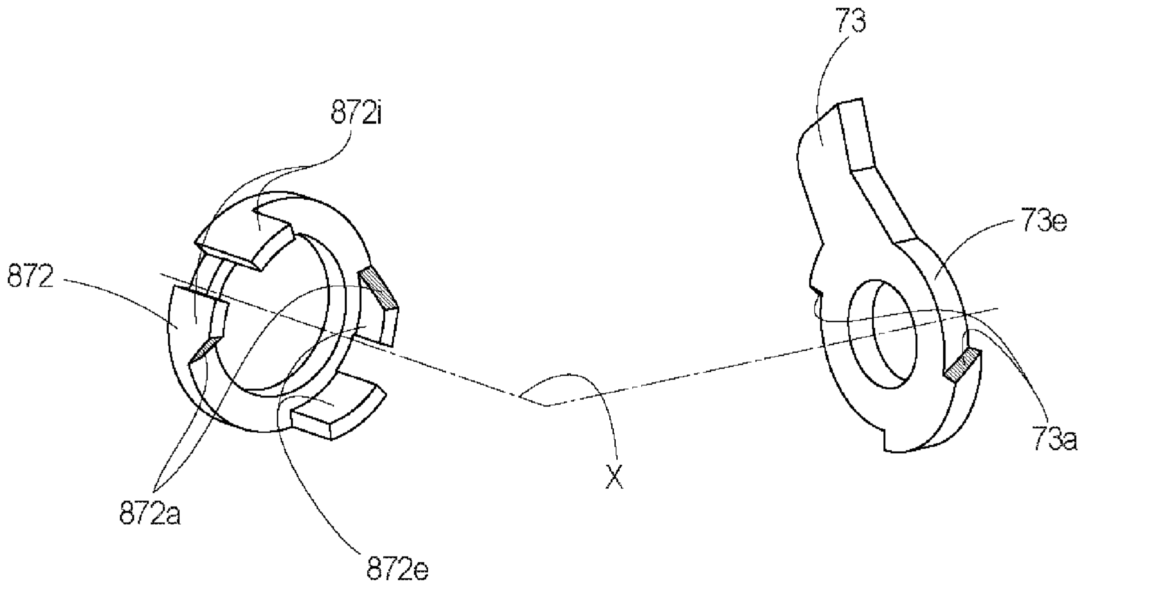
FIG. 94 is a perspective view of a releasing member and peripheral parts thereof according to the eighth embodiment of the present invention.

FIG. 94 shows constitutes of the disconnecting cam 872 and the disconnecting lever 73. The disconnecting cam 872 as the coupling releasing member includes a contact portion 872*a* as a force receiving portion (portion-to-be-urged and a cylindrical inner surface 872*e*. Here, the contact portion 872*a* is inclined relative to the rotational axis X (parallel with rotational axis of the developing roller 6). In addition, the disconnecting lever 73 is provided with a contact portion 73*a* as an urging portion and an outer peripheral surface 73*e*. Here, the contact portion 73*a* is inclined to rotational axis X.

The contact portion 73*a* of the disconnecting lever 73 is contactable to the contact portion 872*a* of the disconnecting cam 872. In addition, the cylindrical inner surface 872*e* of the disconnecting cam 872 and the outer peripheral surface 73*e* of the disconnecting lever 73 are slidably engaged with each other. Furthermore, the outer peripheral surface 872*i* and the cylindrical inner peripheral surface 872*e* of the disconnecting cam 872, and the outer peripheral surface 73*e* of the disconnecting lever 73 are co-axial with each other. Here, as described above, the outer peripheral surface 872*i* of the disconnecting cam 872 engages with the inner peripheral surface 632*i* of the developing device covering member 632 (FIG. 51). The outer peripheral surface 872*i* of the disconnecting cam 872 and the inner peripheral surface 632*i* of the developing device covering member 632 are co-axial with the rotational center X. In other words, the disconnecting lever 73 is supported through the disconnecting cam 872 and the developing device covering member 632 and is rotatably about the rotational center X relative to the developing unit 9 (developing device frame 29).

Here, the disconnecting lever 73 is provided with a ring portion 73*j* having a substantially ring configuration. The ring portion 73*j* includes the contact portion 73*a* and the outer peripheral surface 73*e*. Furthermore, the disconnecting lever 73 is provided with a force receiving portion 73*b* as a projected portion projected from the ring portion 73*j* radially outwardly of the ring portion 73*j*.

Figure 95:
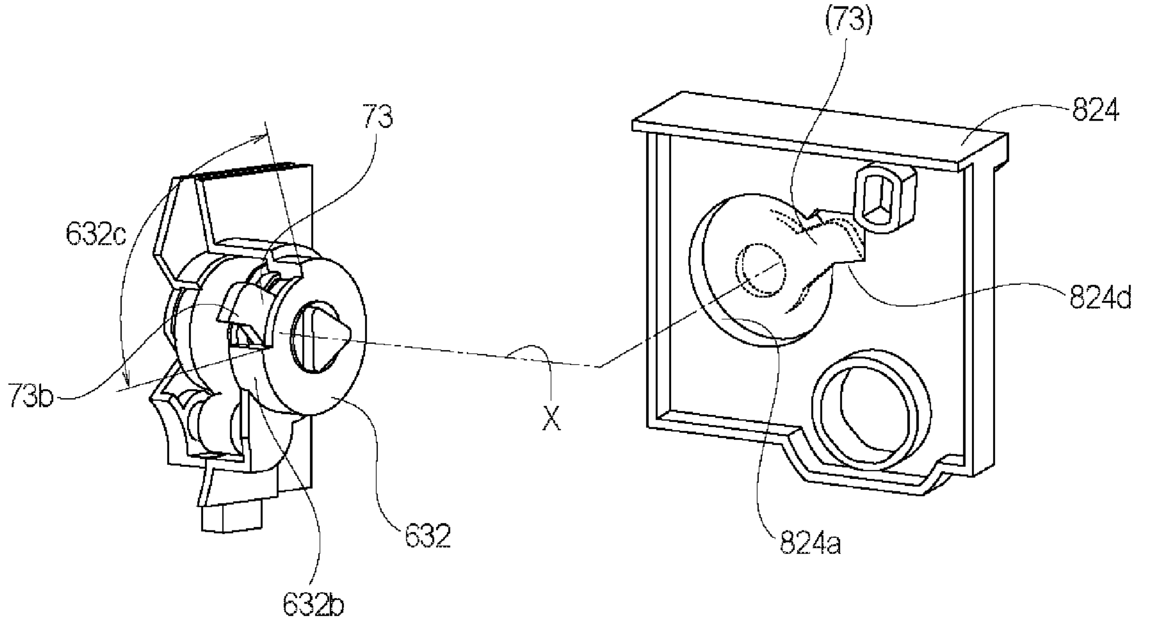
FIG. 95 is a perspective view of a drive connecting portion according to the eighth embodiment of the present invention.

FIG. 95 shows structures of the drive connecting portion and the driving side cartridge cover member 824. The disconnecting lever 73 is provided with the force receiving portion 73*b*. The force receiving portion 73*b* engages with the regulating portion 824*d* of the driving side cartridge cover member 824 to receive a force from the driving side cartridge cover member 824 (a part of the photosensitive member frame). The force receiving portion 73*b* projects through an opening 632*c* provided in a part of a cylindrical portion 632*b* of the developing device covering member 632 to be engageable with the regulating portion 824*d* of the driving side cartridge cover member 824. By the engagement between the regulating portion 824*d* and the force receiving portion 73*b*, the disconnecting cam 73 is prevented in the relative movement about the axis X relative to the driving side cartridge cover member 824.

Figure 96:
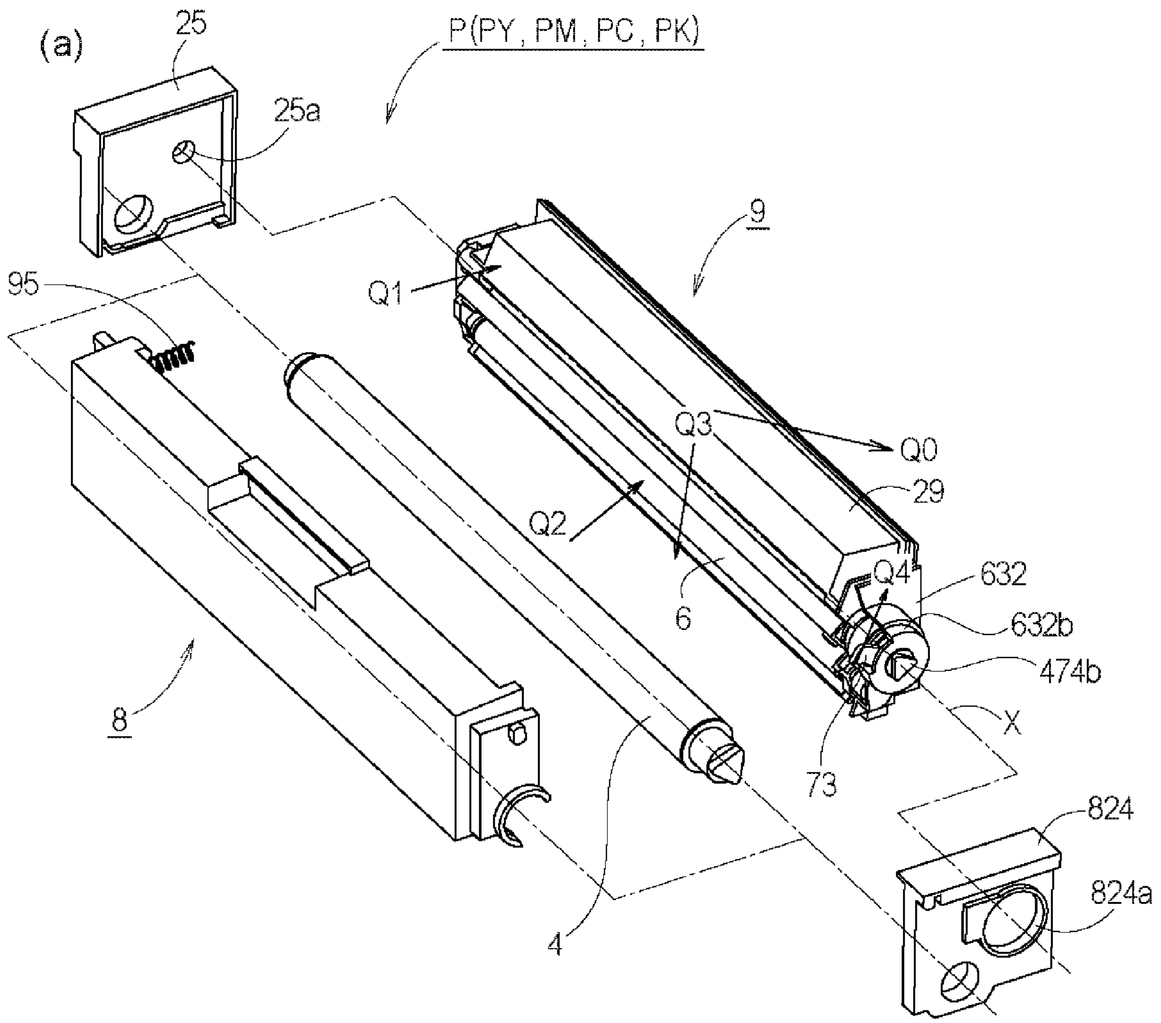
FIG. 96 is an exploded perspective view of the process cartridge according to the eighth embodiment of the present invention.
Figure 96:
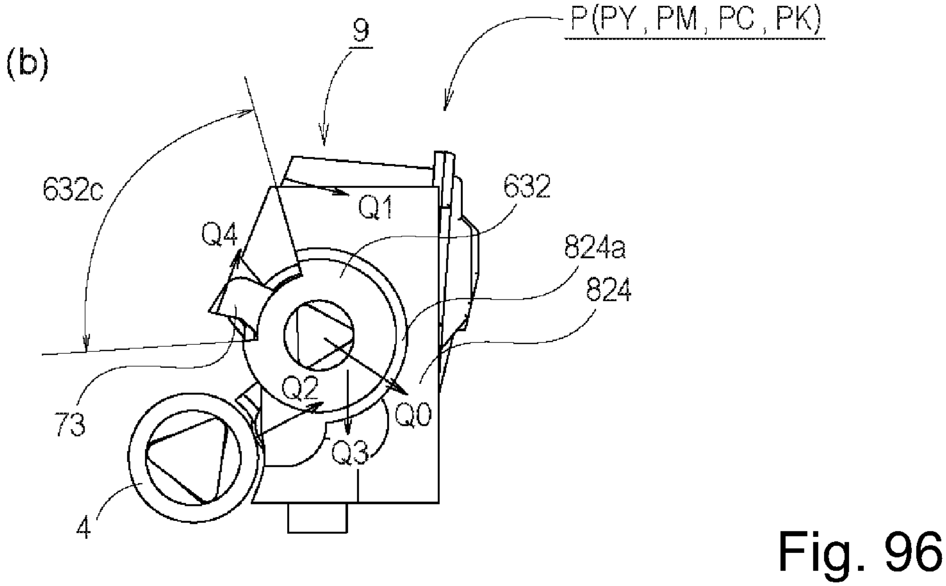

Part (a) of FIG. 96 is a perspective view of the cartridge P schematically showing the force applied to the developing unit 9, and part (b) FIG. 96 is a side view of a part as seen in the direction along the axis X.

To the developing unit 9, a reaction forced Q1 applied from the urging spring 95, a reaction force Q2 applied from the drum 4 through the developing roller 6, and the weight Q3 thereof and so on are applied. In addition, upon the drive disconnecting operation, the disconnecting lever 73 receives a reaction force Q4 by engagement with the driving side cartridge cover member 824, as will be described in detail hereinafter. The resultant force Q0 of the reaction forces Q1, Q2 and Q4 and the weight Q3 is applied to supporting hole portions 824*a*, 25*a* of the driving side rotatably supporting the developing unit 9 and non-driving side cartridge cover members 824 and 25.

Therefore, when the cartridge P is seen along the axial direction ((b) of FIG. 96), a sliding portion 824*a* of the driving side cartridge cover member 824 contacting the developing device covering member 632 is necessary with respect to the direction of the resultant force Q0. On the other hand, with respect to the direction other than the direction of the resultant force Q0, the cylindrical portion 632*b* of the developing device covering member 632 or the sliding portion 824*a* of the driving side cartridge cover member 824 is not inevitable. In this embodiment in view of these, an opening 632*c* which opens in the direction different from that of the resultant force Q0 is provided in a part of the cylindrical portion 632*b* sliding relative to the driving side cartridge cover member 824 of the developing device covering member 632. The disconnecting lever 73 for engaging with the regulating portion 824*d* of the driving side cartridge cover member 824 is through the opening 632*c*.

[Drive Disconnecting Operation]

The operation of the drive connecting portion at the time of change from the contact state to the spaced state between the developing roller 6 and the drum 4 will be described.

[State 1]

Figure 97:
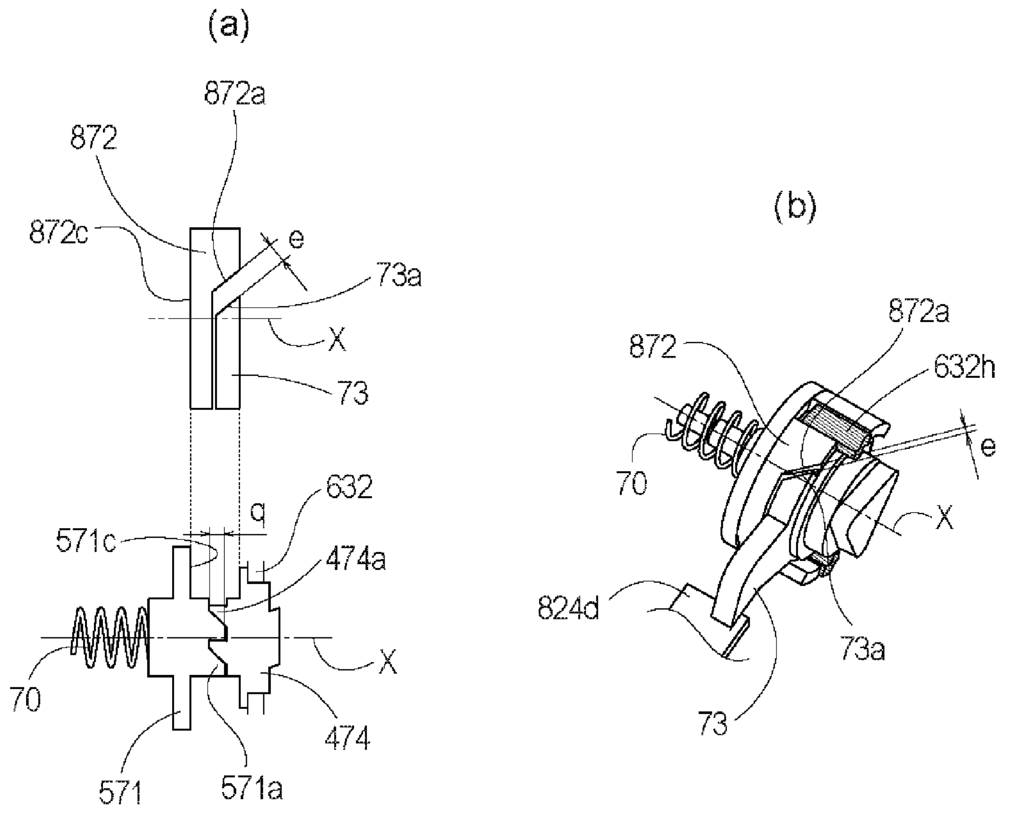
FIG. 97 is a schematic view and a perspective view of the drive connecting portion according to the eighth embodiment of the present invention.

As shown in part (a) of FIG. 7, the main assembly spacing member 80 and the force receiving portion 845*a* of the bearing member 845 are spaced by a gap d. At this time, the drum 4 and the developing roller 6 contact to each other. This state will be called "state 1" of the main assembly spacing member 80. Part (a) of FIG. 97 schematically shows the drive connecting portion at this time. Part (b) of FIG. 97 is a perspective view of the drive connecting portion. In FIG. 97, some parts are omitted for better illustration. In part (a) of FIG. 97, a pair of the upstream drive transmission member 474 and the downstream drive transmission member 571, and a pair of the disconnecting cam 872 and the disconnecting lever 73 are shown separately. In part (b) of FIG. 97, only a part of the developing device covering member 632 which include is guide 632*h* is shown. Between the contact portion 872*a* of the disconnecting cam 872 and the contact portion 73*a* of the disconnecting lever 73, there is a gap e. At this time, the claws 474*a* of the upstream drive transmission member 474 and the claws 571*a* of the downstream drive transmission member 571 are engaged with each other by an engagement depth q. In addition, as described above, the downstream drive transmission member 571 engages with the idler gear 68 (FIG. 59). Therefore, the driving force inputted to the upstream drive transmission member 474 at main assembly 2 of the apparatus is transmitted to the idler gear 68 through the downstream drive transmission member 571. By this, the developing roller gear 69 and the developing roller 6 are driven. The positions of the parts at this time is called a contacting position, a development contact and drive transmission state.

[State 2]

Figure 98:
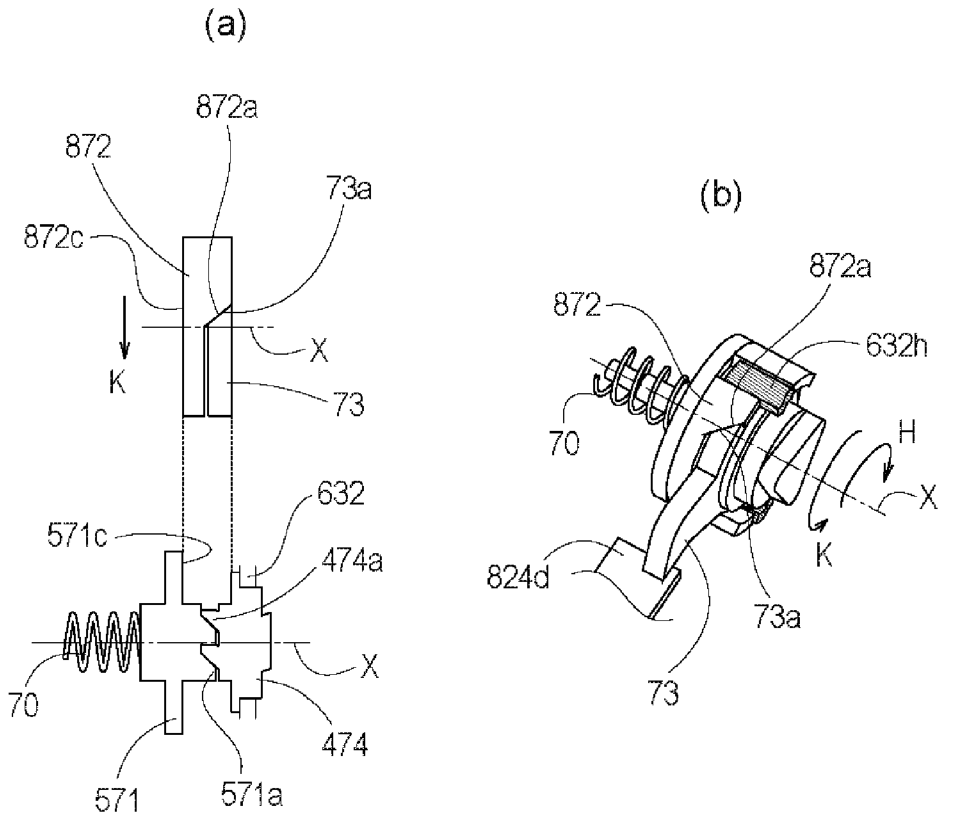
FIG. 98 is a schematic view and a perspective view of the drive connecting portion according to the eighth embodiment of the present invention.

When the main assembly spacing member 80 moves in the direction of an arrow F1 only δ1 in the Figure from the development contact and drive transmission state (part (b) of FIG. 7), the developing unit 9 rotates in the direction of an arrow K only an angle θ1 about the rotational center X, as described hereinbefore. As a result, the developing roller 6 is spaced from the drum 4 by a distance ε1. The disconnecting cam 872 and the developing device covering member 632 in the developing unit 9 rotate in the direction indicated by the arrow K by an angle θ1 in interrelation with the rotation of the developing unit 9. On the other hand, the disconnecting lever 73 is provided in the developing unit 9, but as shown in FIG. 95, the force receiving portion 73*b* is engaged with the engaging portion 824*d* of the driving side cartridge cover member 824. Therefore, the force receiving portion 73*b* does not move in interrelation with the rotation of the developing unit 9, and does not change the position thereof. That is, the disconnecting lever 73 receives the reaction force from the engaging portion 824*d* of the driving side cartridge cover member 824 to make a relative movement (rotation) relative to the developing unit 9. Part (a) of FIG. 98 schematically shows the drive connecting portion at this time. Part (b) of FIG. 98 is a perspective view of the drive connecting portion. In the state shown the Figure, the disconnecting cam 872 rotates in the direction of the arrow K in the Figure in interrelation with the rotation of the developing unit 9, and the contact portion 872*a* of the disconnecting cam 872 and the contact portion 73*a* of the disconnecting lever 73 start to contact with each other. At this time, the claw 474*a* of the upstream drive transmission member 474 and the claw 571*a* of the downstream drive transmission member 571 are kept engaged with each other. Therefore, the driving force inputted to the upstream drive transmission member 474 from the main assembly 2 of the apparatus is transmitted to the developing roller 6 through the downstream drive transmission member 571, the idler gear 68 and the developing roller gear 69. The state of these parts in this state is called a developing device spacing and drive transmission state. In the state 1, it is not inevitable that the force receiving portion 73*b* contacts the engaging portion 824*d* of the driving side cartridge cover member 824. More particularly, in the state 1, the force receiving portion 73*b* may be spaced from the engaging portion 824*d* of the driving side cartridge cover member 824. In this case, in the process of shifting operation from the state 1 to the state 2, the gap between the force receiving portion 73*b* and the engaging portion 824*d* of the driving side cartridge cover member 824 disappears, that is, the force receiving portion 73*b* is brought into contact to the engaging portion 824*d* of the driving side cartridge cover member 824.

[State 3]

Figure 99:
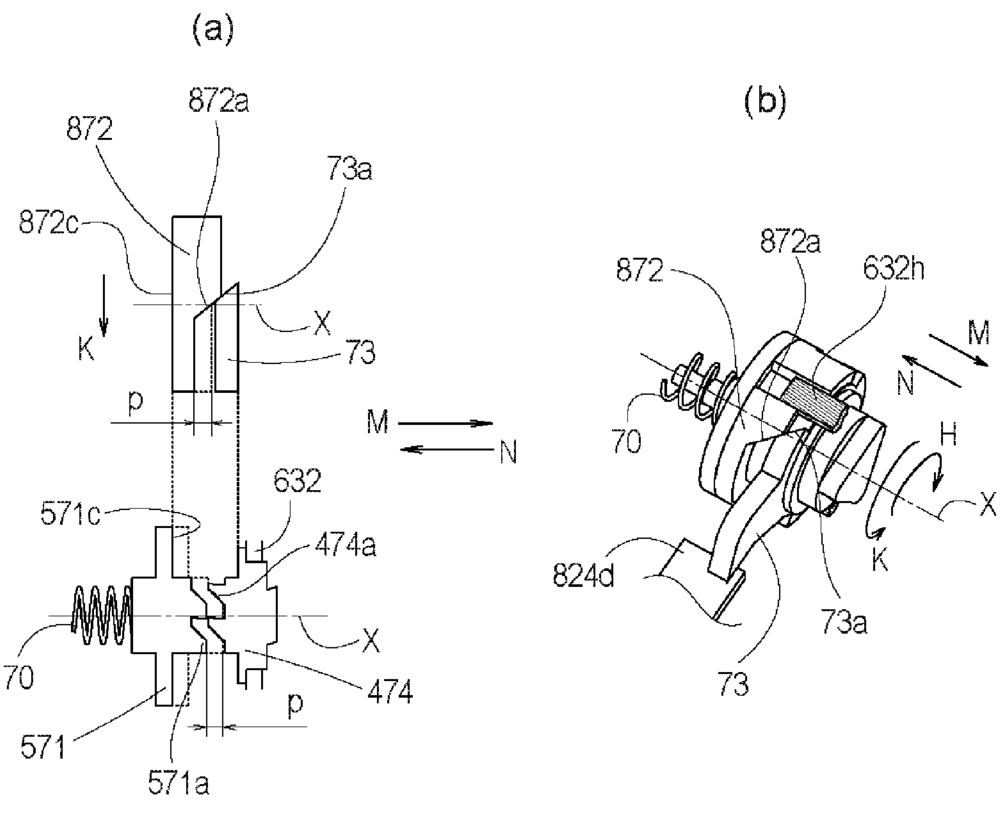
FIG. 99 is a schematic view and a perspective view of the drive connecting portion according to the eighth embodiment of the present invention.

FIG. 99 shows the state of the drive connecting portion at this time when the main assembly spacing member 80 moves in the direction of the arrow F1 in the Figure by δ2 from the developing device spacing and drive transmission state (part (c) of FIG. 7). In interrelation with the rotation of the developing unit 9 by the angle θ2 (>θ1), the disconnecting cam 872 and the developing device covering member 632 rotate. On the other hand, the disconnecting lever 73 does not change the position thereof, similarly to the above-described case, but the disconnecting cam 872 rotates in the direction of the arrow K in the Figure. At this time, the contact portion 872*a* of the disconnecting cam 872 receives a reaction force from the contact portion 73*a* of the disconnecting lever 73. In addition, as described above, the guide groove 872*h* of the disconnecting cam 872 is limited by engaging with the guide 632*h* of the developing device covering member 632 to be movable only in the axial direction (arrows M and N) (FIG. 51). Therefore, as a result, the disconnecting cam 872 slides in the direction of the arrow N by a movement distance p. In interrelation with the movement of the disconnecting cam 872 in the direction of the arrow N, an urging surface 872*c*, as the urging portion, of the disconnecting cam 872 urges the urged surface 571*c*, as the portion-to-be-urged, of the downstream drive transmission member 571. By this, the downstream drive transmission member 571 slides in the direction of the arrow N against an urging force of the spring 70 by the movement distance p.

At this time, the movement distance p is larger than the engagement depth q between the claws 474*a* of the upstream drive transmission member 474 and the claws 571*a* of the downstream drive transmission member 571, and therefore, the claws 474*a* and the claws 571*a* are disengaged from each other. Then, since the upstream drive transmission member 474 receives the driving force from the main assembly 2 of the apparatus, it continues to rotate, and on the other hand, the downstream drive transmission member 571 stops. As a result, the rotations of the idler gear 68, the developing roller gear 69 and the developing roller 6 stop. The state of the parts is a spacing position, or a developing device spacing and drive disconnection state.

In the manner described above, the drive for developing roller 6 is disconnected in interrelation with the rotation of the developing unit 9 in the direction of the arrow K. With such structures, the developing roller 6 can space from the drum 4 while rotating, so that the drive to the developing roller 6 can be stopped in accordance with the spacing distance between the developing roller 6 and the drum 4.

[Drive Connecting Operation]

Then, the description will be made as to the operation of the drive connecting portion when the developing roller 6 and the drum 4 change from the spacing state to the contacting state. The operation is the reciprocal of the operation from the above-described development contact state to the spaced-developing-device-state.

In the spaced-developing-device-state (the state in which the developing unit 9 is in the angle θ2 position as shown in part (c) of FIG. 7), the drive connecting portion is in the state in which the claws 474*a* of the upstream drive transmission member 474 and the claws 571*a* of the downstream drive transmission member 571 are in a disconnected state, as shown in FIG. 99.

When the developing unit 9 is gradually rotated from this state in the direction of an arrow H shown in FIG. 7, the state in which the developing unit 9 is rotated only the angle θ1 results (the state shown in part (b) of FIG. 7 and FIG. 98), the downstream drive transmission member 571 is moved in the direction of the arrow M by the urging force of the spring 70. By this, the claw 474*a* of the upstream drive transmission member 474 and the claw 571*a* of the downstream drive transmission member 571 are brought into engagement with each other. By this, the driving force from the main assembly 2 is transmitted to the developing roller 6 to rotate the developing roller 6. At this time, the developing roller 6 and the drum 4 are still in the spaced state from each other.

By further rotating the developing unit 9 gradually in the direction of the arrow H shown in FIG. 7, the developing roller 6 can be contacted to the drum 4.

The foregoing is the explanation of the operation of the drive transmission to the developing roller 6 in interrelation with rotation of the developing unit 9 in the direction of the arrow H. With such structures, the developing roller 6 is brought into contact to the drum 4 while rotating, and the drive can be transmitted to the developing roller 6 depending on the spacing distance between the developing roller 6 and the drum 4.

As described in the foregoing, according to the structures, the drive disconnection state and the drive transmission state to the developing roller 6 are determined firmly by the rotation angle of the developing unit 9.

In the foregoing, the contact portion 872*a* of the disconnecting cam and the contact portion 73*a* of the disconnecting lever 73 make face-to-face contact with each other, but this is not inevitable. For example, the contact may be between a surface and a ridge line, between a surface and a point, between a ridge line and a ridge line or between a ridge line and a point. In addition, in the foregoing, the force receiving portion 73*b* of the disconnecting lever 73 engages with the regulating portion 824*d* of the driving side cartridge cover member 824, but this is not inevitable, and it may be engaged with the cleaner container 26, for example.

In this embodiment, the developing unit 9 comprises the disconnecting lever 73 and the disconnecting cam 872. The disconnecting lever 73 is rotatable about the axis X relative to the developing unit 9, and is not slidable in the axial direction M or N. On the other hand, the disconnecting cam 872 is slidable in the axial directions M and N relative to the developing unit 9, but is not rotatable about the axis X. Thus, no member that makes a three-dimensional relative movement including the rotation about the rotational center X relative to the developing unit 9 and the sliding motion in the axial directions M and N is provided. In other words, the moving directions of the parts are assigned separately to the disconnecting lever 73 and the disconnecting cam 872. By this, the movement of the parts are two-dimensional, and therefore, the operations are stabilized. As a result, the drive transmission operation to the developing roller 6 in interrelation with the rotation of the developing unit 9 can be carried out smoothly.

Figure 100:
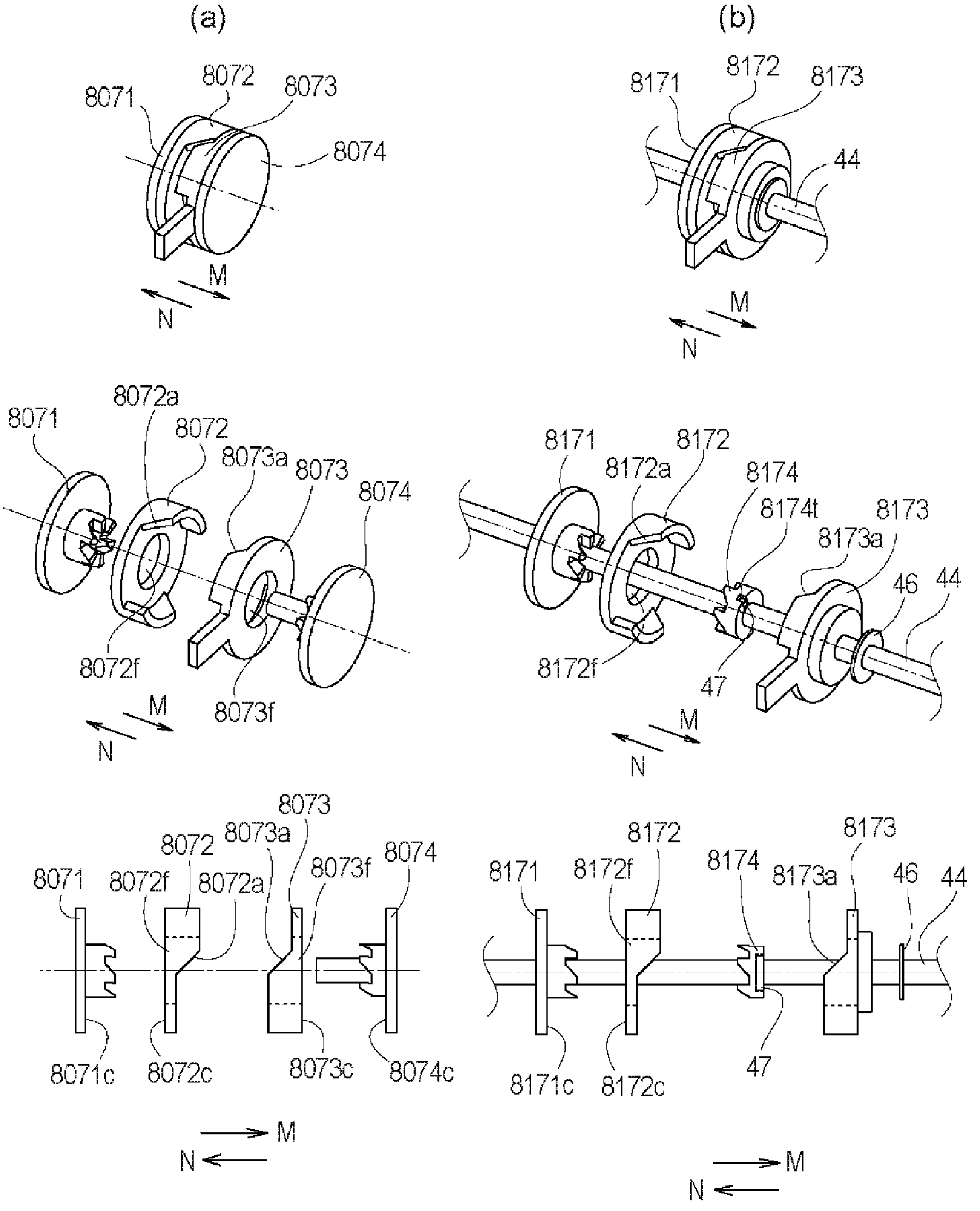
FIG. 100 is a schematic view illustrating a positional relation among a disconnecting cam, a disconnecting lever, a downstream drive transmission member and an upstream drive transmission member with respect to an axial direction.

FIG. 100 is a schematic view illustrating a positional relation among the disconnecting cam, the disconnecting lever, the downstream drive transmission member, the upstream drive transmission member with respect to the axial direction.

Part (a) of FIG. 100 shows the structure of this embodiment, in which a disconnecting cam 8072 and a disconnecting lever 8073 as the coupling releasing member which is a part of the disconnecting mechanism is provided between a downstream drive transmission member 8071 and a drive transmission member 8074. The upstream drive transmission member 37 and the downstream drive transmission member 38 are engaged through an opening 8072*f* of the disconnecting cam 8072 and an opening 8073*f* of the disconnecting lever 8073. Upon the drive disconnection, an urging surface 8072*c* as the urging portion of the disconnecting cam 8072 urges an urged surface 8071*c* as a portion-to-be-urged of the downstream drive transmission member 8071. Simultaneously, an urging surface 8073*c* as the urging portion of the disconnecting lever 8073 urges the urged surface 8074*c* as the portion-to-be-urged of the upstream drive transmission member 8074. That is, the disconnecting cam 8072 relatively urges the downstream drive transmission member 8071 in the direction of the arrow N, and the disconnecting lever 8073 relatively urges the upstream drive transmission member 8074 in the direction of the arrow M, by which the downstream drive transmission member 8071 and the upstream drive transmission member are separated from each other to disconnect the drive transmission in the direction of arrows M and N.

On the other hand, part (b) of FIG. 100 shows a structure different from the foregoing example, and various parts are slidably supported by a shaft 44 which is rotatable about the axis. Specifically, the disconnecting lever 8173 is supported slidably relative to the shaft 44. On the other hand, the upstream drive transmission member 8174 is supported rotatably, and is rotatable integrally with the shaft 44. For example, a pin 47 fixed to the shaft 44 and a groove 8174*t* provided in the upstream drive transmission member 8174 are engaged with each other, by which the upstream drive transmission member 8174 and the shaft 44 are fixed. The downstream drive transmission member 8171 is supported slidably relative to the shaft 44. The upstream drive transmission member 37 and the downstream drive transmission member 38 are engaged with each other through an opening 8172*f* of the disconnecting cam 8172 as the coupling releasing member. In addition, the shaft 44 is provided with a ring member 46 rotatable integral with the shaft. The ring member 46 functions to retain the disconnecting lever 8173 in the direction of the arrow M. Upon the drive disconnection with the above-described structure, the contact portion 8172*a* functioning force receiving portion of the disconnecting cam 8172 and the contact portion 8173*a* of the disconnecting lever 8173 are contacted to each other, first. Then, a gap exists between the disconnecting lever 8173 and the ring member 8173 in the axis M and N direction, the disconnecting lever 8173 moves in the direction of the arrow M to abut to the ring member 46. By this, the disconnecting lever 8173 is positioned relative to the shaft 44 with respect to the arrow M and N direction. Subsequently, in accordance with the movement of the disconnecting cam 8172 in the direction of the arrow N, the downstream drive transmission member 8171 moves away from the upstream drive transmission member 8174, by which the drive transmission is disconnected. With such structures, in order to reduce the movement distances of the downstream drive transmission member 8171 and/or the disconnecting cam 8172 in the directions of the arrows M and N for the driving connection and disconnection, or in order to control the driving connection and disconnection timing with high precision, it is desirable to control with high precision the positional accuracy of the ring member 46 fixed to the shaft 44 to position the disconnecting lever 8173 and the positional accuracy between the upstream drive transmission member 8174 and the ring member 46.

On the other hand, with the structures shown in part (a) of FIG. 100, when the upstream drive transmission member 8074 and the downstream drive transmission member 8071 are disconnected from each other, it will suffice if the disconnecting cam 8072 and the disconnecting lever 8073 are provided between the upstream drive transmission member 8074 and the downstream drive transmission member 8071. Therefore, the movement distances of the downstream drive transmission member 8071 and/or the disconnecting cam 8072 in the directions of the arrows M and N can be reduced, and in addition, the timing of the driving connection and disconnection can be controlled with high precision, and furthermore, the number of parts can be reduced, and the assembling property can be improved.

In FIG. 94, the positioning of the disconnecting lever 73 and the disconnecting cam 872 are effected by engagement between the outer peripheral surface 73*e* of the disconnecting lever 73 and the cylindrical inner peripheral surface 872*e* of the disconnecting cam 872 as the coupling releasing member.

Figure 101:
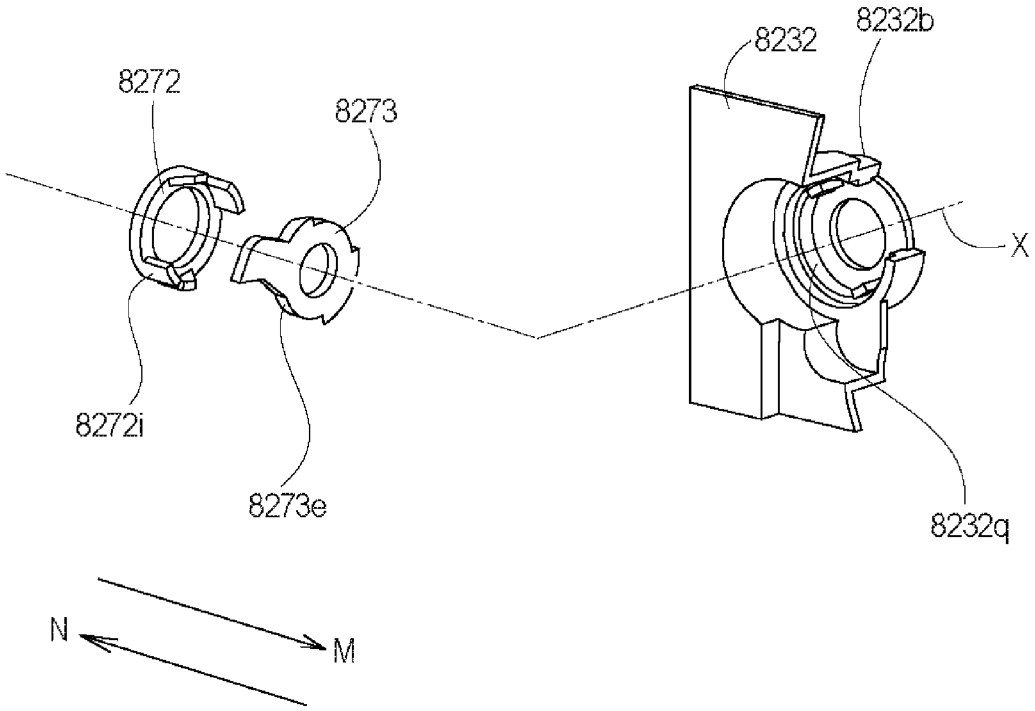
FIG. 101 is an exploded view of the disconnecting cam, the disconnecting lever and the developing device covering member.

However, this is not inevitable, and the structure as shown in FIG. 101 can be employed. More particularly, an outer peripheral surface 8273*e* of a disconnecting lever 8273 is supported slidably relative to an inner peripheral surface 8232*q* of a developing device covering member 8232, and a cylindrical inner surface 872*i* of a disconnecting cam 8272 is also supported slidably relative to the inner peripheral surface 8232*q* of the developing device covering member 8232.

Embodiment 9

A cartridge by a ninth embodiment of the invention will be described. In the description of this embodiment, the description of the structures similar to those of the foregoing embodiments will be omitted. The embodiment is similar to the above-described fifth embodiment.

Figure 102:
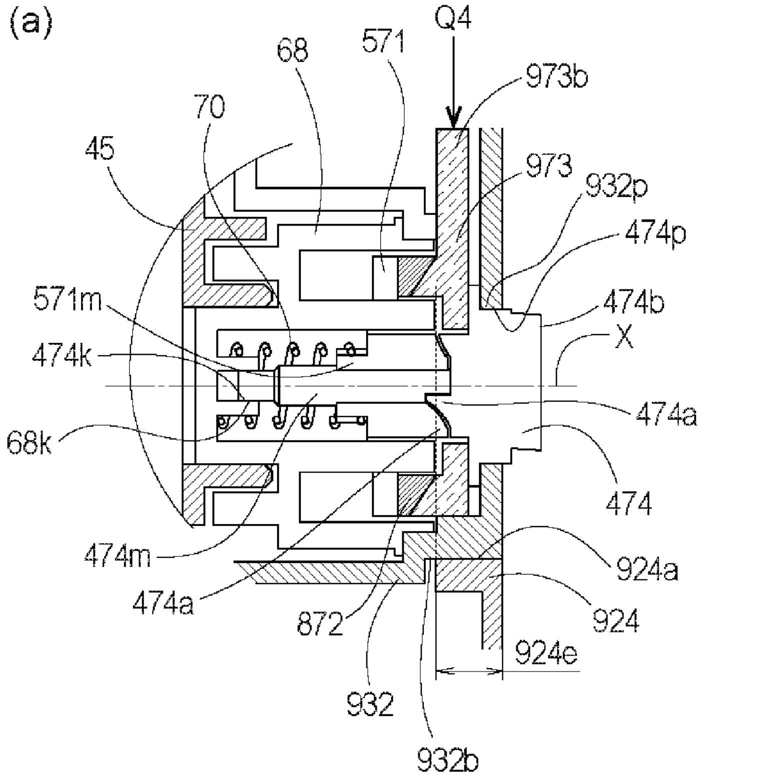
FIG. 102 is a sectional view of a drive connecting portion according to a ninth embodiment of the present invention.
Figure 102:
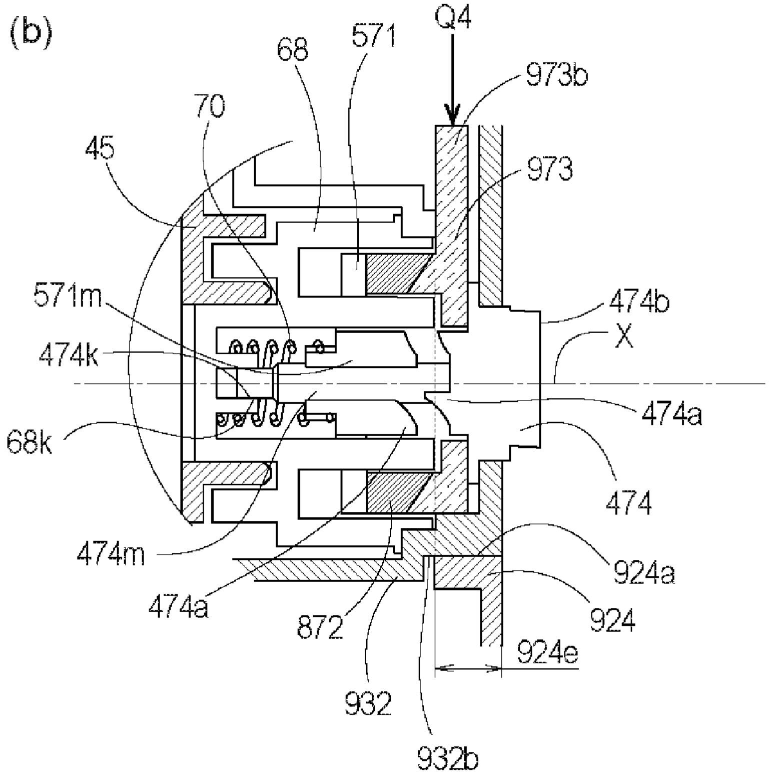

Part (a) of FIG. 102 which is a sectional view of a drive connecting portion shows a state in which claws 474*a* of an upstream drive transmission member 474 as a first drive transmission member and claws 571*a* of a downstream drive transmission member 571 as a second drive transmission member are engaged with each other. Part (b) of FIG. 102 which is a sectional view of the drive connecting portion shows a state in which the claws 474*a* of the upstream drive transmission member 474 and the claws 571*a* of the downstream drive transmission member 571 are separated from each other.

The disconnecting lever 973 projects through an opening 932*c* provided in a part of the cylindrical portion 932*b* slidable relative to the driving side cartridge cover member 924 of the developing device covering member 932. The disconnecting lever 973 is provided in a sliding range 924*e* of a sliding portion 924*a* which is between the driving side cartridge cover member 924 and the developing unit 9 with respect to the direction of an axis X.

Here, as described hereinbefore, upon the drive disconnecting operation the disconnecting lever 973 receives a reaction force Q4 (FIG. 96). A force receiving portion 973*b* of the disconnecting lever 93 for receiving the reaction force Q4 is provided in the sliding range 924*e* of the sliding portion 924*a* which is between the developing unit 9 is the driving side cartridge cover member 924. In addition, the disconnecting lever 973 is supported in the sliding range 924*e* of the sliding portion 924*a* which is between the developing unit 9 and the driving side cartridge cover member 924. That is, the reaction forced Q4 received by the disconnecting lever 973 is received without deviation in the direction of the axis X by the driving side cartridge cover member 924. Therefore, according to this embodiment, a deformation of the developing device covering member 932 can be suppressed. Because the deformation of the developing device covering member 932 is suppressed, the rotation of the developing unit 9 about the axis X relative to the driving side cartridge cover member 924 can be carried out stably. Furthermore, because the disconnecting lever 973 is provided in the sliding range 924*e* of the sliding portion 924*a* which is between the developing unit 9 and the driving side cartridge cover member 924 in the direction of the axis X, the drive connecting portion and the process cartridge can be downsized.

INDUSTRIAL APPLICABILITY

According to the present invention, a cartridge, a process cartridge and an electrophotographic image forming apparatus in which the drive switching for the developing roller can be effected within the cartridge are provided.

REFERENCE NUMERALS

1: image forming apparatus
2: main assembly
4: electrophotographic photosensitive drum
5: charging roller
7: cleaning blade
8: drum unit
9: developing unit, developing unit
24: driving side cartridge cover
25: non-driving side cartridge cover
26: cleaner container
27: residual developer accommodating portion
29: developing device frame
31: developing blade
32: developing device covering member
45: bearing
49: developer accommodating portion
68: idler gear
69: developing roller gear
70: spring
71: downstream drive transmission member
72: disconnecting cam
73: disconnecting lever
74: upstream drive transmission member
80: main assembly spacing member
81: rail
95: urging spring

The invention claimed is:

1. A cartridge comprising:

a developing roller for developing a latent image on a photosensitive drum, the developing roller being movable relative to the photosensitive drum between (i) a first position in which the developing roller is positioned proximate to the photosensitive drum such that the developing roller can develop the latent image on the photosensitive drum, and (ii) a second position in which the developing roller is spaced apart from the photosensitive drum; and a clutch comprising:

a first drive transmission member capable of receiving a rotational force to thereby rotate the first drive transmission member about a rotational axis, the first drive transmission member including an engagement portion comprising at least one projection; and a second drive transmission member capable of receiving the rotational force from the first drive transmission member to thereby rotate the second drive transmission member about a rotational axis, and the second drive transmission member being configured to transmit the rotational force to the developing roller, and the second drive transmission member including an engagement portion comprising at least one projection, the engagement portion of the second drive transmission member being engageable with the engagement portion of the first drive transmission member, wherein the engagement portion of the first drive transmission member and the engagement portion of the second drive transmission member contact each other when the developing roller is in the first position to enable the second drive transmission member to receive the rotational force from the first drive transmission member, and wherein the engagement portion of the first drive transmission member and the engagement portion of the second drive transmission member are separated from each other when the developing roller is in the second position in order to prevent the second drive transmission member from receiving the rotational force from the first drive transmission member.

2. The cartridge of claim 1, wherein the engagement portion of the first drive transmission member includes a plurality of projections, and the engagement portion of the second drive transmission member includes a plurality of projections that are contactable to the plurality of projections of the first drive transmission member.

3. The process cartridge of claim 1, further comprising a spring that urges one of the first drive transmission member and the second drive transmission member toward the other of the first drive transmission member and the second drive transmission member.

4. The cartridge of claim 1, further comprising a drive connecting and disconnecting member configured to connect the first and second drive transmission members when the developing roller is in the first position and configured to disconnect the first and second drive transmission members when the developing roller is in the second position.

5. The process cartridge of claim 1, wherein one of the first drive transmission member and the second drive transmission member is movable along its rotational axis in order to separate the first drive transmission member and the second transmission member from each other.

6. A cartridge comprising:

a developing roller for developing a latent image on a photosensitive drum, the developing roller being movable relative to the photosensitive drum between (i) a first position in which the developing roller is positioned proximate to the photosensitive drum such that the developing roller can develop the latent image on the photosensitive drum, and (ii) a second position in which the developing roller is spaced apart from the photosensitive drum; and a clutch comprising:

a first drive transmission member capable of receiving a rotational force to thereby rotate the first drive transmission member about a rotational axis, the first drive transmission member including an engagement portion; and a second drive transmission member capable of receiving the rotational force from the first drive transmission member to thereby rotate the second drive transmission member about a rotational axis, the second drive transmission member being configured to transmit the rotational force to the developing roller, the second drive transmission member including an engagement portion, wherein the engagement portion of the first drive transmission member and the engagement portion of the second drive transmission member couple by interference when the developing roller is in the first position to enable the second drive transmission member to receive the rotational force from the first drive transmission member, and wherein the engagement portion of the first drive transmission member and the engagement portion of the second drive transmission member are separated from each other when the developing roller is in the second position in order to prevent the second drive transmission member from receiving the rotational force from the first drive transmission member.

7. The cartridge of claim 6, wherein the engagement portion of the first drive transmission member includes a plurality of projections, and the engagement portion of the second drive transmission member includes a plurality of projections that are contactable to the plurality of projections of the first drive transmission member.

8. The cartridge of claim 6, further comprising a spring that urges one of the first drive transmission member and the second drive transmission member toward the other of the first drive transmission member and the second drive transmission.

9. The cartridge of claim 6, further comprising a drive connecting and disconnecting member configured to connect the first and second drive transmission members when the developing roller is in the first position and configured to disconnect the first and second drive transmission members when the developing roller is in the second position.

10. The cartridge of claim 6, wherein one of the first drive transmission member and the second drive transmission member is movable along its rotational axis in order to separate the first drive transmission member and the second transmission member from each other.

11. A cartridge comprising:

a developing roller for developing a latent image on a photosensitive drum, the developing roller being movable relative to the photosensitive drum between (i) a first position in which the developing roller is positioned proximate to the photosensitive drum such that the developing roller can develop the latent image on the photosensitive drum, and (ii) a second position in which the developing roller is spaced apart from the photosensitive drum; and a dog clutch comprising:

a first drive transmission member capable of receiving a rotational force; and a second drive transmission member capable of receiving the rotational force from the first drive transmission member, the second drive transmission member being configured to transmit the rotational force to the developing roller when the second drive transmission member is engaged with the first drive transmission member, wherein the first drive transmission member is engaged with the second drive transmission member when the developing roller is in the first position and is disengaged from the second drive transmission member when the developing roller is in the second position.

12. The cartridge of claim 11, wherein an engagement portion of the second drive transmission member is engageable with an engagement portion of the first drive transmission member, the engagement portion of the first drive transmission member includes a plurality of projections, and the engagement portion of the second drive transmission member includes a plurality of projections that are contactable to the plurality of projections of the first drive transmission member.

13. The cartridge of claim 11, further comprising a spring that urges one of the first drive transmission member and the second drive transmission member toward the other of the first drive transmission member and the second drive transmission member.

14. The cartridge of claim 11, further comprising a drive connecting and disconnecting member configured to connect the first and second drive transmission members when the developing roller is in the first position and configured to disconnect the first and second drive transmission members when the developing roller is in the second position.

15. The cartridge of claim 11, wherein one of the first drive transmission member and the second drive transmission member is movable along its rotational axis in order to separate the first drive transmission member and the second transmission member from each other.

16. A cartridge comprising:

a developing roller for developing a latent image on a photosensitive drum, the developing roller being movable relative to the photosensitive drum between (i) a first position in which the developing roller is positioned proximate to the photosensitive drum such that the developing roller can develop the latent image on the photosensitive drum, and (ii) a second position in which the developing roller is spaced apart from the photosensitive drum; and a clutch comprising:

a first drive transmission member capable of receiving a rotational force input to the clutch; and a second drive transmission member capable of operably connecting to the first drive transmission member and outputting the rotational force from the clutch, wherein the first drive transmission member and the second drive transmission member contact each other when the developing roller is in the first position to enable the second drive transmission member to receive the rotational force from the first drive transmission member, and wherein the first drive transmission member and the second drive transmission member are separated from each other when the developing roller is in the second position in order to prevent the second drive transmission member from receiving the rotational force from the first drive transmission member.

17. The cartridge of claim 16, wherein an engagement portion of the second drive transmission member is engageable with an engagement portion of the first drive transmission member, the engagement portion of the first drive transmission member includes a plurality of projections, and the engagement portion of the second drive transmission member includes a plurality of projections that are contactable to the plurality of projections of the first drive transmission member.

18. The cartridge of claim 16, further comprising a spring that urges one of the first drive transmission member and the second drive transmission member toward the other of the first drive transmission member and the second drive transmission member.

19. The cartridge of claim 16, further comprising a drive connecting and disconnecting member configured to connect the first and second drive transmission members when the developing roller is in the first position and configured to disconnect the first and second drive transmission members when the developing roller is in the second position.

20. The cartridge of claim 16, wherein one of the first drive transmission member and the second drive transmission member is movable along its rotational axis in order to separate the first drive transmission member and the second transmission member from each other.

* * * * *